United States Patent
Teshima et al.

(10) Patent No.: US 6,332,909 B1
(45) Date of Patent: Dec. 25, 2001

(54) PROCESSING APPARATUS, PROCESSING SYSTEM AND PROCESSING METHOD

(75) Inventors: Kouichi Teshima, Tokyo; Tomohiro Todoroki, Chigasaki; Terunobu Hayata, Kawasaki; Fuminobu Tezuka; Masao Koyama, both of Yokohama; Naohiko Oyasato, Kamakura; Tomiaki Furuya, Yokohama; Yoshiaki Yokoyama, Konosu; Teruhisa Ogihara; Kaichiro Ogihara, both of Ota, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/142,742

(22) PCT Filed: Mar. 17, 1997

(86) PCT No.: PCT/JP97/00851

§ 371 Date: Feb. 23, 1999

§ 102(e) Date: Feb. 23, 1999

(87) PCT Pub. No.: WO97/33703

PCT Pub. Date: Sep. 18, 1997

(30) Foreign Application Priority Data

Mar. 15, 1996 (JP) .................................................. 8-058656
Sep. 30, 1996 (JP) .................................................. 8-259201

(51) Int. Cl.⁷ .............................. C22B 7/00; C22B 13/00
(52) U.S. Cl. ................................ 75/401; 75/414; 75/392; 75/693; 75/694; 432/191; 432/128; 432/37; 432/133; 588/223; 588/228; 588/234
(58) Field of Search .............................. 75/693, 694, 401, 75/392, 414; 432/191, 128, 37, 133; 588/234, 223, 228

(56) References Cited

U.S. PATENT DOCUMENTS

| | | | |
|---|---|---|---|
| 5,205,857 | 4/1993 | Yokoyama | 75/401 |
| 5,350,438 | 9/1994 | Okada et al. | 75/401 |
| 5,413,621 | * 5/1995 | Hogner et al. | 75/376 |
| 5,547,490 | 8/1996 | Discher et al. | 75/665 |
| 5,735,933 | * 4/1998 | Yokoyama et al. | 75/403 |

FOREIGN PATENT DOCUMENTS

| | | |
|---|---|---|
| 42 17 081 | 11/1992 | (DE) . |
| 42 09 891 | 9/1993 | (DE) . |
| 44 18 562 | 1/1995 | (DE) . |
| 0 493 122 | 7/1992 | (EP) . |
| 0 632 843 | 1/1995 | (EP) . |
| 0 694 623 | 1/1996 | (EP) . |
| 4-346681 | 12/1992 | (JP) . |

(List continued on next page.)

Primary Examiner—Roy King
Assistant Examiner—Tima McGuthry-Banks
(74) Attorney, Agent, or Firm—Finnegan, Henderson, Farabow, Garrett & Dunner, L.L.P.

(57) ABSTRACT

A processing apparatus capable of separating and recovering resins and metals, respectively, from an object being processed, which has resins and metals as its constituent, comprises a first gastight area (102), in which temperature and pressure are regulated so as to permit selective thermal decomposition of resins from the object (150) being processed, a second gastight area (103), which is partitioned from the first gastight area by an openable and closeable partition (105C) and in which temperature and pressure are regulated so as to permit selective vaporization of metals from the object, first recovering chamber (111) connected to the first gastight area for recovering gases produced by thermal decomposition of resins, and second recovering chamber (115) connected to the second gastight area for recovering vaporized metals.

21 Claims, 48 Drawing Sheets

FOREIGN PATENT DOCUMENTS

| | | |
|---|---|---|
| A 4-346681 | 12/1992 | (JP) . |
| 5-148558 | 6/1993 | (JP) . |
| 7-3343 | 1/1995 | (JP) . |
| 7-144185 | 6/1995 | (JP) . |
| 7-505677 | 6/1995 | (JP) . |
| A 8-108164 | 4/1996 | (JP) . |
| 8-127826 | 5/1996 | (JP) . |
| 8-225863 | 9/1996 | (JP) . |
| 9-78148 | 3/1997 | (JP) . |
| 93/19213 | 9/1993 | (WO) . |

* cited by examiner 1201  1202  1203

FIG. 34
(a)
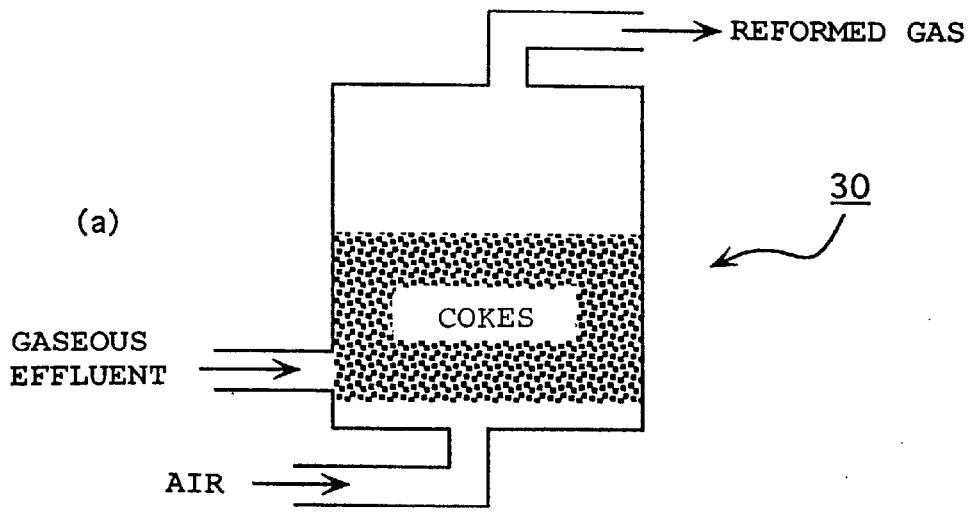
(b)
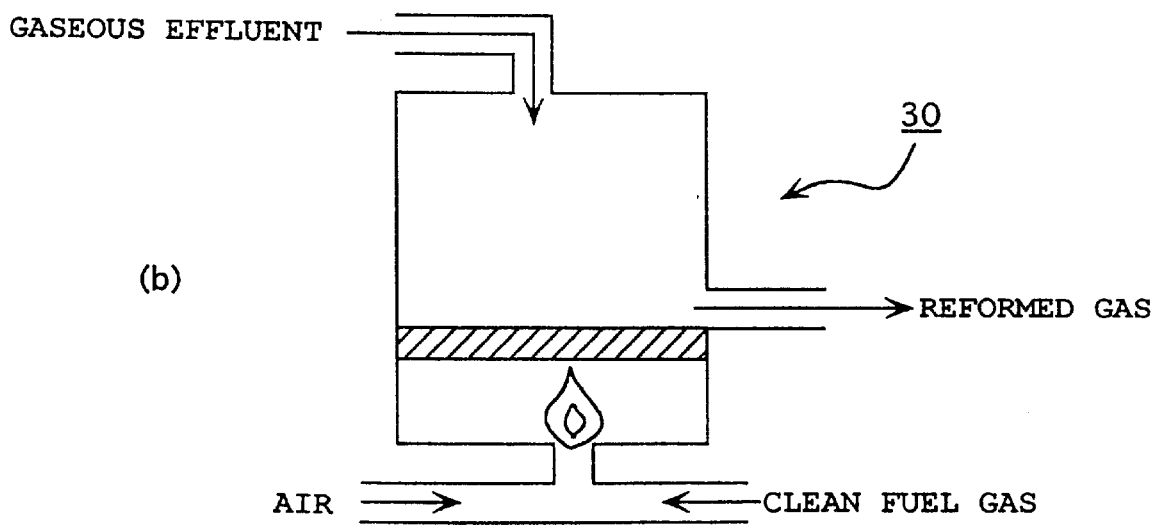

FIG. 35
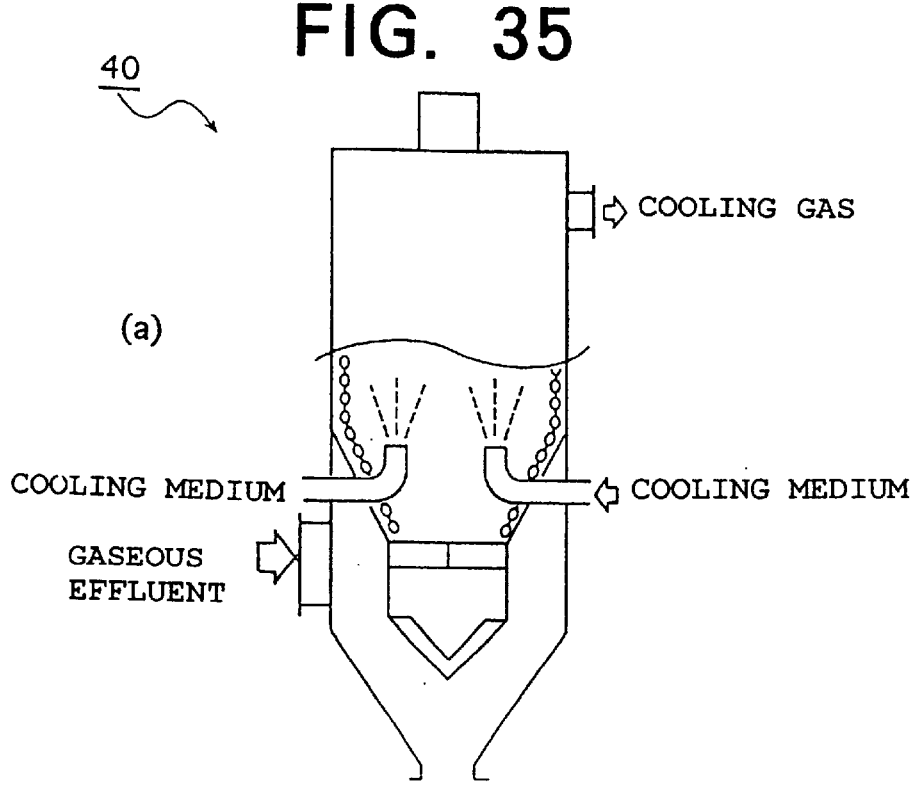
(a)
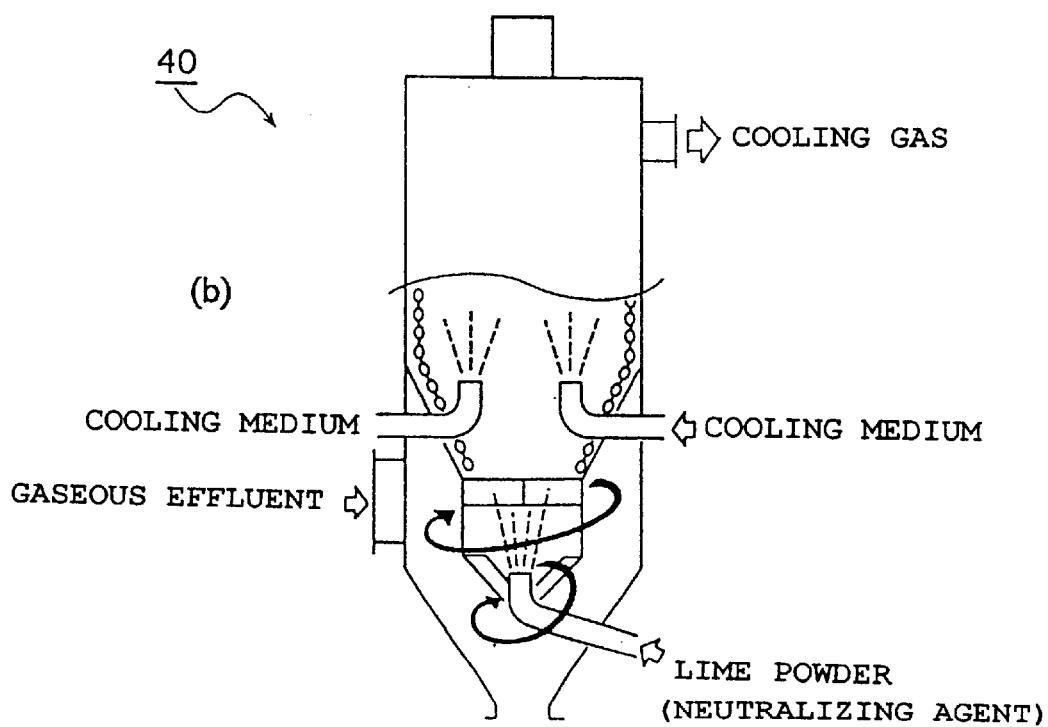
(b)

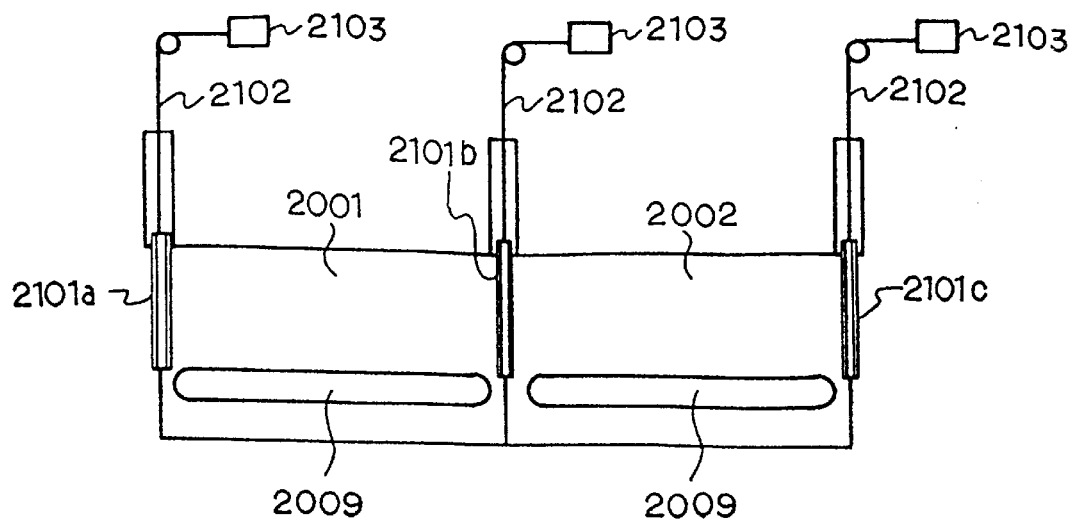
FIG. 60
FIG. 61
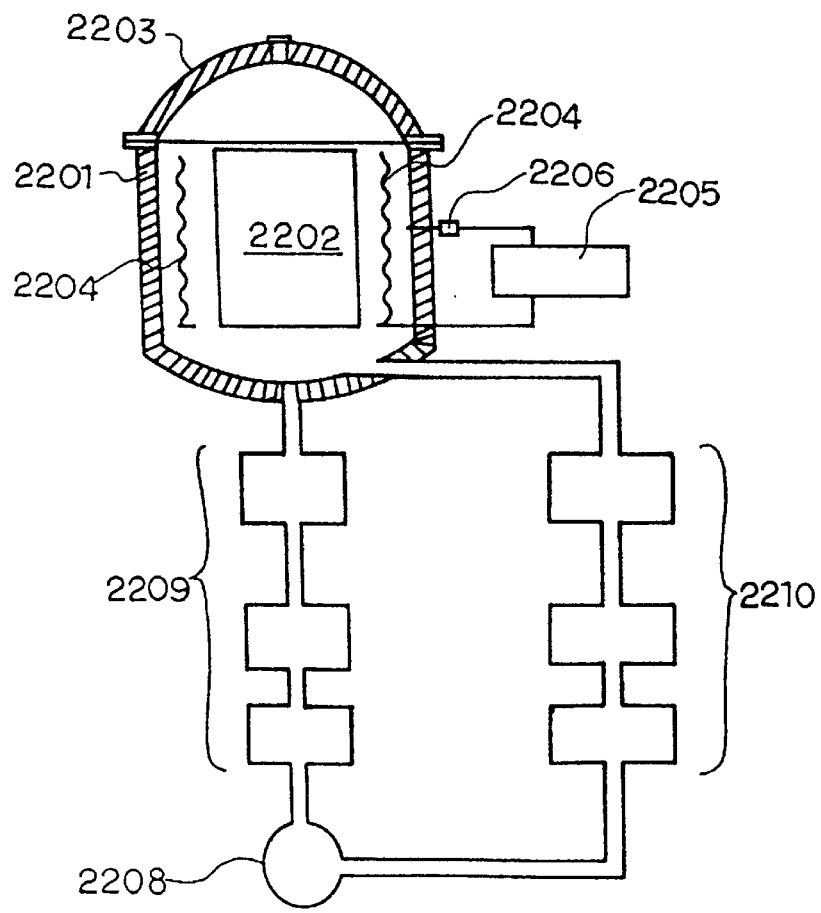

PROCESSING APPARATUS, PROCESSING SYSTEM AND PROCESSING METHOD

This application, which is the U.S. national stage of PCT application, PCT/JP97/00851, filed Mar. 17, 1997, claims priority based on Japanese Applications No. P8-058656, filed Mar. 15, 1996, and No. P8-259201 filed Sep. 30, 1996. All the above applications are incorporated by reference herein.

TECHNICAL FIELD

The present invention relates to a processing apparatus, a processing system and a processing method. The present invention particularly relates to a processing apparatus, a processing system and a processing method removing lead from an object which contains a hazardous substance such as lead, further, relates to a processing apparatus, a processing system, and a processing method disconnecting a connection of an object connected by a metal, an alloy, still further, relates to a processing apparatus, a processing system and a processing method of an object including metal and resin.

BACKGROUND ART

An enormous amount of wastes which modern society embraces has been increasing day by day, establishment of an effective processing technology thereof is an urgent concern, accordingly.

Although various useful substances are included in the wastes, they are not separated from the wastes due to difficulty of separation, and the wastes is almost processed through landfills or incineration processing. From a viewpoint of energy problem or resource exhaustion problem, the useful substances in the wastes are required to be reused as much as possible through separation and recovery.

Besides, there are hazardous substances in the wastes, which not only causes an environment destruction but also make difficult to recycle the wastes. Therefore, if the hazardous substances are effectively separated from the wastes, the wastes can be positively recycled as a treasure house of the resources and an influence on the environment or living things can be reduced to the minimum level.

Thus, in order to circumvent such serious problems as environment pollution, resources exhaustion, and energy shortage that surround the modern society, a technology effectively processing the wastes must be established.

However, recently, the wastes takes various complex forms and there is much of the wastes in which a plurality of different materials are integrated into a composite. Further, there are the wastes that include the hazardous materials. In order to recycle such a composite wastes as resources, the useful substances and the hazardous substances have to be selectively separated and recovered from the wastes in which a plurality of different materials are integrated. Such a processing technology has not been established.

Since a resin-coated aluminum foil formed by laminating such as a resin film and an aluminum foil is not expensive and excellent in workability, for instance, a large volume of them is used in various fields such as wrapping cases of foods or medicines including wrapping cases of retort pouch foods.

Further, a resin-coated copper laminate foil obtained by laminating a resin film and a copper foil is also used in a huge quantity, in particular, it is used in a huge quantity as constituent components of electronic devices such as a printed circuit board, a flexible substrate, a film-carrier for a TAB technology.

However, an effective processing technology of the used resin-coated aluminum foils or resin-coated copper laminate foils has not been established because they are composite wastes formed by integrating a plurality of different materials.

Conventionally, the wastes of the used resin-coated aluminum foils or the resin-coated copper laminate foils are processed through landfills or incineration processing. Because of a large space needed for landfills processing of the wastes, there is a problem that acquisition of such a large space is becoming more and more difficult. Besides, in the case of incineration, there are problems of damaging the furnace and of generating oxides of such as aluminum or copper.

A huge quantity of electricity is used for smelting of aluminum or copper. It is loss of energy to oxidize once smelted aluminum or copper by incineration. Therefore, it is strongly required that a technology that makes possible to recycle these metals as metal state as resources is established.

Besides, the composite wastes such as the printed circuit boards of the above described electronic devices includes a large quantity of hazardous substances such as lead. In a conventional technology, due to its low melting point and excellent wettability even in an oxidizing atmosphere, such a solder alloy as a lead-tin based alloy is used in large volume in solder connection of the various kinds of electronic devices.

Now, since lead is strongly poisonous and can induces functional damage on nervous system or genital system when being taken in a body, handling of lead or lead containing alloys has been regulated by law.

Further, due to a recent high concern of the environmental destruction, the wastes processing of the electronic devices and components that employ a solder alloy including lead has became a social problem.

That is to say, composite wastes such as waste electronic instruments in which a large volume of solder alloy containing lead is employed, are conventionally processed mainly by landfills in an identical manner as that of the industrial wastes or the general wastes.

However, when the composite type wastes containing hazardous substances such as lead as in the case of the waste electronic devices are processed by landfills, the lead component can be leached out due to such as rain fall, thereby seriously damaging the environment through pollution of soil or underground water. In particular, since dissolution of lead from a solder alloy is increased drastically due to acid rain, there is a serious concern of severely influencing on the environment or the living things.

From these reasons, when the wastes such as the waste electronic devices that contain hazardous substances such as lead are processed, it is required to be processed after separation/recovery of lead.

However, at present time, a technology for effectively recovering lead has not been found.

Besides, since there is a possibility of recovery cost of lead to invite an increase of product cost, although the development of lead free solder not containing lead is being demanded and utilized practically in part, there are many still unsolved problems with respect to performance, cost. Thus, still large volume of solder alloy including lead is being used. Further, a vast volume of the wastes including lead has been produced. Moreover, a huge amount of wastes is stocked somewhere since there is still no effective and safe processing technology established.

If the viewpoint is changed, the composite wastes such as a circuit board of the above described electronic device can be a treasure house of the resource if the hazardous substance can be separated. So-called wastes can be called a treasure house of the resource if judged based on the relative value. If a technology that recycles the wastes as resources and is not expensive can be established, the so-called wastes are a resource and are not the wastes.

Although, in a circuit board, various kinds of electronic components such as an IC, an LSI, a resistor, a condenser and the like are mounted, and, useful metals including Cu, Ni, Al, Au, Pt, Ta, W, Mo, Co, Cr and resins are contained, among them are such materials that are worried about their exhaustion.

However, since a multiplicity of electronic components are mounted on a substrate and, accompanying the recent tendency of higher integration, number of connecting portions tends to increase and to result in making their connecting pitch fine, effective separation of the electronic components from the substrate is very difficult. In addition, the circuit board and the electronic components, as described above, have many solder connecting portions that include the poisonous lead. This is one of the biggest causes hindering effective processing of such as the waste electronic instruments.

The present invention is to circumvent such problems. That is to say, an objective of the present invention is to provide a processing apparatus, a processing system and a processing method that enables to effectively and economically process objects possessing the metals and the resins as their constituent members.

An objective of the present invention is to provide a processing apparatus, a processing system and a processing method that enables to separate/recover lead from objects including lead.

An objective of the present invention is to provide a processing apparatus, a processing system and a processing method enabling also to separate/recover the resin component in addition to separate/recover lead from an object including lead.

An objective of the present invention is to provide a processing apparatus, a processing system and a processing method which enables to disconnect connections of the object connected by an alloy An objective of the present invention is to provide a processing apparatus, a processing system and a processing method that enables to disconnect connections of the object connected by an alloy including lead.

An objective of the present invention is to provide a processing apparatus, a processing system and a processing method enabling to separate/recover also the resin component in addition to disconnect connections of the object including the resin connected by an alloy including lead as a constituent member.

An objective of the present invention is to provide a processing apparatus, a processing system and a processing method enabling to separate/recover effectively a resin component and a metal from an object including the resin and the metal as constituent members.

An objective of the present invention is to provide a processing apparatus, a processing system and a processing method enabling to separate/recover the resin and a plurality of metals respectively in addition to separate effectively the resin component and the metals from the object in which the resin and a plurality of metals are integrated.

DISCLOSURE OF THE INVENTION

The present invention, in order to process an object being processed having a resin and a metal as constituent members, is to provide a means decomposing the resin to recover and a means evaporating the metal to recover.

A processing apparatus of the present invention is a processing apparatus for processing an object comprises a resin and a metal as constituent members, and comprises a first gas tight zone provided with a temperature adjusting means and a pressure adjusting means adjusting a temperature and a pressure so as to pyrolyze selectively the resin of the object, a second gas tight zone separated from the first gas tight zone by a partition capable of being opened and closed and provided with a temperature adjusting means and a pressure adjusting means adjusting the temperature and the pressure so as to vaporize selectively the metal in the object, a first recovering means for recovering gases generated through pyrolysis of the resin, the first recovering means connected to the first gas tight zone and, and a second recovering means for recovering the metal vaporized from the object, and the second recovering means connected to the second gas tight zone and.

The first gas tight zone is to pyrolyze selectively the resin in such a manner that the metal (excluding mercury) in the object does not evaporate. In general, when the object is complex, during processing, the object can be partially oxidized or reduced, or its phase equilibrium state can change, but, the constituent metal (excluding mercury) of the object needs only remain in the object or in the first air tight zone without being vaporized. In addition, it can be provided with a temperature adjusting means and a pressure adjusting means decomposing the resin while maintaining the constituent metal of the object not to be substantially oxidized.

As a temperature adjusting means, a heating means and a temperature measuring means can be used. As the heating means, various types of convection heating, radiation heating can be selected as demand arises, or combination thereof can be used. For instance, resistance heating such as a seeds heater can be used, or gases, heavy oil or light oil can be combusted. Further, an induction heating means can be used. For a temperature measurement means, various kinds of temperature sensors can be used.

The resin is selectively decomposed to vaporize (includes vaporization after once conversion to oily state) or carbonize under a temperature and a pressure condition where the metal in the object do not oxidize or vaporize so much in a first gas tight zone.

Thereafter, the gas(es) generated by decomposition of the vaporized resin is condensed in a first recovering system, however, the recovered decomposition products of the resin can be burned to be used as a heating means. As described above, in general, when the object is complex and in huge quantity, during processing, the object can be partially oxidized or reduced, or its phase equilibrium state can change. For instance, when the constituent metal of the object is mingled in the first recovering system recovering the decomposition products of the resin, it can be separated/recovered in a later processing step.

As a pressure adjusting means, an exhausting or pressurizing means or a pressure measuring means can be used. For the exhausting means, various kinds of vacuum pumps such as a rotary pump, an oil diffusion pump, a booster pump, for instance, can be employed. For the pressurizing means, gases can be introduced into the system from a gas reservoir. For the pressure measuring means, such as a Bourdon tube or a Pirani gage can be used depending on the degree of vacuum or the like.

A purging zone can be disposed adjacent to the first gas tight zone. The purging zone can be provided with a pressure adjusting means such as an exhausting system or a pressurizing means, a temperature adjusting means heating precedently or cooling the object. In addition, a carrier gas introducing system replacing the gas in the system can be provided, the carrier gas introducing system also can function as the pressurizing system.

An object is introduced into the first gas tight zone from outside the apparatus through a purging zone.

By providing with the purging zone, when an object is introduced into the first gas tight zone, the first gas tight zone can be secluded from the outside portion of the apparatus. In addition, since the first gas tight zone can be always exhausted to maintain a decompression state, load on vacuum pumps can be reduced.

Similarly, a purging zone can be provided with adjacent to the second gas tight zone. The object is taken out outside the apparatus from the second gas tight zone through the purging zone.

By providing a purging zone posterior to the second gas tight zone, when the object is taken out from the second gas tight zone, the second gas tight zone can be secluded from the outside of the apparatus. Therefore, because of being able to always exhaust the second gas tight zone to maintain a decompression state, load on a vacuum pump can be alleviated. Further, until the temperature of the heated object is sufficiently cooled down to the temperature where the object is not oxidized under the atmospheric pressure, the object can be held shielded from the outside air.

That is, the purging zone, from the viewpoint of apparatus maintenance as well as maintenance of the object being processed, functions as a buffer zone between the first and the second gas tight zone, and the outside of the apparatus.

The first gas tight zone and the second gas tight zone of the processing apparatus are secluded by a partition capable of being opened and closed. The partition maintains, in addition to gas tightness of the respective zones, adiathermic property of the respective zones. For instance, a vacuum door capable of maintaining gas tightness of zones can be combined with an adiathermic door capable of maintaining heat insulation. When the first and the second gas tight zones are secluded with a partition of a combined structure of such as an adiathermic door-a vacuum door-an adiathermic door, the gas tightness and the adiathermic properties of the respective zones can be maintained. By disposing an adiathermic door between a vacuum door and a zone secluded by the vacuum door, even when heavy thermal load is put on the vacuum door, the vacuum door can be protected from the thermal load. In this case, the vacuum door can be protected from heat of the first and the second gas tight zone.

Such a partition can be, naturally, disposed between the outside portion of the apparatus and a purging zone, between the purging zone and a first gas tight zone, between a second gas tight zone and a purging zone, but what kind of partition should be disposed can be designed according to respective demands. For instance, when the thermal load of the purging room is small, a vacuum door can be provided.

In a first gas tight zone wherein the object being processed was introduced, a state of a metal in the object can be maintained, and the temperature/pressure condition can be adjusted so as to decompose the resin selectively. The temperature/pressure condition can be installed in advance or can be controlled by feedback of the measured values of the temperature and the pressure to the heating means, the pressure adjusting means and the like. The second gas tight zone can be handled in the same manner.

Further, when the first gas tight zone is decompressed, an oxygen concentration is also decreased to be less liable the object to be rapidly oxidized. In addition, although a huge quantity of decomposition gas is generated from the resin due to heating, generally, the resin hardly generates oxygen through its decomposition. Further, the decomposition product of the resin is also easily vaporized.

Besides, thermal conductivity in the gas tight zone decreases through decompression. However, if the first gas tight zone is in a non-oxidizing atmosphere, even under the atmospheric pressure or a pressurized condition, the object is not substantially oxidized. Therefore, if the inside of the first gas tight zone is in a non-oxidizing atmosphere, pressurization can be possible and can improve the thermal conductivity in the system.

A first recovering means is to recover the decomposition product gas of the resin constituting the object. Here, the resin can be any one of a synthetic resin or a natural resin, or a mixture thereof.

As a first recovering means, an oil condenser, which converts gas into oil, condensing the gas to convert into oil can be employed. In addition, when such gases as halogen, halogenated hydrocarbons are included in the decomposition product gases of the resin, they can be decomposed by the help of, for example, a catalyst.

As described above, the heavy oil or light oil recovered at the first recovering means can be used for heating the first or the second gas tight zone.

Further, the first recovering means can be provided in a plurality of systems or can be connected to form a multiplicity of steps.

The resin component of the object is almost thermally decomposed in the first gas tight zone and the decomposition product gas is recovered. Therefore, a metal component in the object is not vaporized and remains in the object. Besides, much of the resin in the object exists as carbide. In addition, in this state, the object is transferred from the first gas tight zone to the second gas tight zone.

In the processing apparatus of the present invention, the object heated in the first gas tight zone is introduced into the second gas tight zone without being cooled. Therefore, an input energy in the second gas tight zone can be saved remarkably, and heating period can be shortened.

The temperature/pressure condition in the second gas tight zone wherein the object being introduced is adjusted so as to vaporize the metal in the object. When the second gas tight zone is decompressed, the metal in the object can vaporize at a temperature lower than that at the atmospheric pressure. Further, since the oxygen concentration decreases to be non-oxidizing atmosphere in the second gas tight zone, the vaporized metal can be maintained in metallic state.

For instance, although the boiling point of Zn at 760 Torr is 1203K, but at 1 Torr, that is 743K, and at $10^{-4}$ Torr, that is 533K.

In addition, although the boiling point of Pb at 760 Torr (1 atm) is 2017K, but at $10^{-1}$ Torr, that is 1100K, and at $10^{-3}$ Torr, that is 900K.

Thus, in the second gas tight zone, a metal can be selectively vaporized according to the temperature/pressure condition.

Further, since almost all of the resin of the object is converted to carbide when being introduced into the second gas tight zone, the vaporization of the metal from the object does not almost generate the decomposition product gas. Therefore, the vaporized metal can be recovered as a metal of high purity state, thereby reducing the load of the vacuum pump.

The second recovering means is to recover the metal vaporized in the second gas tight zone.

For instance, by intervening a recovering chamber between the second gas tight zone and an exhausting system, the metal vaporized in the chamber can be cooled to a temperature lower than its melting point to be condensed to recover. The inside structure of the recovering chamber can be formed in, for example, a counter-flow structure or a spiral structures. Instead, between the recovering chamber and the second gas tight zone, between the recovering chamber and the exhausting system, a valve or a partition capable of being opened/closed can be disposed. That is, when the metal vaporized from the object is introduced into the recovering chamber, the recovering chamber can be closed to let cool the metal and condense to be recovered.

Even when the vaporized metal is condensed, recovered continuously or even when it is condensed, recovered in a batch, recovering efficiency can be heightened if the residence time of the vaporized metal in the recovering chamber can be made long.

Further, $N_2$ or noble gases can be introduced into the second gas tight zone as a carrier gas. The vaporized metal can be effectively introduced into the recovering chamber by the carrier gas.

A plurality of the systems of the second recovering means can be provided. A plurality of the second recovering means can be used to recover the same metal or, by gradually adjusting the temperature and the pressure in the second gas tight zone, a plurality of metals can be selectively vaporized to be recovered by switching the second recovering means consisting of a plurality of systems.

Further, the second recovering means can be connected to form a multiplicity of steps.

Thus, a processing apparatus of the present invention is to process an object being processed having a resin and a metal as constituent members. The processing apparatus of the present invention, by disposing the first gas tight zone decomposing the constituent resin of the object prior to the second gas tight zone vaporizing the constituent metal of the object, enables to process the object having a resin and a metal as constituent members. The decomposition product gas, which is generated in huge quantity in the gas tight zone, of the resin in the object can be recovered by the first recovering unit connected to the first gas tight zone. Therefore, in the second gas tight zone, heating and decompression sufficient to vaporize the metal can be carried out.

In addition, since, in the first gas tight zone, the resin is selectively pyrolyzed under the condition where the metal of the object is not so much oxidized or vaporized, the metal is separated/recovered in metallic state from the object.

The processing apparatus of the present invention can be further provided with an oxygen concentration adjusting means for adjusting an oxygen concentration in the first gas tight zone.

By providing the oxygen concentration adjusting means, selective pyrolysis of the constituent resin of the object can be promoted. Further, in the first gas tight zone, a temperature adjusting means and a pressure adjusting means and an oxygen concentration adjusting means can be provided to selectively pyrolyse the resin while maintaining the metal not to be substantially oxidized.

The present processing apparatus is characterized in being provided with an oxygen concentration adjusting means in the first gas tight zone. By employing the oxygen concentration adjusting means, the oxygen concentration in the first gas tight zone can be adjusted independently of the total pressure of the first gas tight zone.

By adjusting the oxygen concentration in the first gas tight zone, the degree of the freedom of the processing in the first gas tight zone can be promoted. For instance, without deteriorating the thermal conductivity in the first gas tight zone, the state of the constituent metal of the object can be maintained. Further, under the pressurized condition, the resin can be more positively decomposed.

For the oxygen concentration adjusting means, an oxygen concentration sensor, which is an oxygen concentration measuring means, and a carrier gas introducing system can be employed.

As an oxygen concentration sensor, for example, a so-called zirconia sensor adopting zirconia (zirconium oxide) can be used, or, absorption of, for example, CO and $CO_2$ can be measured by infra-red spectrometry. Further, GC-MS (gas chromatography combined with mass spectroscopy) method can be used, or by selecting or combining them depending on demands, they can be used.

As a carrier gas, such as $N_2$ or noble gases such as Ar can be used. Further, by this carrier gas, not only the oxygen concentration is controlled in the first gas tight zone but also the decomposition product gas of the resin can be effectively introduced into the first recovering means. Further, it can concurrently function as a pressure control means.

Further, a plurality of second gas tight zones can be provided. That is, a processing apparatus is processing an object being processed having a resin and a first metal and a second metal as constituent members, and comprises a first gas tight zone provided with a temperature adjusting means and a pressure adjusting means and an oxygen concentration adjusting means selectively pyrolyzing the resin, a second gas tight zone provided with a temperature adjusting means and a pressure adjusting means selectively vaporizing the first metal in the object separated from the first gas tight zone by a partition capable of being opened/closed, a third gas tight zone provided with a temperature adjusting means and a pressure adjusting means selectively vaporizing the second metal in the object separated from the second gas tight zone by a partition capable of being opened/closed, a first recovering means for recovering gas generated through decomposition of the resin connected to the first gas tight zone, a second recovering means for recovering the first metal vaporized from the object connected to the second gas tight zone, and a third recovering means for recovering the second metal vaporized from the object connected to the third gas tight zone.

The structure of this processing apparatus is characterized in having a plurality of the second gas tight zones. By providing a plurality of the second gas tight zones, a plurality of metals contained in the object can be selectively vaporized, recovered, respectively.

The processing apparatus of the present invention is to process an object being processed having a resin and a metal as its constituent members, and comprises, a gas tight chamber capable of holding the object therein, and the gas tight chamber being provided with a temperature adjusting means and a pressure adjusting means and an oxygen concentration adjusting means; a first recovering means for recovering gases generated by pyrolysis of the resin when a temperature and an oxygen concentration in the gas tight chamber are adjusted so that the resin of the object being pyrolyzed, and the first recovering means connected to the gas tight chamber; and a second recovering means for recovering a first metal vaporized from the object when the temperature and the pressure in the gas tight chamber are adjusted so that the first metal of the object being selectively vaporized, and the second recovering means connected to the gas tight chamber. The processing apparatus of the present invention can be further provided with a third recovering means disposed with connecting to the gas tight chamber and recovering the second metal vaporized from the object when a temperature and a pressure in the gas tight chamber are adjusted so as to selectively vaporize the second metal in the object.

A first recovering means can recover the gas generated through decomposition of the resin when the temperature and the oxygen concentration in the gas tight chamber are adjusted so as to selectively pyrolyze the resin while maintaining the first and the second metal in the object not to be substantially oxidized.

The processing apparatus is provided with, instead of the above described processing apparatus of the present invention which is provided with a plurality of the gas tight zones different in their conditions such as the temperature, the pressure, the oxygen concentration in the gas tight vessel, a means varying the condition in one gas tight chamber and a plurality of recovering means corresponding to the conditions in the system.

For the temperature adjusting means in the gas tight chamber, that is, the temperature adjusting means of the object, likely to the processing apparatus of the above described present invention, a heating means and a temperature sensor can be employed. For heating, various kinds of heating means such as convection, radiation can be used alone or in combination thereof as demand arises.

Also for the pressure adjusting means, as identical as for the processing apparatus of the above described present invention, an exhausting means, a pressurizing means and a pressure measuring means can be used. For the exhausting means, various kinds of vacuum pumps such as a rotary pump, an oil diffusion pump, a booster pump can be used. For the pressurizing means, for instance, gas can be introduced into the system from a gas reservoir. As a pressure measuring means, a Bourdon tube or a Pirani gage can be used according to the degree of vacuum to be measured.

As for also the oxygen concentration measuring means, an oxygen concentration sensor and a carrier gas introducing system can be used in the similar manner.

For also the recovering means, it can be provided as identical as the above-described processing apparatus of the present invention.

That is, as a first recovering means, a device converting to oil that condenses the decomposition product gas of the resin to recover, for example, can be provided. In addition, the obtained oil by this device can be used as a heating means.

As a second, a third recovering means, for instance, a recovering chamber having an exhausting system can be connected to the gas tight zone to condense/recover the metal vaporized in the chamber by cooling the metal below the melting point of the metal. The inside of the recovering chamber can be a counter-flow structure or a spiral structure. Instead, between the recovering chamber and the second gas tight zone, between the recovering chamber and the exhausting system, a valve or a partition capable of being opened/shut can be disposed. That is, when the metal vaporized from the object is introduced into the recovering chamber, the recovering chamber is closed to cool, thereby condensing the metal to recover.

The processing system of the present invention is a processing system for processing an object being processed comprises lead as a constituent member that comprises a gas tight chamber capable of holding the object being processed therein; a temperature adjusting means for adjusting a temperature in the gas tight chamber;

A pressure adjusting means for adjusting a pressure in the gas tight chamber; a controlling means for controlling the temperature adjusting means and the pressure adjusting means so that the lead in the object being selectively vaporized; and at least a recovering means for recovering the lead vaporized from the object, and the recovering means connected to the gas tight chamber.

Further, the processing system comprises a gas tight chamber holding therein an object being processed having lead and resin as constituent members, a temperature adjusting means for adjusting the temperature in the gas tight chamber, a pressure adjusting means for adjusting the pressure in the gas tight chamber, a first control means for controlling the temperature adjusting means and the pressure adjusting means so as to selectively pyrolyze the resin with maintaining the temperature and the pressure in the gas tight chamber not to vaporize substantially the lead in the object, a second control means for controlling the temperature adjusting means and the pressure adjusting means so as to adjust the temperature and the pressure in the gas tight chamber to let vaporize selectively the lead in the object, a first recovering means connected to the gas tight chamber and recovering the gas generated through decomposition of the resin, and a second recovering means connected to the gas tight chamber and recovering the vaporized lead from the object.

The processing system of the present invention is a processing system for processing an object being processed having lead and resin as constituent members, that comprises a gas tight chamber capable of holding the object being processed; a temperature adjusting means for adjusting a temperature in the gas tight chamber; a pressure adjusting means for adjusting a pressure in the gas tight chamber; an oxygen concentration adjusting means for adjusting an oxygen concentration in the gas tight chamber; a first controlling means for controlling the temperature adjusting means and the oxygen concentration adjusting means so that the resin of the object being selectively pyrolyzed; a second controlling means for controlling the temperature adjusting means and the pressure adjusting means so that the temperature and the pressure in the gas tight chamber allow the lead in the object to be selectively vaporized; at least a first recovering means for recovering gases generated through pyrolysis of the resin, and the first recovering means connected to the gas tight chamber; and at least a second recovering means for recovering the lead vaporized from the object being processed, and the second recovering means connected to the gas tight chamber.

The first control means can control the temperature adjusting means and the oxygen concentration adjusting means so as to pyrolyze selectively the resin while maintaining the temperature and the oxygen concentration in the gas tight chamber not to oxidize substantially the lead in the object.

A processing method, for processing an object comprises lead as a constituent member, is to comprise steps of, sealing a gas tight chamber after introduction of the object being processed into the gas tight chamber; adjusting a temperature and a pressure in the gas tight chamber so that the lead in the object being selectively vaporized; and recovering the lead vaporized from the object.

The processing method in the present invention can comprise a step of sealing the gas tight chamber after introduction of the object having lead and resin as the constituent members, a first control step for adjusting a temperature and a pressure in the gas tight chamber so as to pyrolyze selectively the resin in the object, a second controlling step for adjusting the temperature and the pressure in the gas tight chamber so as to vaporize selectively the lead in the object, a first recovering step for recovering the gas generated through pyrolysis of the resin, and a second recovering step for recovering the vaporized lead from the object.

Further, the processing method of the present invention comprises steps of, a step of sealing the gas tight chamber after introduction of the object being processed having lead and resin as constituent members, a first controlling step for adjusting a temperature and an oxygen concentration in the gas tight chamber so as to pyrolyze selectively the resin, a second controlling step for adjusting the temperature and the pressure in the gas tight chamber so as to vaporize selectively the lead in the object, a first recovering step for recovering the gas generated through pyrolysis of the resin, and a second recovering step for recovering the vaporized lead from the object.

In addition, in the first controlling step, the temperature and the oxygen concentration in the gas tight chamber can be adjusted so as to pyrolyze selectively the resin while maintaining the lead in the object not to be substantially oxidized.

These processing systems and processing methods of the present invention can separate/recover lead from an object including lead.

The first controlling step can be implemented by, for example, adjusting the oxygen concentration in the gas tight chamber below 10 vol %. By adjusting the oxygen concentration, the lead can be prevented from being oxidized.

Further, in the first controlling step, the temperature in the gas tight chamber can be adjusted in the range of 323 to 1073K, for example.

Further, the first controlling step can be also implemented by adjusting the pressure in the gas tight chamber in the range of around 760 to 10 Torr. By adjusting the pressure, lead can be vaporized at a lower temperature.

The second controlling step can be implemented by adjusting the pressure in the gas tight chamber in the range of around $6 \times 10^2$ to $7.6 \times 10^3$ Torr. By selectively pyrolyzing the resin through pressurizing, the pyrolysis of the resin can be expedited.

Further, the second controlling step can be implemented by, for example, adjusting the temperature in the gas tight chamber in the range of 713 to 2273K.

The present processing system and method are characterized primarily in introducing an object being processed into a gas tight chamber and in selectively vaporizing lead in the object, by adjusting the temperature, the pressure, the oxygen concentration in the gas tight chamber, to separate/recover the lead in the object from the object. Further, the metal other than lead, by controlling the inside of the gas tight chamber to become a predetermined temperature and pressure which can vaporize selectively the metal, can be separated/recovered from the object.

In addition, when the object being processed contains lead and resin, at first, by heating the object being processed under a condition in which lead is not vaporized and is not oxidized, the resin portion is selectively pyrolyzed (gasification, conversion to oil, carbonization) and, thereafter, lead is selectively vaporized to recover the vaporized lead in metallic state. Here, the resin can be a synthetic resin or a natural resin or a combination thereof. In general, much of the thermoplastic resin can be recovered by vaporizing, converting to oil through heating, but, in a case of the thermosetting resin, much of them is carbonized, vaporized. Anyway, by selectively pyrolyzing the constituent resin in the object, the lead can be positively recovered.

For the apparatus portion of the processing system, for instance, such as the above described processing apparatus of the present invention can be employed. That is, for instance, by adjusting gradually such conditions as the temperature, pressure, oxygen concentration of the inside of one gas tight chamber, the selective pyrolysis of the resin, vaporization of lead can be carried out. Further, by disposing a plurality of gas tight zones different in their conditions such as the temperature, the pressure, the oxygen concentration, and, by transferring sequentially the object through opening/closing of a partition separating between each gas tight zone, the selective pyrolysis of the resin and he vaporization of lead can be implemented.

As a temperature adjusting means, a heating means and a temperature measuring means can be employed. As the heating means, resistance heating such as a seed heater can be employed or combustion of oil such as heavy oil or light oil can be used. Further, an induction heating can be used. As a measuring means, various kinds of thermometers can be used.

By controlling the temperature, pressure, the oxygen concentration in the gas tight chamber, under the temperature/pressure conditions which does not oxidize or vaporize the lead in the object, the resin can be selectively pyrolyzed to vaporize (includes the vaporized products after conversion to oil) or to carbonize. Though the decomposition product gas of the vaporized resin is recovered at the first recovering means, but the recovered decomposition product gas of the resin can be burned to use as a heating means.

As a pressure adjusting means, an exhausting means or a pressurizing means and a pressure measuring means can be used. As an exhausting means, various kinds of vacuum pumps such as a rotary pump, an oil diffusing pump, a booster pump can be provided according to the demands such as the degree of vacuum, exhausting capacity. As the pressurizing means, for instance, a gas can be introduced into the system from a gas reservoir.

In addition, a carrier gas can be introduced into the gas tight chamber, and, by pressurizing the gas through adjustment of, for example, a valve of the exhausting system or an introducing flow rate, it can be used as a pressurizing means.

As the pressure measurement means, a Bourdon tube or a Pirani gage can be used according to the degree of vacuum to be measured.

Also in the processing system of the present invention, in addition to the temperature adjusting means and the pressure adjusting means, an oxygen concentration adjusting means adjusting the oxygen concentration in the gas tight chamber can be provided.

By providing the oxygen concentration adjusting means, the oxygen concentration in the gas tight chamber can be adjusted independently of the total pressure. By adjusting the oxygen concentration in the gas tight chamber, the degree of freedom of processing in the gas tight chamber can be made broad. For instance, without deteriorating the thermal conductivity in the gas tight chamber, the resin can be selectively pyrolyzed. Further, the oxidation, vaporization of the constituent metal of the object can be prevented from occurring.

In particular, when the object being processed contains a resin as a constituent member, by adjusting the oxygen concentration in the gas tight chamber, while maintaining substantially the state of lead, more effectively the resin can be pyrolyzed. For instance, by pressurizing the inside of the gas tight chamber at around 1 to 10 atmospheric pressure with a non-oxidizing atmosphere maintained, more positive and the selective pyrolysis of the resin can be carried out.

For an oxygen concentration measuring means, such as an oxygen concentration sensor which is an oxygen concentration measuring means, and a carrier gas introducing system can be employed.

As an oxygen concentration sensor, such as a zirconia sensor adopting zirconia(zirconium oxide) can be used or an absorption of, for instance, CO and $CO_2$ can be measured with an infra-red spectrometer. Further, GC-MS can be employed, or, according to demands, a combination thereof can be employed.

Additionally, the processing system of the present invention is provided with a controlling means controlling such as the temperature adjusting means, the pressure adjusting means, or the oxygen concentration adjusting means. The controlling means is to control the temperature, the pressure or the oxygen concentration in the gas tight chamber so as to pyrolyze selectively the resin and so as to vaporize selectively lead in the object. This controlling means, by measuring the state in the gas tight chamber with the above described temperature sensor, the pressure sensor or the oxygen concentration sensor, feed-backs the measured values to the heating means, the exhausting system, the pressurizing system, the carrier gas introducing system to optimize the state in the gas tight chamber.

In addition, such a control can be carried out by an operator through operation of the heating means, the exhausting means, the pressurizing means, the carrier gas input system and the like, according to the parameters of the states in the gas tight chamber.

Further, a control device, which, by using the parameters of the measured states in the gas tight chamber as input data, outputs signals operating the heating means, the exhausting system, the pressurizing system, the carrier gas input system and the like in such a manner that the conditions in the gas tight chamber are optimized, can be provided. The control circuit can be stored in a memory means of the control device in a form of a program.

A first step in the processing method of the present invention is a step for pyrolyzing selectively the resin by heating the object.

The resin such as plastic starts melting from around 323K (50° C.), pyrolyses at around 453 to 873K (180 to 600° C.) to discharge hydrocarbons mainly composed of C1 to C16. The pyrolyzed product gas generated through the selective pyrolysis of these resins can be recovered as a useful oil by condensing by, for instance, a device converting into oil.

It is preferable for the selective pyrolysis of the resin to be implemented in a state where the oxygen concentration in the gas tight chamber is adjusted. The oxygen concentration can be adjusted by adjusting the total pressure in the gas tight chamber or by introducing the carrier gas such as $N_2$, Ar.

By adjusting the oxygen concentration in the gas tight chamber, the lead can be prevented from being oxidized.

Further, by adjusting the oxygen concentration independently of the total pressure, the oxidation of lead can be prevented without lowering the thermal conductivity in the gas tight chamber, resulting in improvement of the decomposition efficiency of the resin, the recovering efficiency of the decomposition gas. As demand arises, by pressurizing the inside of the gas tight chamber through introduction of the carrier gas such as $N_2$, Ar, the resin can be selectively pyrolyzed.

It is not necessary for the resin in the object to be completely pyrolyzed, but can be decomposed to the degree which does not adversely affect on the separation, recovery of lead.

Though lead (metal state) shows the vapor pressure of 760 mmHg at 2017K, lead oxide shows the vapor pressure of 760 mmHg at 1745K lower than that of lead. Therefore, by adjusting the oxygen concentration in the gas tight chamber, lead metal can be suppressed from being oxidized to lead oxide, thereby preventing scattering of the lead, resulting in recovering positively the lead with high yieled afterwards.

After the selective pyrolysis of the resin in the object, the temperature and the pressure in the gas tight chamber are controlled so as to selectively vaporize the lead, resulting in separation/recovering of the lead in the object.

When metal other than lead is contained in the object, by taking advantage of the difference of the vapor pressures, lead can be selectively vaporized.

The temperature at which lead vaporizes varies according to the pressure in the gas tight chamber. When heated at, for example, 1673K under the atmospheric pressure, the vapor pressure of lead is 84 mmHg, but those of iron, copper, tin do not reach even to 1 mmHg.

Therefore, by heating the object at a temperature of around 1673K, almost lead vapor only can be selectively generated from the object.

Further, when heated at, for example, 2013K under the atmospheric pressure, the vapor pressure of lead is 760 mmHg, but those of tin, copper do not reach even 15 mmHg, 3 mmHg, respectively. Therefore, by heating the object at a temperature of around 1673K, lead vapor only can be selectively generated from the object.

Further, by decompressing the inside of the gas tight chamber, at further lower temperature, lead in the object can be vaporized.

When the pressure in the gas tight chamber is adjusted to $10^{-1}$ Torr, by heating to around 1100K, only lead vapor can be selectively generated from the object.

Further, if the pressure in the gas tight chamber is adjusted to $10^{-3}$ Torr, by heating to a temperature of around 900K, almost lead vapor only can be selectively generated from the object.

Still further, if the pressure in the gas tight chamber is adjusted to $10^{-4}$ Torr, by heating to about 700K, almost lead vapor only can be generated selectively from the object.

The lead vapor thus generated selectively can be recovered as lead metal with a recovering device cooled to, for example, below the melting point of lead.

When recovering such lead vapor through condensation, crystallization, by setting the residence time of the lead vapor in the device longer, the recovering rate of lead becomes high yield. For instance, the structure of the recovering device can be a counterflow structure or a spiral structure.

Further, by flowing the carrier gas such as $N_2$, noble gases such as Ar from the inside of the gas tight chamber to the recovering device, the lead vapor can be recovered more selectively in high purity.

By continuously carrying out a step of pyrolyzing selectively the resin and a step of vaporizing lead selectively, an amount of an input energy at the later step can be remarkably reduced.

That is, since the thermal conductivity of a gas decreases as the pressure thereof decreases, in the vaporizing step of lead, the larger amount of energy input is required as the inside of the gas tight chamber is decompressed. However, according to the processing system, the processing method of the present invention, since a step of pyrolyzing the resin is a preliminal heating step to vaporize the lead, the energy input in the step of vaporizing lead can be drastically saved.

Further, moisture or an oil component in the object, being removed from the object during the pyrolysis step of the resin, does not adversely affect on the step of vaporizing lead.

Still further, the processing system of the present invention is a processing system processing for an object comprises a first object and a second object being connected by a metal, comprising, a gas tight chamber capable of holding the object therein; a temperature adjusting means for adjusting a temperature in the gas tight chamber; a pressure adjusting means for adjusting a pressure in the gas tight chamber; and a controlling means for controlling the temperature adjusting means and the pressure adjusting means so that the metal connecting the first object and the second object being vaporized.

The processing system, for prosessing an object comprises a first object and a second object being connected by an alloy having a first metal and a second metal, can comprise a gas tight chamber capable of holding the object therein, a temperature adjusting means for adjusting a temperature in the gas tight chamber, a pressure adjusting means for adjusting a pressure in the gas tight chamber, and a controlling means for controlling the temperature adjusting means and the pressure adjusting means in such a manner that the temperature and the pressure in the gas tight chamber allow the metal to vaporize.

Still further, the processing system can comprise a gas tight chamber holding therein a first object and a second object having resin connected by an alloy consisting of a first metal and a second metal as a constituent member, a temperature adjusting means for adjusting the temperature in the gas tight chamber, a pressure adjusting means for adjusting the pressure in the gas tight chamber, a first controlling means for controlling the temperature adjusting means so as to pyrolyze selectively the resin, a second controlling means controlling the temperature adjusting means and the pressure adjusting means in such a manner that the temperature and the pressure in the gas tight chamber allow the first metal of the alloy to selectively vaporize, a third controlling means for controlling the temperature adjusting means and the pressure adjusting means in such a manner that the temperature and the pressure in the gas tight chamber allow the second metal of the alloy to vaporize, a first recovering means for recovering the gas generated by the selective pyrolysis of the resin, and a second recovering means for recovering the first metal vaporized from the alloy. Further, while substantially maintaining the oxidation state of the first and the second metals, the resin can be selectively pyrolyzed.

Still further, the processing system can comprise a gas tight chamber capable of holding an object comprises a first object and a second object having resin connected by an alloy consisting of a first metal and a second metal as a constituent member, a temperature adjusting means for adjusting a temperature in the gas tight chamber, a pressure adjusting means for adjusting a pressure in the gas tight chamber, a first controlling means for controlling the temperature adjusting means in such a manner that the temperature and the pressure in the gas tight chamber allow the resin to pyrolyze selectively, a second controlling means for controlling the temperature adjusting means and the pressure adjusting means in such a manner that the temperature and the pressure in the gas tight chamber allow the first metal of the alloy to vaporize selectively, a third controlling means for controlling the temperature adjusting means and the pressure adjusting means in such a manner that the temperature and the pressure in the gas tight chamber allow the second metal of the alloy to vaporize, a first recovering means for recovering the gas generated by the selective pyrolysis of the resin, and a second recovering means for recovering the first metal vaporized from the alloy. Further, while substantially maintaining the oxidation state of the first and the second metals, the resin can be selectively pyrolyzed.

Further, the processing system of the present invention is a processing system for processing an object comprises a first object and a second object connected by an alloy having a first metal and a second metal, and the object having a resin as a constituent member, that comprises a gas tight chamber capable of holding the object therein, a temperature adjusting means for adjusting a temperature in the gas tight chamber, a pressure adjusting means for adjusting a pressure in the gas tight chamber, an oxygen concentration adjusting means for adjusting a oxygen concentration in the gas tight chamber, a first controlling means for controlling the temperature adjusting means and the oxygen concentration adjusting means so as to pyrolyze selectively the resin, a second controlling means for controlling the temperature adjusting means and the pressure adjusting means so as to vaporize selectively the first metal of the alloy, a third controlling means for controlling the temperature adjusting means and the pressure adjusting means so as to vaporize selectively the second metal of the alloy, a first recovering means for recovering the gas generated by pyrolysis of the resin, and a second recovering means recovering the first metal vaporized from the alloy of the object.

Further, the first controlling means, in addition to maintaining the temperature and the oxygen concentration in the gas tight chamber not so as to oxidize substantially the state of the first metal of the alloy, controls the temperature adjusting means and the oxygen concentration adjusting means so as to pyrolyze selectively the resin.

For instance, at least one element among Zn, Cd, Hg, Ga, In, Tl, Sn, Pb, Sb, Bi, Ag or In can be separated or recovered as a first metal from the object.

Further, by adjusting the temperature, the pressure, the oxygen concentration in the gas tight chamber, also metals other than these metals can be separated and recovered in their metallic state (vide: FIG. 13, FIG. 18, FIG. 19, FIG. 29, FIG. 30). Even if not particularly being stated, the above described situation goes through all the present invention.

Further, the processing method of the present invention is a processing method for processing an object comprises a first object and a second object being connected by a metal, comprising steps of; sealing a gas tight chamber after introduction of the object into the gas tight chamber; and adjusting a temperature and a pressure in the gas tight chamber so that the metal of the object being vaporized.

Further, the processing method can comprise steps of, a step for sealing the gas tight chamber after introduction of a first object and a second object, which are connected by an alloy having a first metal and a second metal, into the gas tight chamber, and a step for adjusting a temperature and a pressure in the gas tight chamber so as to vaporize the metal.

Still further, the processing method can comprise steps of, a step for sealing the gas tight chamber after introduction, into the inside of the gas tight chamber, of an object being processed having a first object and a second object having resin connected by an alloy having a first metal and a second metal as a constituent member, a first step for adjusting a temperature and a pressure in the gas tight chamber so as to pyrolyze selectively the resin, a second step for adjusting the temperature and the pressure in the gas tight chamber so as to vaporize selectively the first metal of the alloy, a third step for adjusting the temperature and the pressure in the gas tight chamber so as to vaporize the second metal of the alloy, a first recovering step for recovering the gas generated by the thermal decomposition of the resin, and a second recovering step for recovering the first metal vaporized from the alloy of the object.

Further, in the first step, the temperature and the pressure in the gas tight chamber can be adjusted so as to pyrolyze selectively the resin while substantially maintaining the state of the first metal in the alloy.

Still further, a processing method, for processing an object comprises a first object and a second object, the first object and the second object being connected by an alloy of a first metal and a second metal, and the object comprises at least a resin as a constituent member, comprising steps of, sealing a gas tight chamber after introduction of the object into the gas tight chamber; a first controlling step for adjusting a temperature and an oxygen concentration in the gas tight chamber so that the resin of the object being selectively pyrolyzed; a second controlling step for adjusting the temperature and the pressure in the gas tight chamber so that the first metal in the alloy of the object being selectively vaporized; a third controlling step for adjusting the temperature and the pressure in the gas tight chamber so that the second metal in the alloy of the object being vaporized; a first recovering step for recovering a gas generated through pyrolysis of the resin; and a second recovering step of recovering the first metal vaporized from the alloy.

Further, in the first controlling step, the temperature and the oxygen concentration in the gas tight chamber can be adjusted so as to pyrolyze selectively the resin while maintaining the first and the second metal of the alloy in a state not to be substantially oxidized.

Further, the processing method of the present invention can comprise steps of, a step for sealing the gas tight chamber after introduction, into the gas tight chamber, of a mounted substrate consisting of a circuit board having a resin as a constituent member and at least an electronic element mounted on the circuit board by an alloy having a first metal and a second metal, a first controlling step for adjusting a temperature and an oxygen concentration in the gas tight chamber so as to pyrolyze selectively the resin, a second controlling step for adjusting the temperature and the pressure in the gas tight chamber so as to vaporize selectively the first metal in the alloy, a third controlling step for adjusting the temperature and the pressure in the gas tight chamber so as to vaporize the second metal of the alloy, a first recovering step for recovering the gas generated by the selective pyrolysis of the resin, and a second recovering step for recovering the first metal vaporized from the alloy. In the first controlling step, the temperature and the oxygen concentration in the gas tight chamber can be adjusted so as to pyrolyze selectively the resin while maintaining substantially the state of the first and the second metals of the alloy.

The processing system of the present invention described above can disconnect the connection of the object connected by a metal or an alloy. The processing method of the present invention can disconnect the connection of the object connected by a metal or an alloy.

The primary concept of the above described processing system and processing method of the present invention is to introduce an object being processed into a gas tight chamber, to adjust the temperature, the pressure, and an oxygen concentration in the gas tight chamber, and to vaporize a connecting metal or alloy, thus to disconnect its connection. The vaporized metal can be recovered through a process of condensation and the like.

When an object being processed has a resin as a constituent member, at first, the resin portion is selectively pyrolyzed to vaporize, to condense into oil, to carbonize. This selective pyrolysis of the resin can be implemented by adjusting the conditions of the temperature, the pressure or the oxygen concentration in the gas tight chamber not so as to much oxidize or vaporize the metal. That is, while maintaining the oxidation state, the phase equilibrium state of the constituent metal of the object as much as possible, the resin can be pyrolyzed.

Then, the temperature, the pressure in the gas tight chamber are adjusted so as to vaporize selectively the connecting metal in the object. When a plurality of metals (elements) are included in the object, the temperature and the pressure in the gas tight chamber can be adjusted according to respective metals to vaporize selectively the respective metal.

For the processing apparatus portion of the processing system, the above described processing apparatus of the present invention can be used. That is, for instance, by adjusting gradually the conditions of the temperature, the pressure, the oxygen concentration in one gas tight chamber, the selective pyrolysis of the resin and vaporization of lead can be carried out. Further, by disposing a plurality of gas tight zones different in their conditions such as the temperature, the pressure, the oxygen concentration, and by transferring the object sequentially by opening/closing a partition separating each gas tight zone, the selective pyrolysis of the resin and vaporization of lead can be implemented.

Further, the temperature adjusting means, the pressure adjusting means, the oxygen concentration adjusting means, the controlling means, the resin recovering means, the metal recovering means are identical as those described above.

As an object being processed in the processing system and the processing method of the present invention, a mounted substrate in which, for instance, a printed circuit board and various kinds of electronic elements are mounted with a solder alloy such as Pb—Sn, an electronic instrument having such a mounted substrate can be cited as an example.

Other than the mounted substrate, any object connected by a metal or an alloy can be disconnected from their connections.

For instance, a mounted substrate is introduced into the processing apparatus of the present invention, is heated up to a temperature (473K, for instance) where the resin is not so much oxidized while adjusting an oxygen concentration, then, while decompressing the inside of the gas tight chamber to adjust the oxygen concentration, is further heated up to a temperature where lead is not oxidized, vaporized (about 523 to 773K at $10^{-3}$ Torr, for example) to pyrolyze the constituent resin of the mounted substrate, is further heated above the melting point of lead (about 900K at $10^{-3}$ Torr) to vaporize lead, to vaporize tin as identical as lead, thus separating the mounted substrate into an electronic component and a circuit board (a substrate to be mounted at least an electronic element is called a circuit board, here) to recover.

Even if a metal such as lead is vaporized during the selective pyrolysis of the resin, a separating means of the metal can be disposed in the recovering system. This situation is common for all of the present invention.

Further, for instance, a mounted substrate is introduced into the processing apparatus of the present invention, is heated up to a temperature (about 473K, for instance) where the resin is not so much oxidized by adjusting an oxygen concentration, then, by controlling the oxygen concentration through decompression of the inside of the gas tight chamber, the mounted substrate is further heated up to a temperature where the lead is not oxidized, vaporized substantially (about 523 to 773K at $10^{-3}$ Torr, for example) to pyrolyze the constituent resin of the mounted substrate, is further heated up to, for example, about 973K to vaporize/recover zinc, antimony.

Still further, by heating up to, for example, about 1773K, such as Au, Pt, Pd, Ta, Ni, Cr, Cu, Al, Co, W, Mo can be vaporized to recover.

The solder alloy is not restricted to Pb—Sn, for instance, so-called lead-free solders such as Ag—Sn, Zn—Sn, In—Sn, Bi—Sn, Sn—Ag—Bi, Sn—Ag—Bi—Cu can be employed. In addition to them, connection through an alloy or a single metal other than those described above can be allowed.

In an object, a resin can be contained as a constituent member. The resin can be a thermoplastic type or a thermosetting type or a mixture thereof.

When the object being processed contains a resin as a constituent member, as previously described, the resin portion can be selectively pyrolyzed (vaporization, conversion to oil, carbonization). The gas and the like generated through the selective pyrolysis can be converted to oil by a device such as an oil condenser, thus recovering it. The decomposition products of the recovered resin, such as light oil, heavy oil, can be used to heat the object.

The selective pyrolysis of the resin component is not necessarily required to be carried out completely, but can be done to the degree not disturbing the separation, recovery of the connecting metal. In addition, as described above, even if the connecting metal is partially vaporized, a separating/recovering means of the vaporized metal can be disposed in the recovering system.

Melting and the like of a resin such as plastics starts around 323K, through pyrolysis at around from 453 to 873K, a hydrocarbon based gas mainly consisting of C1 to C8, C8 to C16 is evolved. The decomposition product gas generated through the pyrolysis of these resins can be recovered as valuable oil by condensing by, for instance, a device converting to oil. In general, much of the resin constituting a circuit board is a thermosetting resin, so in many cases, can be carbonized, vaporized.

It is preferable for this selective pyrolysis of the resin to be carried out in a state where the oxygen concentration in the chamber is adjusted. The oxygen concentration can be adjusted by the total pressure in the gas tight chamber or by introduction of a carrier gas such as $N_2$, Ar.

By adjusting the oxygen concentration in the gas tight chamber, the connecting metals such as lead, tin, for example, can be prevented from being oxidized. Further, by adjusting the oxygen concentration independently of the total pressure, without lowering the thermal conductivity in the gas tight chamber, the metal can be prevented from being oxidized, thus, resulting in improvement of the decomposition efficiency of the resin, the recovering efficiency of the decomposition gas. According to circumstances, a carrier gas such as $N_2$, Ar can be introduced to pressurize the inside of the gas tight chamber, thereby pyrolyzing selectively the resin.

The pyrolysis of the resin of the object is not necessarily required to be carried out completely, but can be done to the degree not affecting adversely on the separation, recovery of the metal.

Though lead shows the vapor pressure of 760 mmHg at 2017K, for instance, but lead oxide shows the vapor pressure of 760 mmHg at 1745K much lower than that of the lead.

Therefore, by adjusting the oxygen concentration in the gas tight chamber to suppress the metal from being oxidized to an oxide, further positive recovery can be carried out at a later step. In addition, by recovering as a metal, its utility value becomes large.

After pyrolysis of the resin while maintaining substantially the state of lead in the object, the temperature and the pressure in the gas tight chamber are adjusted so as to selectively vaporize the lead, thus separating/recovering the lead from the object.

Even when a metal other than lead is contained in the object, by taking advantage of the difference of the vapor pressures, lead can be selectively vaporized.

For instance, the temperature at which lead vaporizes varies according to the pressure in the gas tight chamber. When heated to, for example, 1673K under the atmospheric pressure, the vapor pressure of lead is 84 mmHg, but those of iron, copper, tin does not reach even to 1 mmHg. Therefore, by heating the object to around 1673K, almost lead vapor only can be selectively generated from the object.

Further, when heated to, for example, 2013K under the atmospheric pressure, the vapor pressure of lead is 760 mmHg, but that of tin is 15 mmHg, that of copper does not reach even to 3 mmHg. Therefore, by heating the object to around 1673K, almost lead vapor only can be selectively generated from the object.

Further, by decompressing the inside of the gas tight chamber, at further lower temperature, the lead in the object can be vaporized.

When the pressure in the gas tight chamber is adjusted at $10^{-1}$ Torr, by heating to around 1100K, almost lead vapor only can be selectively generated from the object.

Further, if the pressure in the gas tight chamber is adjusted to $10^{-3}$ Torr, by heating to around 900K, almost lead vapor only can be selectively generated from the object.

Still further, if the pressure in the gas tight chamber is adjusted to $10^{-4}$ Torr, by heating to about 700K, almost lead vapor only can be generated selectively from the object.

The lead vapor generated selectively in such a manner can be recovered as lead metal with a recovering apparatus cooled below the melting point of lead, for example.

When recovering such lead vapor through condensation, crystallization, by setting the residence time of the lead vapor in the device at a longer side, the recovering rate of lead becomes high. For instance, the structure of the recovering apparatus can be a counter-flow structure or a spiral structure.

Further, by introducing the carrier gas such as $N_2$, noble gases such as Ar from the inside of the gas tight chamber to the recovering apparatus, the lead vapor can be recovered more selectively.

By successively implementing a step for pyrolyzing the resin and a step for vaporizing lead selectively, an input energy at the later step can be remarkably suppressed.

That is, since the thermal conductivity of a gas decreases as the pressure thereof decreases, in the vaporizing step of lead, the larger energy input is required as the inside of the gas tight chamber is more decompressed. However, according to the processing system, the processing method of the present invention, since a step of pyrolyzing the resin is also a step of preparative heating step to vaporize the lead, the energy input in the step of vaporizing lead can be drastically saved.

Further, moisture or an oil component in the object, being removed from the object during the selective pyrolysis step of the resin, does not adversely affect on the step of vaporizing the lead.

A processing system of the present invention is a processing system for processing an object comprises a resin and a metal being integrated, comprising, a gas tight chamber capable of holding the object therein; a temperature adjusting means for adjusting a temperature in the gas tight chamber; a pressure adjusting means for adjusting a pressure in the gas tight chamber; and a controlling means for controlling the temperature adjusting means and the pressure adjusting means in the gas tight chamber so as to pyrolyze selectively the resin of the object.

Further, the controlling means controlling the temperature adjusting means and the pressure adjusting means in the gas tight chamber can control the temperature adjusting means and the pressure adjusting means in the gas tight chamber so as to pyrolyze selectively the resin while sustaining substantially the state of metal.

Further, the processing system of the present invention can comprise a gas tight chamber capable of holding an object in which a resin and a metal are integrated therein, a temperature adjusting means for adjusting a temperature in the gas tight chamber, an oxygen concentration adjusting means for adjusting an oxygen concentration in the gas tight chamber, and a controlling means for controlling the temperature adjusting means and the oxygen concentration adjusting means in the gas tight chamber so as to pyrolyze selectively the resin together with substantially maintaining the state of metal. During the selective pyrolysis of the resin, the temperature, the pressure or the oxygen concentration can be adjusted so as to maintain the state of the constituent metal as much as possible.

The processing system of the present invention is a processing system for processing an object comprises a resin and a metal being integrated, comprising, a gas tight chamber capable of holding the object being processed therein; a temperature adjusting means for adjusting a temperature in the gas tight chamber; a pressure adjusting means for adjusting a pressure in the gas tight chamber; an oxygen concentration adjusting means for adjusting an oxygen concentration in the gas tight chamber; and, a controlling means for controlling the temperature adjusting means and the pressure adjusting means and the oxygen concentration adjusting means in the gas tight chamber so as to pyrolyze selectively the resin of the object.

Further, the controlling means can control the temperature adjusting means, the pressure adjusting means, the oxygen concentration adjusting means in the gas tight chamber so as to pyrolyze selectively the resin while maintaining substantially the state of metal.

Still further, the processing system of the present invention can comprise a gas tight chamber capable of holding an object in which a resin and a first metal and a second metal being integrated therein, a temperature adjusting means for adjusting a temperature in the gas tight chamber, a pressure adjusting means for adjusting a pressure in the gas tight chamber, an oxygen concentration adjusting means for adjusting an oxygen concentration in the gas tight chamber, a controlling means for controlling the temperature adjusting means and the oxygen concentration adjusting means in the gas tight chamber so as to pyrolyze selectively the resin, a second controlling means for controlling the temperature adjusting means and the pressure adjusting means so as to vaporize selectively the first metal, and a recovering means for recovering the first metal vaporized from the object.

The controlling means can control the temperature adjusting means and the oxygen concentration adjusting means in the gas tight chamber so as to pyrolyze selectively the resin while substantially maintaining the state of the first and the second metal.

Further, the processing method of the present invention is a processing method for processing an object comprises a resin and a metal being integrated, comprising steps of, introducing the object into a gas tight chamber; and, adjusting a temperature and an oxygen concentration in the gas tight chamber so as to pyrolyze selectively the resin of the object.

Further, in addition to maintaining substantially the state of the metal, the temperature and the oxygen concentration in the gas tight chamber can be adjusted so as to pyrolyze selectively the resin.

Further, the processing system of the present invention can comprise a step for introducing an object in which a resin and a metal are integrated into the gas tight chamber, and a step for adjusting a temperature and a pressure in the gas tight chamber so as to pyrolyze selectively the resin.

Further, the processing method of the present invention is a processing method for processing an object comprises a resin and a metal being laminated, comprising steps of; introducing an object into a gas tight chamber; adjusting a temperature and an oxygen concentration in the gas tight chamber so as to pyrolyze selectively the resin of the object; and, adjusting the temperature and the pressure in the gas tight chamber so as to melt the metal of the object and to make the surface area of the metal being reduced.

Further, in addition to maintaining substantially the state of the metal, the temperature and the oxygen concentration in the gas tight chamber can be adjusted so as to pyrolyze selectively the resin.

Further, the processing method of the present invention can comprise a step for introducing the object in which a resin and a metal are stacked into the gas tight chamber, a step for adjusting a temperature and a oxygen concentration in the gas tight chamber so as to pyrolyze selectively the resin while maintaining substantially the state of copper, and a step for adjusting a temperature and a pressure in the gas tight chamber so as to make the surface area of copper small while melting metal of the object.

Further, the processing method of the present invention can comprise a step for introducing an object in which a resin and a metal are integrated into the gas tight chamber and a step for adjusting a temperature and a pressure and an oxygen concentration in the gas tight chamber so as to pyrolyze selectively the resin while maintaining substantially the state of the metal.

Further, the processing method of the present invention is a processing method for processing an object comprises a resin and a first metal and a second metal being integrated, comprising steps of; introducing the object into a gas tight chamber; a first controlling step for adjusting a temperature and an oxygen concentration in the gas tight chamber so as to pyrolyze selectively the resin of the object; a second controlling step for adjusting the temperature and the pressure in the gas tight chamber so as to vaporize selectively the first metal of the object; and recovering the first metal vaporized from the object.

Further, in the first controlling step, the temperature and the oxygen concentration in the gas tight chamber can be adjusted so as to pyrolyze selectively the resin while maintaining the first and the second metal not being substantially oxidized.

The above-described processing system of the present invention is a system capable of processing an object having a resin and a metal as constituent members.

Further, the above-described processing method of the present invention is a method capable of processing an object having a resin and a metal as constituent members.

That is, the fundamental concept of the above described processing system or processing method of the present invention is to introduce an object which has a resin and a metal as constituent members into the gas tight chamber and to pyrolyze selectively the resin portion at first to vaporize, to convert to oil, to carbonize. Adjusting the conditions of the temperature, the pressure or the oxygen concentration in the gas tight chamber not so as to oxidize or vaporize the metal, can carry out the selective pyrolysis of the resin.

When the separation of the metal from the object is difficult even after this operation only, thereafter, the temperature, the pressure in the gas tight chamber are adjusted to vaporize selectively the metal in the object. When a plurality of metals (elements) are contained in the object, according to the respective metals, the temperature, the pressure in the gas tight chamber are adjusted to vaporize each metal selectively. As to an apparatus, for instance, the above-described processing apparatus of the present invention can be employed.

The object of a processing system or a processing method of the present invention can be not only an object having only resin and metal but also can be an object in which a resin and a metal are integrated.

As such an object in which a resin and a metal are integrated, for instance, an aluminum foil laminated with a plastic film such as a wrapping container of such as retort pouch food, a syringe, a printed circuit board in which a resin and metal such as copper/nickel are integrated, a film carrier of a flexible substrate or a TAB, an IC, an LSI, a resistor, and the like can be cited as an example.

Further, the wastes from which lead is removed by the processing system or the processing method of the present invention can be an object to be processed.

Still further, an object from which connections due to a metal or an alloy are disconnected by the processing system or the processing method of the present invention can be an object.

For instance, a mounted substrate is separated into a substrate and an electronic component with the processing system or the processing method of the present invention. The obtained substrate and components can be objects.

Further, for instance, the processing systems or the processing methods as set forth in claim 4 through claim 12 and the processing systems or the processing methods as set forth in claim 13 through claim 17 can be combined to employ.

In order to pyrolyze selectively the resin of an object or to pyrolyze selectively the resin while maintaining constituent metals not to be oxidized or vaporized as a whole as much as possible, for instance, the object can be heated while controlling the pressure in the gas tight chamber or can be heated by controlling the oxygen concentration in the gas tight chamber.

In order to control the oxygen concentration, the total pressure in the gas tight chamber can be adjusted or gas such as nitrogen gas, noble gasses can be introduced into the gas tight chamber to adjust the oxygen concentration. When the resin portion is rapidly oxidized due to heating of the object, that is, when burnt out, the metal portion which is integrated with the resin portion is also oxidized to form oxide, resulting in lowering of utility value. Caution should be taken to avoid such a situation.

Further, when heating the object, since, when the gas tight chamber is decompressed, the temperature elevating efficiency decreases due to lower thermal conductivity, the resin can be heated up to a predetermined temperature first, then being decompressed, and further can be heated.

Further, the inside of the gas tight chamber is heated/pressurized in a non-oxidizing atmosphere to a temperature where oxidation state of the metal can be maintained to improve its temperature elevating efficiency, thereby enhancing the thermal conductivity, after being heated up to a temperature where the oxidation state can be maintained, can be decompressed, further can be heated. By heating/pressurizing, the decomposed components of resins of relatively low molecular weight become high in their recovery efficiencies.

Further, when the metal portion is composed of a plurality of metals, further heating to vaporize each element selectively can carry out recovery.

The decomposition product gas of the resin of the object can be condensed to recover, or, can be recovered by, for instance, a device such as an oil condenser capable of condensing gas to oil. Further, after reforming/decomposing at a high temperature such as 1000° C., for instance, it can be condensed. By quenching from a high temperature of 1000° C. or more to the normal temperature, generation of dioxins can be suppressed.

Further, hydrogen gas can be recovered by absorption, and, when chlorinated hydrocarbons are generated, they can be decomposed by use of, for example, a catalyst and the like.

Still further, when the resin includes chlorine like polyvinyl chloride based resin, at first, by the normal temperature heating in the temperature range where the oxidation state of constituent metals in the wastes material can be maintained, the halogen gas can be generated. The generated halogen gas, through contact with, for instance, iron heated at high temperature, can be recovered as ferrous halide, or, through reaction with ammonia, can be recovered as an ammonium halide.

These gases generated through heating of the wastes materials can be processed by a multi-gas processing system.

As an example of the processing, when considering processing of an aluminum foil laminated with a plastic film (hereinafter refers to as resin coated aluminum foil) used in such as various kinds of wrapping container, pyrolysis such as carbonization/conversion to oil of the resin portion is insufficient at 673K or below. When heated to 923K or more, aluminum is melted. Therefore, by heating at the temperature in the range of 673K through 923K, the resin portion is selectively pyrolyzed (vaporization, conversion to oil, carbonization) to recover the aluminum foil in its metal state.

It is more preferable that the pressure in the gas tight chamber is decompressed to around $10^{-2}$ Torr or less or that gas such as $N_2$, Ar or the like is introduced to adjust the oxygen concentration, followed by heating. The heating in the temperature range of 823 to 873K is more preferable.

A processing system of wastes of the present invention comprises a gas tight chamber holding therein the wastes in which a resin and copper are integrated, a temperature adjusting means adjusting the temperature in the gas tight chamber, and a controlling means controlling the temperature in the gas tight chamber in such a manner that copper does not substantially oxidize and resin is selectively pyrolyzed.

Further, a processing system of wastes of the present invention comprises a gas tight chamber holding therein the wastes in which a resin and copper are integrated, a temperature adjusting means adjusting the temperature in the gas tight chamber, an oxygen concentration adjusting means adjusting the oxygen concentration in the gas tight chamber, and a controlling means controlling the temperature and oxygen concentration in the gas tight chamber in such a manner that, in addition to maintaining copper not to be substantially oxidized, resin is selectively pyrolyzed.

Below 673K, the pyrolysis such as carbonization/conversion to oil of the resin portion is insufficient. By heating to the temperature in the range of 673K to 923K, the resin is vaporized/converted to oil/carbonized, resulting in enabling copper to be recovered in metal state.

It is more preferable that the pressure in the gas tight chamber is decompressed to around $10^{-2}$ Torr or less or that gas such as $N_2$, Ar or the like is introduced to adjust the oxygen concentration, followed by heating. The heating temperature in the range of 823 to 873K is more preferable.

The present invention is carried out in order to circumvent such problems. That is, an objective of the present invention is to provide a processing apparatus and a processing method capable of processing effectively, economically and safely an object being processed which has a metal and a resin as constituent members.

An objective of the present invention is to provide a processing apparatus and a processing method capable of processing an object which has a metal and a resin as constituent members, effectively, economically and suppressing the generation of dioxins.

An objective of the present invention is to provide a processing apparatus and a processing method capable of separating/recovering lead from an object including a resin, lead.

An objective of the present invention is to provide a processing method and a processing method capable of disconnecting connection of an object connected by an alloy.

An objective of the present invention is to provide a processing apparatus and a processing method capable of, in addition to disconnection of connection of an object having a resin connected by an alloy including lead as a constituent member, recycling resin portion, too.

An objective of the present invention is to provide a processing apparatus and a processing method capable of separating/recovering effectively a resin component and a metal from an object having a resin and a metal as constituent members.

An object of the present invention is to provide a processing apparatus and a processing method capable of, in addition to effective separation of the resin component and metal from an object in which the resin and a plurality of metals are integrated, separating/recovering the resin and the plurality of metals, respectively.

An objective of the present invention is to provide a processing apparatus and a processing method processing an object containing a metal and a resin such as shredder dust and the like while suppressing generation of dioxins.

An objective of the present invention is to provide a processing apparatus and a processing method separating/recovering poisonous metal such as lead, the metal such as copper by separating an object such as a circuit board on which an electronic component and the like are packaged into an electronic component and a circuit board while suppressing generation of dioxins.

In order to solve such problems, a processing apparatus of the present invention is a processing apparatus for processing an object comprises a resin and a metal, comprising, a first pyrolyzing means for pyrolyzing the object at a first temperature; a reforming means for reforming a gaseous effluent generated from the object at such a second temperature that decompose dioxins, the reforming means connected to the pyrolyzing means; and, a cooling means for cooling rapidly the gaseous effluent to a third temperature so that an increasing of a concentration of the dioxins in the gaseous effluent reformed at the second temperature being suppressed, and the cooling means connected to the reforming means; a vaporizing means for vaporizing the metal included in a residue generated by pyrolysis of the object, and the vaporizing means capable of heating the residue under decompressed pressure; and, a condensing means for condensing the metal vaporized from the residue of the object.

A processing apparatus of the present invention is a processing apparatus for processing an object comprises a resin and a metal, comprising a first pyrolyzing means for pyrolyzing the object at a first temperature; a second pyrolyzing means for pyrolyzing a gaseous effluent generated from the object at a second temperature higher than the first temperature, and the second pyrolyzing means connected to the first pyrolyzing means; a cooling means for cooling rapidly the gaseous effluent to a third temperature so that an increasing of a concentration of dioxins in the gaseous effluent pyrolyzed at the second temperature being suppressed, and the cooling means connected to the second pyrolyzing means; a vaporizing means for vaporizing the metal included in the residue generated by pyrolysis of the object, and the vaporizing means capable of heating the residue under decompressed pressure; and, a condensing means for condensing the metal vaporized from the residue of the object.

A processing apparatus of the present invention comprises a first pyrolyzing means for pyrolyzing an object containing a resin and a first metal and a second metal at a first temperature; a reforming means which is disposed connected to the first pyrolyzing means and reforms a gaseous effluent generated from the object at such a second temperature that decomposes dioxins, a cooling means which is disposed connected to the reforming means and cools rapidly the gaseous effluent down to a third temperature so as to suppress an increasing of a concentration of dioxins in the gaseous effluent reformed at the second temperature, a first decompressing/heating means heating the residue generated through pyrolysis of the object under decompressed condition so as to vaporize the first metal contained in the residue and to maintain the second metal, a condensation means which is disposed connected to the first heating means for heating a residue of the object generated by the pyrolysis under decompressed pressure so that the first metal being vaporized from the residue of the object, and a second heating means for heating the residue of the object under decompressed condition so as to melt the second metal contained in the pyrolysate residue of the object from which the first metal is vaporized.

In addition, the second heating means of the processing apparatus of the present invention capable of heating the object under decompressed condition so as to coagulate due to its surface tension when the second metal contained in the residue from which the first metal is vaporized is melted.

A processing apparatus of the present invention comprises a pyrolyzing means for pyrolyzing an object comprises a resin and a metal as a part of its constituent members and having a first portion and a second portion connected by a connecting metal while maintaining the connecting metal, a reforming means which is disposed connected to the pyrolyzing means and reforms the gaseous effluent generated from the object at such a second temperature that decomposes dioxins, a cooling means which is disposed connected to the reforming means and cools rapidly the gaseous effluent down to a third temperature so as to suppress the increase of the dioxins concentration in the reformed gaseous effluent, and a heating means for heating the residue of the object generated through pyrolysis of the object under decompressed condition so as to vaporize the connecting metal.

The pyrolyzing means of the above-described processing apparatus of the present invention can be implemented in a non-oxidizing atmosphere or a reducing atmosphere by controlling the oxygen concentration.

The cooling means capable of cooling down the gas to a third temperature within a time period of as short as possible, preferably within 10 seconds or less.

Further, the processing apparatus of the present invention can further comprise a neutralizing means, disposed connected with the cooling means, neutralizing the cooled gaseous effluent.

A processing method of the present invention is processing method for processing an object comprises a resin and a metal, comprising steps of: a first pyrolyzing step for pyrolyzing the object at a first temperature; a second pyrolyzing step for pyrolyzing a gaseous effluent generated from the object at a second temperature higher than the first temperature; a cooling step for cooling rapidly a gaseous effluent to a third temperature so as to suppress an increase of a concentration of dioxins in the gaseous effluent pyrolyzed at the second temperature; a heating step for heating the residue generated by pyrolysis of the object under decompressed pressure so as to vaporize the metal included in the residue of the object; and a condensing step for condensing the metal vaporized from the residue of the object.

A processing method of the present invention is a processing method for processing an object comprises a resin and a metal, comprising steps of, a first pyrolyzing step for pyrolyzing the object at a first temperature; a second pyrolyzing step for pyrolyzing a gaseous effluent generated from the object at a second temperature higher than the first temperature; a cooling step for cooling rapidly a gaseous effluent to a third temperature so as to suppress an increase of a concentration of dioxins in the gaseous effluent pyrolyzed at the second temperature; a heating step for heating the residue generated by pyrolysis of the object under decompressed pressure so as to vaporize the metal included in the residue of the object; and, a condensing step for condensing the metal vaporized from the residue of the object.

A processing method of the present invention is a processing method for processing an object comprises a resin and a first metal and a second metal, comprising steps of, a first pyrolyzing step for pyrolyzing the object at a first temperature; a reforming step for reforming a gaseous effluent generated from the object at a second temperature where dioxins being decomposed; a cooling step for cooling rapidly the gaseous effluent to a third temperature so as to suppress an increase of a concentration of the dioxins in the gaseous effluent reformed at the second temperature; a first heating step for heating a residue generated by pyrolysis of the object under decompressed pressure so as to vaporize the first metal included in the residue of the object with maintaining the second metal; a condensing step for condensing the first metal vaporized from the residue of the object; and, a second heating step for heating the residue under decompressed pressure so as to melt the second metal contained in the residue from which the first metal is vaporized.

A processing method of the present invention is characterized in that, the second heating step being carried out by heating the residue under decompressed pressure so as to melt the second metal contained in the residue from which the first metal is vaporized to aggregate due to its surface tension.

A processing method of the present invention is a processing method for processing an object comprises a resin and a metal as a constituent member and the object having a first portion and a second portion connected by a connecting metal, comprising, a pyrolyzing step for pyrolyzing the object so as to maintain the connecting metal; a reforming step for reforming a gaseous effluent generated from the object at a second temperature at which dioxins being decomposed; a cooling step for cooling rapidly a gaseous effluent to a third temperature so as to suppress an increase of a concentration of the dioxins in the reformed gaseous effluent; and, a heating step for heating the residue generated by pyrolysis of the object under decompressed pressure so as to vaporize the connecting metal of the object.

Further, the processing method of the present invention can further comprise a neutralizing step for neutralizing the gaseous effluent cooled in the cooling step.

The pyrolysis step can be carried out in a non-oxidizing atmosphere or a reducing atmosphere through such as control of the oxygen concentration.

The cooling step is preferably implemented by cooling down to the third temperature within a time period as short as possible, preferably within 10 seconds.

Further, the first temperature is preferable to be set at from about 250 to about 500° C.

Further, the second temperature is preferable to be set at a temperature higher than at least about 800° C., more preferable to be set at a temperature higher than at least 1000° C., further preferable to be set at a temperature higher than 1200° C.

Further, the third temperature is preferable to be set at a temperature lower than at least 150° C., more preferable to be set at a temperature lower than at least 100° C., further preferable to be set at a temperature lower than 35° C.

The gaseous effluent exhausted from such an object being processed is reformed/pyrolyzed at such a high temperature that can decompose dioxins. By rapidly cooling from this state to the third temperature where dioxins are not generated, re-synthesized while making residence time in the temperature zone where dioxins are generated, re-synthesized as short as possible, dioxins concentration in the gaseous effluent can be drastically decreased. In addition, by carrying out the first pyrolysis, the second pyrolysis, cracking or reforming in 2 steps of the first temperature and the second temperature and at the same carrying out in a reducing atmosphere, the dioxins concentration in the source can be remarkably decreased.

Here, the second temperature is a temperature where dioxins can be decomposed and, at this temperature, not only dioxins but also other compounds contained in the gaseous effluent can be decomposed. Therefore, the present invention can make not only dioxins but also halogenated hydrocarbons, PCB and the like non-hazardous.

That is, the present invention, in order to process an object having a resin and a metal as constituent members, is provided with a means for decomposing the resin, a means for further pyrolyzing the gaseous effluent generated from an object being processed, a cooling means for cooling the gas so as to prevent synthesis of dioxins from occurring, and a means for recovering the metal from the solid pyrolysate through vaporization or liquefaction under decompressed condition. Here, the resin can be a synthetic resin or a natural resin, or can be a mixture thereof. Further, the metal here, except for the case particularly mentioned, designates whole metals contained in the object and is not limited to a particular metal element.

The first pyrolyzing means is to pyrolyze at such a first temperature where an object is pyrolyzed under control of oxygen concentration, thereby generates the gaseous effluent from, for instance, shredder dust, waste circuit board and the like. Here, the gaseous effluent is basically composed of the effluent gas(es), however the case where solid particles, liquid particles are mingled in the exhaust gas is included.

As a temperature adjusting means for adjusting a first temperature of a first pyrolyzing means, a heating means and a temperature measuring means can be employed. As a heating means, various kinds of convection heating, radiation heating and the like can be employed according to demands, or a combination thereof can be used. Resistance heating such as a seed heater, for instance, can be used, or, a gas, heavy oil or light oil can be combusted outside the chamber. Further, after the gas generated from the resin being pyrolyzed and the like of the object is reformed or cracked, made non-hazardous, and neutralized, as a combustion gas, it can be reused as a heat source of the processing apparatus of the present invention including the first pyrolyzing means. Further, a clean fuel gas obtained according to, for instance, the above described way can be introduced into a gas turbine generator to convert into electricity, thereby the processing apparatus of the present invention including the first pyrolyzing means can be operated.

For a temperature measuring means, various kinds of temperature sensors can be employed. The first temperature can be set at such a temperature where, in addition to enabling to pyrolyze the resin of the object, metal of the object is not oxidized as much as possible, however, in order to eradicate dioxins generating sources in multiple steps, as will be described later, the first pyrolyzing means is preferable to be maintained in a reducing condition. By pyrolyzing, for instance, aromatic hydrocarbon compounds including chlorine under a reducing condition, the chlorine of the aromatic hydrocarbon compounds is decomposed into HCl and the like. Therefore, generation of the dioxins can be suppressed from occurring.

In the present invention, except for the case being mentioned particularly, polychlorinated dibenzo-p-dioxins (PCCDs), polychlorinated dibenzofurans (PCDFs) and homologues thereof different in number of chlorine and substituted positions are termed as dioxins as a whole.

Therefore, a first pyrolyzing means, since it is preferable to maintain the metal included in the object not to be substantially oxidized, more preferable to be maintained in a reducing atmosphere, is preferable to be provided with a temperature adjusting means and an oxygen concentration adjusting means.

In general, when an object is a complex object, during processing, the object can be partly oxidized, but the first pyrolyzing means as a whole needs only to be maintained in a reducing atmosphere.

For an oxygen concentration adjusting means, for example, an oxygen concentration sensor that is an oxygen concentration measuring means and a carrier gas introducing system can be employed.

For an oxygen concentration sensor, a so-called zirconia sensor which employs, for instance, zirconia (zirconium oxide) can be used, or absorption of, for instance, CO and $CO_2$ can be measured with infrared spectrometry method. Further, GC-MS can be employed, or, according to demands, combination thereof can be used.

As a carrier gas, for instance, noble gas such as Ar can be used. In addition, by this carrier gas, not only oxygen concentration in the first pyrolyzing means can be adjusted but this carrier gas can effectively lead also the gas led to a reforming means or a second pyrolyzing means. Further, it is capable of concurrently working as a pressure adjusting means.

Further, as a preceding step of a first pyrolyzing means, a shredder can be disposed. The object brought in from outside the apparatus can be introduced into the first pyrolyzing means after being crushed by a shredder followed by separation or can be introduced into the first pyrolyzing means without being crushed. When the object is a waste circuit board, it is preferable to introduce the object into the first pyrolyzing means without crushing.

Inside the first pyrolyzing means where the object is introduced, the temperature/oxygen concentration conditions can be adjusted such that the state of metal in the object is not oxidized as much as possible and chlorine combined with an organic compound during pyrolysis of the resin is inorganized as much as possible. The temperature/oxygen concentration conditions can be installed in advance or can be controlled by feed-backing the measured value of the temperature, the oxygen concentration to the heating means, the oxygen concentration adjusting means and the like. When the oxygen concentration is required to be measured, a zirconia sensor, for instance, can be employed.

Further, the pressure in the chamber of the first pyrolyzing means can be controlled. The inside of the first pyrolyzing means such as a rotary kiln, for instance, is decompressed, the oxygen concentration decreases too, thus, the object is not rapidly oxidized due to heating. Although, due to heating, a huge quantity of decomposition product gas is generated, normally resin does hardly discharge oxygen through its decomposition. Further, the decomposition product of the resin can be easily vaporized.

Besides, when being decompressed, thermal conductivity in the gas tight zone decreases. However, if the inside of the first pyrolyzing means is a non-oxidizing atmosphere, even under the atmospheric pressure or under a pressurized condition, the object is not oxidized. Therefore, if the inside of the first pyrolyzing means is a non-oxidizing atmosphere, through pressurization, the thermal conductivity in the system can be enhanced.

Here, a gaseous effluent processing system processing the gaseous effluent discharged from the object will be described.

The gaseous effluent processing system is to process the gaseous effluent discharged from the object at a first pyrolyzing means and the main part thereof is composed of a reforming means or a second pyrolyzing means, a cooling means. The gaseous effluent processed with the cooling means can be used as a more clean combustion gas after posterior processing such as neutralization, filtration, cleaning, as demands arise.

A reforming means is disposed connecting with the first pyrolyzing means and reforms the gaseous effluent exhausted from the object inside the first pyrolyzing means at a second temperature higher than the first temperature. Reforming here means to convert the hydrocarbon based compounds contained in the gaseous effluent exhausted from the object to hydrogen, methane, carbon monoxide and the like of lower molecular weight. Further, such as cracking or hydro-reforming can be implemented. To reform while maintaining the insides of the system in a reducing condition is preferable from the view-point of eradicating the sources of dioxins. Further, if the inside of the reforming means can be maintained in a reducing atmosphere, a small quantity of air can be introduced into the reforming means. As a reforming means, other than the thermal reforming means, in addition to this, a contact reforming means employing, for example, a catalyst can be provided. As a catalyst, for instance, solid acids such as $SiO_2/Al_2O_3$ and zeolite (alumino-silicate) carrying metals such as Pt, Re can be used.

Further, in place of the reforming means, a second pyrolyzing means which is connected with the first pyrolyzing means and pyrolyzes the gaseous effluent in a reducing atmosphere can be provided.

By separating the reforming means, the second pyrolyzing means from the first pyrolyzing means, the gaseous effluent from the object can be cracked at a second temperature higher than the first temperature, thus enabling to reform the gaseous effluent and inorganized chlorine, effectively.

The reforming means or the second pyrolyzing means is preferable to be maintained in such a condition that dioxins originating directly or indirectly from the object can be decomposed as much as possible. By setting the second temperature at, for instance, about 800° C., a fair proportion of dioxins can be decomposed. Further, by setting the second temperature at 1000° C. or more, more preferably at 1200° C. or more, dioxins can be further effectively decomposed. Since the reforming means is implemented at the second temperature that can decompose dioxins, the cracking of the gaseous effluent occurs at the same time at this second temperature.

The hydrocarbon based compounds contained in the gaseous effluent generated from the object, through reforming by the reforming means or through cracking by the second pyrolyzing means, are converted into hydrogen, methane, carbon monoxide, hydrocarbon and the like of lower molecular weight.

Further, when dioxins are included in the gaseous effluent exhausted from the object, almost all of the dioxins can be decomposed. In addition, organic chlorine can be inorganized, thus, re-synthesis of the dioxins can be suppressed.

The reforming means or the second pyrolyzing means, through introduction of the gaseous effluent from the first pyrolyzing means and a small quantity of air into a chamber filled with, for example, coke, can be made a reducing atmosphere and a temperature condition where the dioxins can be decomposed.

Further, through heating, as described above, by combusting the fuel gas and air, the chamber is heated to a temperature where dioxins can be decomposed, the gaseous effluent from the first pyrolyzing means can be introduced into this chamber.

Further, inside the chamber, a contact decomposition means such as the above described catalyst can be provided.

Further, as demand arises, to the reforming means or the second pyrolyzing means, a temperature adjusting means and an oxygen concentration measuring means adjusting the temperature, oxygen concentration in the system can be provided. As the oxygen concentration adjusting means, the above described oxygen concentration sensor and the carrier gas introducing system can be used. Further, a hydrogen gas reservoir can be connected or an inert gas such as Ar reservoir can be connected.

Thus, the gaseous effluent contained in the gaseous effluent generated from the object is made lower molecular weight by the reforming means or the second pyrolyzing means, resulting in hydrogen, methane, carbon monoxide and the like.

The first pyrolyzing means, the reforming means or the second pyrolyzing means, and the cooling means, in this case where the gaseous effluent contains chlorine and the like, can be severely eroded of their containers, piping, by chlorine contained in the gaseous effluent, therefore, for these apparatuses, as demands arise, Hastelloy or a titanium alloy can be employed instead of stainless steel.

The processing apparatus of the present invention is provided with a rapidly cooling means which is disposed connected to the reforming means or the second pyrolyzing means and cools rapidly the gaseous effluent reformed or pyrolyzed at a second temperature to a third temperature so as to suppress the increase of the dioxins concentration in the gaseous effluent.

That is, in the reforming means or the second pyrolyzing means, the dioxins concentration in the gaseous effluent reformed or pyrolyzed at the second temperature is remarkably low, because the second temperature is such high that dioxins can be decomposed and chlorine of the hydrocarbon based compounds decomposed or reformed at this temperature is inorganized due to reducing atmosphere. Therefore, so as to prevent production, re-synthesis of the dioxins from occurring from this state, the reforming means or the second pyrolyzing means is rapidly cooled to the third temperature so as to suppress as much as possible the increase of the dioxins in the gaseous effluent. The third temperature can be set at a temperature where production reaction of the dioxins does not occur.

The gaseous effluent which is, for example, in a state where the dioxins are decomposed (the temperature is not necessarily required to be equal with a temperature of the reforming means or the second pyrolyzing means, but it needs only to be a temperature where the dioxins can be decomposed), by rapidly cooling therefrom to a temperature of 150° C. or less, preferably to 100° C. or less, more preferably to 50° C. or less, can be suppressed in production, re-synthesis of dioxins. In this case, the gaseous effluent is preferred to be cooled to the third temperature in as short a time period as possible. This is because the dioxins are likely to be produced, re-synthesized in the temperature range of about 200 to 400° C. By cooling rapidly the gaseous effluent to the third temperature to shorten the residence time in the temperature range where the production, re-synthesis of the dioxins are likely to occur, the dioxins concentration in the gaseous effluent can be effectively suppressed.

Therefore, cooling of the gaseous effluent in the cooling means is preferred to be carried out in such a short time period as about 10 seconds.

As such a cooling means, a coolant such as water, cooling oil and the like can be directly spouted to the gaseous effluent to cool through contact. Here, if an alkaline powder such as lime powder and the like are spouted to the gaseous effluent, the gaseous effluent can be neutralized. Further, since, for example, HCl in the gaseous effluent diffuses into solid surface through contact with the lime powder, the dioxins are suppressed in its production, re-synthesis.

As described above, the gaseous effluent from the object, by the first pyrolyzing means, the reforming means or the second pyrolyzing means, the cooling means, is converted into hydrogen, methane, carbon monoxide and the like, and the dioxins concentration in the gaseous effluent also can be drastically reduced.

In the present invention, decomposition of the object, decomposition of the gaseous effluent from the object are carried out through processing at a plurality of steps of the first pyrolyzing means, the reforming means or the second pyrolyzing means, and through maintaining these decomposition means in reducing condition, resulting in suppression of generation of dioxins.

When halides, $SO_x$, $NO_x$ and the like are included in the gaseous effluent cooled at the cooling means, with cleaning means, desulfurization means and the like, the gaseous effluent can be cleansed, desulfurized. Further, a filtering means employing activated charcoal can be provided.

Further, the gaseous effluent cooled at the cooling means can be introduced into, for instance, a neutralizing reaction/filtering means such as a bag filter. Between the cooling means and the neutralizing reaction/filtering means, with a dry venturi and the like, hydrated lime, filtering aid (particles of high porosity such as zeolite, activated charcoal) can be spouted into airflow of the gaseous effluent.

Thus processed gaseous effluent discharged from the object can be employed as a heat source heating the first pyrolyzing means or can be provided to a gas turbine generator to obtain electricity. Further, this electricity can be used as a heat source and the like of the processing apparatus of the present invention.

Next, processing of solid pyrolysate of the object pyrolyzed at the first pyrolyzing means will be described.

A processing apparatus of the present invention, in order to process an object having a resin and a metal as a part of constituent members, comprises a means recovering the above described resin through decomposition and a means separating, recovering the metal, wherein a decompressing/heating means is to separate/recover the metal from the pyrolysate residue of the object decomposed at the first pyrolyzing means. The decompressing/heating means capable of heating the object under decompressed pressure.

Almost the entire resin component of the object is decomposed by the first pyrolyzing means, the gaseous effluent is processed as described above. Further, since the inside of the first pyrolyzing means is controlled in its oxygen concentration, the metal of the object is not substantially oxidized and is maintained by the object without being vaporized.

Besides, much of the resin of the object remains as carbides in the residue due to pyrolysis. In the present invention, the object processed by the first pyrolyzing means is transferred from the first pyrolyzing means to the decompressing/heating means.

A decompressing/heating means with which the processing apparatus of the present invention is provided comprises a first gas tight zone provided with a temperature adjusting means and a pressure adjusting means selectively vaporizing a metal in the object secluded from the first pyrolyzing means by a partition capable of being opened or closed, and a first recovering means which is disposed connected to the first gas tight zone and recovers the metal vaporized from the object.

As a temperature adjusting means, a heating means and a temperature measuring means can be employed. As the heating means, various kinds of convection heating, radiation heating can be selected or combined according to demands. As a heat source, the fuel gas obtained by processing the gaseous effluent or electricity generated by the fuel gas can be used. Resistance heating such as a seed heater and the like can be employed or heavy oil or light oil can be burned. Further, an induction heating means can be used. As the temperature measuring means, various kinds of temperature sensors can be employed.

In the first pyrolyzing means, the object is pyrolyzed under such temperature/pressure conditions that the metal in the object is hardly oxidized or vaporized, resulting mainly in vaporization (including the vaporization after once converted to oil) or carbonization. Thereafter, the above described reforming means or the second pyrolyzing means processes the gaseous effluent. An equilibrium state can change.

As described above, in general, when the object is complex and in huge quantity, during processing, the object can be partially oxidized, reduced, as the phase equilibrium state thereof can change.

When the gaseous effluent is mingled with, for instance, a constituent metal and the like of the object, after recovering by providing a cyclone separation means disposed in cooling process, a bag filter, or a path according to demands, the recovered metal is processed by a decompressing/heating means together with the pyrolysis residue of the first pyrolyzing means.

As a pressure adjusting means, an exhausting means or a pressurizing means and a pressure measuring means can be employed. As an exhausting means, various kinds of vacuum pumps such as a rotary pump, an oil diffusion pump, a booster pump can be used. As a pressurizing means, for instance, gas can be introduced into the system from a gas reservoir. As a pressure measuring means, a Bourdon tube or a Pirani gage can be employed according to degree of the vacuum to be measured.

In addition, between the first pyrolyzing means and the first gas tight zone of the decompressing/heating means, a purge zone can be disposed connecting with the first gas tight zone. With the purge zone, a pressure adjusting means such as an exhausting system or a pressurizing system, a temperature adjusting means preheating or cooling the object can be disposed. Further, a carrier gas introducing system replacing the gas in the system can be disposed or the carrier gas introducing system can be a pressurizing system at the same time.

The object is introduced into the first gas tight zone from the pyrolyzing means through a purge zone. By disposing the purge zone, when the object is introduced into the first gas tight zone, the first gas tight zone is secluded from the outside of the apparatus. Further, since the first gas tight zone can be always evacuated and maintained in a decompressed state, load upon a vacuum pump can be alleviated.

A decompressing/heating means can be provided with a plurality of gas tight zones. A second gas tight zone, for instance, can be disposed connected with the first gas tight zone.

Further, a purge zone can be disposed adjacent to the first gas tight zone or the second gas tight zone. The object can be taken out outside the apparatus from the first gas tight zone or the second gas tight zone through the purge zone.

By disposing a purge zone posterior to the second gas tight zone, when taking out the object from the first or the second gas tight zone, the first or the second gas tight zone can be secluded from the outside portion of the apparatus. Therefore, since the first or the second gas tight zone can be always evacuated and be maintained in a decompressed state, load on the vacuum pumps can be alleviated. In addition, until the temperature of the heated object is lowered to a temperature where the object is not oxidized even under an atmospheric pressure, the object can be maintained intercepted from the outside air.

That is, a purge zone, from the view point of maintenance of both of the decompressing/heating means and the object, works as a buffer zone between the outside portion of the decompressing/heating means and the first and the second gas tight zones.

The first gas tight zone and the second gas tight zone provided for the decompressing/heating means are secluded by a partition capable of being opened or closed. The partition, together with maintaining gas tightness of each zone, maintains an adiathermic property of each zone, as well. For instance, a vacuum door maintaining gas tightness and a heat insulation door maintaining adiathermic property can be combined. By secluding the first and the second gas tight zones with a partition composed of a heat insulation door-a vacuum door-a heat insulation door, the gas tightness and the adiathermic property of each zone can be maintained. By disposing a heat insulation door between such a vacuum door and the zone, which the vacuum door secludes, even when a large thermal load is put on the vacuum door, the vacuum door can be protected from the thermal load. In this case, the vacuum door can be protected from the heat of the first and the second gas tight zones.

Naturally, such a partition can be disposed between the outside portion of the decompressing/heating zone and a purge zone, between the purge zone and a first gas tight zone, between a second gas tight zone and the purge zone, but what type of partition should be disposed can be designed according demands.

For instance, when the thermal load of the purge zone is small, a vacuum door only can be disposed.

The inside of the first gas tight zone where the pyrolysis residue of the object and the solid state effluent separated from the gaseous effluent of the object are introduced is adjusted in its temperature/pressure condition so as to vaporize a metal in the object. The temperature/pressure condition can be set in advance or can be controlled by feed-backing the measured values of the temperature and the pressure to the heating means, the pressure adjusting means. The same can be said with the second gas tight zone.

The inside of the first gas tight zone wherein the object is introduced is adjusted in its temperature/pressure condition so as to vaporize a metal in the object. When the inside of the first gas tight zone is decompressed, the metal in the object is vaporized at a temperature lower than that of under the atmospheric pressure. In addition, the oxygen concentration decreases to generate a non-oxidizing atmosphere inside the first gas tight zone. Thus, metallic state of the vaporized metal can be maintained.

For instance, the boiling point of zinc at 760 Torr is 1203K, but that at 1 Torr is 743K, and that at $10^{-4}$ Torr is 533K.

Further, for instance, the boiling point of lead is 2017K at 760 Torr(1 atm), but that at $10^{-1}$ Torr is 1100K, and that at $10^{-3}$ Torr is 900K.

Thus, in the first gas tight zone, a metal selectively vaporizes according to the temperature/pressure conditions.

Further, since, when being introduced into the first gas tight zone, almost all of the resin of the object is converted into carbide, vaporization of a metal from the object hardly generate decomposition product gas. Therefore, the vaporized metal can be recovered in its metallic state with high purity, resulting in alleviation of load upon the vacuum pump.

The condensation means is to condense the metal vaporized like this in the first gas tight zone to recover.

For instance, by connecting a recovering chamber having an exhaust system in the first gas tight zone, a metal vaporized in the chamber can be cooled to a temperature below its melting point to condense, thus resulting in recovering. The inside of the recovering chamber can be, for example, a counterflow structure or a spiral structures. Instead, between a recovering chamber and a first gas tight zone, between the recovering chamber and an exhaust system, a valve or a partition capable of being opened or closed can be disposed. That is, when the metal vaporized from the object is introduced into a recovering chamber, the recovering chamber is closed to cool the metal to condense, thus, resulting in recovering it.

Irrespective of the vaporized metal being continuously condensed to recover or being processed in a batch to condense to recover, the longer the residence time of the vaporized metal in the recovering chamber, the recovering efficiency becomes higher.

Further, $N_2$ or noble gas can be introduced as a carrier gas into the first gas tight zone. The vaporized metal is effectively introduced into the recovering chamber together with the carrier gas.

A plurality of systems of the condensation means can be provided. The same metal can be recovered with the plurality of condensation means, or, by adjusting gradually the temperature and the pressure in the first gas tight zone, selective vaporization of a plurality of each metals can be carried out, a plurality of systems of the condensation means being switched to recover them, respectively.

Further, the condensation means can be carried out in multi-stages.

Thus, a decompressing/heating means provided for the processing apparatus of the present invention is to process an object having a resin and a metal as its constituent members. The decompressing/heating means of the processing apparatus of the present invention, by providing a first pyrolyzing means decomposing a constituent resin of the object before the decompressing/heating means vaporizing the constituent metal of the object, made possible to process the object having a resin and a metal as its constituent members. The gaseous effluent from the object discharged from the pyrolyzing means is processed, as described above, by the reforming means or the second pyrolyzing means connected to the first pyrolyzing means, the cooling means. Therefore, in the decompressing/heating means, such heating and decompression that is sufficient to vaporize the metal can be executed.

Further, since, in the first pyrolyzing means, the object is decomposed under such a condition that the metal of the object is not so much oxidized or vaporized, at the decompressing/heating means, the metal can be effectively separated from the object to recover.

The decompressing/heating means of the processing apparatus of the present invention can comprises a first pyrolyzing means provided with a temperature adjusting means and a pressure adjusting means vaporizing a metal included in the object from the object, a second gas tight zone provided with a temperature adjusting means and a pressure adjusting means selectively vaporizing the metal of the object which is secluded by a partition capable of being opened or closed from the first gas tight zone, a condensation means which is connected to the first gas tight zone and condenses the metal vaporized from the object, and a second recovering means which is connected to the second gas tight zone and recovers the metal vaporized from the object.

Such a decompressing/heating means can be provided with a plurality of gas tight zones vaporizing metals included in the object such as a pyrolysis residue of the first pyrolyzing means. That is, when processing an object having a first metal and a second metal as its constituent members, the decompression/heating means comprises a first gas tight zone provided with a temperature adjusting means and an oxygen concentration adjusting means pyrolyzing an object in such a manner that a first and a second metal are not so much oxidized in the first pyrolyzing means, and further provided with a temperature adjusting means and a pressure adjusting means selectively vaporizing the first metal of the object secluded by a partition capable of being opened and closed from the first pyrolyzing means, a second gas tight zone provided with a temperature adjusting means and a pressure adjusting means selectively vaporizing the second metal in the object secluded from the first gas tight zone with a partition capable of being opened and closed, a first condensation means condensing the first metal vaporized from the object connected to the first gas tight zone, and a second condensation means which is connected to the second gas tight zone and recovers the second metal vaporized from the object. The decompressing/heating means is characterized in being provided with a plurality of the second gas tight zones. Thereby, a plurality of metals in the object can be selectively vaporized, condensed, and recovered, respectively.

The decompressing/heating means of the processing apparatus of the present invention comprises a piece of gas tight zone provided with a temperature adjusting means and a pressure adjusting means, a first condensation means which is disposed connecting to the gas tight chamber and recovers the first metal vaporized from the object when the temperature and the pressure in a gas tight chamber are adjusted in such a manner that the first metal of the object is selectively vaporized, and a second condensation means which is disposed connecting to the gas tight chamber and recovers the second metal vaporized from the object when the temperature and the pressure in the gas tight chamber are adjusted so as to vaporize selectively the second metal of the object. Contrary to the previously described heating means for heating the object under decompressed pressure which is provided with a plurality of gas tight zones different in conditions such as the temperature, pressure, oxygen concentration in the gas tight chamber, the present decompressing/heating means is a decompressing/heating means of the processing apparatus provided with a plurality condensation means corresponding to the conditions in one gas tight chamber.

The temperature adjusting means in the gas tight chamber, that is, a temperature adjusting means of the object, can employs a heating means and a temperature sensor as described above. For heating, too, various heating means such as convection, radiation, and combination thereof, can be employed according to their demands.

As the pressure adjusting means, as identical as the case of the above described decompressing/heating means, an exhausting means, a pressurizing means and a pressure measuring means can be used. As the exhausting means, there can be used various kinds of vacuum pumps such as a rotary pump, an oil diffusion pump, a booster pump and the like. For the pressurizing means, for instance, a gas from a gas reservoir can be introduced into the system. As a pressure measuring means, such as a Bourdon tube or a Pirani gage can be employed corresponding to the degree of vacuum to be measured.

The condensation means can be provided with in the identical manner as the case described above.

As the first, the second condensation means, by connecting, for example, a recovering chamber having an exhausting system in a gas tight zone, a metal vaporized in the chamber can be cooled below the melting point to condense, thus enabling to recover. The inside the recovering chamber can be a counterflow structure or a spiral structure. Or, between the recovering chamber and the first, the second gas tight zones, between the recovering chamber and the exhausting system, valves or partitions capable of being opened and closed can be disposed. That is, when the metal vaporized from the object is introduced into the recovering chamber, the recovering chamber is closed to cool, thereby, the metal is condensed to recover.

If a temperature adjusting means holding an object including, for instance, lead at the decompressing/heating means and adjusting the temperature in the decompressing/heating means, a pressure adjusting means adjusting the pressure in the decompressing/heating means, a controlling means controlling the temperature adjusting means and the pressure adjusting means in such a manner that the temperature and the pressure in the decompressing/heating means allow the lead in the object to vaporize selectively, and a recovering means which is connected to the decompressing/heating means and condenses the lead vaporized from the object are provided, the lead can be recovered from the pyrolysis residue of the object (includes solid state, liquid state component separated from the gaseous effluent).

The decompressing/heating means of the processing apparatus is consisting in to separate, recover lead from the object through introduction of the object into the gas tight chamber, adjustment of the temperature, the pressure or the oxygen concentration in the gas tight chamber, and selective vaporization of the lead in the object. Metals other than lead, also, by controlling the inside of the gas tight chamber to the predetermined temperature, pressure conditions which allow the metal to vaporize selectively, can be separated, recovered from the object.

Even when the object includes lead and resin, in the first pyrolyzing means, at first, by pyrolyzing the object under a condition where the lead is not vaporized or not so much oxidized, the resin portion is decomposed (gasification, conversion to oil, carbonization). Then, the lead is selectively vaporized at the decompressing/heating means to recover the vaporized lead in its metallic state. By pyrolyzing the constituent resin of the object at the first pyrolyzing means, the lead in the object can be positively recovered.

In addition, the processing apparatus of the present invention can be provided with a controlling means controlling such a temperature adjusting means, a pressure adjusting means or an oxygen concentration adjusting means. The controlling means controls the temperature, the oxygen concentration in, for instance, the first pyrolyzing means so as to pyrolyze the object while maintaining the metal in the object not to be oxidized, or, so as to vaporize selectively the metal in the decompressing/heating means. The controlling means can optimize the state inside the gas tight chamber by measuring the state of the gas tight zone with the above described temperature sensor, pressure sensor, oxygen concentration sensor and the like, and by feed-backing the measured values to the heating means, exhausting means, pressurizing means, carrier gas introducing system and the like.

In addition, for implementation of such a control, a controlling apparatus can be provided which, by inputting the parameters of the states inside the decompressing/heating means, outputs signals operating the heating means, the exhausting means, pressurizing means, the carrier gas introducing means and the like so as to optimize the conditions in the gas tight chamber. The control circuit can be stored as a program in a memory means of the controlling apparatus. These controlling means can control the first pyrolyzing means, the reforming means, the second pyrolyzing means, the cooling means and the like in an integrated manner.

Pyrolysis step in the processing method of the present invention is a step pyrolyzing an object by heating the object under control of the oxygen concentration.

The resin such as plastics begins to melt around 50° C., decomposes at around 180 to 500° C. to discharge hydrocarbon based gas consisting mainly of C1 to C16. The gaseous effluent generated by pyrolysis of these resins and the like is, as described above, processed not to generate dioxins, thus being recycled as fuel gas.

As described above, the pyrolysis of the object is preferred to be carried out under control of the oxygen concentration in the chamber. The oxygen concentration can be adjusted by introducing a carrier gas such as Ar, or by adjusting the total pressure in the chamber of the first pyrolyzing means.

By adjusting the oxygen concentration in the first pyrolysis step to maintain the reducing atmosphere inside the system, oxidation of metal such as lead can be prevented from occurring, generation of dioxins can be suppressed. Further, by adjusting the oxygen concentration independently of the total pressure, without lowering thermal conductivity in the first pyrolyzing means, the metal can be prevented from being oxidized, pyrolysis efficiency of the object, recovering efficiency of the gaseous effluent can be improved. In some cases, a carrier gas such as Ar can be introduced into the first pyrolyzing means to pressurize and decompose the resin.

In the first pyrolyzing means, pyrolysis of the resin in the object is preferred to be carried out completely, but can be carried out to a degree not to adversely affect separation, recovery of the metal in the decompressing/heating means. Since almost all of moisture or oily portion of the object can be removed from the object during the pyrolysis step, the step where the metal is vaporized is not affected adversely.

For instance, lead displays a vapor pressure of 760 mmHg at about 1745° C., but lead oxide displays a vapor pressure of 760 mmHg at a lower temperature of 1472° C. Therefore, by controlling the oxygen concentration of the first pyrolyzing means, lead metal is prevented from being oxidized to lead oxide, is prevented from being scattered, thus, with the decompressing/heating means, lead can be recovered more positively.

After the object is pyrolyzed while maintaining the metal in the object not to be so much oxidized as described above, the object is heated under a decompressed condition so as to vaporize the metal contained in the pyrolyzed object, thus the metal being separated, recovered from the object.

When a plurality of metals are included in the object, by taking advantage of the difference of their vapor pressures, a target metal can be selectively vaporized.

For instance, a temperature where lead vaporizes varies depending on the pressure in the chamber. Under the atmospheric pressure, when heated at, for instance, 1400° C., the vapor pressure of lead is 84 mmHg, whereas those of iron, copper, tin do not reach even 1 mmHg.

Therefore, by heating the object at about 1400° C., lead vapor only can be selectively generated from the object.

Further, under the atmospheric pressure, the vapor pressure of lead at, for instance, 1740° C. is 760 mmHg, whereas that of tin is 15 mmHg, that of copper does not reach even 3 mmHg. Therefore, by heating the object to about 1740° C., almost lead vapor only can be selectively generated from the object.

Further, by decompressing the inside of the gas tight chamber, at a further lower temperature, the metal in the object can be vaporized.

If the pressure in the gas tight zone of the decompressing/heating means is adjusted to $10^{-}$Torr, by heating to about 100K, almost lead vapor only can be selectively generated from the object.

Further, if the pressure in the gas tight zone is adjusted to $10^{-3}$ Torr, by heating to about 900K, almost lead vapor only can be selectively generated from the object.

Further, if the pressure in the gas tight zone is adjusted to $10^{-4}$ Torr, by heating to about 700K, almost lead vapor only can be selectively generated from the object.

The metal vapor including lead that is selectively generated as described above can be recovered as a metal with a condensation means cooled below the melting point of the metal.

When the metal vaporized from the object is condensed, crystallized to recover, by setting a longer residence time of the lead vapor in the apparatus, recovery ratio can be heightened. Therefore, for a structure of the condensation means, a counterflow structure or a spiral structure is most preferable.

Further, by flowing $N_2$ or noble gas such as Ar as a carrier gas from the gas tight zone of the decompressing/heating means to the condensation means, the metal vapor can be recovered more selectively.

If the first pyrolysis step and the decompressing/heating step are implemented continuously, input energy can be suppressed drastically.

That is, since the thermal conductivity of a gas decreases as the pressure decreases, as the inside of the gas tight chamber is decompressed in the decompressing/heating step, larger energy input is required.

In the processing apparatus, processing method of the present invention, if the first pyrolyzing means and the decompressing/heating means are connected so as to suppress cooling of the object and the first pyrolysis step is used as a preparatory heating step of the decompressing/heating means which vaporizes the metal, an energy inputted at the decompressing/heating step can be saved remarkably. In addition, the object being heated at the first pyrolyzing means can be prevented from being oxidized, being burned in the atmosphere. For instance, the first pyrolyzing means and the gas tight zone of the decompressing/heating means can be connected through a purge room.

The decompressing/heating means provided for the processing apparatus of the present invention can comprise a gas tight zone holding therein the object having a first portion and a second portion connected by a metal, a temperature adjusting means adjusting the temperature of the inside of the gas tight zone, a pressure adjusting means adjusting the pressure of the inside of the gas tight zone, and a controlling means controlling the temperature adjusting means and the pressure adjusting means in such a manner that the temperature and the pressure of the inside of the gas tight zone allow the metal to vaporize.

Further, gas tight zone holding therein an object having a first portion and a second portion connected by an alloy having a first metal and a second metal, a temperature adjusting means adjusting the temperature of the inside of the gas tight zone, a pressure adjusting means adjusting the pressure of the inside of the gas tight zone, and a controlling means controlling the temperature adjusting means and the pressure adjusting means in such a manner that the temperature and the pressure of the inside of the gas tight zone allow the metals to vaporize, can be provided.

For instance, at least one element of Zn, Cd, Hg, Ga, In, Tl, Sn, Pb, Sb, Bi, Ag or In can be separated or recovered as a first metal from the object.

Further, by adjusting the temperature, the pressure, the oxygen concentration inside the gas tight zone, metals other than those metals can be separated, recovered in their metallic states(ref. FIG. 43, FIG. 48, FIG. 49). This is same, if not particularly mentioned, through all portions of the present invention.

After the pyrolysis residue of the object having a first portion and a second portion pyrolyzed at the first pyrolyzing means is introduced into the gas tight zone of the decompressing/heating means, the gas tight zone is sealed, and the temperature and the pressure inside the gas tight zone can be adjusted so as to vaporize the metal connecting the object having a first portion and a second portion.

Further, when a connecting metal is an alloy having a first metal and a second metal, at first, the temperature and the pressure inside the gas tight zone are adjusted so as to vaporize selectively the first metal of the alloy, then, the temperature and the pressure inside the gas tight zone are adjusted so as to vaporize the second metal of the alloy.

For instance, into the first pyrolyzing means, a substrate having a resin as a constituent member and a mounted substrate consisting of the substrate and an electronic component connected therewith by an alloy having a first metal and a second metal are introduced, then, the temperature and the oxygen concentration of the inside of the first pyrolyzing means are controlled so as not to vaporize the first and the second metal of the alloy and to pyrolyze the resin. Then, the pyrolysis residue of the mounted substrate is introduced into the decompressing/heating means, the temperature and the pressure of the gas tight zone of the decompressing/heating means are controlled so as to vaporize selectively the first metal of the alloy, then the temperature and the pressure of the gas tight zone are controlled so as to vaporize the second metal of the alloy.

Thus, according to the present invention, connection of the object having a portion connected by a metal or an alloy such as a mounted substrate wherein, for example, a printed circuit board and various kinds of electronic components are connected by a solder alloy such as Pb—Sn, can be disconnected from connection, in addition, even when a hazardous metal such as lead, for example, is contained in a connecting alloy, these metals can be separated, recovered from the object.

That is, the object pyrolyzed at the first pyrolyzing means is introduced into the gas tight zone of the decompressing/heating means, by vaporizing the connecting metal or alloy through adjustment of the temperature, the pressure, the oxygen concentration of the gas tight zone, connection can be disconnected. The vaporized metal can be recovered.

When the object has a resin as a constituent member, at first, the resin portion is pyrolyzed at the first pyrolyzing means to vaporize, convert to oil, carbonize. This decomposition of the resin can be implemented by adjusting the conditions of the temperature, the oxygen concentration in the first pyrolyzing means in such a manner that the metal is not so much oxidized and vaporized. Even when the metal is vaporized from the object, the metal can be condensed, recovered with, for instance, a cooling means and be introduced into the decompressing/heating means.

Then, by adjusting the temperature and the pressure of the inside of the gas tight zone, the connecting metal of the object is selectively vaporized. When a plurality of metals (elements) are included in the object, the temperature and the pressure inside the gas tight zone can be adjusted according to each metal to vaporize selectively each metal.

Other than the mounted substrate, if a metal or an alloy connects the object, its connection can be disconnected.

For instance, a mounted substrate is introduced into a processing apparatus of the present invention without being crushed, and is pyrolyzed at a temperature (450 to 500° C., for example) where lead is not so much oxidized, vaporized by adjusting the oxygen concentration to decompose the constituent resin of the mounted substrate. Then, after the pyrolyzed mounted substrate being introduced into the decompressing/heating means, the lead is heated to vaporize (about 900K at $10^{-3}$ Torr, for example), and similarly tin is heated to vaporize, thereby the mounted substrate is separated into an electronic component and a circuit board (a substrate to be mounted with an electronic component is referred to as a circuit board) to recover.

Even if a metal such as lead is vaporized at a first pyrolyzing means, a separating means of the metal can be disposed to the processing system of the gaseous effluent.

Further, for instance, after a mounted substrate is introduced into the processing apparatus of the present invention and lead is recovered, by further heating up to, for example, about 973K, Zn, Sb can be vaporized to recover.

Further, by heating up to about 1773K, Au, Pt, Pd, Ta, Ni, Cr, Cu, Al, Co, W, Mo and the like can be vaporized to recover. The solder alloy is not restricted to Pb—Sn, so-called lead-free solders such as Ag—Sn, Zn—Sn, In—Sn, Bi—Sn, Sn—Ag—Bi, Sn—Ag—Bi—Cu, for example, can be processed. Further, the object can be connected by an alloy or a single metal other than these.

Further, according to the present invention, an object in which a resin and a metal are integrated can be effectively processed.

That is, an object in which a resin and a metal are integrated is introduced into a first pyrolyzing means, then, at first, the resin portion is pyrolyzed to vaporize, convert to oil, carbonize. This decomposition of the resin can be carried out by adjusting the temperature, the oxygen concentration or the pressure of the first pyrolyzing means to a condition where the metal is not so much oxidized or vaporized.

When the metal is difficult to be separated from the object only with this processing, by introducing into the decompressing/heating means followed by adjustment of the temperature and the pressure inside the gas tight zone, the metal in the object can be selectively vaporized. When a plurality of metals(elements) are included in the object, by adjusting the temperature, the pressure of the inside of the gas tight zone according to each metal, each metal can be selectively vaporized. Thus, according to the apparatus and the processing method of the present invention, other than the object only having a resin and a metal as they are, the object in which the resin and the metal are integrated can be processed, too. As an object having such a resin and a metal, for instance, such as an aluminum foil laminated with a plastics film of a wrapping container such as a retort pouch food, a printed circuit board in which a resin and copper/nickel and the like are integrated, a film carrier of a flexible substrate or a TAB, an IC, an LSI, a resistor, or shredder dust can be cited as an example.

In order to prevent the constituent metal of the object from being oxidized or vaporized as a whole, for instance, the wastes can be heated by controlling the pressure inside the gas tight zone or the object can be heated by controlling the oxygen concentration inside the gas tight zone. For controlling the oxygen concentration, the oxygen partial pressure can be adjusted by adjusting the total pressure inside the gas tight zone, or the oxygen concentration in the system can be adjusted by introducing a gas such as nitrogen gas or noble gas into the gas tight zone. When oxidation of the resin portion proceeds rapidly due to heating of the object, that is, when being burned, the metal portion integrated with the resin portion is also oxidized to form oxide, thus not only decreases the utility value but also leads to generation of dioxins as described above. Therefore, cautions must be paid.

Further, when the metal portion is composed of a plurality of metals, by heating further to selectively vaporize by each element, recovery can be implemented.

The decomposition product gas of the resin of the object can be recovered by condensation, for instance, a device converting to oil can recover it. Hydrogen gas can be recovered through absorption, and, when halogenated hydrocarbon is generated, it can be decomposed with, for example, a catalyst.

Further, when the resin includes chlorine like polyvinyl chloride based resin, at a gas gaseous effluent processing system, for instance, between a first pyrolyzing means and, a reforming means or a second pyrolyzing means, or between the reforming means or the second pyrolyzing means and a cooling means, the gaseous effluent can be contacted with, for instance, a hot heated iron to form ferrous halide to be recovered.

As one example of processing, processing of an aluminum foil(it is called a resin-coated aluminum foil, same in the following)laminated with a plastics film and used for various kinds of wrapping container will be described.

When a first temperature is below 400° C., decomposition such as carbonization, conversion to oil of the resin portion is insufficient. In addition, since aluminum is melted when heated to 650° C. or more, through pyrolysis set at the first temperature of about 400 to 650° C., the resin portion can be decomposed (vaporization, conversion to oil, carbonization), resulting in recovery of the aluminum foil in its metallic state.

The pressure inside the first pyrolyzing means can be decreased to about $10^{-2}$ Torr or less, or the oxygen concentration can be preferably adjusted through introduction of a gas such as Ar to pyrolyze. The first temperature is further preferable to be set at 550 to 600° C.

Further, the present invention can process an object such as a circuit board in which a resin and a metal are integrated. For instance, a circuit board in which a resin and copper are stacked is pyrolyzed at the first pyrolyzing means, after pyrolysis of the resin portion, it is introduced into the decompressing/heating means. Under a decompressed condition, copper of the printed circuit board is melted, and the pyrolysis residue is further heated so as to coagulate Cu to form particles thereof due to its surface tension. Then, by taking out the object from the decompressing/heating means through a purge room, copper can be easily separated from carbides.

BRIEF DESCRIPTION OF THE DRAWINGS

FIG. 34 is a diagram schematically showing one example of a structure of a gas decomposition vessel;

FIG. 35 is a diagram schematically showing one example of a structure of a cooling tower;

FIG. 60 is a diagram schematically showing a separating wall of a processing apparatus of the present invention;

FIG. 61 is a diagram schematically showing one example of a processing apparatus of the present invention;

BEST MODE FOR CARRYING OUT THE INVENTION (Embodiment 1)

Figure 1:
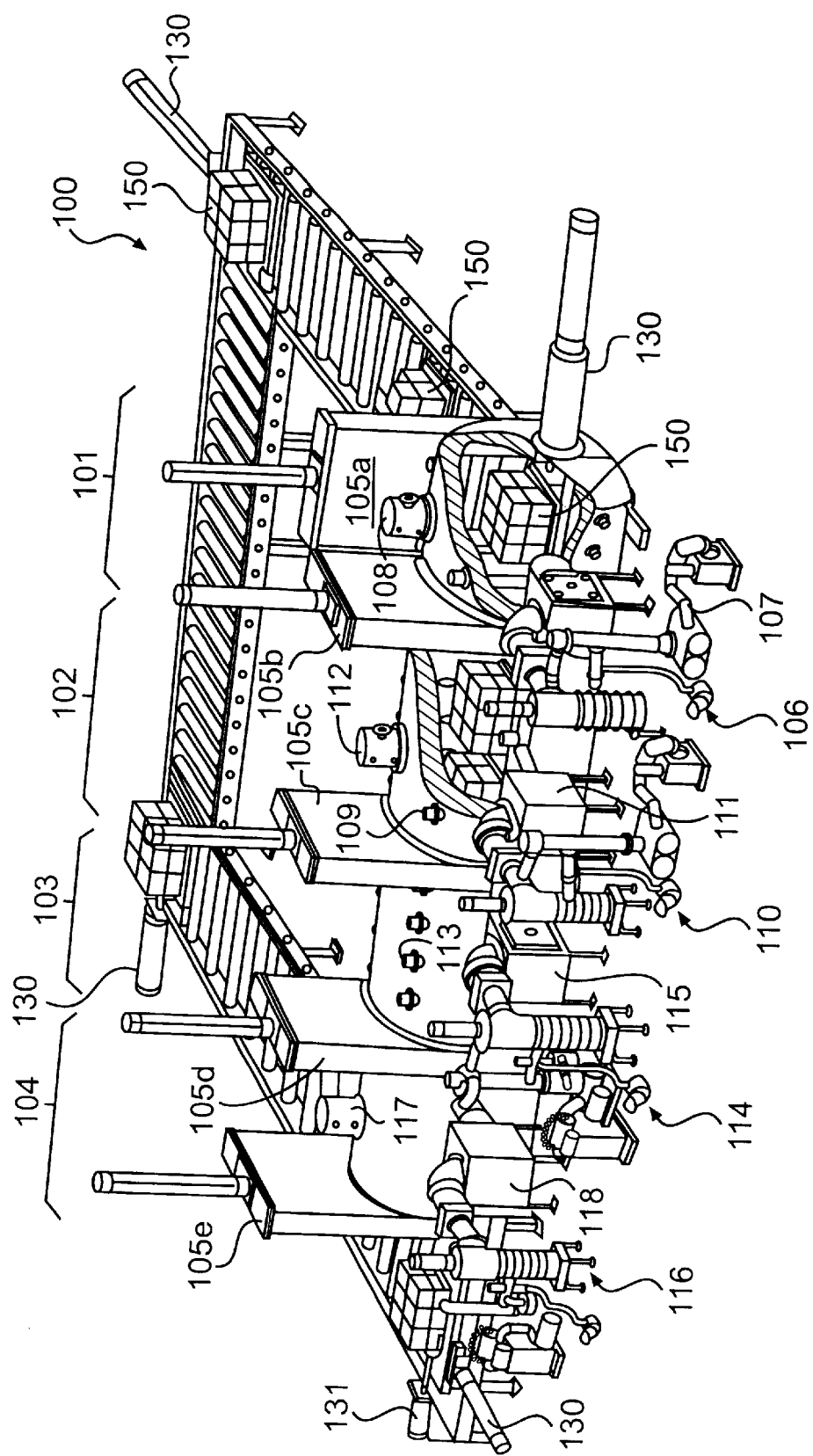
FIG. 1 is a perspective view roughly showing one example of a processing apparatus of the present invention.

FIG. 1 is a perspective view roughly showing one example of a processing apparatus of the present invention. By truncating a part thereof, an inside state is shown.

The processing apparatus 100 processes an object being processed 150 which has a resin and a metal as constituent members and comprises a purge room 101, a first gas tight room 102, a second gas tight room 103, and a cooling room 104.

These respective rooms are separated by doors 105, partitions, which are capable of being opened and closed.

That is, a door 105a separates a purge room 101 from an outside of the apparatus, a door 105b separates a purge room 101 from a first gas tight room 102, a door 105c separates a first gas tight room 102 from a second gas tight room 103, a door 105d separates a second gas tight room 103 from a cooling room 104, and a door 105e separates a cooling room 104 from the outside of the apparatus, respectively.

The doors 105 separating these respective rooms are provided with gas tightness maintaining property and an adiathermic property, thus, separating respective rooms from the view-point of heat, pressure. Since the thermal load upon doors 105a, 105b is low, only gas tightness is needed for them.

An exhaust system 106 is connected to a purge room 101. This exhaust system 106 is provided with an oil diffusion pump 106a, a booster pump 106b, a rotary pump 106c. Between the purge room 101 and the exhaust system 106, between respective vacuum pumps, not shown valves are disposed. This is same in the following if not particularly mentioned.

Between a purge room 101 and an exhaust system 106, a trap 107 is disposed which removes moisture or hydrogen gas discharged from an object 150 due to decompression of the inside of the purge room 101. Therefore, even when moisture or hydrogen gas is discharged from the object 150 in the purge room, the exhaust system 106 is not adversely affected. The trap 107 can be provided with as demand arises.

Pressure in the purge room 101 is adjusted by this exhaust system 106 and a not shown vacuum gage, a pressure sensor. As a vacuum gage, a Bourdon tube, a Pirani gage or the like can be selected according to necessity.

Further, a carrier gas introducing system is connected to the purge room 101 replacing the gas in the inside of the purge room 101, numeral 108 is a carrier gas introducing valve. The carrier gas introducing system is connected to a not shown carrier gas reservoir. Although $N_2$ is used as the carrier gas here, noble gas such as Ar can be used.

In addition, the purge room 101 can be provided with a heating means to heat the object 150 in After pressures of the purge room 101 and a first gas tight room 102 are made almost equal to balance, the door 105b is opened, the object 150 is transferred into the first gas tight room 102 with a pusher 130. Even if being not particularly mentioned in the following, the pressures on both sides of the door 105 can be balanced to open or close.

A first gas tight room 102 is a processing room selectively pyrolyzing a constituent resin while maintaining an oxidation state of a constituent metal of the object 150.

The first gas tight room 102 is provided with an electric heater 109 which is a heating means. The heating means is not restricted to the electric heater 109 but can be one provided after selection or combination according to demand. For instance, gas, oil, and so forth can be burned or induction heating can be implemented. Further, gas or oil which are produced through pyrolysis of the constituent resin of the object 150 can be combusted.

The temperature in the first gas tight room 102 is adjusted by an electric heater 109 and a not shown temperature sensor, and a not shown controlling means controlling the electric heater by the measured values from the temperature sensor. The controlling means can be provided with an electronic calculator provided with a program in which a measured value or a measured voltage from, for instance, the temperature sensor is inputted, and such a signal or an electric voltage that varies input electric power of the electric heater is outputted.

Such a control can be executed with an analogue circuit or an operator can operate a heating means according to the measured temperature.

In the processing apparatus illustrated in FIG. 1, the temperature in the first gas tight room 102, together with the pressure, the oxygen concentration in the first gas tight room 102 that will be described later, and, together with various conditions in the purge room 101, the second gas tight room 103, the cooling room 104, and opening/closing of the partitions 105, transferring of the object 150, can be integrally controlled by a not shown controlling means. This controlling means can be implemented by mounting, for example, a control program on the electronic calculator.

To the first gas tight room 102, too, an exhaust system 110 is connected. The structure of this exhaust system is same with that of the exhaust system 110 of the purge room 101.

The pressure in the first gas tight room 102 is adjusted by this exhaust system 110 and a not shown vacuum gage, a pressure sensor. For a vacuum gage, as described above, a Bourdon tube, a Pirani gage and so on can be used according to demands.

To the first gas tight room 102, a carrier gas introducing system adjusting the oxygen concentration in this room is connected, numeral 112 is a carrier gas introducing gas valve. The carrier gas introducing system is connected to a not shown carrier gas reservoir.

In this case, $N_2$ is employed as a carrier gas but noble gas such as Ar can be used.

By operating adequately the exhaust system 110 and the carrier gas introducing valve 112, the inside of the first gas tight room can be decompressed or pressurized. A pressure adjusting means of the apparatus can adjust the pressure in the system in the range of from $10^{-3}$ Torr to about $4 \times 10^3$ Torr. By varying capacity and volume of the exhaust system, further decompression can be carried out. In addition, by pressurizing the carrier gas in advance, further pressurization can be implemented.

The oxygen concentration in the first gas tight room 102 can be adjusted with a carrier gas introducing valve 112 and a not shown oxygen concentration sensor. As the oxygen concentration sensor, a zirconia sensor, for instance, can be used. If the temperature in the first gas tight room 102 is too low for the zirconia sensor to be able to measure, a gas extracted from, for instance, the first gas tight room 102 can be adjusted to a temperature of about 773K to measure.

Other than the zirconia sensor, the oxygen concentration can be measured through, for instance, infra-red spectrometry of the gas in the system.

The oxygen concentration in the first gas tight room 102 can be adjusted through the total pressure in the system instead of introduction of carrier gas such as $N_2$.

When pyrolysis of the constituent resin of the object 150 begins, an atmosphere of the decomposition product gas of the resin prevails inside the first gas tight room 102. Therefore, if, before the pyrolysis of the resin begins, the oxygen concentration in the first gas tight room 102 is sufficiently lowered by decompressing the inside of the first gas tight room 102, combustion of the object 150, oxidation of the constituent metal of the object 150 can be prevented from occurring.

As described above, the pressure, the oxygen concentration in the first gas tight room 102 can be controlled in the same manner as the case of the temperature. For instance, by inputting a measured value or a measured voltage obtained from a pressure sensor, an oxygen concentration sensor, a signal or a voltage which controls a valve of the exhaust system 110, a carrier gas introducing valve 112 can be outputted. Such a program can be mounted on an electronic calculator as a control means.

Between the first gas tight room 102 and the exhaust system 110, an oil condenser 111 as a device converting to oil is disposed to recover the decomposition product gas of the constituent resin of the object 150. This oil condenser 111 condenses the gas generated through selective pyrolysis of the object 150 to recover as oil such as light oil, heavy oil or tar. As described above, the recovered gas can be used as a heating means.

Further, when a gas such as halogen, halogenated hydrocarbon is contained in the decomposition product gas of the constituent resin of the object 150, pyrolysis is executed with, for example, a catalyst.

In order to prevent hazardous gas discharged from the object 150 from being leaked outside the apparatus, at the posterior stages of the exhaust system 106, 110, 114, 115 connected to respective rooms, a not shown multiple exhaust gas chamber can be provided.

The temperature, the pressure, the oxygen concentration in the first gas tight room 102 can be controlled as described above. Therefore, with the constituent metal of the object 150 being hardly oxidized or vaporized, the constituent resin can be selectively pyrolyzed. In addition, the decomposition product gas of the constituent gas is recovered by the device for converting to oil such as a condenser. The constituent resin of the object is not necessarily required to be completely decomposed and carbonized in the first gas tight room 102, it can be selectively pyrolyzed to a degree which does not disturb the separation, recovery of the metal at a posterior, second gas tight room 103.

When the processing in the first gas tight room 102 is finished, almost all of the constituent resin remaining with the object 150 exists as carbides.

In the processing apparatus 100 of the present invention, since the object 150 heated in the first gas tight room 102 is transferred to the second gas tight room 103 without being cooled, the thermal efficiency is very high.

The second gas tight room 103 is a processing room recovering the constituent metal of the object 150 by selectively vaporizing from the object 150.

The second gas tight room 103 is provided with an electric heater 109 as a heating means as identical as the first gas tight room. The heating means is not restricted to the electric heater 109 but selected or combined according to demands.

As described above, the temperature in the second gas tight room 103 is controlled with this electric heater 113 and a not shown temperature sensor as identical as the inside of the first gas tight room 102. That is, the temperature in the second gas tight room 103, together with the pressure, the oxygen concentration of the second gas tight room 103, and, together with various conditions of the purge room 101, the first gas tight room 102, the cooling room 104 and opening/closing of the partitions 105, can be integrally controlled with a not shown controlling means.

The second gas tight room 103 is also connected to an exhaust system 114. The structure of this exhaust system is identical as that of the exhaust system 114 of the purge room 101.

The pressure in the second gas tight room 103 is adjusted with this exhaust system 114 and a not shown vacuum gage, a pressure sensor. As a vacuum gage, as identical as the case described above, a Bourdon tube, a Pirani gage can be used according to demands.

To the second gas tight room 103, a carrier gas introducing system adjusting the oxygen concentration in this room is connected, numeral 112 is a carrier gas introducing valve. The carrier gas introducing system is connected to a not shown carrier gas reservoir. In this case, $N_2$ is employed as a carrier gas but noble gas such as Ar can be used.

By operating adequately an exhaust system 114 and a carrier gas-introducing valve 112, the inside of the first gas tight room can be decompressed or pressurized. A pressure adjusting means of the apparatus can adjust the pressure in the system in the range of from $10^{-3}$ Torr to about $4 \times 10^3$ Torr. By varying capacity, volume of the exhaust system, further decompression can be implemented. In addition, by pressurizing the carrier gas in advance, further pressurization can be implemented.

Since, accompanying the decompression in the second gas tight room 103, the vapor pressure (boiling point) of the constituent metal decreases, the metal can be vaporized at a further lower temperature.

Therefore, capacity of the heating means, the exhausting means provided for the second gas tight room 103 can be varied according to the kinds of metal separated, recovered from the object 150.

For instance, in order to heat the inside of the second gas tight room 103 to a further higher temperature, an induction heating means can be provided. Further, in order to decompress the inside of the second gas tight room 103 to a further higher vacuum, a vacuum pump of a higher capacity and a larger exhausting volume can be provided. Depending on the volume of the second gas tight room 103, a further high vacuum can be obtained by employing an ion pump, a turbo molecular pump and so on.

The oxygen concentration in the second gas tight room 103, since the system is sufficiently decompressed, is sufficiently low without particular adjustment. Therefore, although there is no necessity to adjust the oxygen concentration positively, when the oxygen concentration adjusting means is provided, it can be handled as identical as the first gas tight room 102.

Further, in the structure of a processing apparatus 100 shown in FIG. 1, one second gas tight room 103 is provided but a plurality of the second gas tight rooms 103 can be provided. By providing a plurality of the second gas tight rooms 103 which are different in their inside temperatures, pressure conditions, a plurality of metals different in their vapor pressures can be vaporized from the object 150 to be recovered.

Further, when there is no need to separate metals by each element from the object 150 to recover, a plurality of metals can be vaporized from the object 150 to recover. For instance, when a Pb—Sn alloy is removed from the object, the object is heated up to a temperature where Pb and Sn are vaporized under a pressure in the second gas tight room 103 to recover Pb and Sn. Of course, by selectively vaporizing Pb and Sn, each of them can be recovered, respectively.

Between the second gas tight room 103 and the exhaust system 114, in order to recover gaseous metal vaporized from the object 150, a recovering chamber 115 is disposed. This recovering chamber cools the metal vaporized in the recovering chamber to the temperature below the melting point to condense, thus recovering the metal. The inside of the recovering chamber 115 can be constructed to have, for example, a counterflow structure or a spiral structures. Instead, between the recovering chamber 115 and the second gas tight room 103, between the recovering chamber 115 and the exhaust system 114, a valve or a partition capable of being opened or closed can be disposed. That is, when the metal vaporized from the object 150 is introduced into the recovering chamber 115, the recovering chamber 115 is closed to cool, thereby the metal being condensed to recover.

Whether the vaporized metal is continuously condensed to recover or is condensed in a batch to recover, the longer the residence time of the vaporized metal in the recovering chamber 115, and the higher the recovering efficiency.

In addition, $N_2$ or noble gas can be introduced into the second gas tight room 103 as a carrier gas. The vaporized metal is efficiently introduced into the recovering chamber with the carrier gas.

The second gas tight room 103 can be provided with a plurality of lines of recovering chamber 115. The plurality of recovering chambers 115 can be used to recover the same metal, or, by gradually adjusting the temperature and the pressure in the second gas tight room 103 to vaporize selectively a plurality of metals respectively and by switching a plurality of lines of recovering chamber 115, the respective metals can be recovered.

The temperature, pressure, oxygen concentration in the second gas tight room 103 can be controlled as identical manner as described above. Therefore, the constituent metals of the object 150 can be vaporized according to their vapor pressures and are recovered in their metallic state in the recovering chamber 115.

Further, depending on the degree of pyrolysis of the object 150 in the first gas tight room, the constituent resin may discharge a decomposition product gas and the like. Such a decomposition product gas can be processed by connecting the posterior stage of the recovering chamber 115 to an oil condenser 111 or a not shown multiple exhaust gas chambers.

Thus, the predetermined metal can be vaporized from the object 150 to recover in the second gas tight room 103.

If the object 150 is directly taken out from the second gas tight room 103 to the outside of the apparatus 100; the object is likely to be rapidly oxidized. Further, because the inside of the second gas tight room 103 is required to be returned to the atmospheric pressure, it is inconvenient from a view point of maintaining gas tightness in the second gas tight room 103. For this, in the processing apparatus 100 shown in FIG. 1, a cooling room 104 is provided at the posterior stage of the second gas tight room 103.

This cooling room is provided with a pressure adjusting means and an oxygen concentration adjusting means as identical as a purge room 101, a first gas tight room 102, a second gas tight room 103. That is, the exhaust system 116 similar to the above-described case and the carrier gas introducing valve 117 are provided.

The object 150 separated of the predetermined metal in the second gas tight room 103 is transferred to the cooling room 104 to cool under a state where the pressure and the oxygen concentration are adjusted. The carrier gas works for not only adjusting the oxygen concentration but also for cooling the object 150.

Between the cooling room 104 and the exhaust system 116, a trap 118 can be disposed to remove the gas discharged from the object 150 due to preparatory heating.

After the object 150 is sufficiently cooled in the cooling room 104, it is brought out outside the apparatus.

Further, introduction of the object 150 into the processing apparatus 100, taking out therefrom, or transfer of the object 150 between respective rooms can be implemented with a pusher 130, a drawer 131.

Operation of a pusher 130 and a drawer 131, together with opening or closing of the partition 105, can be implemented with the above described, not shown control means.

Figure 2:
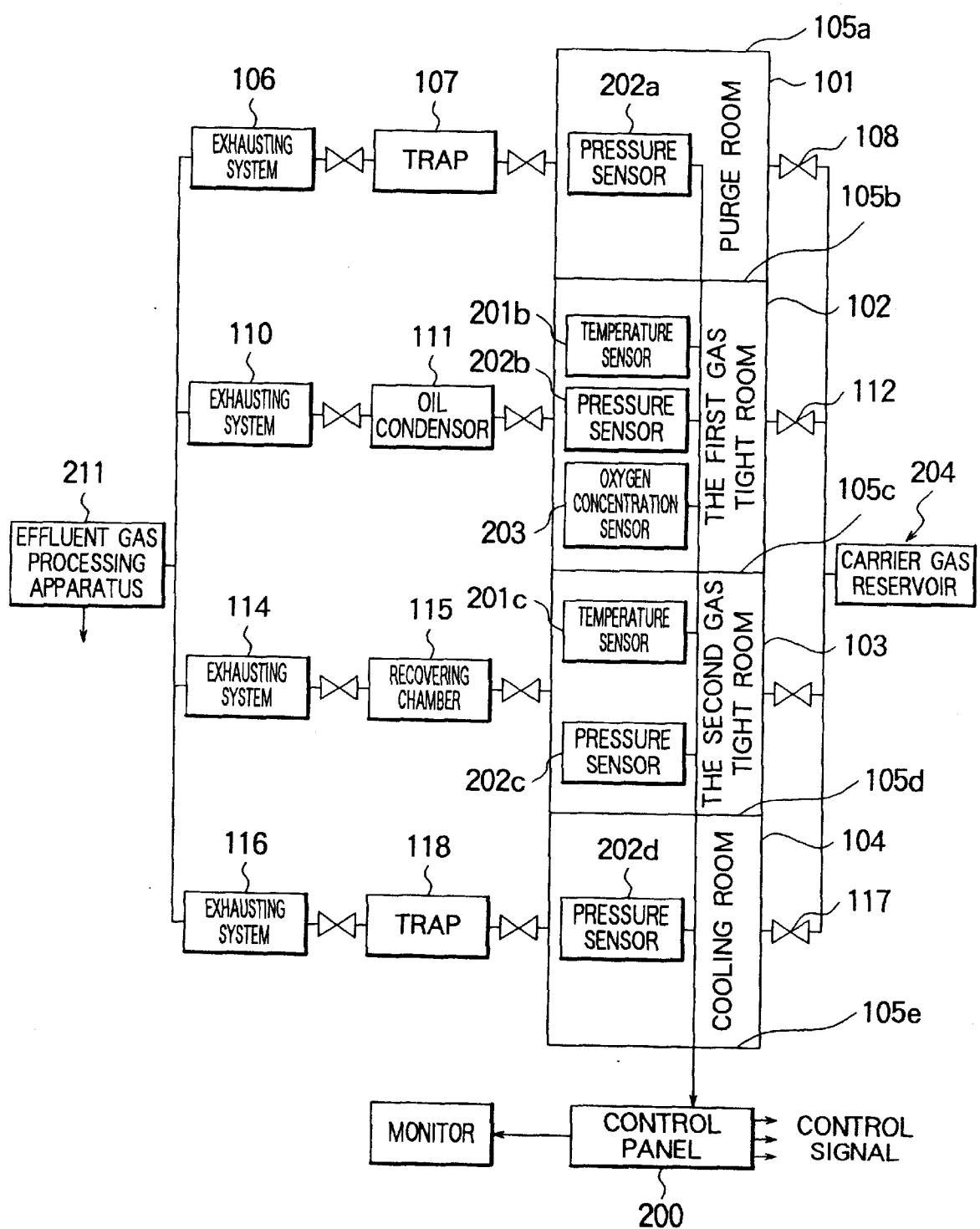
FIG. 2 is a diagram schematically showing the processing apparatus of the present invention illustrated in FIG. 1.

FIG. 2 is a diagram schematically showing the processing apparatus of the present invention illustrated in FIG. 1.

The signals from a pressure sensor 202a in a purge room 101, a temperature sensor 201a, a pressure sensor 202b, an oxygen concentration sensor 203 in a first gas tight room 102, a temperature sensor 201c, a pressure sensor 202c in the second gas tight room 103, a pressure sensor 202d in the cooling room 104, all of them not being shown in FIG. 1, are transmitted to a control board 200 constituting a control means. Mounting a program on an electronic calculator can constitute the controlling means.

Additionally, the controlling means can control a heating means, a pressure adjusting means, an oxygen concentration adjusting means according to the state of each room of the apparatus. Further, opening or closing of the partition 105, transfer of the object 150 due to the pusher 130, the drawer 131 can be controlled through this control means. Numeral 210 shows a monitor displaying an operator the states of such as the temperature, pressure, oxygen concentration in each room, open or closed state of the partition 105 and the like. Further, numeral 211 is a multiple exhaust gas processing apparatus.

(Embodiment 2)

Figure 3:
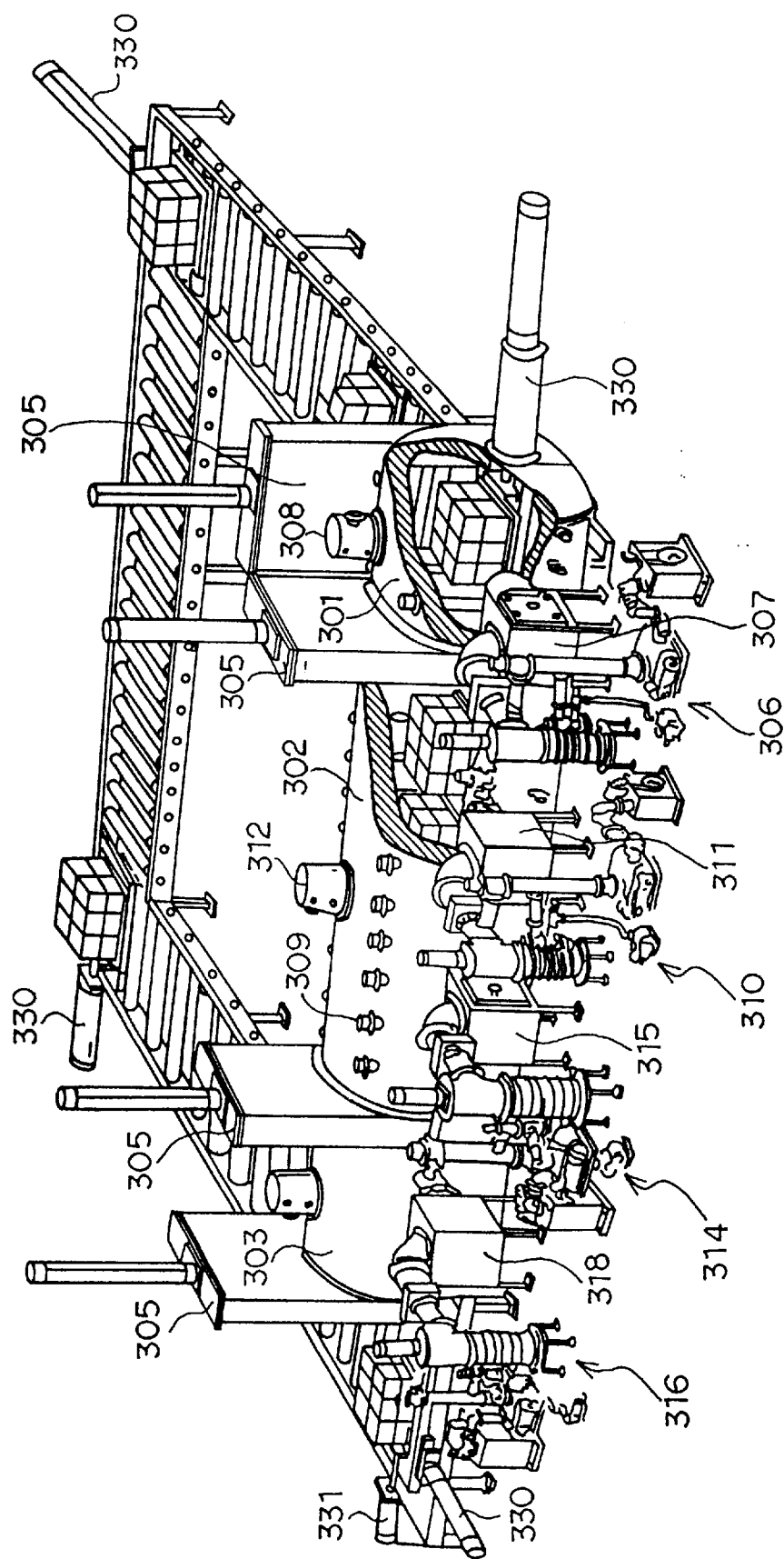
FIG. 3 is a diagram roughly showing another example of the processing apparatus of the present invention.

FIG. 3 is a diagram roughly showing another example of the processing apparatus of the present invention. A part is truncated to show the inside. This processing apparatus 300 also processes an object being processed 350 having a resin and a metal as its constituent members.

This processing apparatus 300 comprises a purge room 301, a gas tight room 302, a cooling room 303. The gas tight room 300 has a combined function of the first gas tight room 102 and the second gas tight room 103 of the processing apparatus 100 illustrated in FIG. 1. That is, in the gas tight room 302, at first, the constituent resin of the object 350 is selectively pyrolyzed, thereafter, in the same gas tight room 302, metal is separated to recover. In particular, when a desired metal can be isolated through selective pyrolysis of the resin, the constituent metal of the object 350 is not necessarily required to be vaporized.

The gas tight room 302 is provided with a temperature adjusting means, a pressure adjusting means, an oxygen concentration adjusting means, but the oxygen concentration can be adjusted through the total pressure in the gas tight room 302 as the case described above.

The temperature in the gas tight room 302 can be adjusted with an electric heater 309 and a not shown temperature sensor.

The pressure in the gas tight room 302 can be adjusted with an exhaust system 310, 314, and a carrier gas introducing system, and a not shown pressure sensor. Numeral 312 shows a carrier gas introducing valve.

Between the gas tight room 302 and the exhaust system 310, an oil condenser 311 as a device for converting to oil which is a condensing/recovering means recovering the decomposition product gas of the constituent resin of the object 350 is disposed.

Further, between the gas tight room 302 and the exhaust system 314, a recovering chamber 315, which is a condensing/recovering means, recovering the gas of the constituent metal vaporized from the object 350, is disposed. When the constituent metal of the object is not required to be vaporized, a plurality of oil condenser 311 can be employed.

The purge room 301, a cooling room 303, a partition 305, a carrier gas introducing system, a pusher 330, a drawer 331 are identical as the processing apparatus 100 illustrated in FIG. 1. In addition, the controlling means can be provided with in the same manner.

Thus, the processing apparatus of the present invention, most fundamentally, comprises a part selectively pyrolyzing the constituent metal of the object not so as to vaporize as much as possible. By combining to this part a part which separates/recovers the constituent metal by vaporizing the constituent metal from the object, the range of the processable object can be expanded.

For instance, processing of a resin coated aluminum foil, by selectively pyrolyzing the resin portion under a controlled atmosphere, aluminum can be recovered in its metallic state.

Further, a mounted substrate on which an electronic component is mounted can be processed by vaporizing solder alloy to recover, thereby separates the substrate and the electronic component.

(Embodiment 3)

Figure 4:
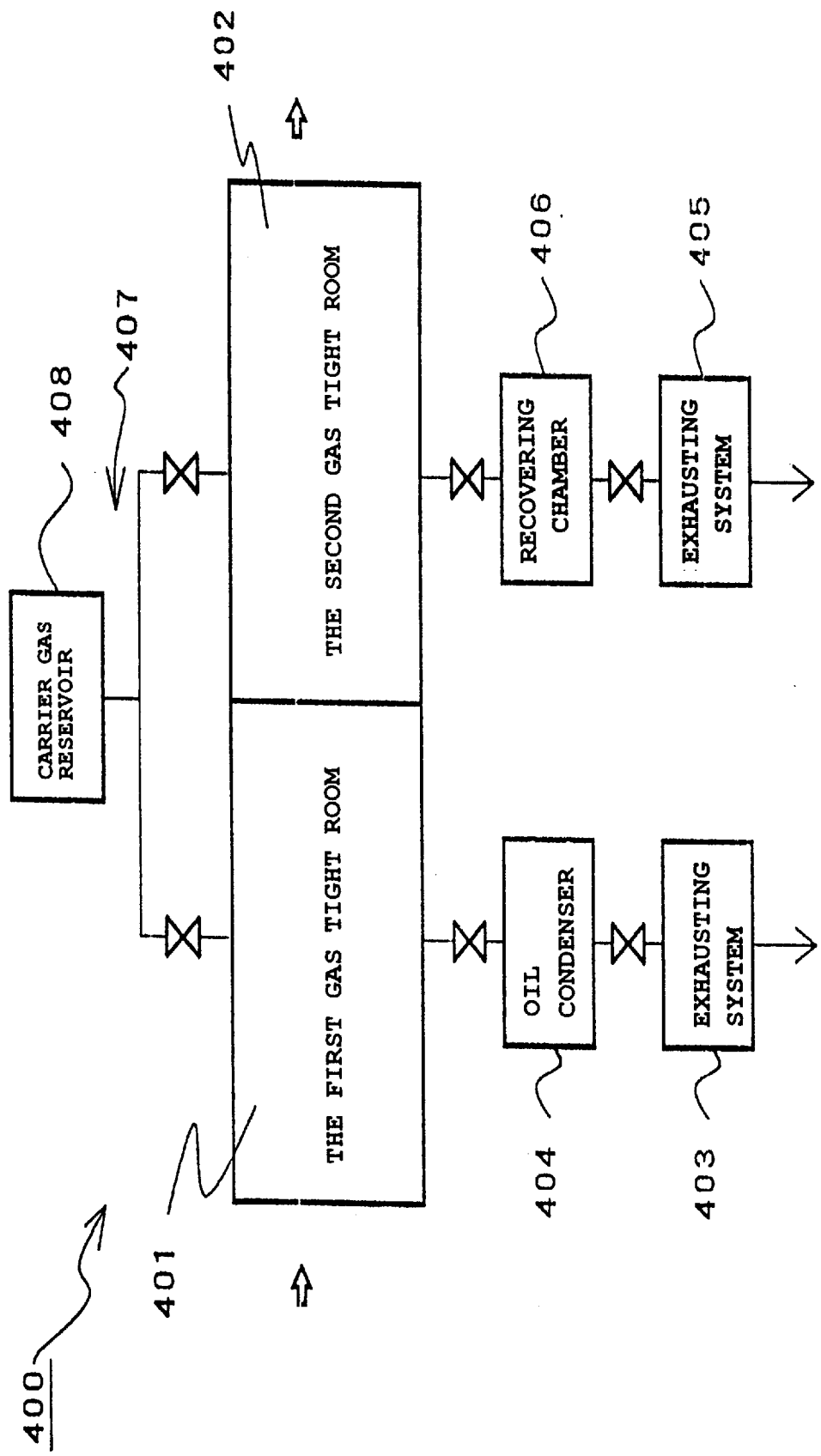
FIG. 4 is a diagram schematically showing another example of the processing apparatus of the present invention.

FIG. 4 is a diagram schematically showing another example of the processing apparatus of the present invention.

This processing apparatus 400 is provided with a first gas tight room 401 and a second gas tight room 402. The first gas tight room 401 is provided with a not shown temperature adjusting means and is connected to an exhaust system 403 and an oil condenser 404 as a device for converting to oil. The second gas tight room is provided with a not shown temperature adjusting means and is connected to an exhaust system 405 and a recovering chamber 406. Further, to the first gas tight room 401, the second gas tight room 402, a carrier gas introducing system 407 is connected, thereby the oxygen concentration in the gas tight room can be adjusted, pressurized. Reference numeral 408 shows a carrier gas reservoir.

That is, a constituent resin of an object being processed which has a resin and a metal is selectively pyrolyzed in the first gas tight room 401, the decomposition product gas thereof is recovered by an oil condenser 404. Here, with the above described controlling means and the like, the temperature, pressure, oxygen concentration in the first gas tight room 401 can be adjusted to pyrolyze selectively the resin while maintaining the state of the constituent metal of the object.

In the second gas tight room 402, the temperature, pressure of the inside are adjusted to vaporize the constituent metal to recover at the recovering chamber 406. The temperature, pressure in the second gas tight room 402 also can be adjusted with the control means as identical as those of the first gas tight room 401.

Before the first gas tight room 401 or after the second gas tight room 402, a purge room can be disposed.

(Embodiment 4)

Figure 5:
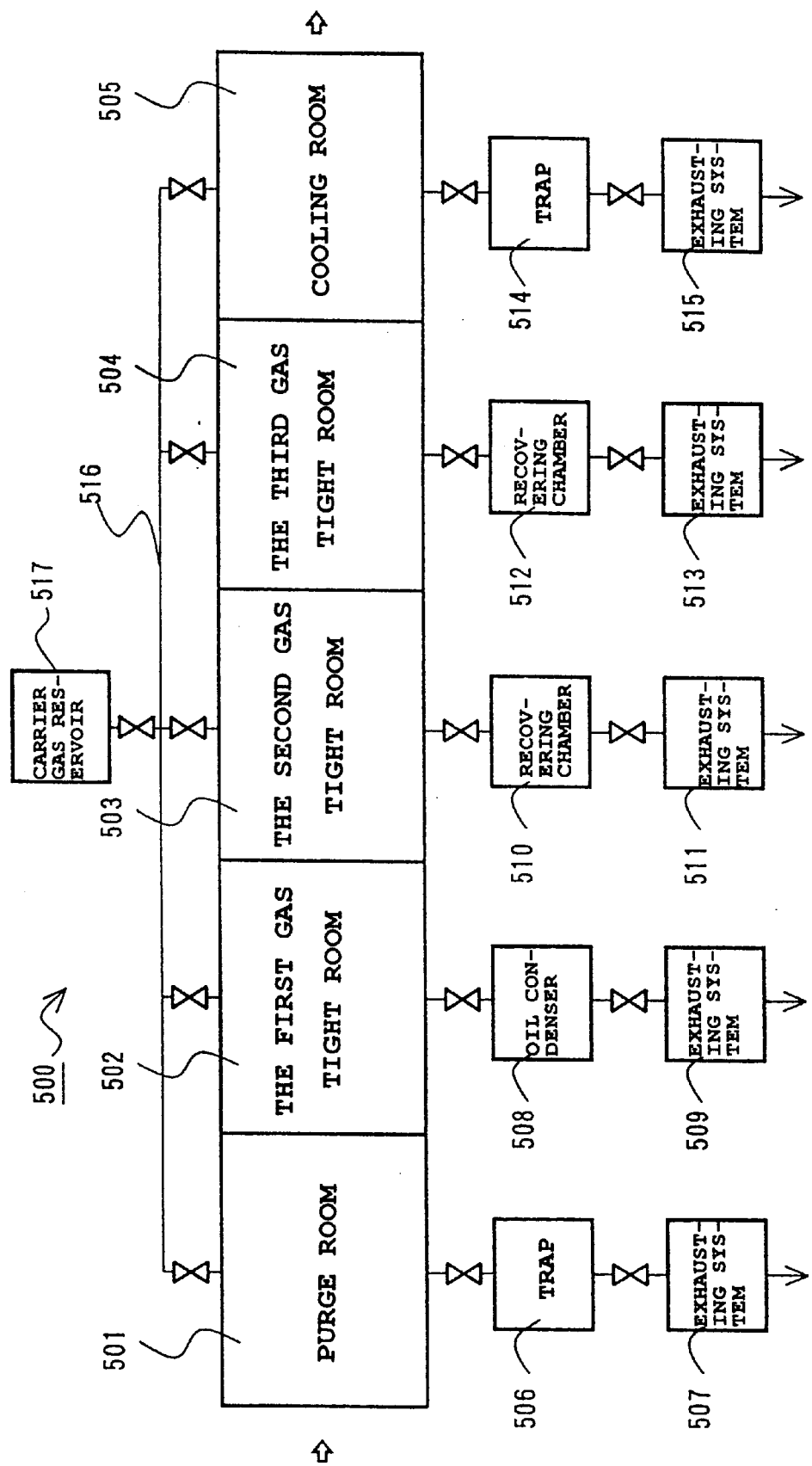
FIG. 5 is a diagram schematically showing another example of the processing apparatus of the present invention.

FIG. 5 is a diagram schematically showing another example of the processing apparatus of the present invention.

The processing apparatus 500 is a processing apparatus processing an object having a resin and a metal as its constituent members and provided with a purge room 501, a first gas tight room 502, a second gas tight room 503, a third gas tight room 504, a cooling room 505.

A purge room 501 is connected to a trap 506 and an exhaust system 507. A first gas tight room 502 is connected to an oil condenser 508 and an exhaust system 509. A second gas tight room 503 is connected to a recovering chamber 510 and an exhaust system 511. A third gas tight room 504 is connected to a recovering chamber 512 and an exhaust system 513. A cooling room 505 is connected to a trap 514 and an exhaust system 515. The first gas tight room 502, the second gas tight room 503, the third gas tight room 504 are provided with not shown temperature adjusting means. Numeral 516 is a carrier gas introducing system and numeral 517 is a carrier gas reservoir.

In addition, the first gas tight room 502 is provided with a not shown oxygen concentration sensor, the oxygen concentration in the system can be adjusted independently of the total pressure.

That is, the processing apparatus 500 is provided with a plurality of processing rooms vaporizing the constituent metals of the object. Even when the object contains a plurality of constituent metals, they are selectively vaporized in the second gas tight room 503 and the third gas tight room 504 respectively to recover.

(Embodiment 5)

Figure 6:
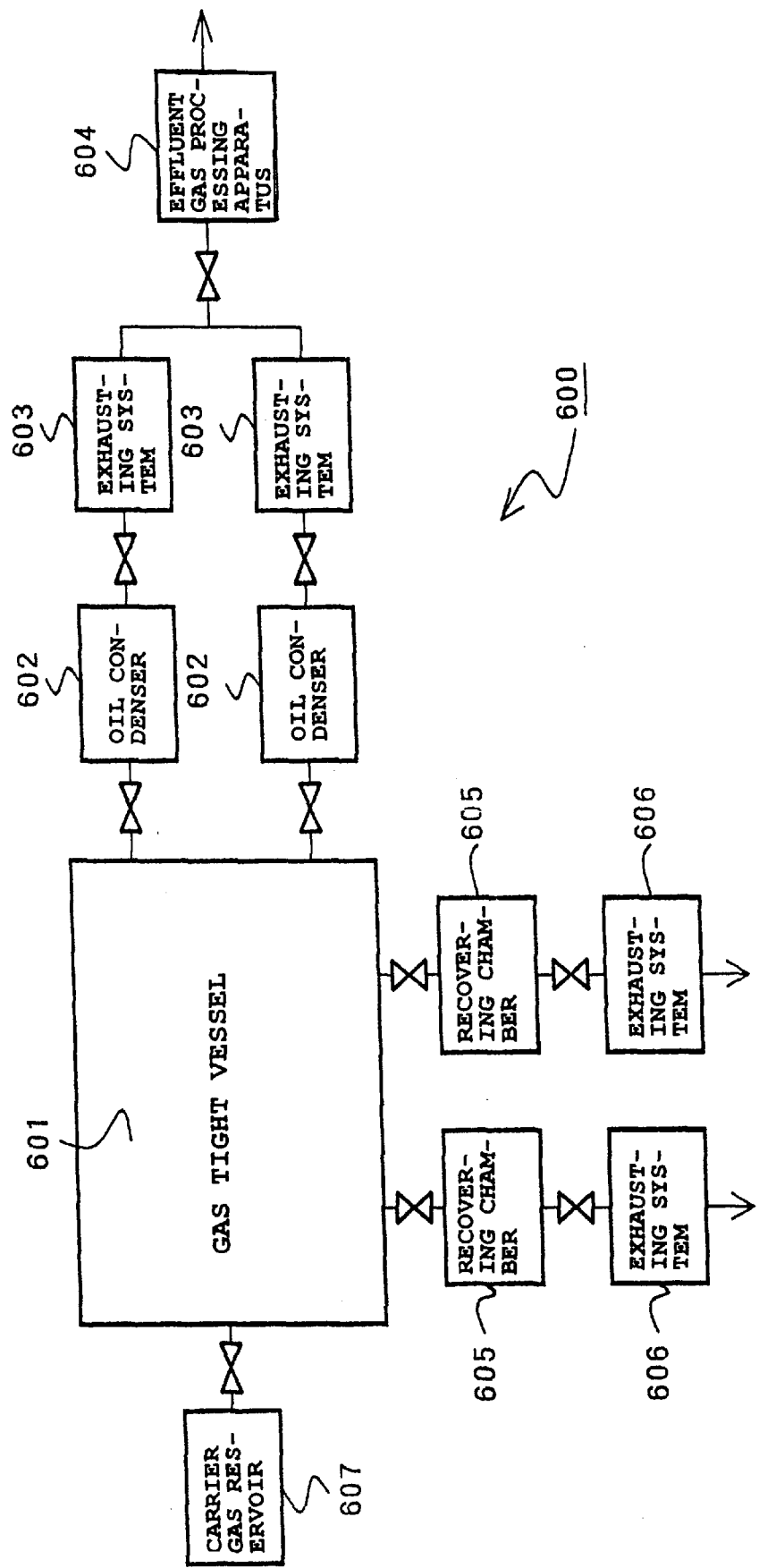
FIG. 6 is a diagram schematically showing another example of the processing apparatus of the present invention.

FIG. 6 is a diagram schematically showing another example of the processing apparatus of the present invention.

The processing apparatus 600 is a processing apparatus processing an object having a resin and a metal as its constituent members. The processing apparatus 600 is constructed by connecting a plurality of recovering systems to a gas tight vessel 601, and, according to the temperature, pressure, oxygen concentration in the gas tight vessel 601, the recovering systems can be switched to process.

(Embodiment 6)

Figure 7:
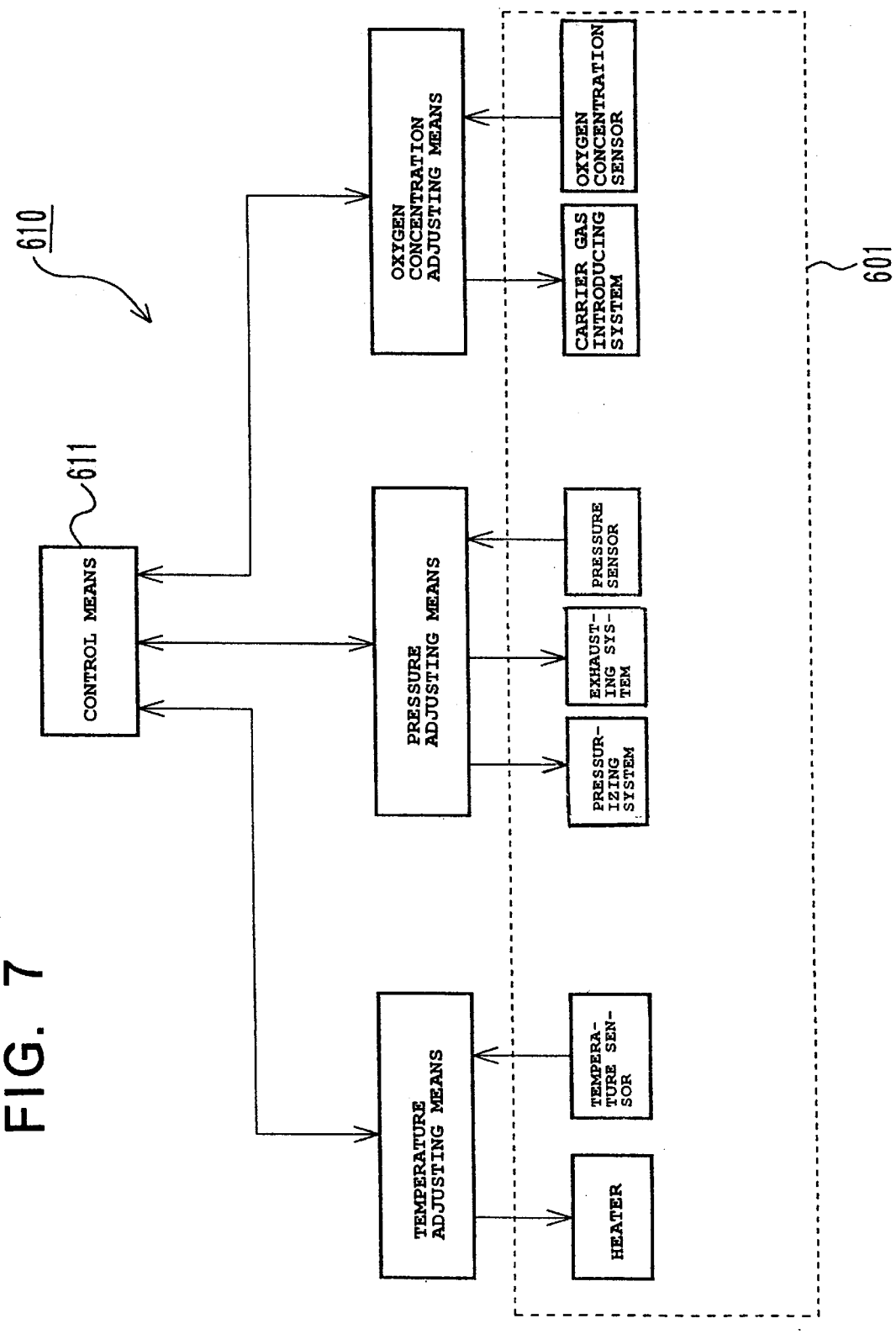
FIG. 7 is a diagram schematically showing a structure of a controlling system controlling temperature, pressure, oxygen concentration of the processing apparatus of the present invention.

FIG. 7 is a diagram schematically showing a structure of a control system 610 adjusting temperature, pressure, and oxygen concentration in the gas tight vessel 601. As previously mentioned, all or a part of the control system 611 can be mounted on an electronic calculator as, for instance, a program to control the apparatus.

To the gas tight vessel 601, a plurality of systems of device for oil condenser 602 recovering thermal-decomposition product gas of the constituent resin of the object are connected, the respective oil condensers 602 being connected to the exhaust system 603. In general, the decomposition product gas of the resin is discharged in a huge quantity, by thus providing the plurality of oil condensers, the state in the gas tight vessel can be easily controlled, and load upon the exhaust system can be alleviated.

At the posterior stage of the exhaust system 603, an effluent gas processing apparatus 604, which renders the effluent gas non-hazardous, odorless, smokeless is provided.

To the gas tight vessel 601, a plurality of systems of recovering chambers recovering the constituent metals of the object vaporized in the gas tight vessel 601 are connected, the respective recovering chamber being connected to the exhaust system 606.

The plurality of systems of recovering chambers 605 connected to the gas tight vessel 601 can recover the same metal. Further, by switching according to the temperature, pressure condition in the gas tight vessel 601, a plurality of metals different in their vapor pressures (boiling points) can be recovered separately.

Further, to the gas tight vessel 601, a carrier gas introducing system is connected. Numeral 607 is a carrier gas reservoir. By introducing a carrier gas such as $N_2$, Ar, the oxygen concentration in the gas tight vessel 601 can be adjusted independently of the total pressure. In addition, by introducing a carrier gas pressurized in advance, the inside of the gas tight vessel 601 can be pressurized. By pressurizing the object in a non-oxidizing atmosphere, the constituent resin can be efficiently decomposed.

Further, the oxygen concentration in the gas tight vessel 601 can be adjusted through the total pressure.

(Embodiment 7)

Figure 8:
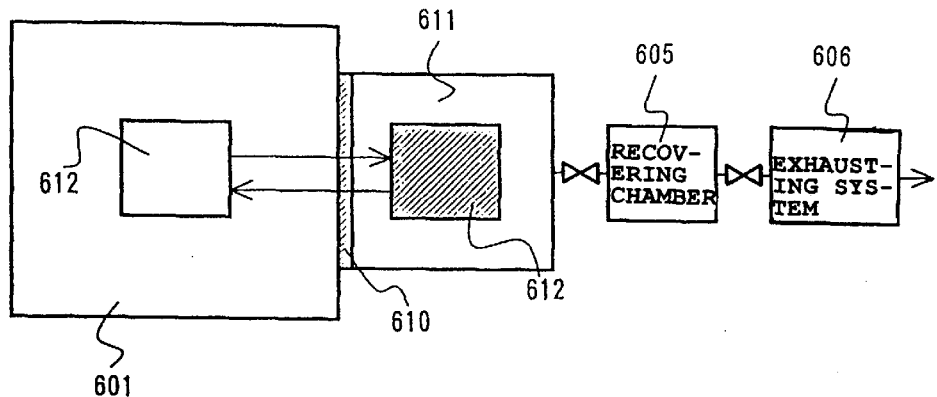
FIG. 8 is a diagram schematically showing another example of the processing apparatus of the present invention.

FIG. 8 is a diagram schematically showing another example of the recovering system of the processing apparatus of the present invention.

Though this processing apparatus has a constitution identical with that of the processing apparatus illustrated in FIG. 6, portions other than the recovering system is omitted from illustration.

A recovering room 611 separated by a partition 610 capable of being opened or closed from a gas tight vessel 601 is provided. The recovering room 611 is provided with a not shown temperature adjusting means. To the recovering room 611, a carrier gas introducing system can be connected.

In addition, to this recovering room 611, a recovering chamber 605, an exhaust system 606 is connected.

When an inside of the gas tight vessel 601 reached the temperature, pressure condition allowing vaporization of the predetermined metal, the partition 610 is opened to introduce the object 612 into the recovering room 611, then the partition 610 is closed.

In addition, while maintaining the temperature, the pressure condition, the metal vaporized at the recovering room 605 can be condensed to recover.

When such a recovering room 611 is provided, even during recovering of the metal from the object in the recovering room 611, such conditions as the temperature, pressure, oxygen concentration in the gas tight vessel 601 can be adjusted independently of the recovering room 611. Thus, the operating efficiency of the apparatus can be enhanced.

Such a recovering room can be disposed to such processing apparatuses as those illustrated in FIG. 1, FIG. 3, FIG. 4, and FIG. 5.

(Embodiment 8)

Figure 9:
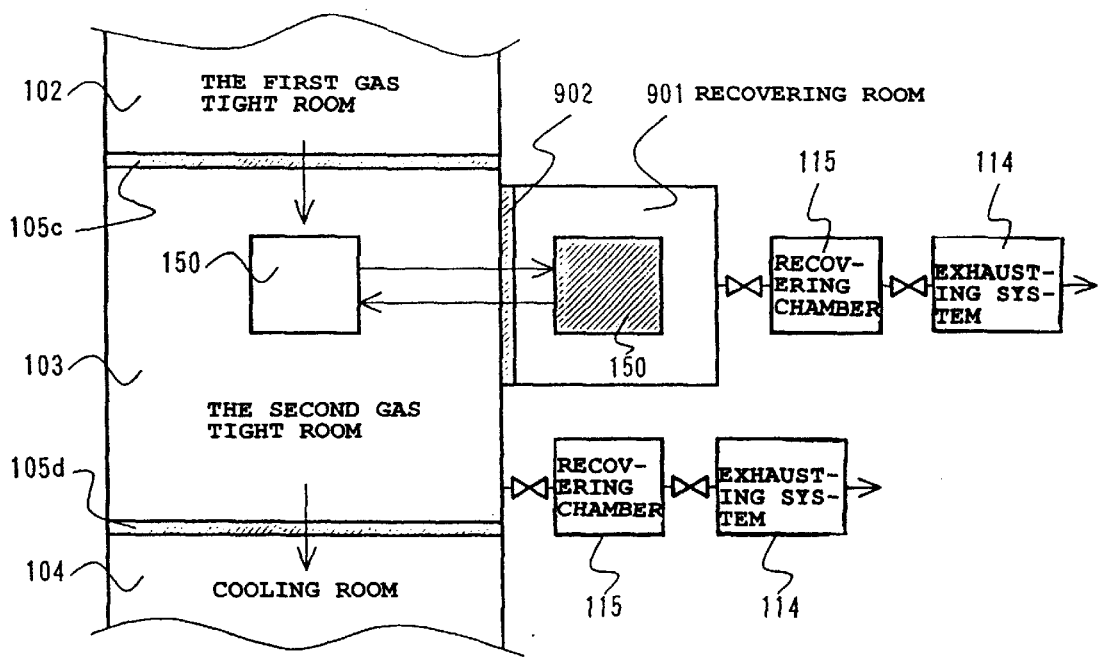
FIG. 9 is a diagram schematically showing a recovering system including a recovering room and connected to the processing apparatus of the present invention.

FIG. 9 is a diagram schematically showing a recovering system including a recovering room 901 connected to the processing apparatus 100 illustrated in, for example, FIG. 1.

To a second gas tight room 103 of the processing apparatus 100, a recovering room 901 is connected, the second gas tight room 103 being separated from the recovering room 901 by a partition 902 capable of being opened or closed. The recovering room 901 is provided with a not shown temperature adjusting means. Further, a carrier gas introducing system can be connected. A recovering chamber 115 and an exhaust system 114 are connected to the recovering room 901. In addition, a recovering chamber 115, an exhaust system 114 can be connected in parallel with the recovering room 901.

Figure 10:
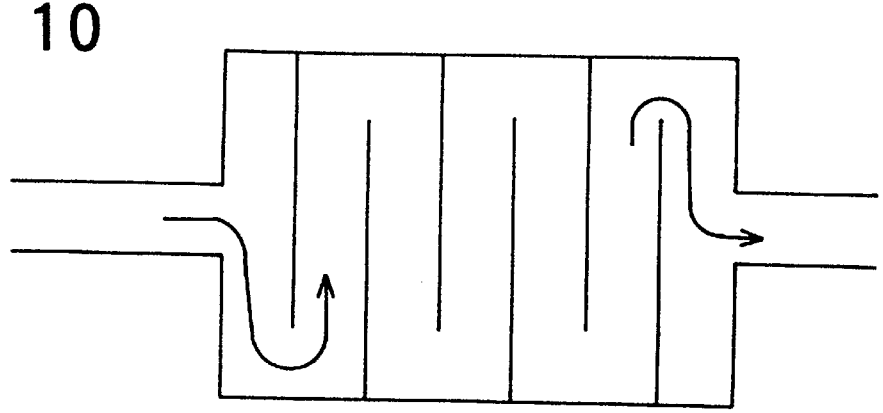
FIG. 10 is a diagram roughly showing one example of a structure of a recovering chamber.
Figure 11:
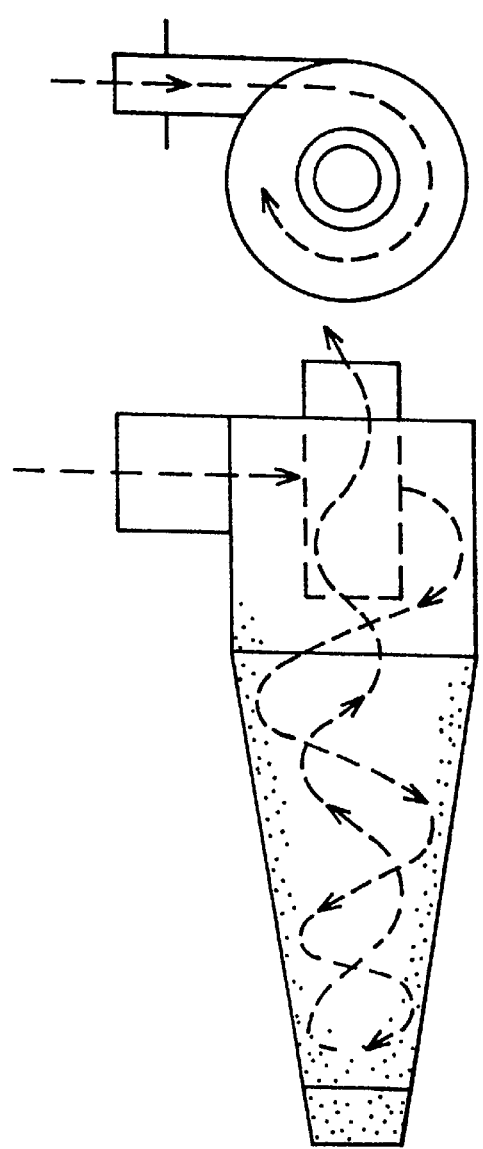
FIG. 11 is a diagram roughly showing one example of a structure of a recovering chamber.

FIG. 10 and FIG. 11 are diagrams roughly showing one example of a structure of the recovering chambers, respectively.

FIG. 10 shows a recovering chamber of a counterflow structure, and FIG. 11 shows a recovering chamber of a cyclone type. The recovering chamber needs only be able to condense the metal vaporized from the object. Further, such recovering chambers can be connected in multiple stages.

Figure 12:
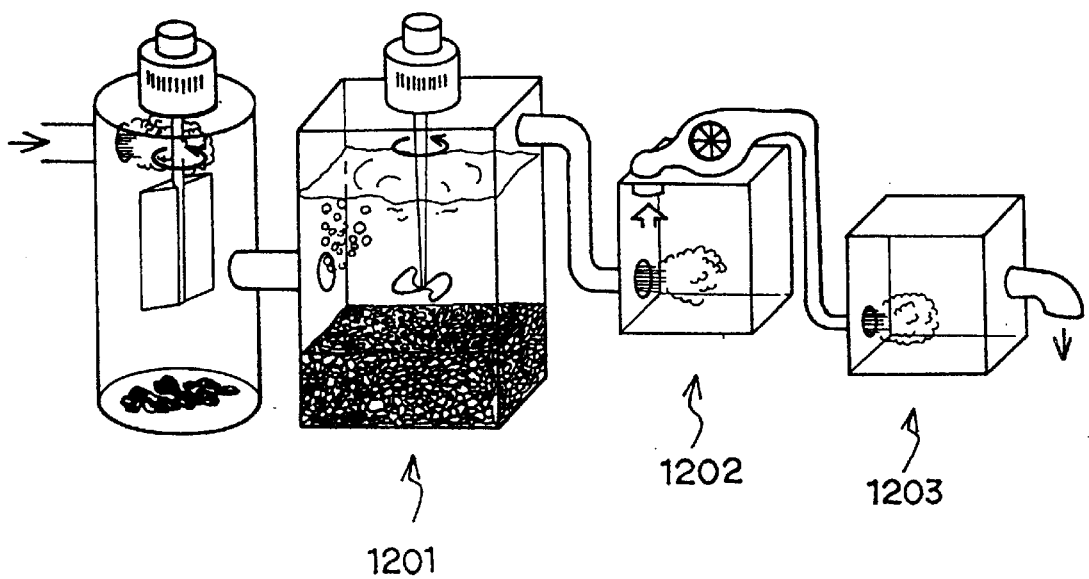
FIG. 12 is a diagram roughly showing one example of a structure of an effluent gas processing apparatus.

FIG. 12 is a diagram roughly showing one example of a structure of an effluent gas processing apparatus which processes the effluent gas discharged from the object and not recovered by an oil condenser as a device for converting to oil or a recovering chamber. After the recovering system such as the oil condenser for converting to oil or the recovering chamber, a multiple effluent gas processing filter 1201, a smoke trapping filter 1202, an odor trapping filter 1203 are connected. Other than these, an alkali trap recovering, for instance, halogen gas, or a halogenated hydrocarbon decomposition apparatus using a catalyst can be provided.

Thus, the processing apparatus of the present invention processes the object having a resin and a metal as constituent members in such a manner that the constituent resin is selectively pyrolyzed (vaporization, conversion to oil, carbonization) and the constituent metal is vaporized from the object to separate and recover.

(Embodiment 9)

Next, a processing system eliminating lead from an object having lead as a constituent member will be described.

The processing system is to process an object, at least a part of the constituent member of which are lead and resin. For instance, lead can be removed from an electronic component of an electronic instrument or an automobile in which an alloy containing lead such as a Pb—Sn based solder alloy is used.

The processing system, at first, pyrolyzes selectively the resin portion through such as vaporization, conversion to oil, carbonization, then, the lead is vaporized to be separated from the object. The vaporized lead can be recovered. For the apparatus, the above described processing apparatus of the present invention can be employed.

At first, the constituent resin is pyrolyzed selectively not so as to substantially oxidize the lead of the object.

The resin starts melting and the like around 323K, when maintained at around 453 to 873K, due to pyrolysis, discharges a hydrocarbon-based gas mainly consisting of C1 to C8. Such a decomposition product gas of the resin can be recovered with the oil condenser and the like.

The selective pyrolysis step of the resin is preferred to be implemented under adjustment of an oxygen concentration. By adjusting the oxygen concentration, the recovering efficiency of the decomposition product gas of the resin can be enhanced. In addition, oxidation of lead can be prevented from occurring. Since lead oxide is vaporized at a temperature lower than that of lead, scattering of lead can be prevented from occurring by adjusting the oxygen concentration, thus, lead can be more positively recovered at a later step.

Then, through adjustment of the temperature and the pressure, lead is vaporized from the object. When the object contains, for instance, iron, copper, aluminum, tin and the like other than lead, through the difference of the vapor pressures, the respective metals can be selectively vaporized.

The temperature at which lead vaporizes varies depending on the pressure in the gas tight vessel. Under the atmospheric pressure, the vapor pressure of lead at 1673K is 84 mmHg, but these of iron, copper, tin do not reach even to 1 mmHg. Therefore, by heating the object at around 1673K, almost lead vapor only can be selectively generated from the object.

Further, when heated at, for example, 2013K under the atmospheric pressure, the vapor pressure of lead is 760 mmHg, whereas that of tin is 15 mmHg, that of copper is only less than 3 mmHg. Therefore, heating of the object at around 1673K can discharge selectively almost lead vapor only from the object.

Further, by heating the object under decompressed condition, lead can be vaporized from the object at further lower temperature.

When the pressure is adjusted to $10^{-1}$ Torr, by heating to around 1100K, almost lead vapor only can be selectively generated from the object.

Further, when the pressure is adjusted to $10^{-3}$ Torr, by heating to around 900K, almost lead vapor only can be generated from the object.

Further, when the pressure is adjusted to $10^{-4}$ Torr, by heating to around 700K, almost lead vapor only can be generated from the object.

The lead vapor selectively discharged in this manner can be recovered as lead metal with a recovering apparatus cooled to, for example, a temperature below the melting point of lead.

Figure 13:
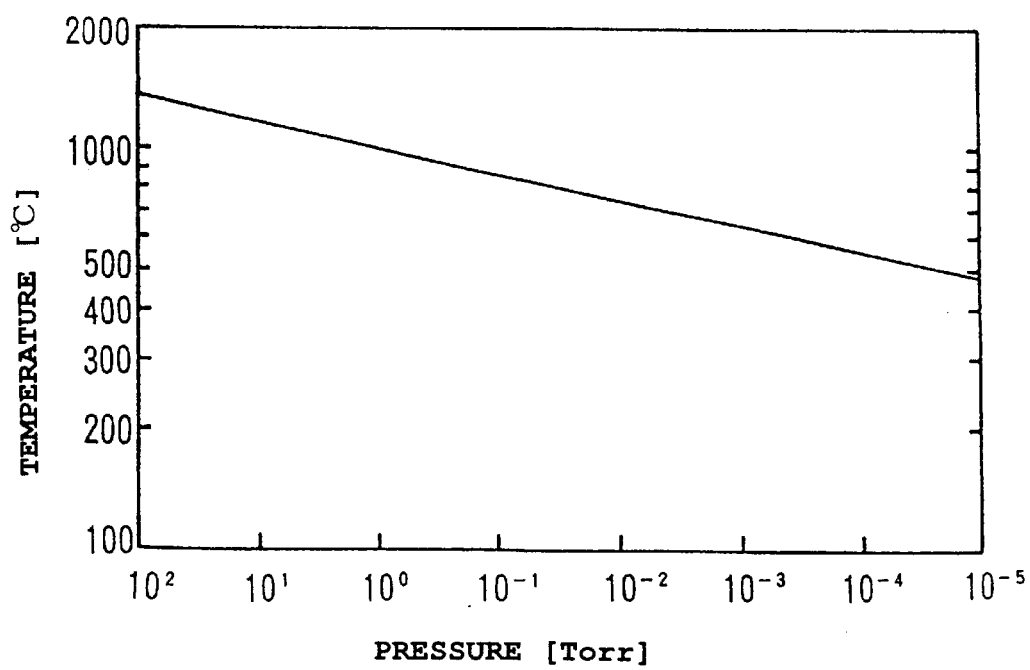
FIG. 13 is a diagram showing a temperature dependence of boiling point(vapor pressure)of lead.

FIG. 13 is a diagram showing relation between vapor pressure of lead and temperature. It is obvious that the boiling point of lead can be lowered by decompressing the inside of the gas tight vessel.

Based on this diagram, the heating temperature can be adjusted according to, for instance, the pressure in the gas tight vessel. Further, by mounting, for example, this relation as a program on an electronic calculator, it can be used as the controlling means of the processing apparatus of the above described present invention.

(Embodiment 10)

Here, a mounted substrate in which various kinds of electronic components are mounted on a substrate with a solder alloy containing lead is taken up as an example of the object having lead and a resin as constituent members, and processing of this object will be described.

Figure 14:
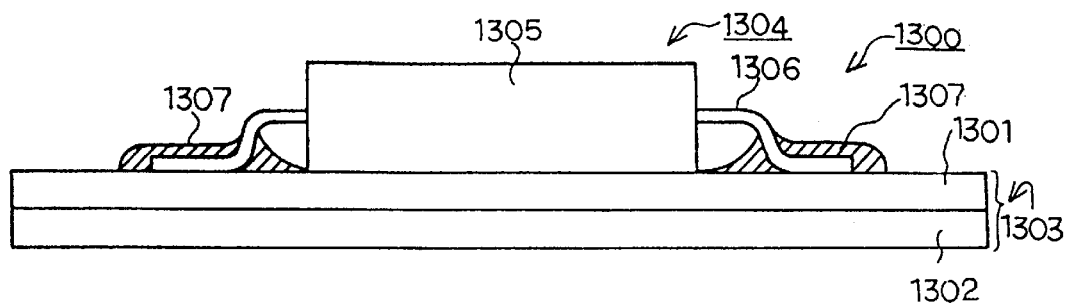
FIG. 14 is a diagram schematically showing a state preceding processing of a mounted substrate, an object being processed.

FIG. 14 is a diagram schematically showing such a mounted substrate 1300.

On a printed circuit board 1303 formed by stacking a copper foil 1301 and a resin 1302, an electronic component 1304 is mounted. This electronic component 1304 is packaged by a resin 1305. In addition, a connecting terminal 1306 of the electronic component consisting of a copper alloy and a copper foil are connected with a Pb—Sn based solder alloy 1307. If the surface of the connecting terminal 1306 of the electronic component is plated with a solder alloy, it can be processed in the identical manner.

At first, the mounted substrate 1300 is heated while adjusting the oxygen concentration in the gas tight chamber to selectively pyrolyze resin 1302, 1303. Since the constituent resin of a printed circuit board is usually a thermosetting resin, much of them are carbonized, but they discharge a huge volume of decomposition product gas. The situation of the packaging resin 1303 of an electronic component is identical with this.

Figure 15:
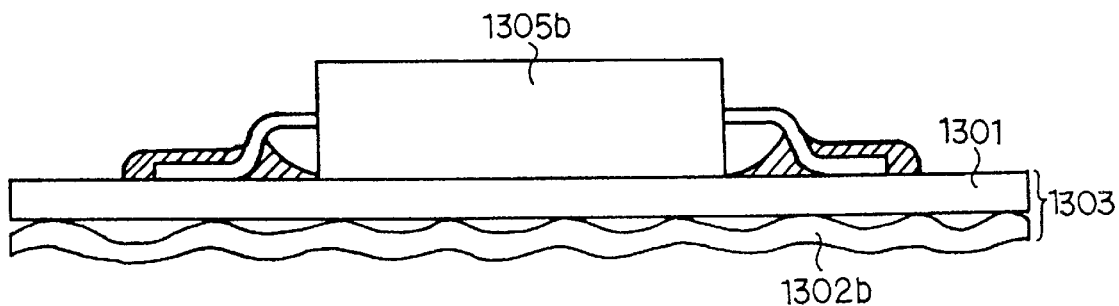
FIG. 15 is a diagram schematically showing a state of a mounted substrate of which constituent resin is pyrolyzed.

FIG. 15 is a diagram schematically showing a mounted substrate 1300 the constituent resin of which is selectively pyrolyzed.

In this state, much of the constituent resin of the mounted substrate is carbonized. Further, scattering of lead can be prevented from occurring by adjusting the oxygen concentration.

Then, through adjustment of the temperature and the pressure in the gas tight chamber, lead in the object is selectively vaporized. The temperature and the pressure can be determined based on FIG. 13. The inside of the gas tight chamber is preferred to be decompressed. This is because, since lead can be vaporized at a lower temperature, the input energy can be saved, and, since the oxygen concentration becomes lower, the constituent metals of the object such as lead and others can be substantially prevented from being oxidized. When the constituent metals of the object are likely to be oxidized, the oxygen concentration in the gas tight chamber can be adjusted by introducing the carrier gas such as $N_2$, Ar into the gas tight chamber.

Figure 16:
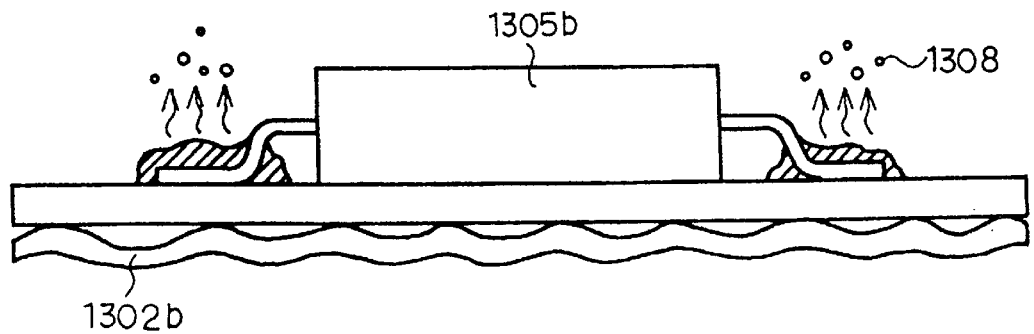
FIG. 16 is a diagram schematically showing a state when lead vaporizes.

The more decompressed is the inside of the gas tight chamber, at the lower temperature, lead vaporizes. FIG. 16 is a diagram schematically showing a state where lead 1308 vaporizes as lead metal.

By adjusting the temperature, the pressure in the gas tight chamber, only lead can be selectively vaporized. When the object contains metals lower in their boiling points than that of lead, such metals can be vaporized in advance.

Thus, lead can be removed from the mounted substrate 1300, the object being processed. Further, by processing thus the mounted substrate such as the waste electronic instruments stocked in huge quantity in society, they can be processed as the general wastes, thus, contamination of the environment due to leaching out of lead can be prevented from occurring. Further, the constituent metals other than lead can be easily separated and can be utilized as resource. The constituent resin also can be recovered as valuable oil or carbide. The carbide can be used as a fertilizer or an activated charcoal.

Here, up to a step eliminating lead from the mounted substrate 1300 has been explained, but, by further adjustment of the temperature, the pressure in the gas tight chamber, the constituent metals other than lead of the object can be vaporized.

For instance, by vaporizing tin constituting a solder alloy, the printed circuit board 1303 and the electronic component 1304 can be separated.

Figure 17:
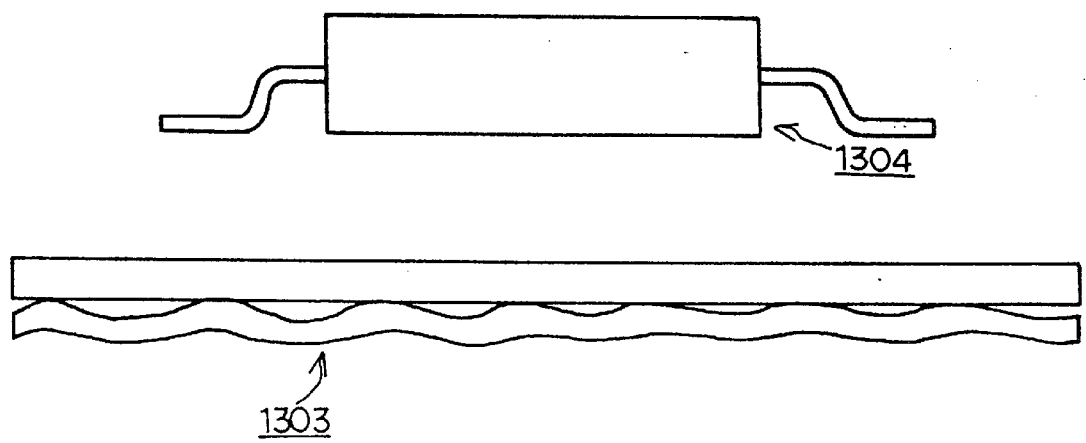
FIG. 17 is a diagram schematically showing a state where a printed circuit board and an electronic component are separated.

FIG. 17 is a diagram schematically showing a state wherein a printed circuit board 1303 of which tin is vaporized and an electronic component 1304 are separated.

Thus, by removing lead or by separating the printed circuit board 1303 and the electronic component 1304, complexity of the object can be reduced, the later processing thereof being made easy. In other words, the entropy of the object diminishes, thereby the value of the subject can be enhanced.

Further, by adjusting the temperature, the pressure in the gas tight chamber, metals such as Au, Ag, Pt, Bi, In, Ta, Ni, Cr, Cu, Al, W, Mo, Co, Pd included in the printed circuit board 1303 and the electronic component 1304 can be vaporized to recover. Such a recovery can be carried out efficiently when being implemented separately after separation of the printed circuit board 1303 and the electronic component 1304.

Figure 18:
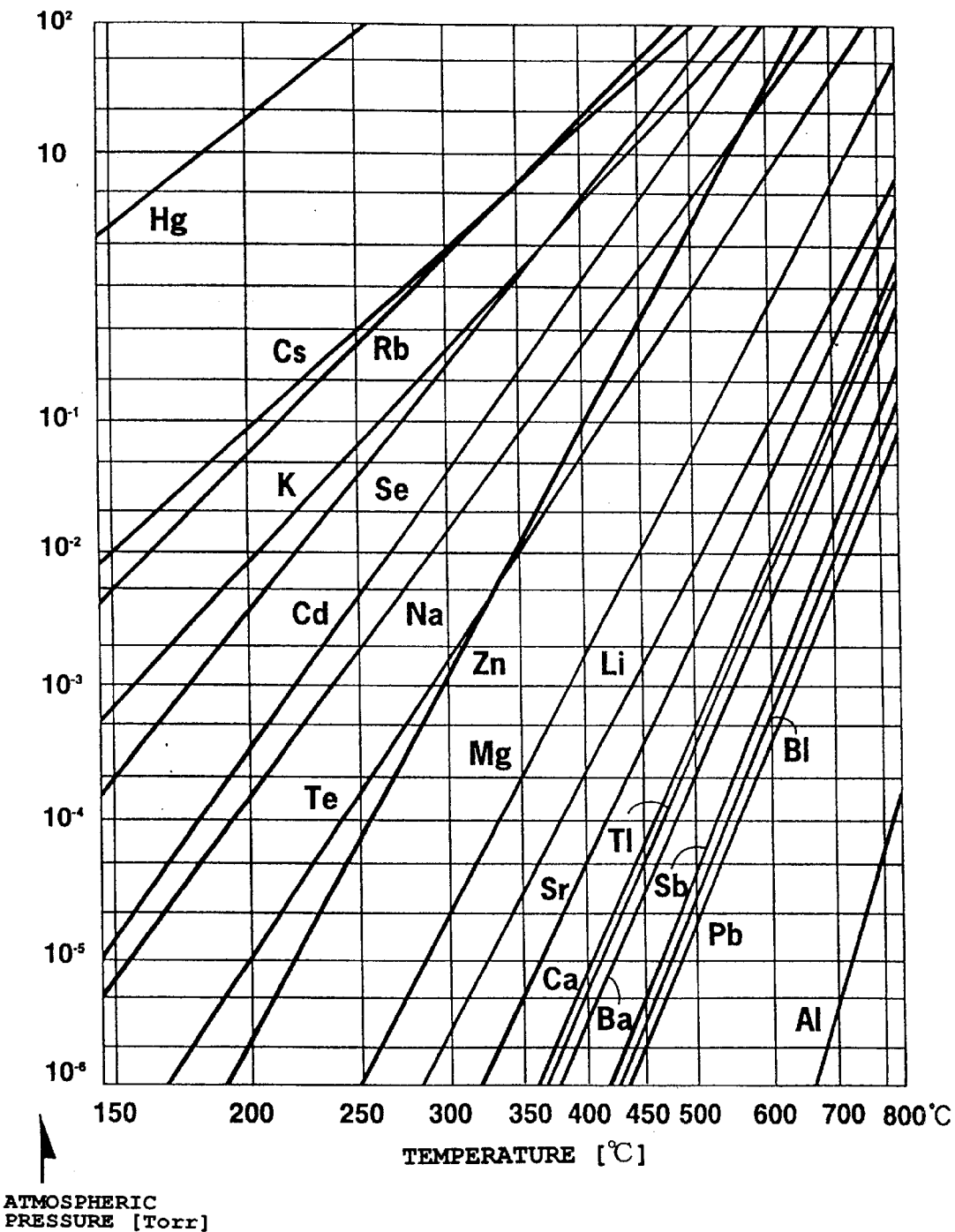
FIG. 18 is a diagram showing pressure dependence of boiling point (vapor pressure) of various kinds of metal.
Figure 29:
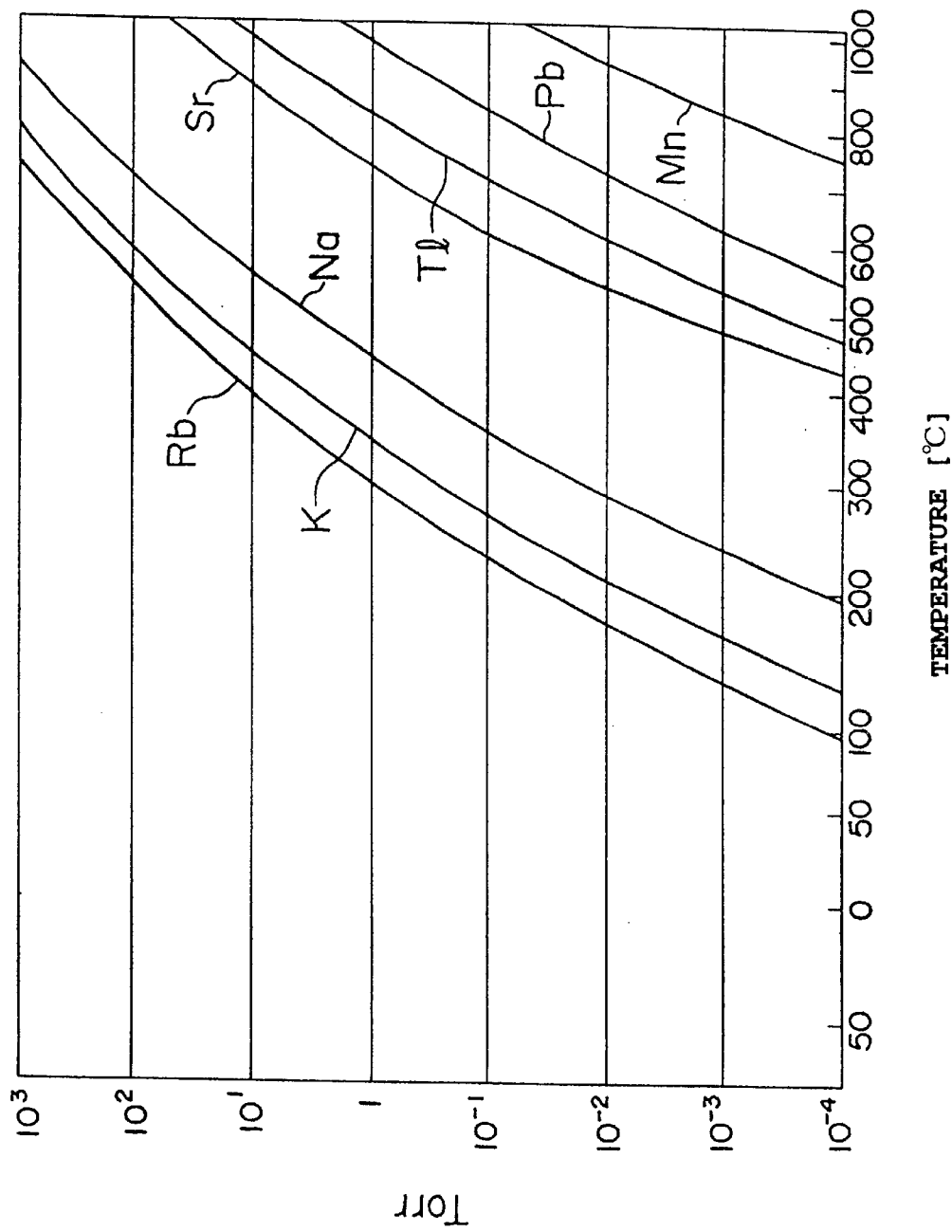
FIG. 29 and FIG. 30 are diagrams showing relationship between vapor pressures of various kinds of metal and temperature.
Figure 30:
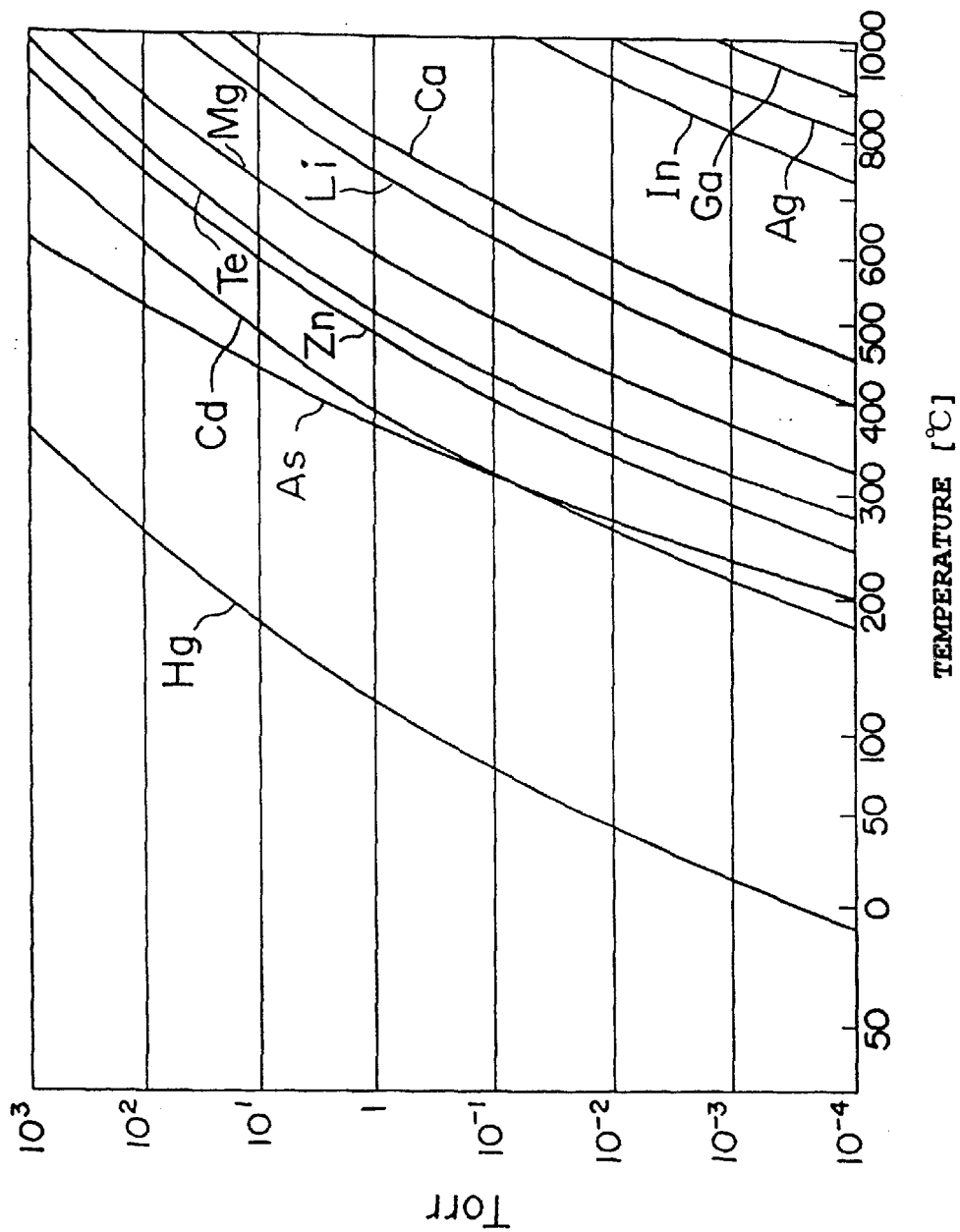

FIG. 18, FIG. 29, FIG. 30 are diagrams showing pressure dependence of boiling points (vapor pressures) of the various metals. These diagrams show one example of recoverable metals, but the metals not shown in the diagrams can be made recoverable.

Figure 19:
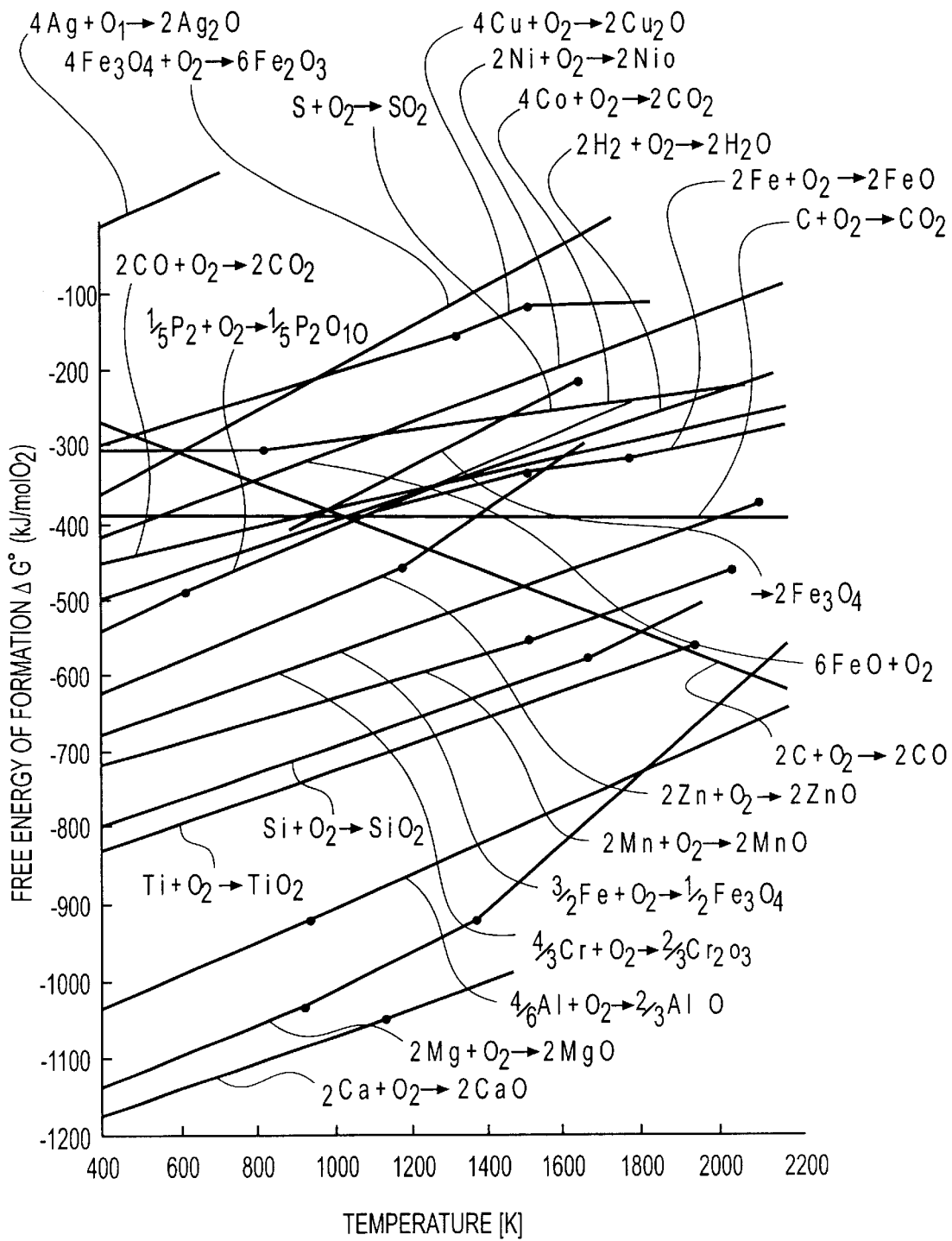
FIG. 19 is a diagram showing temperature dependence of free energies of formation of various kinds of oxide.

FIG. 19 is a diagram showing temperature dependence of formation free energies of oxides. Elements in FIG. 19 are shown as one example, data concerning elements other than these can be easily calculated or can be obtained through database. By employing the relation shown in FIG. 18, FIG. 19, FIG. 29, FIG. 30, together with the relation between the boiling point (vapor pressure) of lead and the pressure shown in FIG. 13, the temperature, the pressure, the oxygen concentration in, for instance, the gas tight chamber can be controlled.

Further, by mounting, for instance, these relations on an electronic calculator as a program, it can be used as a control means of the processing apparatus of the present invention.
(Embodiment 11)

Figure 20:
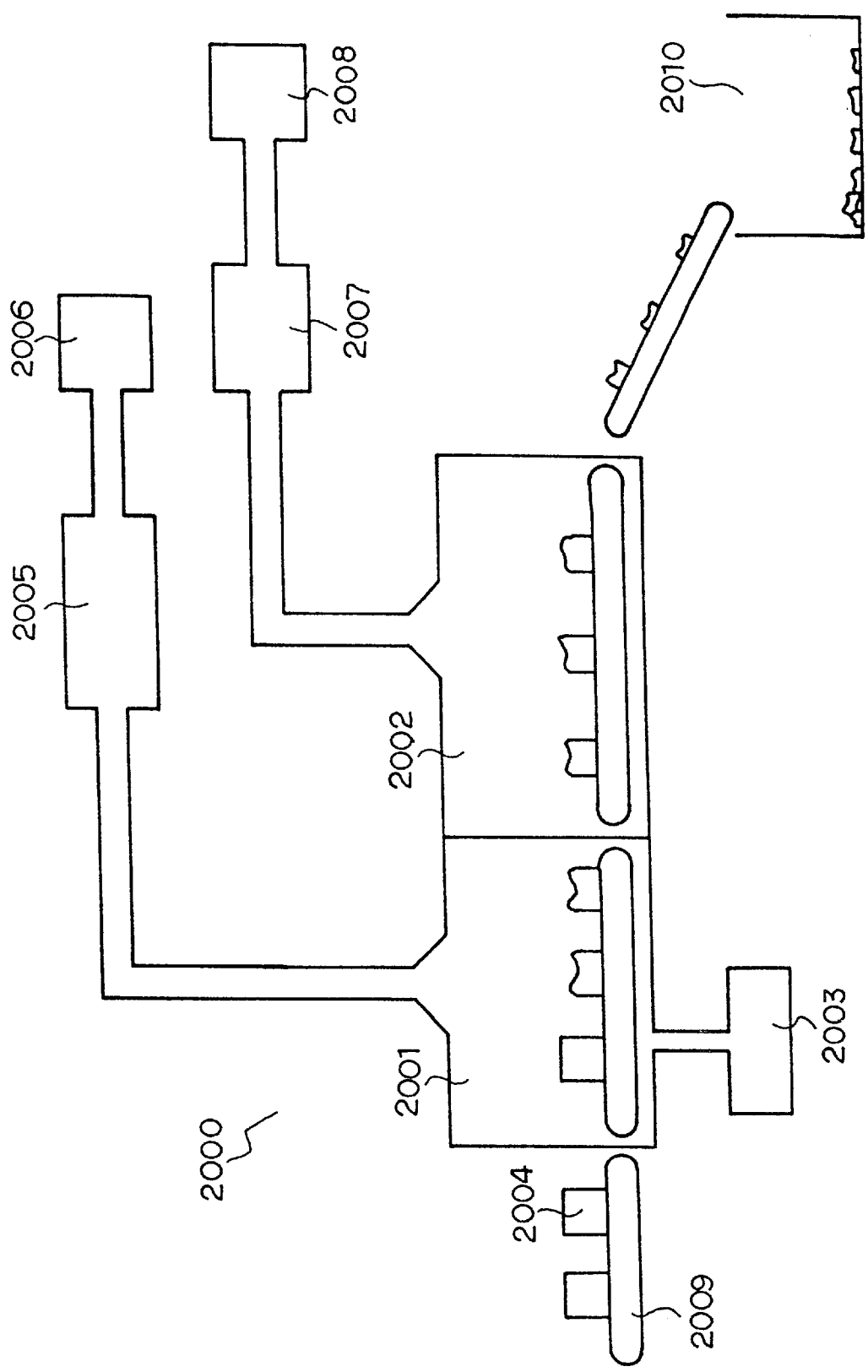
FIG. 20 is a diagram schematically showing one example of a processing apparatus of the present invention.

FIG. 20 is a diagram schematically showing one example of an apparatus removing lead from an object, which has lead and a resin as its constituent members. The apparatus is not restricted to one illustrated in FIG. 20, but the above-described apparatus of the present invention can be employed.

This processing apparatus 2000 is provided with a first gas tight room 2001 and a second gas tight room 2002. The first gas tight room 2001 is provided with an oxygen concentration control apparatus 2003 and a heating device such as a not shown burner and the like. In addition, it is constituted in such a manner that the predetermined temperature is maintained for the predetermined period by a control portion which is omitted in the figure.

Hydrocarbon based gas discharged from the constituent resin through heating of the object 2004 is cooled by a condensation/recovering apparatus 2005 to recover as oil. Reference numeral 2006 shows an exhaust gas cleaning device. In this case, a shower cleaning device using alkaline water or the like is connected, thereby halogen gas in the exhaust gas can be reduced to a level below the environmental criteria.

The second gas tight room 2002 is a vacuum heating furnace and is provided with a lead recovering chamber 2007 and an exhaust device 2008.

The object is transferred to the first gas tight room 2001, the second gas tight room 2002 successively by a transferring means 2009 such as a conveyer.

The residence time, heating temperature, pressure, oxygen concentration of the object in the first gas tight room 2001, the second gas tight room 2002 are controlled by a not shown control portion, respectively.

Here, after going through the second gas tight room 2002, the object is transferred to the residue receiving portion 2010.

In the first gas tight room 2001, the object 2004 is heated to, for instance, about 473 to 873K and maintained there. Thereby, the resin component that is a part of the constituent member of the object 2004 is pyrolyzed to be discharged as hydrocarbon gas of, for instance, C1 to C8, C8 to C16.

The exhausted decomposition product gas of the resin is condensed and recovered by a condensation apparatus 2005. The gas which is not recovered is removed by an effluent gas-cleaning device 2006 to make non-hazardous, smokeless, odorless.

Next, the object 2004 is transferred to the second gas tight room 2002, the pressure is decompressed to a pressure of, for instance, about $10^{-5}$ Torr and the temperature is elevated to about 700K, this state is maintained. Lead in the object is discharged as lead vapor from the object. At the upper portion of the second gas tight room 2002, a gas exhaust portion is disposed, wherein the lead vapor discharged from the object is condensed as lead metal due to decrease of the vapor pressure. The crystallized lead metal is precipitated in the lead recovering chamber 2005 to recover. Further, in order to transport efficiently the metal vapor from the second gas tight room 2002 to the lead recovering chamber 2005, by introducing the inert gas such as $N_2$ or Ar from the carrier gas introducing portion disposed in the second gas tight room 2002, the lead vapor is transferred to the lead recovering chamber 2005 together with the carrier gas.

At the upper portion of the first gas tight room, a gas exhaust portion is disposed, the discharged decomposition product gas of the resin is transferred to the condensation apparatus 2005.

When the cooling temperature of the condensation apparatus 2005 is cooled to 523 to 423K, mainly heavy oil is discharged, when cooled to 423 to 323K, mainly a mixture of heavy oil and light oil is discharged, and when cooled to from 323K to room temperature, mainly light oil is discharged. The recovered oil is led to a recovering tank not shown in the figure and can be reused as fuel or raw material.

The gas discharged from the condensation apparatus 2005 is led to the exhaust gas cleaning device 2006 through a gas sending out portion 15. In this example, a shower cleaning device using alkaline water is connected to reduce halogen gas in the effluent gas to a level below the environmental criteria.

(Embodiment 12)

Next, with a processing apparatus 2000 of the above structure, an example where an electronic instrument containing solder is processed, as the object will be described.

The electronic instrument, the object 2004, can be crushed in advance. In this case, the electronic component is fragmented into the size of about 10 cm square with a biaxial crusher. The roughly fragmented electronic instrument is put into the first gas tight room.

In the first gas tight room 2001, the temperature inside the furnace is maintained at about 773K, the oxygen concentration is maintained at about 5%. The electronic instrument resided there for about half an hour. The constituent resin amounting to about 40% in the constitutional ratio of the electronic instrument is selectively pyrolyzed in the first gas tight room 2001 to be discharged as hydrocarbon gas or to be carbonized.

Metals such as iron, copper, aluminum the total of which amounts to about 50% of the constitutional ratio and the mounted substrate which amounts about 10% of the constitutional ratio did not show any chemical change in the first gas tight room 2001. That is, an oxidation state or a phase equilibrium state is substantially maintained.

The electronic instrument of which the constitutional resin is selectively pyrolyzed was transferred to the second gas tight room 2002 without being cooled. The pressure and the temperature in the second gas tight room 2002 were maintained at about $10^{-3}$ Torr and about 900K, respectively, and the electronic instrument was resided there for about half an hour.

In the mounted substrate, which occupies about 10% of the electronic instrument, a solder alloy amounts to about 5 to 10% of the substrate weight. In addition, about 40% by weight of the solder alloy are composed of lead.

That is, in the electronic instrument, 0.2 to 0.4% of lead is used as a part of the constituent member. This lead is vaporized as lead vapor in the second gas tight room 2002, is transferred to the lead recovering chamber 2005 together with the carrier gas, and is recovered as lead metal.

To improve the recovering efficiency of lead, the residence time of lead vapor in the lead recovering chamber 2005 is preferred to be prolonged as long as possible. In this example, the recovered ratio of lead was 98%. The recovered lead was scarce in impurity content and was possible to be recycled as a valuable metal.

Hydrocarbon gas discharged after pyrolysis in the first gas tight room 2001 is transferred to the condensation apparatus 2005 to be cooled at the condensing portion cooled to about 300K by circulating water. In this example, 40% of the electronic instrument is constituted by resin. The oil conversion ratio depends on the component of the constituent resin but about 90% by weight are recovered as oil, and about 10% remained as the residue mainly consisting of carbide.

The recovered oil was capable of being recycled as fuel or resource. Further, the gas component underwent the condensation apparatus 2005, after cleaning by the exhaust gas-cleaning device 2006, is discharged into the atmosphere as the exhaust gas of below the environmental criteria.

Further, metals such as iron, copper, aluminum which occupy about 50% of the constitutional ratio of an electronic instrument, without being hardly oxidized in the first gas tight room 2001 or in the second gas tight room 2002, are rather reduced to be recovered as metal. Thus, recycle value is high.

In this example, the residue discharged into the residue receiver 30 is mainly composed of iron, copper, aluminum and carbide of the resin.

Figure 21:
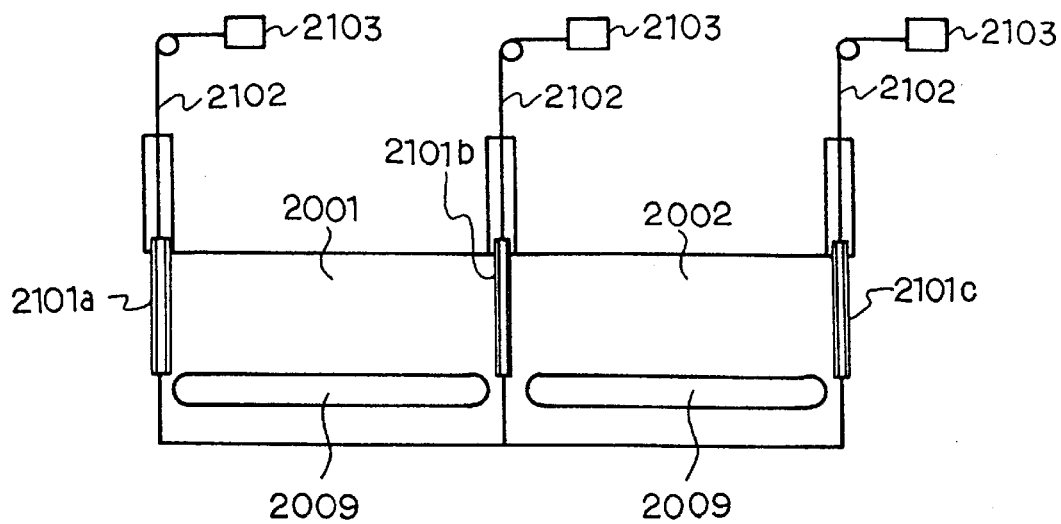
FIG. 21 is a diagram schematically showing a partition of a processing apparatus of the present invention.

FIG. 21 is a diagram schematically showing one example of a partition 2101 capable of being opened or closed which maintains gas tightness and adiathermic property of the first gas tight room 2001 and the second gas tight room 2002 of the processing apparatus 2000 illustrated in, for instance, FIG. 20. A partition 2101 is operated with a wire 2102 and a hoist 2103.

At the position of their respective partition 2101, a vacuum door and an adiathermic door can be provided separately. For instance, a partition 2101b can be a vacuum door and, on both of the side of the first gas tight room 2001 and the side of the second gas tight room 2002 of this door, adiathermic doors, identically capable of being opened or closed, can be disposed.

Next, an example will be picked up and described wherein, as an object being processed, a wastes containing resin and metal which are used in huge quantity in various kinds of electronic instrument, automobile, precision instrument, stationary, package of medicine/food is processed. The processing apparatus of the above described present invention can be employed.

(Embodiment 13)

Since such wastes including a resin and a metal is difficult to separate/recover, normally, they are processed through incineration, landfill processing. In the processing system of the present invention, in one apparatus, the constituent resin of the wastes is selectively pyrolyzed (vaporization, conversion to oil, carbonization) and the constituent metal is vaporized to recover in its metal state. In particular, though the wastes including the resin has presented a practical problem under decompressed heating that the temperature elevation during heating is slow, however, the present invention can circumvent this problem through adjustment of the oxygen concentration.

In the processing system of the present invention, firstly, wastes containing a resin and a metal is put into the gas tight chamber. Then, by adjusting the oxygen concentration to recover the resin, the pressure is raised to a pressure of several atmospheric pressure and the temperature is elevated. Next, decompression and heating are carried out to vaporize and recover the metal.

Figure 22:
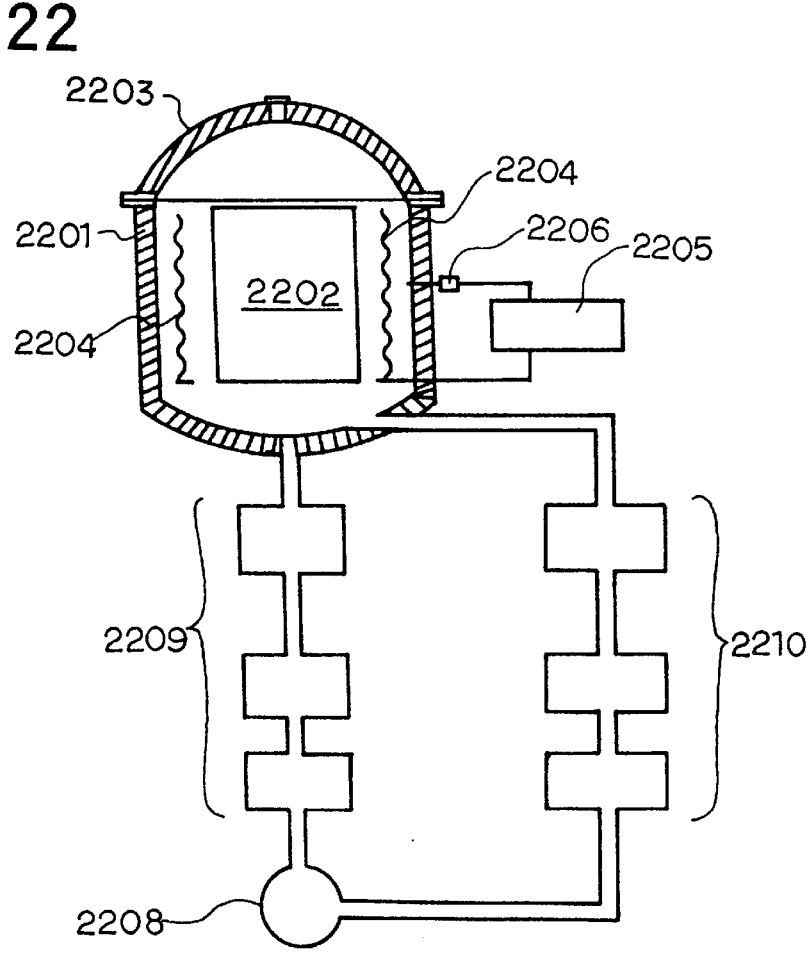
FIG. 22 is a diagram schematically showing one example of a processing apparatus of the present invention.

FIG. 22 is a diagram schematically showing one example of the processing apparatus of the present invention capable of being used in the processing system.

In the gas tight chamber 2201, there is disposed a shelf for inputting 2202 which accommodates the wastes including the resin and the metal and is consisting of metal and the like high in temperature elevating efficiency and heat resistance. Numeral 2203 shows a door that opens or closes the gas tight chamber 2201. In the gas tight chamber, a heating device 2204 such as a seed heater is disposed and is operated, together with the pressure, the oxygen concentration in the gas tight chamber, through a control panel 2205. Numeral 2206 shows a sensor and, thereby, the temperature, pressure, oxygen concentration in the gas tight chamber 2201 are transmitted to the control panel 2205 as signals.

The gas tight chamber 2201 is connected to an exhausting apparatus 2208. Between the gas tight chamber 2201 and the exhausting apparatus 2208, a resin recovering system 2209 which is a recovering apparatus of the decomposition product gas of the constituent resin of the wastes, and a metal recovering system 2210 which is a recovering apparatus of the constituent metal of the wastes are disposed. For the resin recovering system 2209, a condensation apparatus, for instance, can be provided. For the metal recovering apparatus, a cyclone classifier, for instance, can be provided.

The wastes is put in the shelf for inputting 2202 disposed inside the gas tight chamber 2201, the door 2203 is closed to seal, heating (400° C.) and pressurization (3 atm) are started while the recovering system being closed at first.

In this case, the temperature is elevated more efficiently than when being heated under the decompressing condition, and that contributes to the temperature elevation efficiency when the temperature is elevated under the decompressing condition during later metal recovering.

The gases generated through pyrolysis of the constituent resins of the wastes are recovered by a plurality of recovering apparatuses according to the kinds of gas. When the wastes contains polyvinyl chloride based resin, the wastes can be first heated under the atmospheric pressure to discharge chlorine gas, thereafter, the chlorine gas can be recovered as ferrous chloride through contact with iron heated at high temperature or can be recovered as ammonium chloride through addition of ammonia. In this case, since the chamber, the piping are prone to be severely corroded due to chlorine gas, it is preferable for the apparatus to employ Hastelloy or a titanium alloy instead of stainless steel according to demands. Incidentally, the exhaust gas such as not-recovered gas can be made nonhazardous through high temperature combustion.

A part of the resin being carbonized and can be recycled as fertilizer, or fuel. The carbon heated under a vacuum condition is excellent as fertilizer, fuel, or deodorant.

Then, the resin recovering system 2209 is closed and a circuit of a pipe of each metal recovering system 2210 is opened. The inside of the gas tight chamber 2201 is decompressed to a pressure of around $10^{-3}$ Torr with an exhausting apparatus, is heated above the boiling point of the alloy according to the kinds of the metal, thereby the metal is vaporized to be recovered by a condensation means disposed in the midway of the metal recovering system 2210. In this case, since the vaporization temperature of the metal becomes lower than the case of under the atmospheric pressure, relatively low temperature can be employed, in addition, the recovering efficiency becomes high due to difficulty of being oxidized.

Thus, according to the processing system of the present invention, the thermal efficiency is excellent and processing cost is low. Further, through heating/pressurizing, oil relatively low in its molecular weight can be recovered with high efficiency and the recovering efficiency of the highly pure metal can be high due to heating under a vacuum.

(Embodiment 14)

Next, the wastes of mounted substrates in which various kinds of electronic components are mounted on a printed circuit board and which are used in a huge volume in various kinds of electronic instruments, automobiles, precision instruments and the like, will be taken up as an object being processed to describe the processing system of the present invention. Concerning the apparatus, the processing apparatus of the present invention can be used.

This processing system separates/recovers efficiently electronic components from a mounted substrate on which various kinds of electronic components such as an IC, an LSI, a resistor, a condenser are mounted. In addition, the system separates/recovers a constituent resins a constituent metal of the mounted substrate consisting of a circuit board, an electronic component to make resource.

In such wastes of a mounted substrate, separation of an electronic component from a circuit board was difficult, and, since a mounted substrate was an object in which different materials were integrated in a complex manner, its processing had been difficult. Therefore, processing such as landfill, incineration has been generally employed.

In this processing system, the wastes of a mounted substrate are introduced into the gas tight chamber. Then, to attain a high temperature elevation efficiency, under the atmospheric pressure or pressurization, the temperature is elevated to a temperature where the resin is not so much oxidized, thereafter the pressure is decreased. This is because, under decompression, the thermal conductivity in the gas tight chamber becomes small.

Then, as identical as the previous case, the resin is selectively pyrolyzed (vaporization, conversion to oil, carbonization) to recover the decomposition product gas.

When the constituent resin of a mounted substrate is to be processed, to attain high temperature elevation efficiency, after heating up to a temperature (200° C.) where the resin is not so much oxidized, while adjusting the pressure, oxygen concentration with an exhaust system, the mounted substrate which is an object is heated. In this case, the constituent resin is selectively pyrolyzed at a temperature according to the degree of vacuum. Since, the higher the degree of vacuum becomes, the lower the pyrolysis temperature becomes, the sealed decompression chamber is not likely to be damaged.

Packaging resin of an electronic component is also pyrolyzed and becomes very brittle, resulting in an easy separation from an element in the package.

The gases generated through pyrolysis of the resin are recovered with a plurality of recovering apparatuses according to kinds of generated gas. For instance, hydrogen gas is absorbed to recover by a substance that can absorb this gas, chlorine gas can be contacted with iron heated to high temperature to recover as ferrous chloride.

Here, the effluent gas and the like can be made nonhazardous by burning at a high temperature.

Further, through adjustment of the temperature, pressure, oxygen concentration in the gas tight chamber according to the metals to be recovered (vide FIG. 13, FIG. 18, FIG. 19, FIG. 29, FIG. 30), an alloy connecting a circuit board and an electronic component (Pb—Sn alloy, for example) is vaporized. The alloy is preferable from the viewpoint of recycling to be vaporized selectively according to each vapor pressure to separate.

Due to vaporization of the alloy connecting the circuit board and the electronic component, the electronic component can be separated from the circuit board.

Other than the connecting alloy which connects a circuit board and an electronic component, various kinds of metals such as Zn, Sb, Au, Pt, Ni, Cr, Cu, Al, Mo, W, Ta included in a mounted substrate can be vaporized to separate/recover. Utility value of metal is high because the metal is recovered in its metallic state without being oxidized.

When a solder alloy is vaporized, to enhance the temperature elevation efficiency, after heating up to a temperature where the solder alloy is not so much oxidized (about 200° C., for example), the inside of the gas tight chamber is decompressed with an exhausting means and is further heated (about 400° C., for example), the vaporized solder alloy can be condensed by a condensation means disposed at the midway of the recovering path.

According to this system, as illustrated in FIG. 17, the solder alloy of the mounted substrate is completely removed and the solder of the lead terminal portion of such as an IC, an LSI, a resistor, a condenser is also completely removed. Therefore, not only an electronic component can be separated from a substrate, but also later recycling of a circuit board, an electronic component can be made easy, resulting in enhancement of the value.

The constituent resin of a mounted substrate is vaporized, carbonized or made an intermediate product, thereby enabling to be used effectively.

Since the constituent metals of a solder alloy vaporize according to the degree of vacuum in the gas tight chamber and, since they vaporize at a lower temperature as the degree of vacuum becomes high, a furnace wall and so on of the processing apparatus are not damaged.

When the mounted substrates are processed by landfill processing, there is a possibility that hazardous metals such as Pb, Sb in solder alloys are dissolved due to acid rain and the like to result in pollution of soil, river. Further, almost all of the resin is not decomposed in nature to remain there semi-permanently, resulting in not only shortage of processing fields but also occurrence of problem relating to the environment security. According to the processing system of the present invention, these problems can be circumvented.

Further, various kinds of metals contained in circuit boards or electronic components can be separated/recovered to reuse as resources. Among them are included metals which are under risk of exhaustion or rare metals of which crustal abundance are scarce. Therefore, recovery of these metals contributes to the solution of the problem of resources and energy which the mass consumption society faces.

(Embodiment 15)

Next, a processing system will be described taking up as an object a circuit board in which a copper foil and a resin are stacked.

A circuit board can be a so-called copper plated laminate, a flexible substrate, and a film carrier of a TAB (Tape Automated Bonding). A cut off portion of a copper plated laminate that is produced during manufacturing process of a circuit board can be processed. In addition, as described above, a circuit board in which an electronic component and a connecting alloy are separated from a mounted substrate can be processed.

Further, though the present description will be made on a circuit board, the same processing can be employed if the object has copper and resin as constituent members.

Separation of a solder alloy, an electronic component from a mounted substrate can be implemented in an identical manner as described above. Pyrolysis of the constituent resin of the mounted substrate is also identically implemented as described above.

Here, paper can be included as a part of the resin. This is same all through the present invention.

In this system, to separate efficiently the copper foil and the resin, a circuit board is heated under decompression condition or in a non-oxidizing condition to pyrolyze the constituent resin of the circuit board into gas, oil, carbide and so on. The copper foil can be recovered as an almost pure metal. Impurities such as carbide and the like which are stuck to copper can be removed by implementing cleaning, vibration, rotation with fine sand, according to demands. As an apparatus, the processing apparatus of the present invention can be employed.

Figure 23:
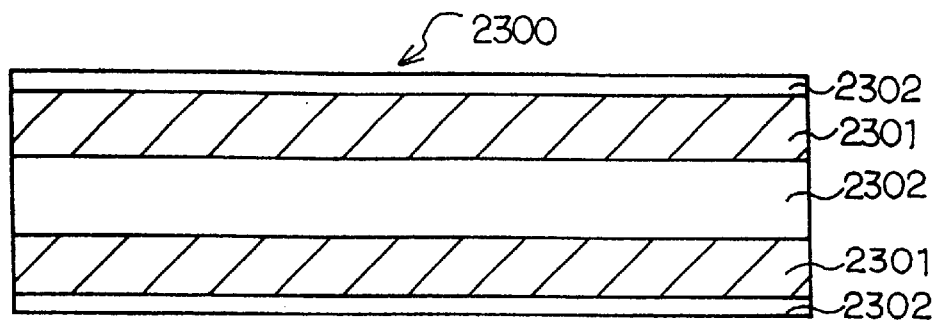
FIG. 23 is a diagram schematically showing a state prior to processing of a printed circuit board, an example of an object being processed.

FIG. 23 is a diagram schematically showing a circuit board 2300, which is an object to be processed. This circuit board 2300 is stacked in 2 layers, a copper foil 2301 and a resin 2302 being integrally stacked.

After a circuit board 2300 is introduced into a gas tight chamber, the temperature, pressure, oxygen concentration in the gas tight chamber are adjusted not so as to substantially oxidize the copper 2301 to selectively pyrolyze the resin 2302 (vaporization, conversion to oil, carbonization). The decomposition product gas of the resin 2302 is recovered with a condensation apparatus.

This time, the temperature is elevated to a temperature (200° C., for instance) where the resin is not so much oxidized, then the pressure is decompressed or the partial pressure of oxygen is lowered, further the temperature can be elevated (400 to 650° C., for example). These are implemented to raise the temperature elevation efficiency.

Figure 24:
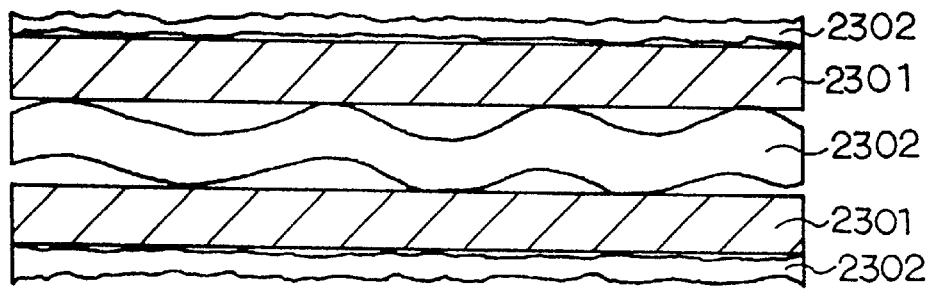
FIG. 24 is a diagram schematically showing a state of a printed circuit board of which constituent resin is pyrolyzed.

FIG. 24 is a diagram schematically showing a circuit board 2300 after the constituent resin is pyrolyzed. Much of the resin exists as carbide.

In this state, the carbonized resin 2302 can be separated mechanically.

Figure 25:
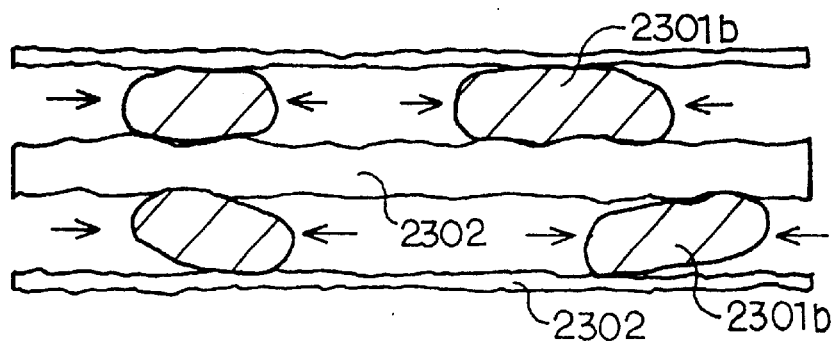
FIG. 25 is a diagram schematically showing a state where copper aggregates to form particles due to its surface tension.

Further, when the temperature is elevated up to a temperature several tens degree higher than the melting point of copper while adjusting the pressure or the oxygen concentration in the gas tight chamber, the copper 2301 of liquid state becomes particulate copper 2301b due to surface free energy (surface tension) (FIG. 25). When cooled in this state, separation/recovery of copper is more easily done. For instance, the melting point of copper at 760 Torr is 1080° C., but, if the temperature in the gas tight chamber is elevated up to 1150° C. (in the case of 760 Torr), copper can be gathered in particulate state.

Like this, through heating of a circuit board under a decompressed condition or in a non-oxidizing atmosphere, almost all of the copper foil can be recovered without being oxidized. Here, impurities such as carbide and the like which stuck on the surface can be removed by cleaning and so on according to demands.

Thus, according to the processing system of the present invention, copper can be separated and recovered in metallic state from the object in which resin and metal are integrated. Further, the resin can be recovered as oil, carbide.

(Embodiment 16)

Next, as an object, a resin coated aluminum foil in which an aluminum foil and a resin are stacked is taken up to describe a processing system.

Such a resin coated aluminum foil is in wide use, including such as a bag of potato chips or a wrapping container of a retort pouch food such as curry, a wrapping container of food, medicine, a heat insulating material.

Such a resin coated aluminum foil is difficult in processing due to integration of a resin and an aluminum foil, thus, is conventionally processed through landfill or incineration processing. When incinerated, aluminum becomes oxide, therefore, the value as resources becomes drastically lowered.

Being huge amount of energy expended in smelting of aluminum, it is a complete waste of energy not to reuse as a resource.

The present invention, by heating a resin coated aluminum foil in the gas tight chamber while adjusting the oxygen concentration, is to selectively pyrolyze (vaporization, conversion to oil, carbonization) the constituent resin while substantially maintaining an oxidation state of aluminum.

That is, to separate efficiently an aluminum foil and a resin, a resin coated aluminum foil is heated under a decompressed condition or a non-oxidized condition, then the resin is decomposed into gas, oil, carbide and the like to recover. The aluminum foil can be recovered as an almost pure metal. Such an impurity as a carbide stuck to aluminum can be separated by implementing such as cleaning, vibrating, rotating with fine sand particles as demand arises.

In this processing system, a resin coated aluminum foil is, to enhance a temperature elevation efficiency, heated up to a temperature where the resin is not so much oxidized, then, the pressure is decreased or the partial pressure of oxygen is lowered, then the temperature is further elevated up to a temperature where the resin portion is decomposed into gas, oil, carbide and so on to recover. The aluminum foil can be separated from the resin in an almost pure metal state.

Figure 26:
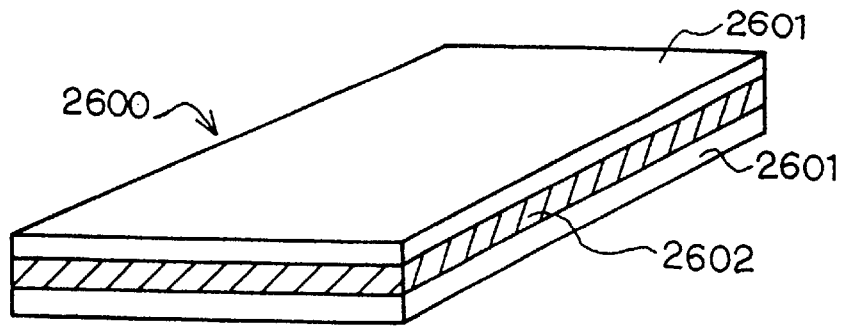
FIG. 26 is a diagram schematically showing a state preceding processing of resin coated aluminum foil, an object being processed.

FIG. 26 is a diagram schematically showing a resin coated aluminum foil 2600. A resin 2601 and an aluminum foil 2602 are integrated.

First, the resin coated aluminum foil 2600 which is an object being processed is introduced into a processing apparatus of the present invention.

Next, to enhance a temperature elevation efficiency of the gas tight chamber, after being heated up to a temperature (200° C., for instance) where the resin 2601 is not so much oxidized, while controlling temperature/pressure condition, the resin coated aluminum foil 2600 is heated to 400 to 650° C. (vide FIG. 18, FIG. 19, FIG. 29, FIG. 30).

At a temperature below 400° C., pyrolysis of the constituent resin is insufficient, on the contrary, at a temperature above 650° C., the aluminum foil is melted. Thus, the above described temperature range is determined.

It is more preferable to selectively pyrolyse the resin in the temperature range of 550 to 650° C. under a pressure of $10^{-2}$ Torr or less (or non-oxidizing atmosphere).

Figure 27:
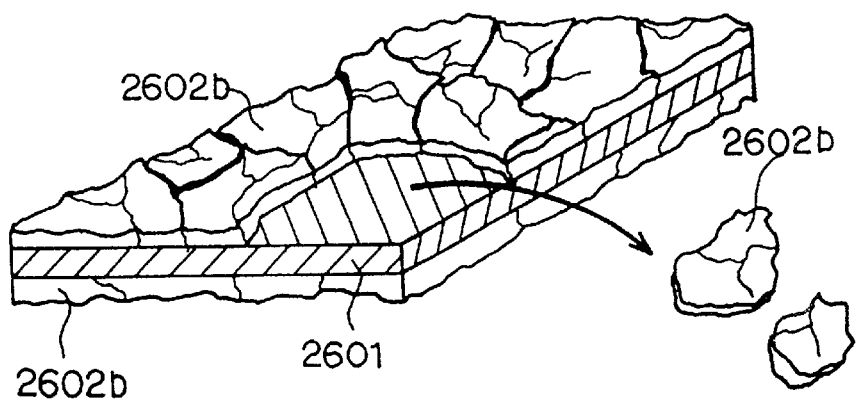
FIG. 27 is a diagram schematically showing a state of a resin coated aluminum foil of which constituent resin is pyrolyzed.
Figure 28:
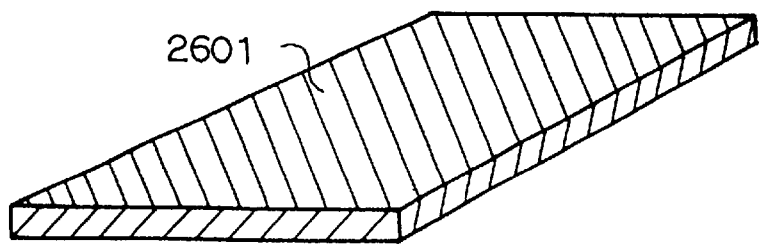
FIG. 28 is a diagram schematically showing an aluminum foil separated from a resin coated aluminum foil.

FIG. 27 is a diagram schematically showing a state of a resin coated aluminum foil after the constituent resin 2601 is selectively pyrolyzed, that is, a state where, to the aluminum foil 2601 in a metal state, a carbide 2602b which is pyrolysis product of the resin, is stuck. In this state, a carbide 2602b can be easily peeled off the aluminum foil by only lightly touching. Therefore, the aluminum foil can be easily recovered in metallic state (vide, FIG. 28).

Further, the decomposition product gas generated by pyrolysis of the resin can be recovered with a plurality of recovering apparatuses according to the kinds of gas. A catalyst can be used.

For instance, hydrogen gas can be absorbed by a hydrogen gas absorbing material to recover. Chlorine gas can be trapped by an alkaline solution such as NaOH, for instance, to neutralize or can be recovered as ferrous chloride through contact with iron heated at high temperature.

Incidentally, an effluent gas such as not-recovered gas can be made non-hazardous by heating to a high temperature. A part of the resin is recovered as carbide or oil. In general, the constituent resin of a resin coated aluminum foil is thermosetting resin, thus, much of them can be recovered through vaporization, conversion to oil. Carbide of the constituent resin was easily peeled off the aluminum foil. Further, the aluminum maintained its metallic property.

Thus, by heating a resin coated aluminum foil under a decompressed condition or in a non-oxidizing atmosphere, almost all of the aluminum can be recovered without being oxidized. Incidentally, according to necessity, impurities such as carbide and the like stuck on the surface can be removed by cleaning.

(Embodiment 18)

Figure 31:
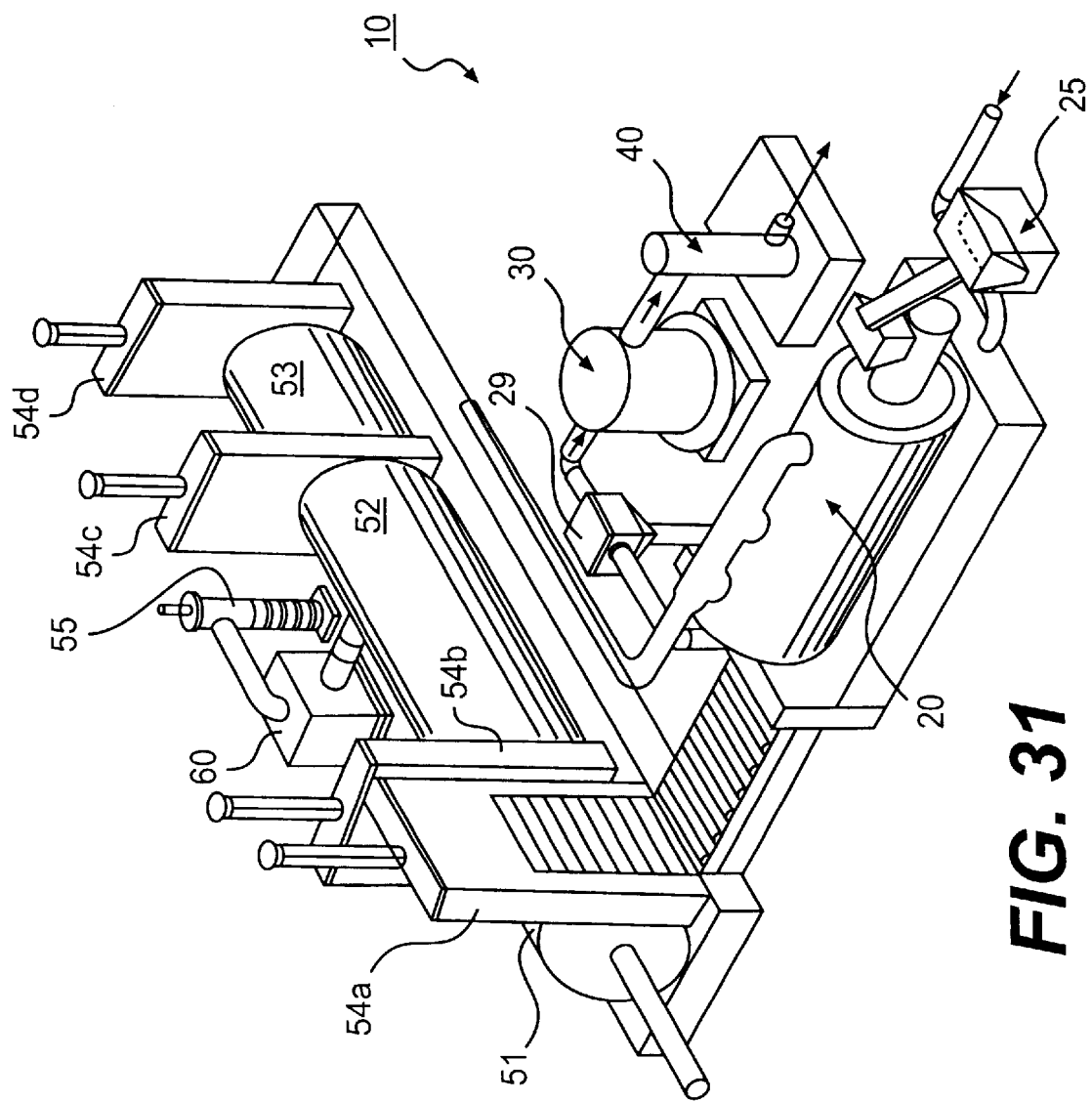
FIG. 31 is a diagram outlining one example of a processing apparatus of the present invention.

FIG. 31 is a diagram roughly showing one example of a processing apparatus of the present invention.

Figure 32:
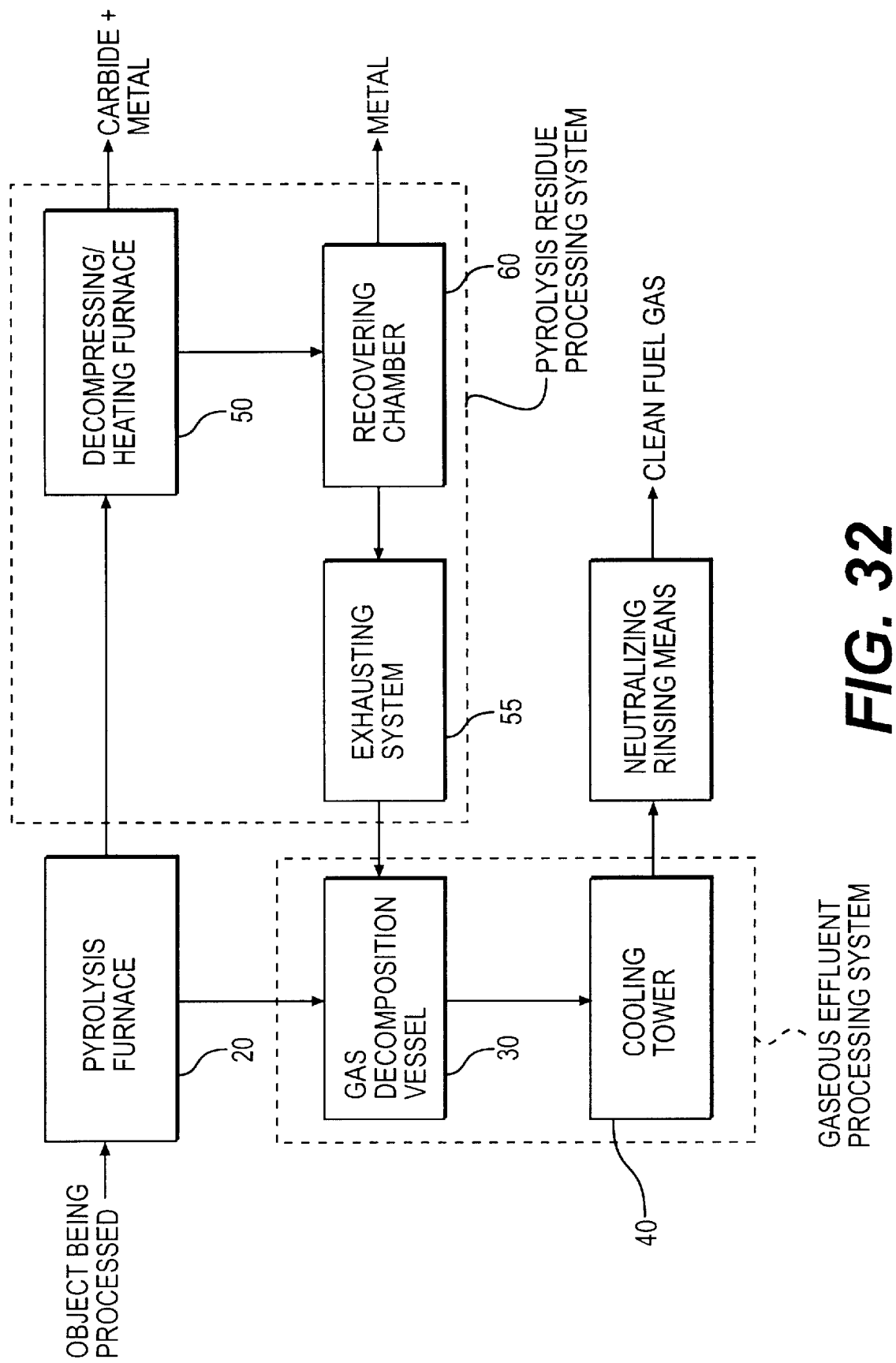
FIG. 32 is a diagram schematically showing a constitution of the processing apparatus of the present invention illustrated in FIG. 31.

FIG. 32 is a diagram schematically showing a structure of a processing apparatus of the present invention illustrated in FIG. 31.

This processing apparatus 10 comprises a pyrolysis furnace 20, a first pyrolyzing means, which pyrolyzes an object containing resin and metal at a first temperature; a gas decomposition chamber 30, disposed connecting to the pyrolysis furnace 2, reforming or pyrolyzing the gaseous effluent generated from an object at such a second temperature that dioxins are decomposed; a cooling tower 40 which is a cooling means, disposed connecting to the gas decomposition chamber 30, quenching the gaseous effluent to a third temperature so as to suppress the increase of dioxins concentration in the gaseous effluent reformed at the second temperature; a decompression/heating furnace 50 heating the residue generated through pyrolysis of the object, solid materials separated from the gaseous effluent and the like under decompression so as to vaporize metals contained in the residue; and a recovering chamber 60 condensing the metal vaporized from the residue.

That is, in the processing apparatus of the present invention, an object containing a resin and a metal is introduced into a pyrolysis furnace to pyrolyze; the gaseous effluent discharged from the object is processed to make non-hazardous, to make a clean fuel through a gaseous effluent processing system of which main portion is composed of a gas decomposition chamber, a cooling tower; and the pyrolysis residue of the object from which the gaseous effluent is discharged is introduced into a decompression/heating furnace to separate/recover metals.

The pyrolysis furnace 20 is to pyrolyze at a first temperature at which the object is pyrolyzed under control of oxygen concentration, from shredder dust, waste circuit board and the like, for instance, the gaseous effluent can be extracted. The gaseous effluent here is basically consisting of the gas, however the cases where solid state particles, liquid state particles and the like are contained in the effluent gas are not eliminated.

Figure 33:
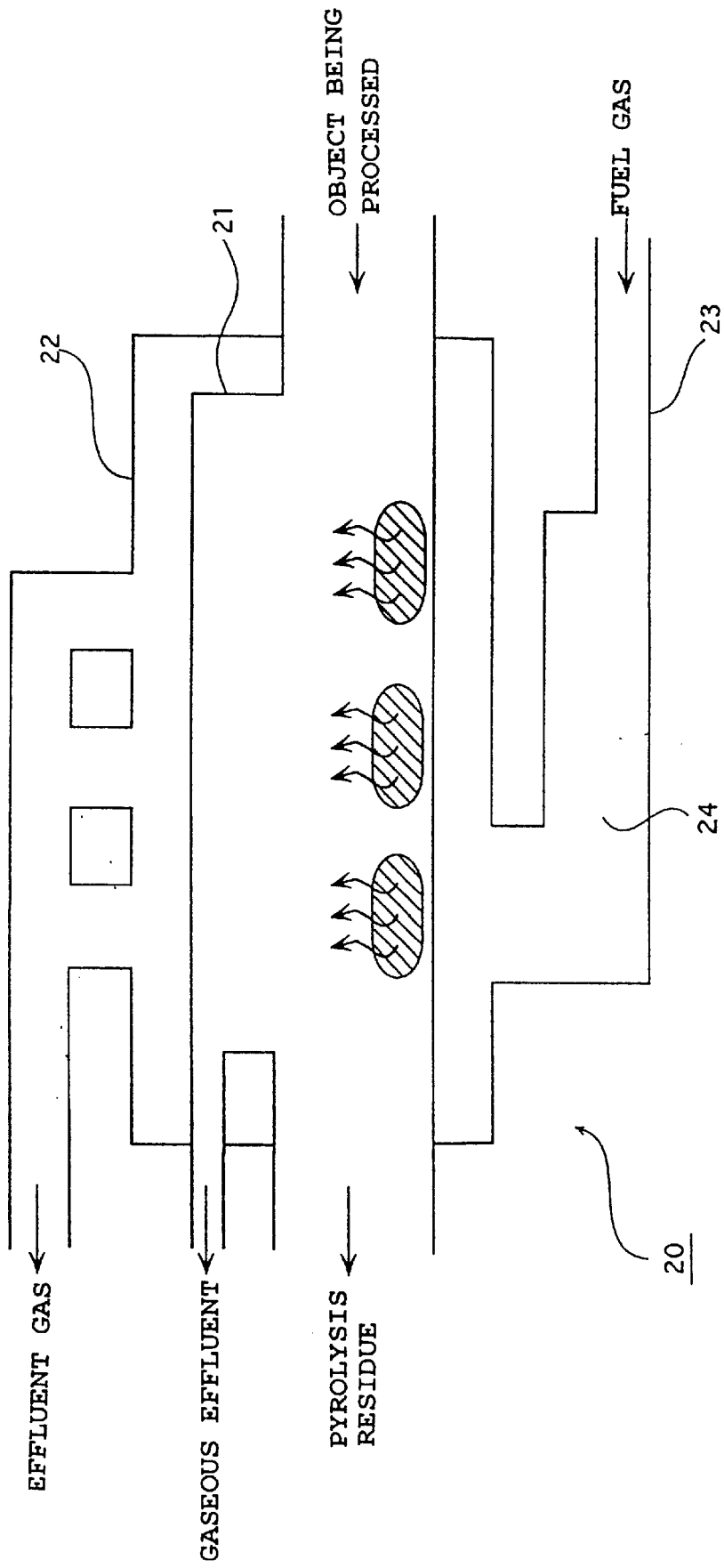
FIG. 33 is a diagram schematically showing one example of a structure of a pyrolysis furnace.

FIG. 33 is a diagram schematically showing one example of a structure of a pyrolysis furnace 20. The pyrolysis furnace 20 is composed of a pyrolysis chamber 21 pyrolyzing an object and a combustion chamber 22 heating the pyrolysis chamber 21, wherein the fuel gas introduced from the fuel gas piping 23 is combusted in a combustion room 24 to heat the inside of the pyrolysis chamber 21 with this heat of combustion.

The pyrolysis furnace is provided with a temperature adjusting means and an oxygen concentration adjusting means both of which are not shown in the figure, therewith, the inside of the pyrolysis chamber 21 is maintained at a first temperature and the oxygen concentration is so adjusted that pyrolysis is carried out in a reducing atmosphere.

As a temperature adjusting means adjusting a first temperature of the pyrolysis furnace 20, a heating means and a temperature measuring means can be employed. As the heating means, various kinds of convection heating, radiation heating or combination thereof can be employed according to demands. For instance, resistance heating such as a seed heater can be used or heavy oil or light oil can be burned outside the chamber. Further, after the gas discharged from the resin of the object is reformed, made non-hazardous, neutralized, as a fuel gas, the obtained gas can be reused as heat source of the processing apparatus of the present invention including the pyrolysis furnace 20. Further, for instance, the clean fuel gas obtained as described above can be introduced into a gas turbine generator to convert into electricity, with this electricity, the processing apparatus of the present invention including the pyrolysis furnace 20 can be operated.

As a temperature measuring means, various kinds of temperature sensors can be employed. The first temperature can be set at a temperature where the resin of the object is pyrolyzed and the metal of the object is not oxidized as much as possible, but, as will be described later, in order to cut a generating source of dioxins in multiple steps, the pyrolysis furnace 20 is preferred to be kept under. a reducing condition. For instance, through pyrolysis of aromatic based hydrocarbon compounds including chlorine under a reducing condition, the chlorine in the aromatic based hydrocarbon compounds is decomposed into HCl and the like. Thus, generation of dioxins can be suppressed.

The pyrolysis furnace 20 is designed to pyrolyze the object in a temperature range of about 250 to about 600° C., more preferably in the range of 400 to 550° C. The first temperature can be adjusted, according to demands, depending on property, structure of the object. By setting the first temperature of the pyrolysis furnace 20 at a relatively low temperature, vaporization of a heavy metal of the object can be prevented, thereby effective separation/recovery can be executed at a decompressing/heating furnace 50 disposed at a later step. Further, load upon the pyrolysis furnace 20 can be alleviated, thus, service life can be made longer, processing cost can be reduced.

An oxygen concentration adjusting means can be, for instance, an oxygen concentration sensor that is an oxygen concentration measuring means, and a carrier gas introducing system.

For an oxygen concentration sensor, a zirconia sensor adopting, for instance, zirconia (zirconium oxide) can be employed, or absorption of, for instance, CO and $CO_2$ can be measured with infrared spectrometry. Further, GC-MS can be employed or combination thereof can be employed according to requirement.

As a carrier gas, for instance, noble gas such as Ar can be used. Further, with this carrier gas, not only the oxygen concentration in the pyrolysis furnace 20 can be adjusted but also the gas can be effectively introduced into the gas decomposition chamber 30. In addition, it can concurrently serve as a pressure adjusting means.

The pyrolysis furnace 20 needs only be able to pyrolyze the object under control of the oxygen concentration, for instance, a rotary kiln can be employed.

Figure 40:
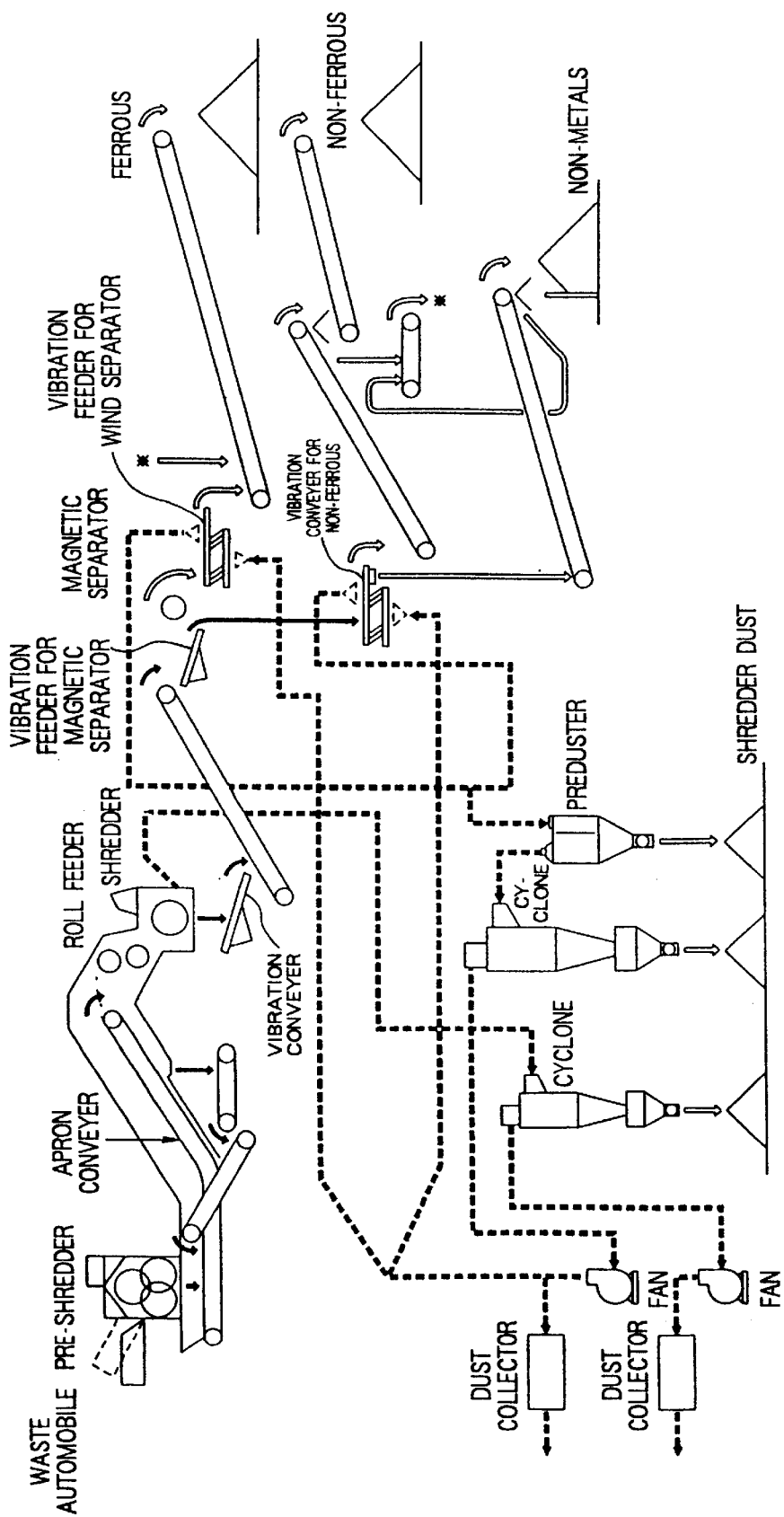
FIG. 40 is a diagram schematically outlining one example of a constitution of a shredder apparatus.

Further, as a preceding step of the pyrolysis furnace 20, a shredder 25 can be disposed (FIG. 40). The object introduced from the outside of the apparatus is crushed by the shredder and classified, thereafter can be introduced into the pyrolysis furnace 20, or, without crushing, can be introduced into the pyrolysis furnace 20. When the object is a waste circuit board, it is preferable to introduce into the pyrolysis furnace 20 without crushing.

In the inside of the pyrolysis furnace 20 into which the object is introduced, the temperature/oxygen concentration condition need only be adjusted in such a manner that the state of the metal of the object is not oxidized as much as possible and, during pyrolysis of resin, chlorine combined with organic compound can be made inorganic as much as possible. The temperature/oxygen concentration condition can be determined in advance, or can be controlled by feeding back the measured values of temperature and oxygen concentration to a heating means, an oxygen concentration adjusting means. When the oxygen concentration is required to be measured, for instance, a zirconia sensor can be employed.

Further, the pressure in the pyrolysis chamber 21 of the pyrolysis furnace 20 can be controlled. When, for instance, the inside of the pyrolysis chamber 21 is decompressed, the oxygen concentration is lowered too, the object is not rapidly oxidized by heating, accordingly. Further, in spite of generation of a huge volume of decomposition product gas from the resin, the decomposition of the resin does not usually produce oxygen. In addition, the decomposition product of the resin is also easily vaporized.

Besides, when being decompressed, thermal conductivity in the pyrolyzing chamber 21 becomes low. However, if the inside of the of the pyrolysis furnace 20 is in a non-oxidizing atmosphere, even under the atmospheric pressure or under pressurization, the object is not oxidized. Therefore, if the inside of the pyrolysis chamber 21 is in a non-oxidizing atmosphere, pressurization is possible, the thermal conductivity in the system can be enhanced, accordingly.

The gaseous effluent exhausted from the object is introduced into a gas decomposition chamber 30 through piping. In the processing apparatus 10 illustrated in FIG. 31, between a pyrolysis furnace 20 and a gas decomposition chamber 30, a cyclone type separator 29 is disposed to separate solid state effluent such as dust in the gaseous effluent, but the cyclone type separator 29 can be disposed according to demands.

The gas decomposition chamber 30 cracks or reforms the gaseous effluent discharged from the object at a second temperature higher than the first temperature. Cracking, pyrolysis or reforming here is to convert hydrocarbon based compounds contained in the gaseous effluent discharged from the object into hydrogen, methane, carbon monoxide and the like of lower molecular weight. Further, hydroreforming can be implemented. To reform while maintaining the inside of the system in a reducing condition is preferable from the view point of cutting the generating source of dioxins. Further, if the inside of the gas decomposition chamber 30 is maintained in a reducing condition, a sight quantity of air can be introduced into the gas decomposition chamber 30. In the gas decomposition chamber 30, other than pyrolysis, in addition to this, for example, a catalyst can be employed to decompose by contact. As a catalyst, for instance, solid acids such as silica/alumina or zeolite (alumino-silicate salt) carrying metal such as Pt, Re and so on can be employed.

By providing the gas decomposition chamber 30 independent of the pyrolysis furnace 20, the gaseous effluent from the object can be processed at a second temperature higher than the first temperature, reforming of the gaseous effluent, inorganization of chlorine can be implemented effectively.

The gas decomposition chamber 30 is preferable to be kept under a condition where the dioxins derived directly or indirectly from the object can be decomposed as much as possible. For instance, by setting the second temperature at around 800° C., fair proportion of dioxins can be decomposed. Further, by setting the second temperature at 1000° C. or more, more preferably at 1200° C. or more, the dioxins can be decomposed more effectively. Since the gas decomposition chamber 30 is set at the second temperature where the dioxins can be decomposed, at this second temperature, hydrocarbon of the gaseous effluent is pyrolyzed at the same time.

The hydrocarbon based compounds contained in the gaseous effluent discharged from the object is, by being reformed, pyrolyzed in the gas decomposition chamber 30, converted into hydrogen, methane, carbon monoxide of lower molecular weight.

Further, when the dioxins are included in the gaseous effluent, almost all of the dioxins are decomposed. Further, organic chlorine is made inorganic, re-synthesis of dioxins can be suppressed.

FIG. 34 is a diagram schematically showing one example of a structure of the gas decomposition chamber 30.

The gas decomposition chamber illustrated in FIG. 34(*a*) is, by introducing the gaseous effluent from the pyrolysis furnace 20 and a small quantity of air into the chamber filled with coke, to establish, in addition to execution of pyrolysis and reforming of the gaseous effluent, a reducing atmosphere and a temperature condition where dioxins are decomposed.

The gas decomposition chamber illustrated in FIG. 34(*b*) is, after heating the chamber to a temperature where the dioxins can be decomposed by combusting a fuel gas and air, by introducing the gaseous effluent from the pyrolysis furnace 20 into the chamber, to pyrolyze, reform.

In the chamber of the gas decomposition chamber 30, for instance, a contact decomposition means such as a catalyst as described above can be provided.

Further, according to demands, a temperature adjusting means and an oxygen concentration measuring means adjusting the temperature, oxygen concentration in the chamber can be provided to the gas decomposition chamber 30. As an oxygen concentration adjusting means, the oxygen concentration sensor and the carrier gas introducing system as described above can be employed. Further, a hydrogen gas reservoir can be connected, or an inert gas such as Ar reservoir can be connected.

Like this, the gaseous effluent contained in the gaseous effluent discharged from the object can be converted into hydrogen, methane, carbon monoxide of lower molecular weight by the gas decomposition chamber 30 or the second pyrolyzing means.

The gaseous effluent pyrolyzed, reformed at the gas decomposition means 30 is introduced into the cooling tower 40.

The cooling tower 40, disposed connecting to the gas decomposition chamber 30, cools rapidly the gaseous effluent reformed or pyrolyzed at the second temperature to a third temperature so as to suppress the increase of dioxins concentration in the gaseous effluent.

That is, the concentration of the dioxins in the gaseous effluent reformed or pyrolyzed at a second temperature at the gas decomposition chamber 30 or the second pyrolyzing means is remarkably low, since the second temperature is a temperature at which the dioxins can be decomposed and chlorine of hydrocarbon based compounds decomposed or reformed at this temperature is made inorganic by the reducing atmosphere. Therefore, in order to prevent the production, re-synthesis of the dioxins from occurring from this state, that is, in order to suppress the increase of the dioxins concentration in the gaseous effluent as much as possible, the temperature is rapidly lowered to the third temperature. The third temperature can be set at a temperature where production reaction of dioxins does not occur.

By quenching from a state where the dioxins in the gaseous effluent (the temperature is not necessarily required to be equal to the second temperature of the gas decomposition chamber 30 but can be a temperature higher than that where the dioxins are decomposed) is decomposed to, for instance, 150° C. or less, preferably 100° C. or less, more preferably 50° C. or less, most preferably 35° C. or less, production, re-synthesis of the dioxins can be suppressed.

In this case, it is preferable to cool the gaseous fluent to the third temperature in short time as much as possible. This is because the dioxins are prone to be formed, re-synthesized in the temperature range of about 200° C. to 400° C. By shortening the residence time in the temperature range where the dioxins are prone to be produced, re-synthesized through rapid cooling of the gaseous effluent to the third temperature, more effectively the dioxins concentration in the gaseous effluent can be suppressed.

Thus, in the cooling tower 40, the gaseous effluent is desirable to be cooled rapidly in less than about 10 seconds.

Such a cooling tower 40 can cool through contact by directly spouting a coolant such as water, a cooling oil to the gaseous effluent. In this case, if alkaline powder such as lime powder is spouted, the gaseous effluent can be neutralized. Further, HCl, for instance, in the gaseous effluent diffuses into solid surface through contact with lime powder, resulting in suppression of production, re-synthesis of the dioxins.

FIG. 35 is a diagram schematically showing one example of the structure of a cooling tower 40.

FIG. 35(*a*) shows a structure wherein the gaseous effluent introduced from the decomposition chamber 30 is rectified, the coolant such as cooling water, cooling oil is directly spouted, thereby the gaseous effluent is cooled to the third temperature. FIG. 35(*b*) has a structure in which, by spouting a neutralizer such as lime powder together with a coolant, the gaseous effluent is neutralized, at the same time, chlorine in the gaseous effluent is fixed to eliminate dioxins source from the gaseous effluent.

Further, the cooling tower 40 is provided with not shown temperature sensors at the gaseous effluent introducing portion and the cooling gas discharging portion, further with cooling rate managing means, for instance, an adjusting means of flow rate of coolant, temperature. Thereby, the cooling rate of the gaseous effluent is controlled so as to suppress production, re-synthesis of dioxins.

Thus, the gaseous effluent discharged from the object at the pyrolysis furnace 20 is pyrolyzed or reformed at the gas decomposition chamber 30 at a temperature where dioxins are decomposed, and is rapidly cooled by the cooling tower 40 so as to suppress production, re-synthesis of dioxins. Thereby, the gaseous effluent is converted into hydrogen, methane, carbon monoxide and the like and the dioxins concentration in the gaseous effluent also can be drastically decreased.

Thus, in the processing apparatus of the present invention, decomposition of the object, decomposition of the gaseous effluent from the object are processed in multiple stages with a pyrolysis furnace 20 and a gas decomposition chamber 30, and, by maintaining these decomposition means in a reducing atmosphere, occurrence of dioxins can be suppressed.

By setting the second temperature at 800° C., the third temperature at 150° C., the dioxins concentration in the gaseous effluent could be reduced to 0.1 to 0.5 TEQng/Nm$^3$.

Further, by setting the second temperature at 1150° C., the third temperature at 50° C., the dioxins concentration in the gaseous effluent could be reduced to 0.1 TEQng/Nm$^3$ or less.

The gaseous effluent cooled at the cooling tower 40 can be cleaned, desulfurized according to demands.

Further, the gaseous effluent cooled at the cooling tower 40 can be introduced into a neutralization reaction filter means such as a bag-filter. Between the cooling tower 40 and the neutralization reaction filter means, such as hydrated lime, filtering aid (for example, particles high in its porosity such as zeolite, activated carbon, TESHISOUBU, Shirasu balloon) can be spouted into the flow of the gaseous effluent.

Figure 36:
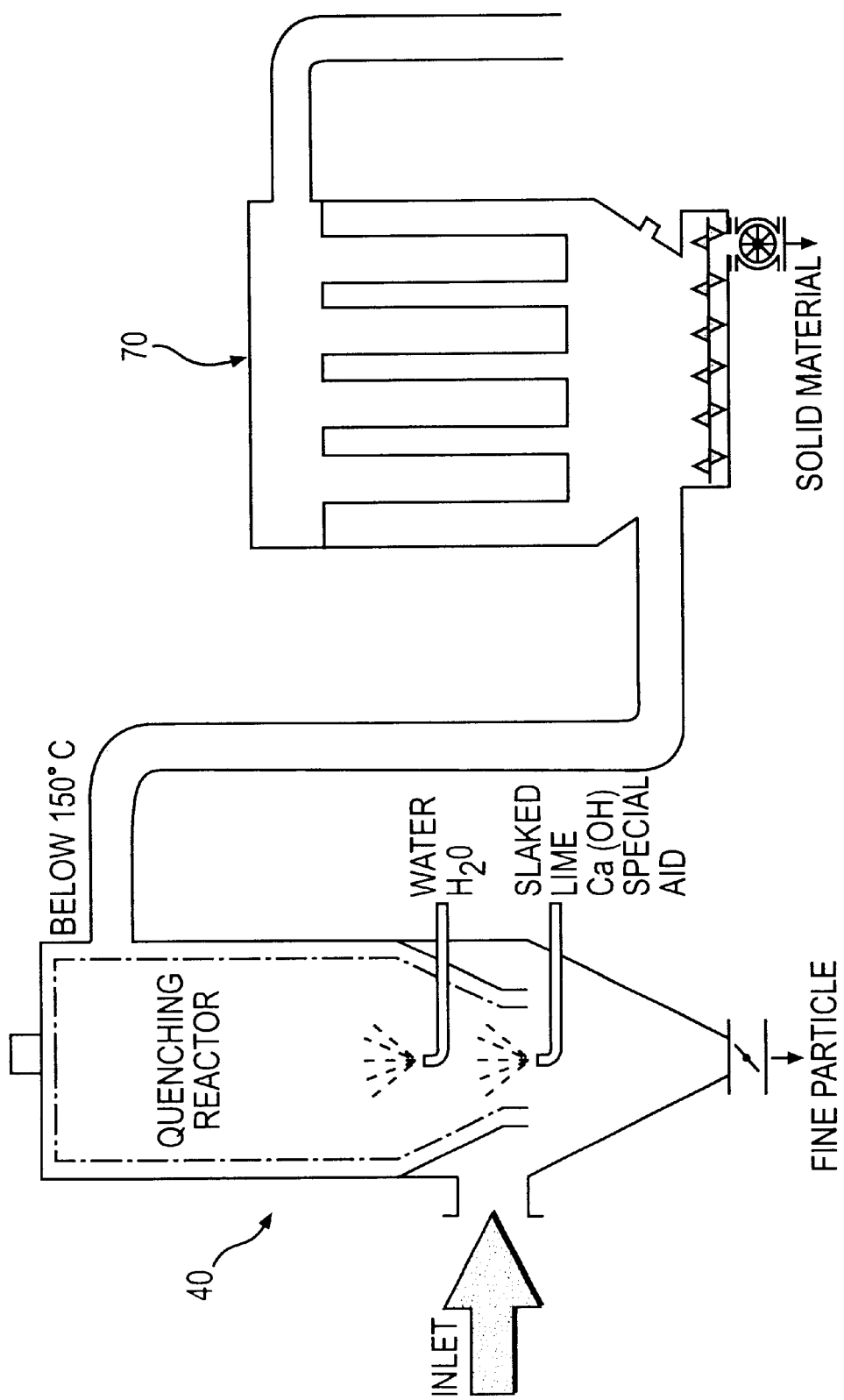
FIG. 36 is a diagram showing a part of a constitution of a gaseous effluent processing system connected a bag-filter at the later stage of a cooling tower.

FIG. 36 is a diagram showing a part of a structure of a gaseous effluent processing system in which a bag-filter 70 is connected posterior to the cooling tower 40.

Solid state discharge such as fine particles of heavy metals condensed at the cooling tower 40, solid material discharged from the bag-filter 70 and the like can be processed by introducing into a decompression/heating furnace 50. Thereby, even when metals such as lead, tin, arsenic, cadmium and the like are included in the gaseous effluent, they can be separated/recovered.

Thus processed gaseous effluent discharged from the object can be used as a heat source heating the pyrolysis furnace 20 or can be provided to a gas turbine generator to generate electricity. Further, this electricity can be used as a heat source or others of the processing apparatus of the present invention.

Besides, the pyrolysis residue of the object from which gaseous effluent is discharged at the pyrolysis furnace 20 is introduced into a decompression/heating furnace 50. Since organic components of the object can be decomposed at the pyrolysis furnace 20 which is a first pyrolyzing means, the pyrolysis residue is mainly composed of metal, carbide, or glass.

The decompression/heating furnace 50 separating/recovering metals from the pyrolysis residue which is an object here, comprises a purge room 51, a first gas tight room 52, a cooling room 53, wherein each room is separated by a partition 54 capable of being opened or closed. Further, the pyrolysis furnace 20 and the first gas tight room of the decompression/heating furnace 50 can be connected through a purge room 51.

In the decompression/heating furnace 50 illustrated in FIG. 31, the object is introduced into the purge room 51 by opening a partition 54a. The partition 54a is closed, then the inside of the purge room 51 is roughly evacuated with a not shown exhaust system. Thereafter, the partition 54b is opened to transfer the object into the first gas tight room 52.

The partition 54b is closed, then, the pressure, the temperature of the inside of the first gas tight room 52 are controlled so as to vaporize the metal of the object under a decompression condition. The metal vaporized from the object is condensed by the recovering chamber 60 to recover. Numeral 55 is an exhausting system. Exhaust gas from the exhausting system can be introduced into the decomposition chamber 30.

After vaporizing the desired metal, by opening the partition 54c separating the cooling room 53 decompressed by a not shown exhausting system, the object is transferred into the cooling room 53.

The partition 54c is closed to cool the object, when a stable state of the object is established even in the air, the cooling room 53 is leaked to open the partition 54d to pull out the object.

Although the object is composed of carbides and not vaporized metals, these metals can be easily separated from the carbides.

Thus, according to the present invention, an object having a resin and a metal can be recycled in high degree, moreover, generation of dioxins can be prevented.

(Embodiment 19)

Figure 37:
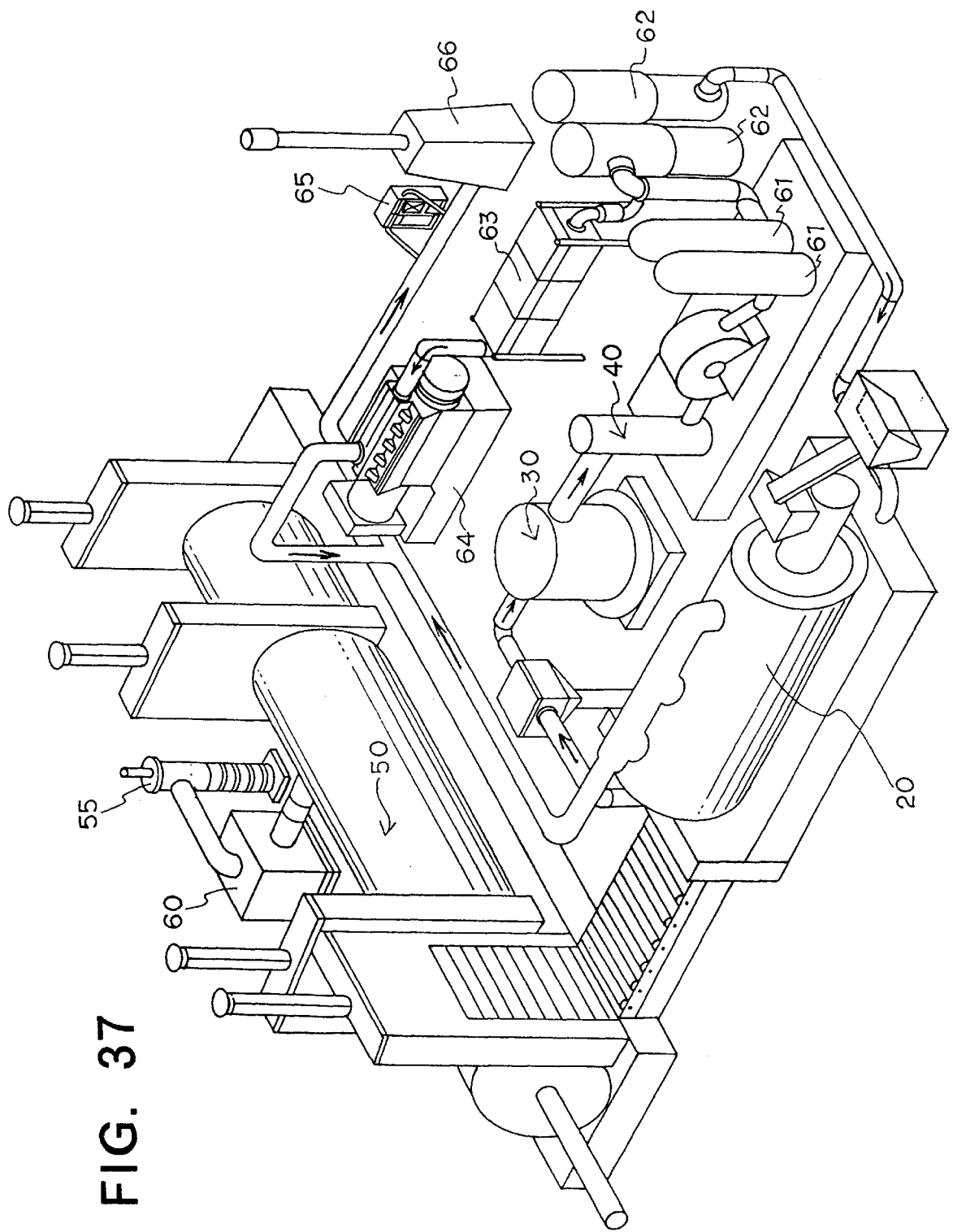
FIG. 37 is a diagram outlining another example of a processing apparatus of the present invention.

FIG. 37 is a diagram showing roughly another example of the processing apparatus of the present invention.

Figure 38:
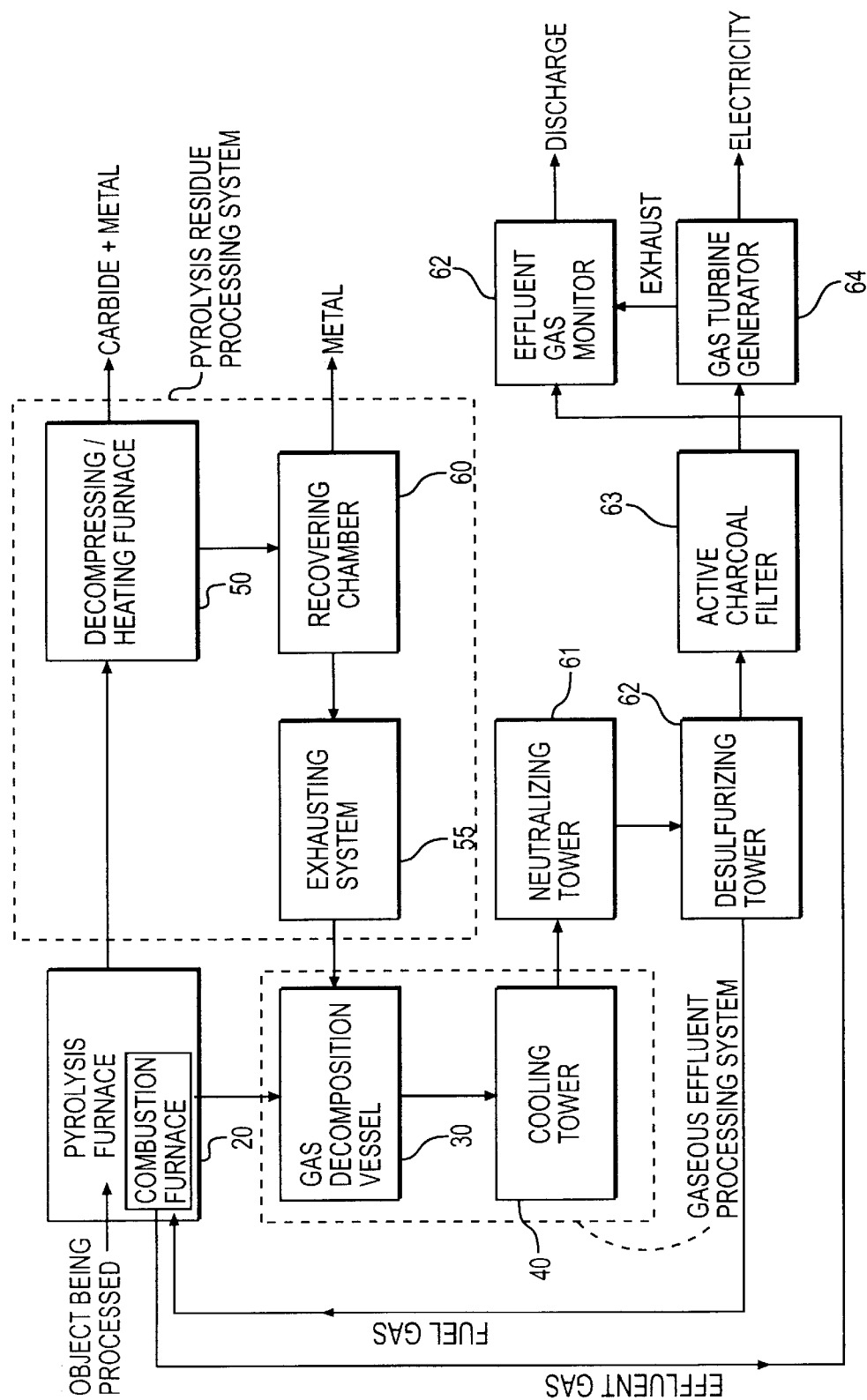
FIG. 38 is a diagram schematically showing a constitution of a processing apparatus of the present invention illustrated in FIG. 37.

FIG. 38 is a diagram schematically showing a structure of the processing apparatus of the present invention illustrated in FIG. 37. In this processing apparatus, an acidic component in the gaseous effluent cooled at the cooling tower 40 is neutralized at a neutralizing cleaning tower 61, and is desulfurized at a desulfurization tower 62 to make clean, resulting in the use as a clean fuel gas. The fuel gas is transferred to a combustion room 23 of the pyrolysis furnace 20 to be used as a heating fuel of the pyrolysis furnace, and is filtered by an activated charcoal filter 63 to be sent to a gas turbine generator 64 to be converted into electricity. The exhaust gas which heated the pyrolysis furnace 20 and the exhaust gas of the gas turbine generator 64 are monitored in their components, concentrations with GC-MS and the like, and, after confirming their safety, are discharged into the air through a smokestack 66.

By adopting such a structure, the processing apparatus of the present invention can process the object more effectively.

For instance, the gaseous effluent, which is made non-hazardous, is neutralized, cleaned to be used as a clean fuel gas heating the pyrolysis furnace. Further, the decompression/heating furnace can be operated with the electricity obtained by the gas turbine generator. Or, the electricity can be sold. Thereby, the running cost of the apparatus can be restricted remarkably low.

In addition, since the first temperature in the first pyrolyzing means is such low as 600° C. or less, the service life of the pyrolysis furnace is long, maintenance can be made easy.

Figure 39:
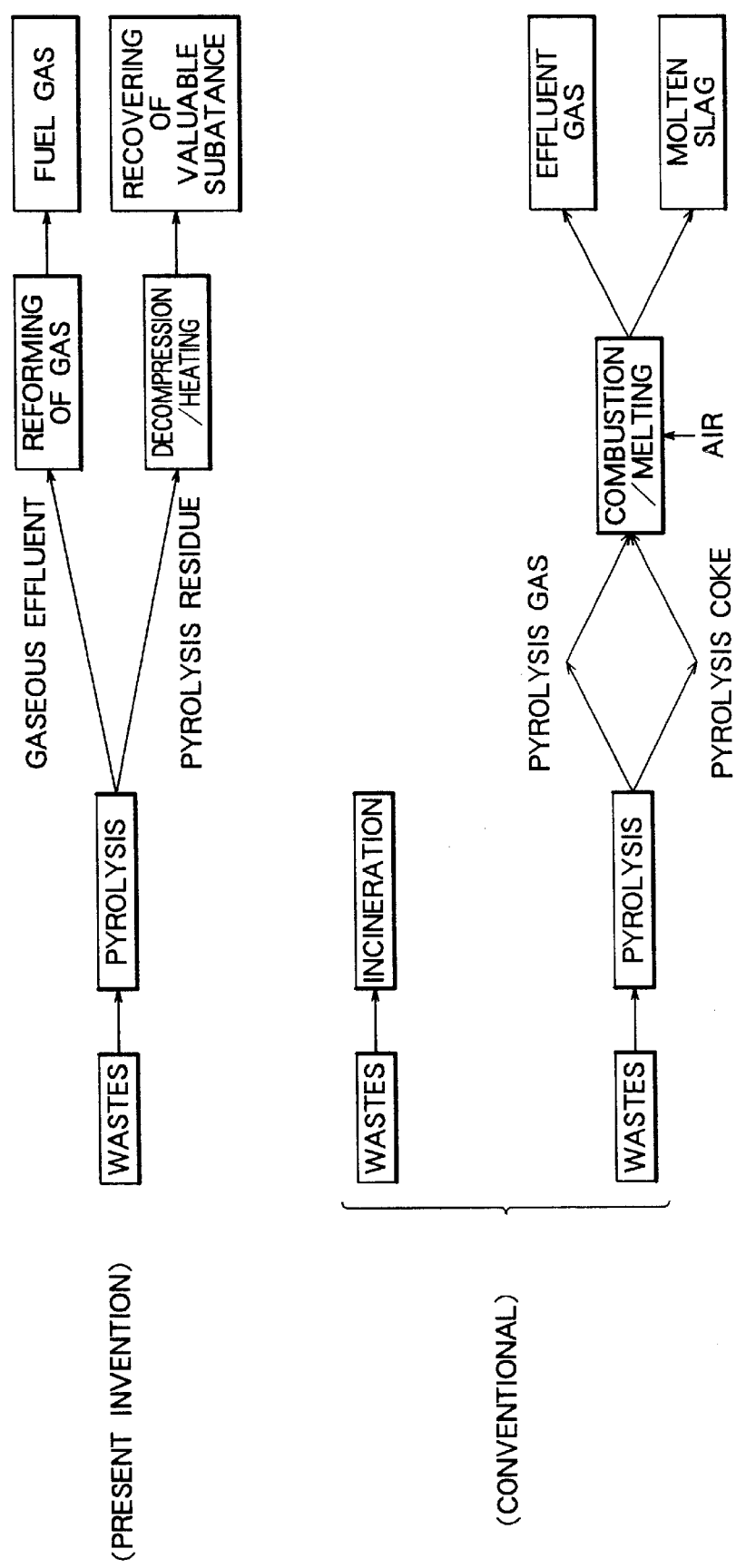
FIG. 39 is a diagram schematically showing an example in which a processing method of the present invention is applied to processing of the wastes.

FIG. 39 is a diagram schematically showing an example in which the processing method of the present invention is applied to process wastes. That is, the wastes is pyrolyzed, the gaseous effluent discharged from the wastes is converted into a clean fuel gas by a gaseous effluent processing system, the pyrolyzed residue is introduced into the decompression/heating furnace to recover as a heavy metal, a useful metal, an activated charcoal.

FIG. 40 is a diagram schematically showing one example of a structure of a shredder device, which can be provided at the preceding step of the processing apparatus. Here is shown a shredder device processing a waste automobile.

An waste automobile is crushed by a shredder, and, with magnetism, wind power and the like, is fractionated into ferrous kind, non-ferrous metals kind, non-metal kind. Leftovers from this fractionation step are the shredder dusts. The shredder dust contains resin (includes fiber, paper), glass, various kinds of metals including heavy metals. By adoption of such a structure described above, the shredder dust of which processing technology has not been established can be processed safe and effectively.

The shredder dust is thrown into a pyrolysis furnace 20 to pyrolyze at 400 to 500° C., the gaseous effluent discharged from the resin component or organic component of the shredder dust is introduced into the gas decomposition chamber 30 to pyrolyze at a second temperature of 1100° C. or more (more preferably 1150° C. or more) so as to decompose and make non-hazardous the hazardous material such as dioxins and the like. Then, immediately thereafter, by rapidly cooling within 10 seconds at the cooling tower 40 of which third temperature is set at 100° C. or less (more preferably 50° C. or less), generation of dioxins could be suppressed to 0.1 TEQng/Nm$^3$ or less. The gaseous effluent from the object thus processed is processed by a gas cleaning (neutralizing) apparatus, a desulfurization apparatus to eliminate cyanides, sulfides, nitrides to obtain a clean fuel gas.

This fuel gas can be utilized as a heat source of the pyrolysis furnace 20, at the same time, can be converted into electricity by gas turbine generator to operate the decompression/heating furnace 50.

Further, the pyrolysis residue of the object is introduced into the decompression/heating furnace 50, and is heated under a decompression state of $10^{-1}$ to $10^{-3}$ Torr. Thereby, metals such as Pb, Sb, As, Cd, Sn, Zn and the like can be separated/recovered with a recovering efficiency of more than 99%. Pb, Sb, As, Cd, Sn, Zn in the object processed at the decompression/heating furnace 50 can be lowered to the level of 0.1 ppm.

The ferrous kind remaining in the object processed at the decompression/heating furnace 50 can be separated/recovered with a gravity classification method, an electromagnet and the like, finally resulting in a non-hazardous and highly pure carbide. This carbide can be used at the activated charcoal filter 63 or can be utilized as an effective soil stabilizer.

According to such an invention, by pyrolyzing under control of an oxygen concentration the home electric appliances, automobiles, precision instruments and the like, or the shredder dust of these wastes, then by processing at the gaseous effluent processing system and the pyrolysis residue processing system, the gaseous effluent can be made a clean fuel gas through decomposition, conversion to non-hazardous material of the hazardous material such as dioxins and the like. This gas fuel can be used as a heat source by introducing into a combustion room such as a pyrolysis furnace and the like. Further, this gas fuel can be used to generate electricity. Compared with a hydroelectric generation method in which the constant supply of the electricity is difficult in the period of water shortage, since the shredder dust is plentiful in its quantity and inexpensive as a resource, very effective generation of the electricity is made possible by using the processing apparatus of the present invention. Further, the processing apparatus of the present invention, being constructed in a module structure, can correspond to a wide range of scale ranging from a small scale to a large scale or to any use.

Besides, from the pyrolysis residue, by heating in a vacuum, various kinds of metals can be separated/recovered in a highly pure metallic state. Since heavy metals are removed from carbides, the carbides can be used effectively. Further, since the decompression/heating furnace is relatively small in its size when compared with a melt furnace, and construction expenditure, construction space can be saved accordingly, it can effectively respond to the wastes processing of a town and village scale.

Thus, a huge quantity of the wastes which contains hazardous materials or resource materials thereof and generates hazardous materials including dioxins when being burned, can be recovered as reusable materials in a highly pure state without discharging the hazardous materials, heavy metals into the environment.

In addition, with a processing apparatus, processing method of the present invention, without generating a hazardous gas, a circuit board and the electronic components such as various kinds of ICs, resistors, condensers and the like can be easily separated from the wastes of a mounted substrate, and at the same time, a solder alloy and the like can be separated and recovered.

First, a mounted substrate is introduced, without crushing, into a pyrolysis furnace 20 set at a first temperature of 250 to 500° C. to pyrolyze. In this case, the inside of the pyrolysis furnace can be decompressed. The gaseous effluent generated through decomposition of the mounted substrate, to suppress generation of hazardous materials such as dioxins and the like, is introduced into a gas decomposition chamber 30 to pyrolyze at 800° C. or more, thereafter, is rapidly cooled down to 100° C. or less at a cooling tower 40. The pyrolysis residue is introduced into a decompression/heating furnace 50 to be followed by the decompression to about $10^{-3}$, then is gradually heated up to 350 to 700° C. to vaporize the constituent materials of solder alloys. Therefore, the circuit board and the electronic components such as various kinds of ICs, resistors, condensers and the like can be separated, at the same time, metals such as vaporized lead can be recovered with a condensation means disposed in the midway of the recovering path.

With such a method, the electronic components and the circuit board were separated almost completely. Further, low melt metals such as hazardous Pb or the like can be almost completely eliminated (to the level of 0.1 ppm). The hazardous material in the gaseous effluent generated from resin portion is remarkably low in its concentration, for instance, dioxins can be reduced to 0.1 to 0.5 TEQng/Nm$^3$. The circuit board, of which electronic components are disconnected and from which a connecting metal is removed, was carbonized and became a state of containing copper for wiring. Hazardous metals such as Pb, Sb can be removed from the electronic components such as various kinds of ICs, resistors, condensers and the like too, and the resin portion such as a molded resin was carbonized and became a state partly including metals such as Si, Au, Ni, W, Mo and so on.

Next, the carbonized circuit board including copper is further heated (1050 to 1200° C.) in the decompression/heating furnace 50, the copper foil is half melted to coagulate in a ball like shape of several mm.

By applying such a processing, copper became separated/recovered easily from the carbide. The circuit board consisting of this carbide and copper metal can be cleaned with calcium carbonate solution and the like to recover a high purity copper.

Thus, according to the present invention, wastes of the mounted substrates can be easily separated into the circuit board and various kinds of electronic components without discharging a hazardous material, with the hazardous material removed, and without relying on hands. At the same time, various kinds of metals including constituent metals of solder alloy can be vaporized to separate/recover. Further, metal such as copper which does not vaporize can be recovered in high purity. According to the present invention, the wastes such as the mounted substrate which so far does not have any established, effective processing technology can be recovered as reusable materials of high purity without discharging hazardous materials, heavy metals into the environment.

(Embodiment 3)

Next, the detail of a decompression/heating means of the present invention will be described.

Figure 41:
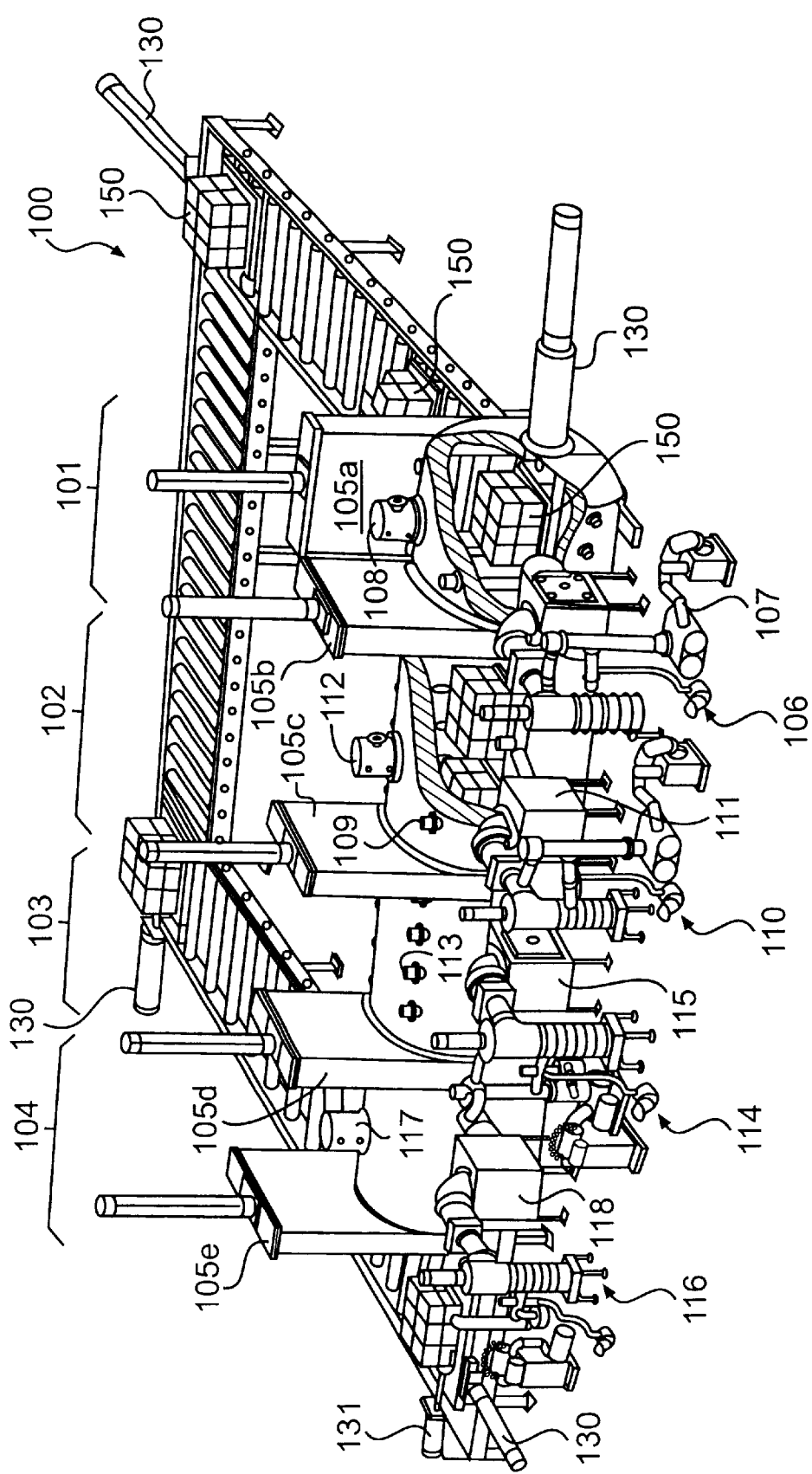
FIG. 41 is a perspective view outlining one example of a processing apparatus of the present invention.

FIG. 41 is a perspective view roughly showing one example of a decompression/heating device which is provided to the processing apparatus of the present invention. By truncating partly, the inside situation is shown.

The decompression/heating furnace 100 can process the pyrolysis residue from the object 150 which possesses resin and metal as constituent members, and solid state wastes, slug which are separated from the gaseous effluent, and comprises a purge room 101, a first gas tight room 102, a second gas tight room 103, a cooling room 104.

These each rooms are separated by doors 105 which are partitions capable of being opened or closed. That is, the outside portion of the apparatus and the purge room 101, the purge room 101 and the first gas tight room 102, the first gas tight room 102 and the second gas tight room 103, the second gas tight room 103 and the cooling room 104, and the cooling room 104 and the outside of the apparatus, are separated by doors 105*a*, 105*b*, 105*c*, 105*d* and 105*e*, respectively.

The doors 105 separating these respective rooms are provided with gas tightness and adiathermic property, each room being separated from thermal and pressure point of view, accordingly. The thermal load on the doors 105*a*, 105*b* is small, only gas tightness is required accordingly.

To the purge room 101, an exhausting system 106 is connected. The exhausting system 106 is provided with an oil diffusion pump 106*a*, a booster pump 106*b*, a rotary pump 106*c*. Between the purge room 101 and the exhausting system 106, between respective vacuum pumps, not shown valves are disposed, respectively.

Between the purge room 101 and the exhausting system 106, a trap 107 is disposed to eliminate moisture or hydrogen gas discharged from the object 150 through decompression in the purge room 101 and the like. Therefore, even if moisture or hydrogen gas is discharged from the object 150 in the purge room, the exhausting system 106 is not adversely affected. The trap 107 can be disposed according to demands.

Pressure in the purge room 101 is adjusted by this exhausting system 106 and a not shown vacuum gage which is a pressure sensor. As a vacuum gage, a Bourdon tube, a Pirani gage and the like can be used according to demands.

In addition, to the purge room 101, a carrier gas introducing system is connected to replace the inside of the purge room 101 with the gas, numeral 108 is a carrier gas introducing valve. The carrier gas introducing system is connected to a not shown carrier gas reservoir. Here, $N_2$ is used as a carrier gas but noble gas such as Ar can be employed.

Further, by providing a heating means to the purge room 101, the object 150 can be heated in advance.

After equalizing pressures of the purge room 101 and the first gas tight room 102, the door 105*b* is opened, the object 150 is transferred into the first gas tight room 102 with a pusher 130. Though not particularly mentioned hereinafter, the door 105 can be opened or closed after balancing the pressures on both sides separated by this door.

The first gas tight room 102 is a processing room to selectively vaporize to recover the constituent metals of the object 150 from the object 150.

The first gas tight room 102 is provided with an electric heater 109 which is a heating means. The electric heater can be supplied with electricity from the gas turbine generator 64. The heating means is not restricted to an electric heater 109, but can be selected or combined according to demands. For instance, from the outsides of the gas tight zone, gas, oil and the like can be combusted or induction heating can be employed to heat. Further, fuel gas obtained from the object 150 can be employed.

The temperature in the first gas tight room 102 is adjusted with an electric heater 109 and a controlling means controlling the electric heater through a not shown temperature sensor and the measured values from the temperature sensor. As a controlling means, a program in which, for instance, the measured values or measured voltages from the temperature sensor are input data, and the signals or the voltages which vary the input electric power to the electric heater are output data, can be mounted on an electronic calculator.

Such a control can be carried out through an analogue circuit, or an operator can operates the heating means according to the temperature.

In the decompression/heating apparatus illustrated in FIG. 41, the temperature in the first gas tight room 102, together with the pressure in the first gas tight room 102 which will be later described, further, together with various conditions in the purge room 101, the second gas tight room 103, the cooling room 104 and opening or closing of the partitions 105, transferring of the object 150, is integrally controlled with a not shown controlling means. The controlling means can be implemented by, for instance, mounting a control program on an electronic calculator. Also to the first gas tight room 102, an exhausting system 110 is connected. The structure of this exhausting system is constituted identical as that of the exhausting system 110 of the purge room 101.

The pressure in the first gas tight room 102 is adjusted with this exhausting system 110 and a not shown vacuum gage which is a pressure sensor. As a vacuum gage, as described above, a Bourdon tube, a Pirani gage can be employed according to demands.

To the first gas tight room 102, a carrier gas introducing system adjusting the oxygen concentration in this room is connected, numeral 112 is a carrier gas introducing valve. This carrier gas introducing system is connected to a not shown carrier gas reservoir.

An oxygen concentration adjusting means can be provided according to demands.

Since decompression of the first gas tight room 102 lowers the temperature elevation efficiency of the object, firstly, when the degree of vacuum is relatively low, the object is heated while adjusting the oxygen concentration, then, the degree of vacuum is heightened. Thus, the temperature elevation efficiency of the object can be heightened.

Here, $N_2$ is employed as a carrier gas but, for instance, noble gas such as Ar also can be used.

By adequately operating the exhausting system 110 and the carrier gas introducing valve 112, the inside of the first gas tight room can be decompressed or pressurized. The pressure adjusting means of this apparatus can adjust the pressure inside the system in the range of from about $10^{-3}$ Torr to $4\times10^3$ Torr. By varying the capacity, volume of the exhausting system, further decompression can be implemented. In addition, by pressurizing the carrier gas in advance, further pressurization can be implemented.

The oxygen concentration in the first gas tight room 102 is adjusted with a carrier gas introducing valve 112 and a not shown oxygen concentration sensor. For the oxygen concentration sensor, such as a zirconia sensor can be used. When the temperature inside the first gas tight room 102 is too low for the zirconia sensor to be able to measure, the temperature of the gas extracted from the inside of the first gas tight room 102, for instance, can be adjusted at about 773K to measure.

Other than the zirconia sensor, for instance, the oxygen concentration of the gas inside the system can be measured with infrared spectrometry.

The oxygen concentration in the first gas tight room 102 can be adjusted through adjustment of the total pressure inside the system instead of, for instance, introduction of carrier gas such as $N_2$.

As described above, the pressure, the oxygen concentration in the first gas tight room 102 can be controlled in an identical manner as the temperature. For instance, a program in which the measured values or the measured voltages from the pressure sensor, the oxygen concentration sensor are inputted as input data, and the signals or the voltages which controls the valve of the exhausting system 110, a carrier gas introducing valve 112 are outputted, can be mounted on an electronic calculator as a controlling means.

Between the first gas tight room 102 and the exhausting system 110, a recovering chamber 111 recovering the gaseous state metal vaporized from the object 150 is disposed. The recovering chamber 111 cools the metal vaporized in the chamber down to melting point or less to condense/recover. The inside of the recovering chamber 111 can be formed in a counter-flow structure or in a spiral structure, for example. Instead, between the recovering chamber 111 and the first gas tight room 102, between the recovering chamber 111 and the exhausting system 110, a valve or a partition capable of being opened or closed can be disposed.

That is, when the metal vaporized from the object 150 is introduced into the recovering chamber 111, the recovering chamber 111 is closed to cool the metal to condense, thereby recovering.

When the hazardous gas is discharged from the object 150, the exhaust gas of the exhaust system is introduced into the gas decomposition device 30 to render non-hazardous. Further, the posterior stages of the exhausting systems 106, 110, 114, 115 all of which are connected to respective rooms can be connected to the gas decomposition apparatus 30.

The temperature, the pressure, the oxygen concentration in the first gas tight room 102 are controlled in the above described manner. Therefore, the constituent metals of the object 150 can be selectively vaporized to recover.

When the processing in the first gas tight room 102 is finished, a predetermined metal has been removed from the object but 150, if the metal of higher boiling point is intended to be recovered, between the first gas tight room 102 and the cooling room 104, a second gas tight room 103 can be provided.

In the decompression/heating apparatus 100 which is provided to the processing apparatus of the present invention, the object 150 heated in the gas tight room 102 is transferred into the second gas tight room 103 without being cooled, therefore, thermal efficiency is very high.

The second gas tight room 103 is a processing room further vaporizing selectively and recovering the constituent metals of the object 150 from the object 150.

The second gas tight room 103 is provided with an electric heater 109 as a heating means as identical as the first gas tight room. The heating means is not restricted to an electric heater 109, selection or combination can be employed according to requirements.

As described above, the temperature in the second gas tight room 103 is controlled with an electric heater 113 and a not shown temperature sensor as identical as the inside of the first gas tight room 102. That is, the temperature in the second gas tight room 103, together with the pressure, oxygen concentration in the second gas tight room 103, and together with various conditions of the purge room 101, the first gas tight room 102, the cooling room 104 and opening or closing of the partitions 105, is integrally controlled by a not shown controlling means.

The exhausting system 114 is connected to the second gas tight room 103, too. The structure of this exhausting system is constituted as identical as the exhausting system 114 of the purge room 101.

The pressure in the second gas tight room 103 is adjusted with the exhausting system 114 and a not shown vacuum gage which is a pressure sensor. As a vacuum gage, as identical as the above, a Bourdon tube, a Pirani gage and the like can be employed according to requirements.

To the second gas tight room 103, a carrier gas introducing system is connected to adjust the oxygen concentration in this room, wherein numeral 112 is a carrier gas introducing valve. The carrier gas introducing system is connected to a not shown carrier gas reservoir. Here, $N_2$ is employed as a carrier gas but, for instance, noble gas such as Ar can be used.

By adequately operating the exhausting system 114 and the carrier gas introducing valve 112, the inside of the first gas tight room can be decompressed or pressurized. In this apparatus, the pressure in the system can be adjusted in the range of $10^{-3}$ Torr to $4\times10^3$ Torr. By varying the capacity, volume of the exhausting system, further decompression can be implemented. Further, by pressurizing the carrier gas in advance, further pressurization can be attained.

Accompanying decompression of the inside of the second gas tight room 103, the vapor pressure (boiling point)of a constituent metal of the object 150 diminishes, thereby, the metal can be vaporized at a more lower temperature. Therefore, capacity of the heating means, the exhausting means which are provided to the second gas tight room 103 can be varied according to the kinds of metal to be separated/recovered from the object 150. For instance, to heat the inside of the second gas tight room 103 to a further higher temperature, an induction heating means can be provided. In addition, for instance, to decompress the inside of the second gas tight room 103 to a further higher vacuum, a vacuum pump of a large capacity and of a large exhausting volume can be provided. Depending on the volume of the second gas tight room 103, an ion getting pump, a turbo molecular pump and the like can be employed to attain a further higher vacuum.

Because the inside of the system is sufficiently decompressed, the oxygen concentration in the second gas tight room 103 is enough low even without being particularly adjusted. Therefore, not required to be adjusted positively, in the case when the oxygen concentration adjusting means is provided, it can be provided as identical as the first gas tight room 102.

Further, in the decompression/heating device 100, illustrated in FIG. 41, a structure provided with one room of the second gas tight room 103 is illustrated, but a plurality of the second gas tight rooms 103 can be provided. By providing a plurality of the second gas tight rooms 103 different in their inside temperature condition, pressure condition, a plurality of metals different in their vapor pressures each other can be vaporized from the object 150 to recover.

Further, when there is no necessity to separate/recover the metals by each element from the object 150, a plurality of metals can be vaporized from the object 150 to recover. For instance, when a Pb—Sn alloy is removed from the object, by heating at a temperature where Pb and Sn vaporize under a pressure of the inside of the second gas tight room 103, Pb and Sn can be recovered. Naturally, by selectively vaporizing Pb and Sn, each metal can be recovered.

Between the second gas tight room 103 and the exhausting system 114, a recovering chamber 115 recovering gaseous metals vaporized from the object 150 is disposed. This recovering chamber cools the metals vaporized in the chamber below their melting points to condense and recover. The inside of the chamber can be structured to have a counter-flow structure or a spiral structure. Instead, between the recovering chamber 115 and the second gas tight room 103, between the recovering chamber 115 and the exhausting system 114, a valve or a partition capable of being opened or closed can be disposed. That is, when the metals vaporized from the object 150 is introduced into the recovering chamber 115, the recovering chamber 115 is closed to cool and condense the metals, thus recovering them.

Whether the vaporized metals are continuously condensed, recovered, or are condensed, recovered by a batch processing, the longer residence time of the vaporized metals in the recovering chamber 115 heightens the recovering efficiency.

In addition, $N_2$ or noble gas can be introduced into the second gas tight room 103 as a carrier gas. The vaporized metals are efficiently introduced into the recovering chamber with the carrier gas.

The second gas tight room 103 can be provided with a plurality of recovering chambers 115. The same metal can be recovered with the plurality of recovering chambers 115, or a plurality of metals can be selectively vaporized by gradually adjusting the temperature and the pressure in the second gas tight room 103 and can be recovered by switching between the plurality of recovering chambers 115.

The temperature, pressure, oxygen concentration in the second gas tight room 103 are controlled in the above described manner. Therefore, by vaporizing the constituent metals of the object 150 according to their vapor pressures, they can be recovered in their metallic state in the recovering chamber 115.

Further, depending on the degree of decomposition of the constituent resins of the object 150 at the first pyrolyzing means, the constituent resins may discharge the decomposition product gas and the like. Such a decomposition product gas can be processed by connecting the posterior stage of the recovering chamber 115 to the gas decomposition apparatus 30.

Thus, even in the second gas tight room 103, the predetermined metal can be vaporized and recovered from the object 150.

If the object 150 is directly pulled out outside the apparatus 100 from the second gas tight room 103, the object 150 is likely to be rapidly oxidized. Further, being inevitably required to return the inside of the second gas tight room 103 to the atmospheric pressure, it is inconvenient from the view point of maintaining gas tightness of the second gas tight room 103. Therefore, in the decompression/heating apparatus 100 illustrated in FIG. 41, a cooling room 104 is provided with at the posterior stage of the second gas tight room 103.

The cooling room is provided with a pressure adjusting means, an oxygen concentration adjusting means as identical as those of the purge room 101, the first gas tight room 102, the second gas tight room 103. That is, the exhausting system 116 identical that described above, a carrier gas introducing valve 117 are provided.

The object 150 from which a predetermined metal is separated in the second gas tight room 103 is transferred to the cooling room 104 to cool under a condition where the pressure and the oxygen concentration are adjusted. The carrier gas not only adjust the oxygen concentration but also functions as a cooling gas of the object 150.

Between the cooling room 104 and the exhausting system 116, a trap 118 eliminating the gas discharged from the object due to preparatory heating can be disposed.

After the object 150 is sufficiently cooled in the cooling room 104, the object is taken out outside the device.

Incidentally, introduction into, take-out of the object 150 from the decompression/heating apparatus 100 and transfer of the object 150 between respective rooms can be carried out by a pusher 130, a drawer 131.

Operation of the pusher 130 and the drawer 131, together with opening and closing of the partition 105, can be carried out by the above described, not shown controlling means.

Figure 42:
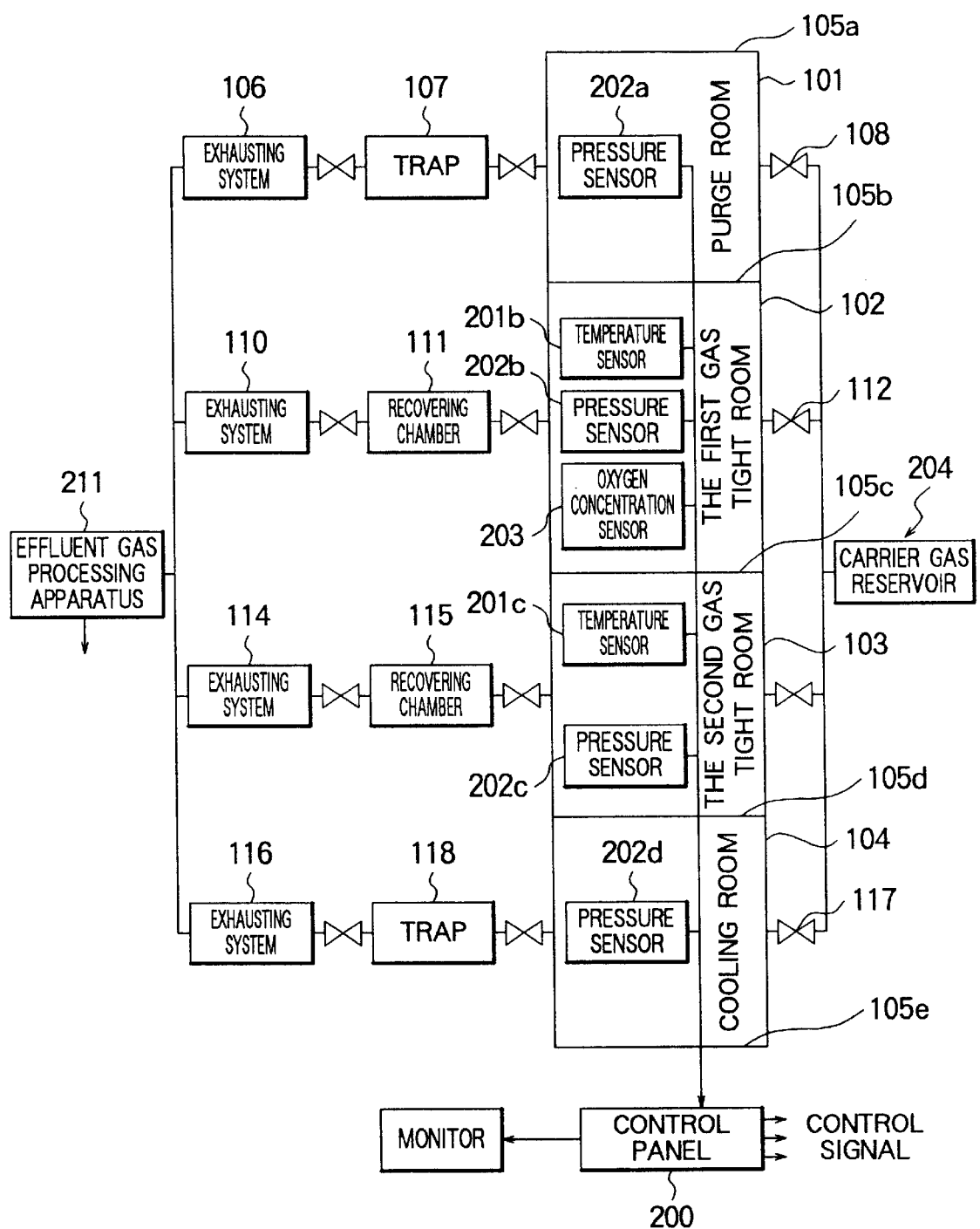
FIG. 42 is a diagram schematically showing the processing apparatus of the present invention illustrated in FIG. 41.

FIG. 42 is a diagram schematically showing a decompressing/heating apparatus provided to the processing apparatus of the present invention illustrated in FIG. 41.

Signals from a pressure sensor 202a in the purge room 101, a temperature sensor 201a, a pressure sensor 202b, an oxygen concentration sensor 203 in the first gas tight room 102, a temperature sensor 201c, an pressure sensor 202c in the second gas tight room 103, a pressure sensor 202d in the cooling room 104, all of them are not shown in FIG. 41, are transmitted to a control panel 200 constituting a controlling means. The controlling means can be constituted by mounting a program on an electronic calculator.

In addition, the controlling means controls the heating means, the pressure adjusting means, the oxygen concentration adjusting means according to the states in the respective rooms of the apparatus. Further, opening or closing of the partition 105, transfer of the object 150 with the pusher 130, the drawer 131 can be carried out with this controlling means. Numeral 210 is a monitor displaying to an operator the state of temperature, pressure, oxygen concentration of the respective rooms, opening or closing state of the partition 105. Further, numeral 211 is a gaseous effluent processing system processing the previously mentioned gaseous effluent.

(Embodiment 4)

Figure 43:
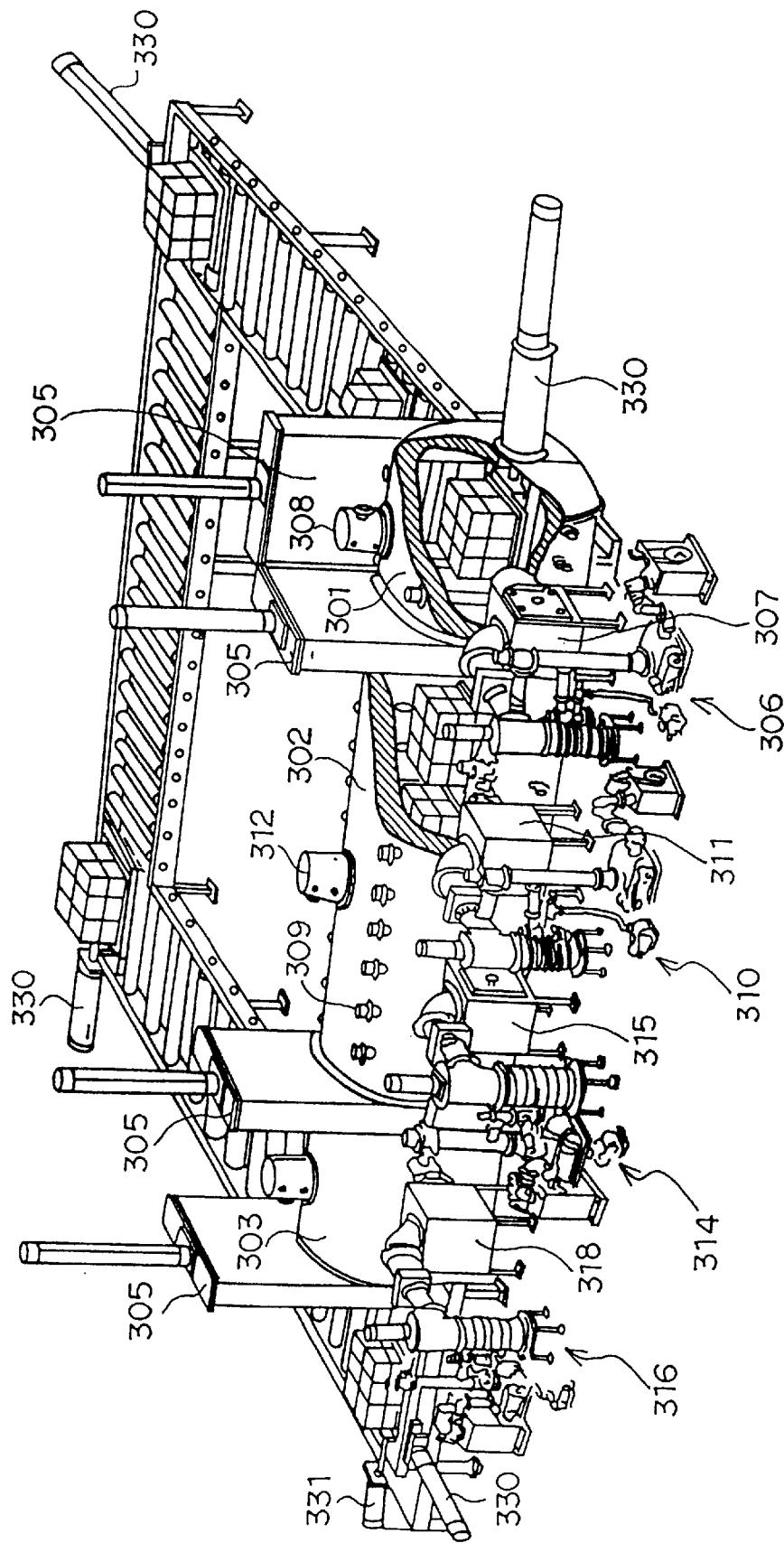
FIG. 43 is a diagram outlining another example of a processing apparatus of the present invention.

FIG. 43 is a diagram roughly showing another example of a decompression/heating apparatus provided to the processing apparatus of the present invention. The inside state is shown by partly cutting off. This decompression/heating apparatus 300 also processes the pyrolysis residue and the like of an object 350 which has resin and metal as its constituent members.

The decompression/heating apparatus 300 is composed of a purge room 301, a gas tight room 302, a cooling room 303. The gas tight room 300 is provided with a combined function of both the first gas tight room 102 and the second gas tight room 103 of the decompression/heating apparatus 100 illustrated in FIG. 41.

That is, in the gas tight room 302, firstly, the predetermined metal is separated and recovered from the object 350, then, in the same gas tight room 302, another metal is separated and recovered.

The gas tight room 302 is provided with a temperature adjusting means, a pressure adjusting means, an oxygen concentration adjusting means, but the oxygen concentration may be adjusted, as described above, through the total pressure in the gas tight room 302.

Temperature adjustment in the gas tight room 302 can be carried out with an electric heater 309 and a not shown temperature sensor.

Pressure adjustment in the gas tight room 302 can be carried out with exhausting systems 310, 314 and a carrier gas introducing system and a not shown pressure sensor. Numeral 312 is a carrier gas introducing valve.

Between the gas tight room 302 and the exhausting system 310, a recovering chamber 311, which is a condensation/recovering means, recovering the metal vaporized from the object 350 is disposed. Further, between the gas tight room 302 and the exhausting system 314, a recovering chamber 315, which is a condensation/recovering means, recovering the gas of another constituent metal vaporized from the object 350 is disposed. When vaporization of the constituent metal of the object is not required, a plurality of recovering chambers 311 can be disposed.

The purge room 301, cooling room 303, partition 305, carrier gas introducing system, pusher 330, drawer 331 are provided as identical as the decompression/heating apparatus 100 illustrated in FIG. 41. Further, the controlling means can be provided in the same manner.

Thus, the processing apparatus of the present invention, by combining a portion pyrolyzing the constituent resin of the object and a portion separating and recovering the constituent metal from the object of which resin is pyrolyzed, can be drastically enlarged in its category of processable object. For instance, the object, of which processing is conventionally difficult and of which the effective, safe processing technology has not been established yet, such as waste circuit board, wastes of home electric appliances, shredder dust can be also processed.

For instance, in the processing of the resin coated aluminum foil, by pyrolyzing the resin portion under a controlled atmosphere, aluminum can be recovered in a metallic state.

In addition, a mounted substrate in which the electronic components are mounted on a substrate can be processed after vaporization of solder alloy to recover, thus separating the substrate and the electronic component.

(Embodiment 5)

Figure 44:
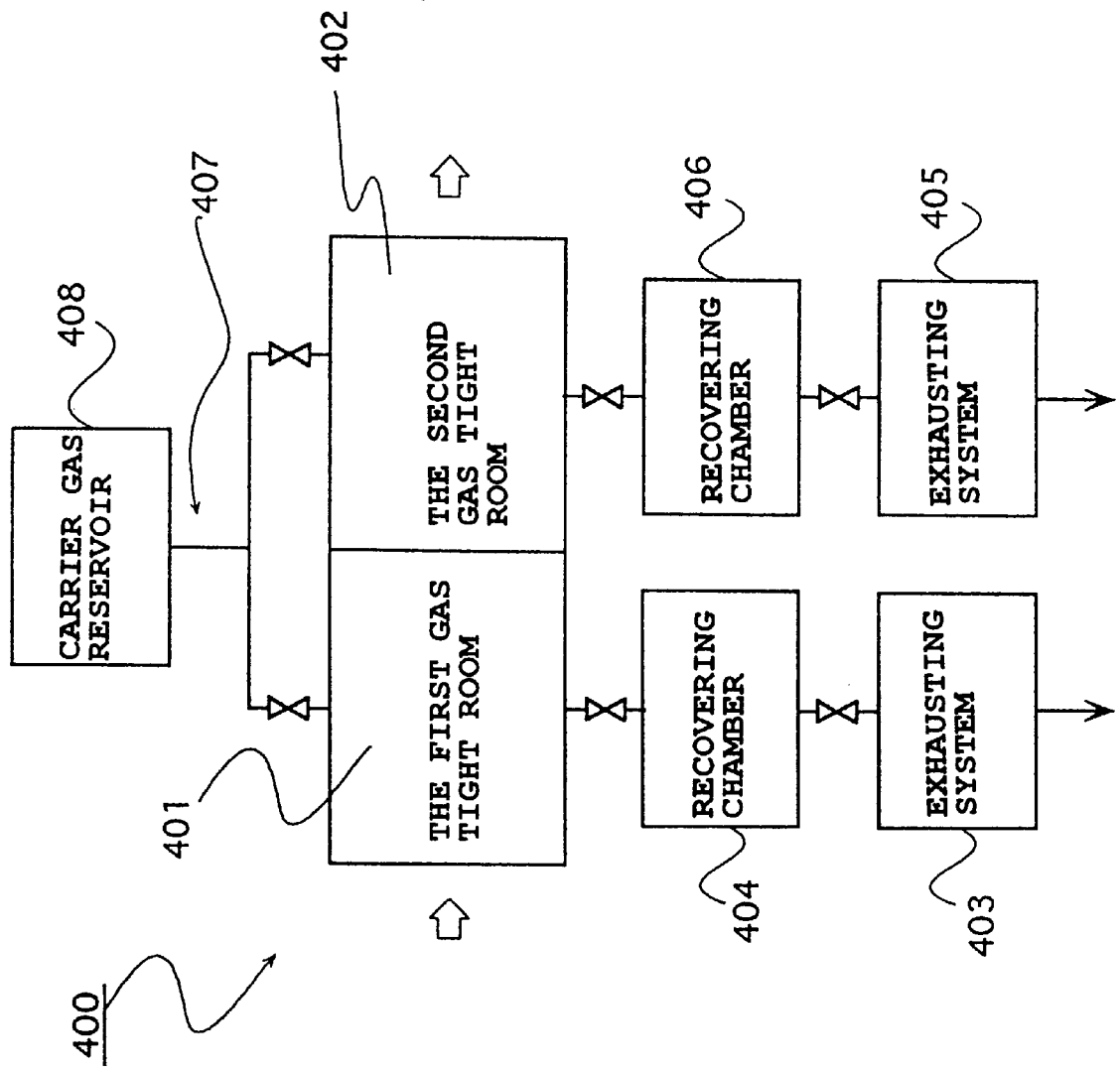
FIG. 44 is a diagram schematically showing another example of a processing apparatus of the present invention.

FIG. 44 is a diagram schematically showing another example of the decompression/heating apparatus which is provided to the processing apparatus of the present invention.

The decompression/heating apparatus 400 is provided with a first gas tight room 401 and a second gas tight room 402. The. first gas tight room 401 is provided with a not shown temperature adjusting means, and is connected to an exhausting system 403 and a recovering chamber 404. The second gas tight room is provided with a not shown temperature adjusting means, and is connected to an exhausting system 405 and a recovering chamber 406. Further, to the first gas tight room 401 and the second gas tight room 402, carrier gas introducing systems 407 are connected to adjust, pressurize the oxygen concentration in the gas tight room. Numeral 408 is a carrier gas reservoir.

That is, the pyrolysis residue and the like of the object possessing resin and metal is heated in the first gas tight room 401 under decompression, the vaporized metals are recovered in the recovering chamber 404. In this time, through adjustment of the temperature, pressure, oxygen concentration in the first gas tight room 401 with the above described controlling means and the like, the desired metal is vaporized while maintaining the state of other constituent metals of the object.

In the second gas tight room 402, by adjusting the temperature, pressure of the inside to vaporize still another constituent metal, the metal is recovered in the recovering chamber 406. The temperature, pressure in the second gas tight room 402 also can be adjusted with the similar controlling means as the first gas tight room 401.

Before the first gas tight room 401 or after the second gas tight room 402, a purge room can be disposed.

(Embodiment 6)

Figure 45:
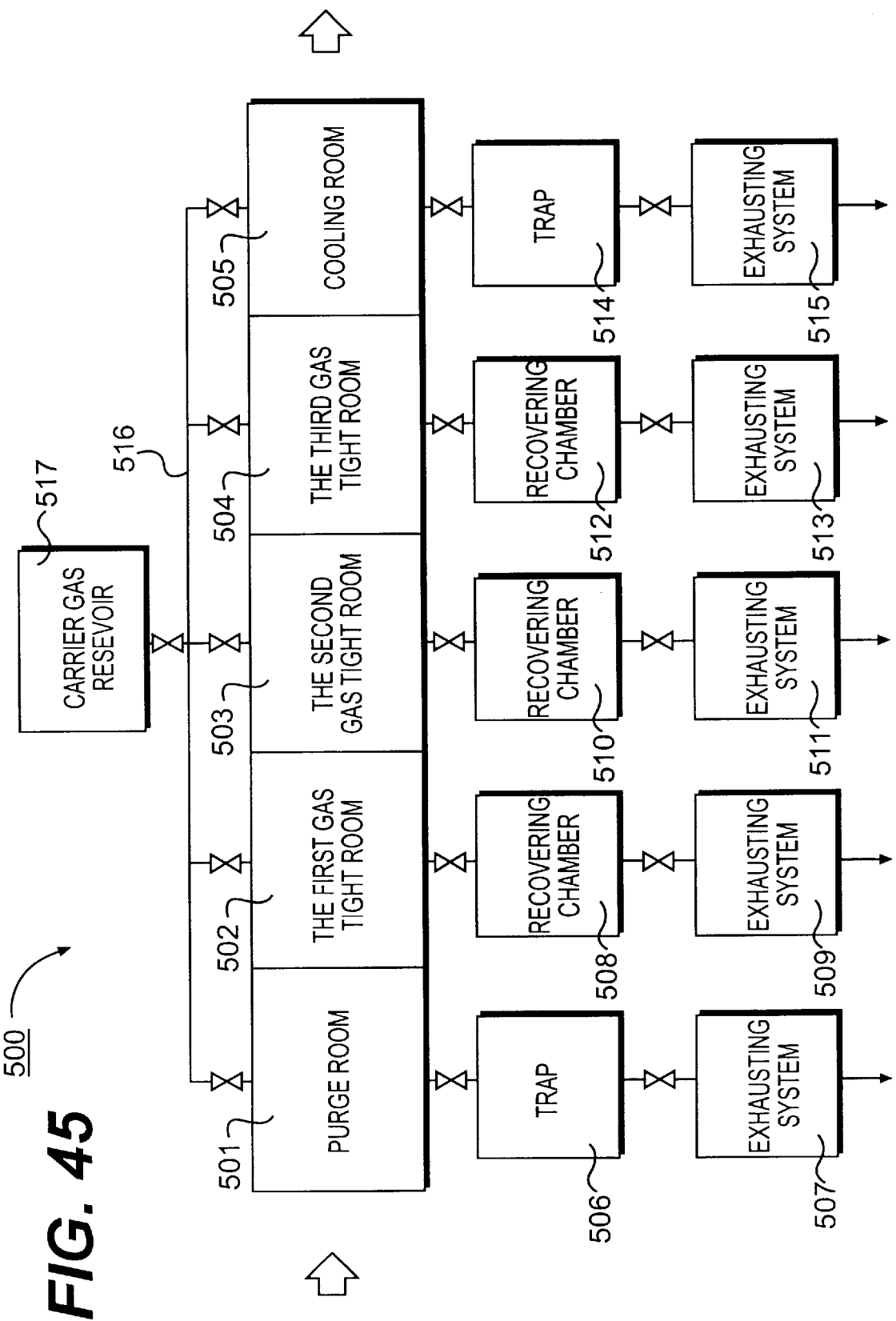
FIG. 45 is a diagram schematically showing another example of a processing apparatus of the present invention.

FIG. 45 is a diagram schematically showing another example of the decompression/heating apparatus which is provided to the processing apparatus of the present invention.

This decompression/heating apparatus 500 processes the object possessing resin and metal as its constituent members, and is provided with a purge room 501, a first gas tight room 502, a second gas tight room 503, a third gas tight room 504, a cooling room 505.

The purge room 501 is connected to a trap 506 and an exhausting system 507. The first gas tight room 502 is connected to a recovering chamber 508 and an exhausting system 509. The second gas tight room 503 is connected to a recovering chamber 510 and an exhausting system 511. The third gas tight room 504 is connected to a recovering chamber 512 and an exhausting system 513. The cooling room 505 is connected to a trap 514 and an exhausting system 515. The first gas tight room 502, the second gas tight room 503, the third gas tight room 504 are provided with not shown temperature adjustment means. Numeral 516 is a carrier gas introducing system, numeral 517 is a carrier gas reservoir.

Further, the first gas tight room 502 is provided with a not shown oxygen concentration sensor, the oxygen concentration in the system can be adjusted independently of the total pressure.

That is, the decompression/heating apparatus 500 is provided with a plurality of processing rooms vaporizing the constituent metals of the object. Even when the object possesses a plurality of the constituent metals, in the second gas tight room 503 and the third gas tight room 504, each of them can be selectively vaporized to be recovered.

(Embodiment 7)

Figure 46:
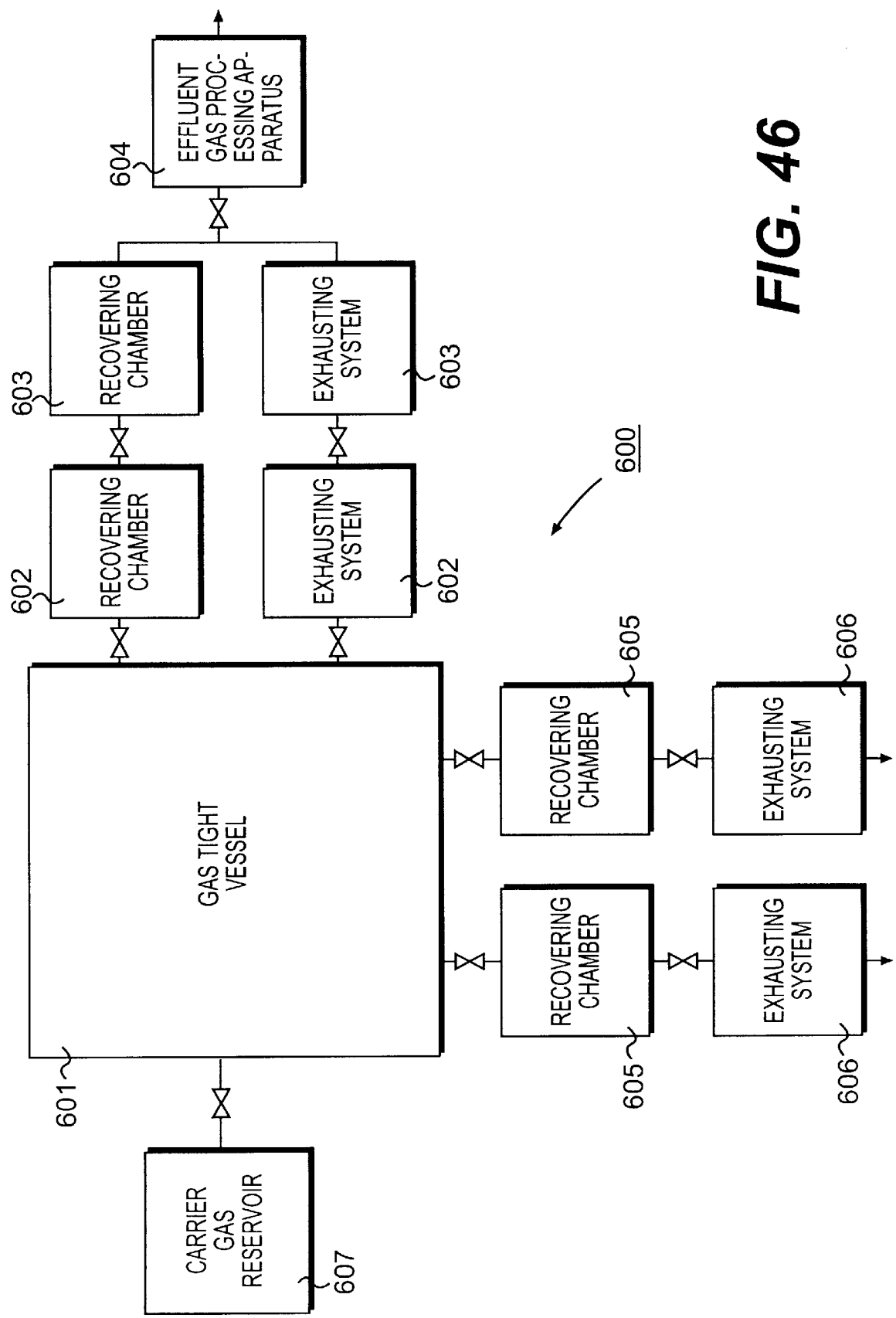
FIG. 46 is a diagram schematically showing another example of a processing apparatus of the present invention.

FIG. 46 is a diagram schematically showing another example of the processing apparatus which is provided to the decompression/heating apparatus of the present invention.

The decompression/heating apparatus 600 is an apparatus which can process the pyrolysis residue of the object possessing resin and metal as its constituent members. In this decompression/heating apparatus 600, a plurality of recovering systems are connected to one gas tight chamber 601, the recovering systems are switched between themselves to process according to the temperature, pressure, oxygen concentration in the gas tight chamber 601.

(Embodiment 8)

Figure 47:
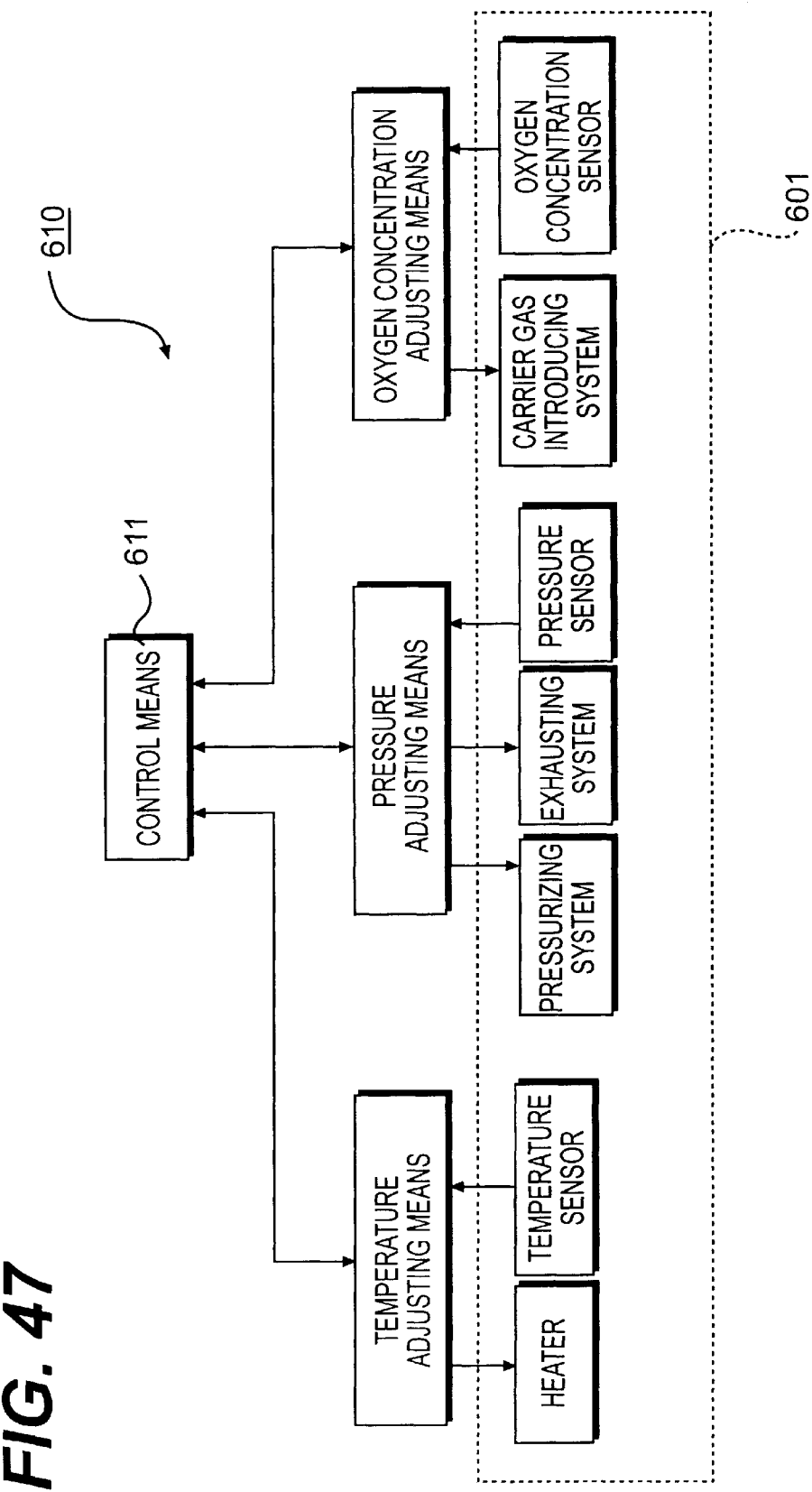
FIG. 47 is a diagram schematically showing a constitution of a controlling system adjusting temperature, pressure, oxygen concentration of the processing apparatus of the present invention.

FIG. 47 is a diagram schematically showing a structure of a controlling system 610 adjusting the temperature, pressure, oxygen concentration in the gas tight chamber 601. As described above, all or a part of the controlling means 611 can be mounted as, for instance, a control program on an electronic calculator to control the apparatus.

To the gas tight chamber 601, a plurality of systems of the recovering chambers 602 are connected to recover the gas of the vaporized constituent metal of the object, the respective recovering chamber 602 being connected to the exhausting system 603.

To the gas tight chamber 601, a plurality of systems of the recovering chambers 605 are connected to recover the constituent metal of the object vaporized in the gas tight chamber 601, respective recovering chamber being connected to the exhausting system 606.

The same metal can be recovered with the plurality of systems of the recovering chambers 605 connected to the gas tight chamber 601. Further, by switching according to the temperature, pressure condition in the gas tight chamber 601, a plurality of metals different in their vapor pressures (boiling point) can be recovered, respectively.

Further, a carrier gas introducing system is connected to the gas tight chamber 601. Numeral 607 is a carrier gas reservoir. By introducing a carrier gas such as $N_2$, Ar, the oxygen concentration in the gas tight chamber 601 can be adjusted independently of the total pressure. Further, by introducing a carrier gas pressurized in advance, the inside of the gas tight chamber 601 can be pressurized. By heating the object in a non-oxidizing atmosphere, temperature elevation efficiency of the object can be enhanced.

Further, the oxygen concentration in the gas tight chamber 601 can be adjusted through the total pressure.

(Embodiment 9)

Figure 48:
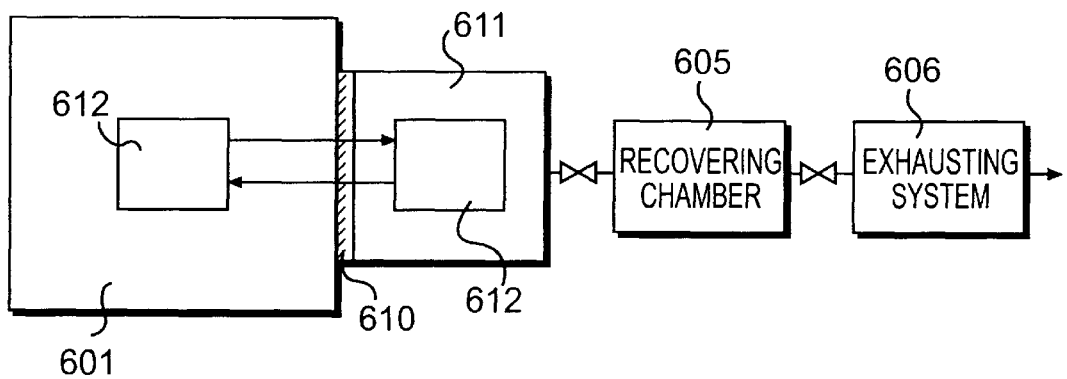
FIG. 48 is a diagram schematically showing another example of a processing apparatus of the present invention.

FIG. 48 is a diagram schematically showing another example of the recovering system of the decompression/heating apparatus which is provided to the processing apparatus of the present invention.

The decompression/heating apparatus possesses the similar structure with the decompression/heating apparatus illustrated in FIG. 46, but other portion than the recovering system is omitted in the figure.

A recovering room 611 is disposed while being separated from a gas tight chamber 601 by a partition 610 capable of being opened or closed. The recovering room 611 is provided with a not shown temperature adjusting means. To the recovering room 611, a carrier gas introducing system can be connected.

In addition, a recovering chamber 605 and an exhausting system 606 are connected to the recovering room 611.

When the inside of the gas tight chamber 601 reaches the temperature, the pressure condition where the predetermined metal can be vaporized, the partition 610 is opened to introduce the object 612 into the recovering room 611, then the partition 610 is closed. While maintaining the temperature, the pressure condition, the metal vaporized by the recovering chamber 605 can be condensed to recover.

When such a recovering room 611 is provided, even during recovery of the metal from the object at the recovering room 611, such conditions as the temperature, the pressure, the oxygen concentration in the gas tight chamber 601 can be controlled independently of those of the recovering room 611. Therefore, the operating efficiency of the apparatus can be enhanced.

Such a recovering room can be provided to the decompression/heating apparatus illustrated in, for example, FIG. 41, FIG. 43, FIG. 44, FIG. 45.

Figure 49:
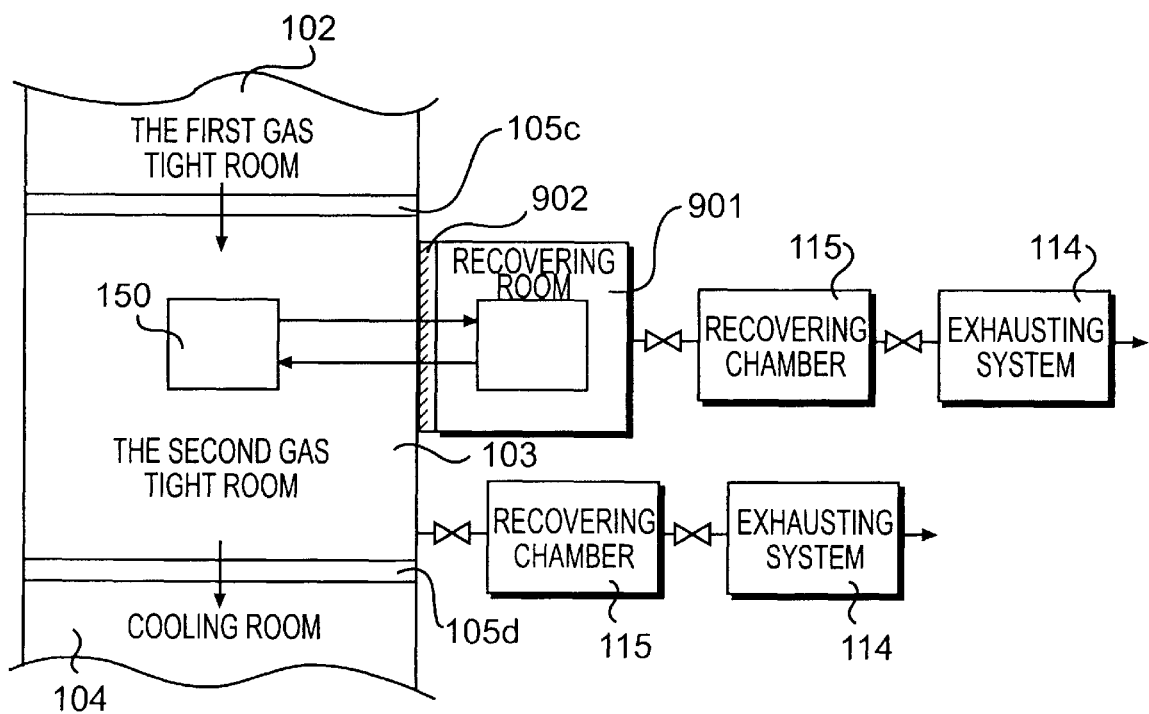
FIG. 49 is a diagram schematically showing a recovering system including a recovering room connected to the processing apparatus of the present invention.

FIG. 49 is a diagram schematically showing a recovering system including a recovering room 901 connected to the decompression/heating apparatus 100 illustrated in FIG. 41, for example.

The recovering room 901 is connected to the second gas tight room 103 of the decompression/heating apparatus 100, and, the second gas tight room 103 and the recovering room 901 are separated by a partition 902 capable of being opened or closed. The recovering room 901 is provided with a not shown temperature adjusting means. A carrier gas introducing system can be connected to. To the recovering room 901, a recovering chamber 115, an exhausting system 114 are connected. Further, a recovering chamber 115, an exhausting system 114 can be connected in parallel to the recovering room 901.

(Embodiment 10)

Figure 50:
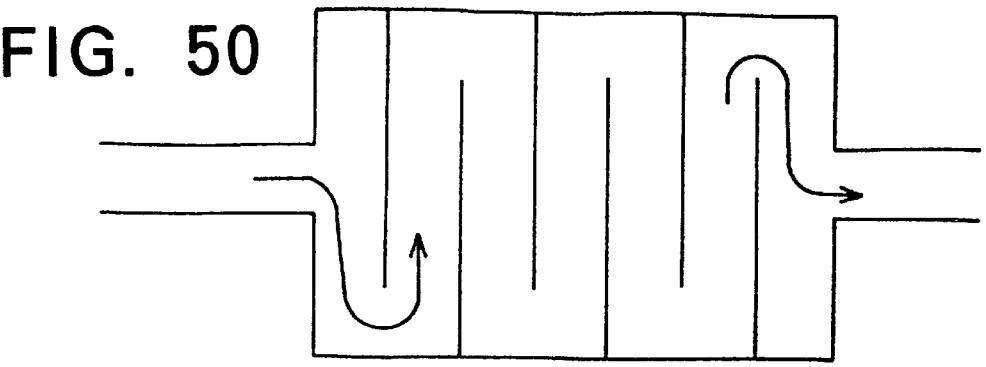
FIG. 50 is a diagram outlining one example of a structure of a recovering chamber.
Figure 51:
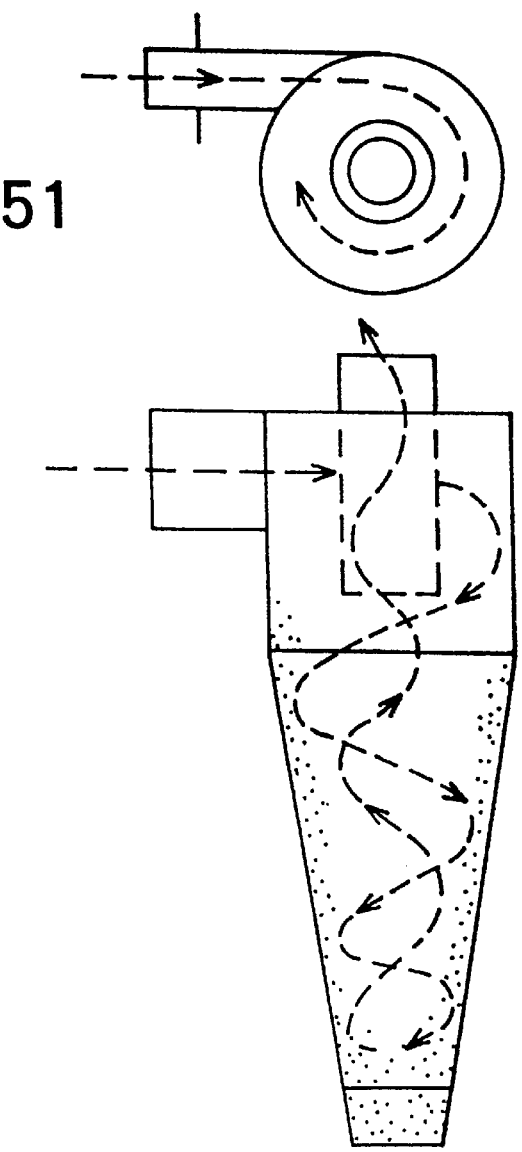
FIG. 51 is a diagram outlining one example of a structure of a recovering chamber.

FIG. 50 and FIG. 51 are diagrams outlining one example of a structure of the recovering chamber.

FIG. 50 illustrates a recovering chamber of a counterflow structure, FIG. 51 illustrates a recovering chamber of a cyclone type structure, respectively. The recovering chamber needs only condense the metal vaporized from the object. Further, these chambers can be connected in multiple stages. FIG. 12 is a diagram outlining one example of a structure of an exhaust gas processing apparatus processing the exhaust gas exhausted from the object and not recovered by the recovering chamber and the like. To the posterior stage of the recovering chamber or the recovering system such as the recovering chamber, a multiplicity of exhaust gas processing filters 1201, filter 1202 for making smokeless, filter 1203 for rendering odorless are connected. Other than these, for instance, an alkali trap recovering halogen gas or a halogenated hydrocarbon decomposition apparatus which employs a catalyst can be provided to.

Thus, the processing apparatus of the present invention can separate and recover the constituent resin through decomposition (vaporization, conversion to oil, carbonization), and the constituent metal through vaporization, respectively from an object possessing resin and metal as constituent members.

(Embodiment 11)

Next, a processing procedure eliminating lead from an object possessing lead and resin as a part of constituent member will be described.

The present invention can effectively process an object in which lead and resin are used for at least a part of the constituent member. For instance, lead can be eliminated from an electronic element of an electronic instrument or an automobile in which, for instance, an alloy containing lead such as Pb—Sn based alloy and the like is used,.

In the present invention, firstly, with a first pyrolyzing means, a resin portion is pyrolyzed such as vaporization, conversion to oil, carbonization, then, lead is vaporized from the pyrolysis residue to separate. The vaporized lead can be recovered. For this apparatus, the above described processing apparatus of the present invention can be employed.

At first, the object is pyrolyzed in such a manner that lead of the object is not oxidized as much as possible and is not vaporized as much as possible.

The resin starts to melt at around 50° C., and by holding at around 200 to 600° C., hydrocarbon based gas mainly of C1 to C8 is discharged due to decomposition. The gaseous effluent such as the decomposition product gas of the resin like this can be recovered at the above described gaseous effluent processing system.

The pyrolysis step is preferred to be carried out in a reducing atmosphere by adjusting the oxygen concentration as previously described. Through adjustment of the oxygen concentration, the recovering efficiency of the decomposition product gas of the resin can be improved. Further, lead can be prevented from being oxidized. Since lead oxide is vaporized at a lower temperature lower than lead, by adjusting the oxygen concentration, scattering of lead can be prevented, and, at later step, more positively, lead can be recovered, accordingly. Further, generation of dioxins in the gaseous effluent processing system can be suppressed.

After the object pyrolyzed as described above is introduced into the decompression/heating means, by adjusting the temperature and the pressure, lead is vaporized from the object. When the object contains metals such as iron, copper, aluminum, tin and the like other than lead, each metal can be selectively vaporized according to difference of their vapor pressure.

The temperature at which lead vaporizes varies according to the pressure in the gas tight chamber. When heated at, for example, 1400° C. under the atmospheric pressure, the vapor pressure of lead is 84 mmHg, but vapor pressures of iron, copper, tin do not reach even to 1 mmHg. Therefore, by heating the object at about 1400° C., only lead vapor can be selectively vaporized from the object.

Further, the vapor pressure of lead heated at, for instance, 1740° C. is 760 mmHg but that of tin does not reach even to 15 mmHg, that of copper does not reach even to 3 mmHg. Therefore, also by heating to about 1740° C., almost lead vapor only can be selectively vaporized from the object.

Further, by heating the object under a decompression condition, lead can be selectively vaporized at a further lower temperature.

When the pressure is adjusted to $10^{-1}$ Torr, by heating to about 827° C., almost lead vapor only can be selectively vaporized from the object.

Further, when the pressure is adjusted to $10^{-3}$ Torr, by heating to about 627° C., almost lead vapor only can be selectively vaporized from the object.

Still further, when the pressure is adjusted to $10^{-4}$ Torr, by heating to about 427° C., almost lead vapor only can be selectively vaporized from the object. The lead vapor thus selectively vaporized can be recovered as lead metal with a recovering device cooled to, for instance, below the melting point of lead.

Figure 52:
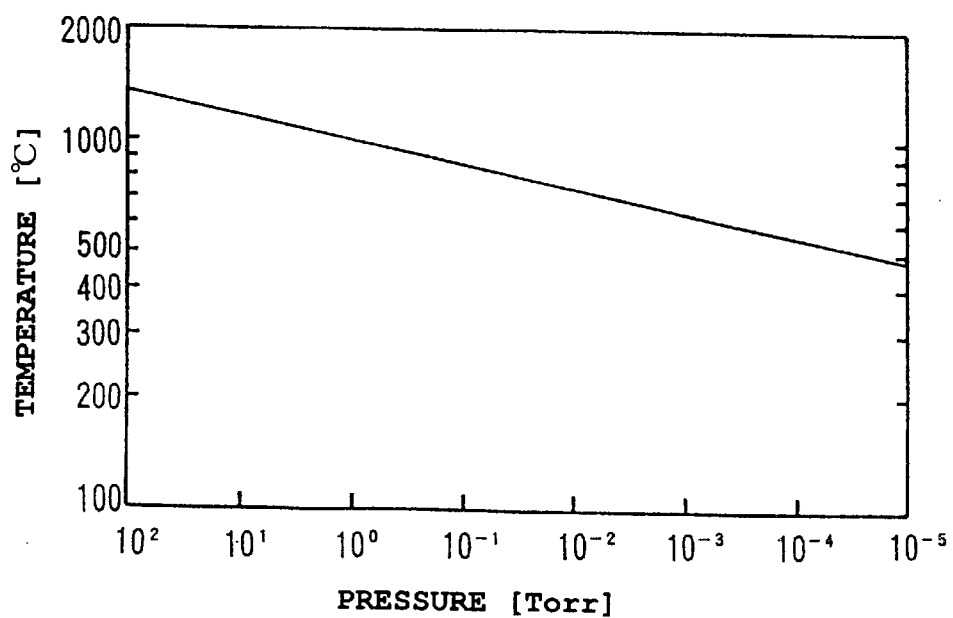
FIG. 52 is a diagram showing temperature dependence of boiling point (vapor pressure) of Pb.

FIG. 52 is a diagram showing a relationship between the vapor pressure of lead and the temperature. It can be seen that, as the inside of the gas tight chamber of the decompression/heating means is decompressed, the boiling point of lead becomes low.

Based on this diagram, according to, for instance, the pressure in the gas tight chamber, the temperature to be heated can be adjusted. Further, by mounting, for instance, this relation on an electronic calculator as a program, it can be used as a control means of the processing apparatus of the present invention.

(Embodiment 12)

An example will be described, wherein, as an example of the object possessing resin and metal as its constituent members, a mounted substrate in which various kinds of electronic elements are mounted on a substrate with a solder alloy including lead is processed as the object.

Figure 53:
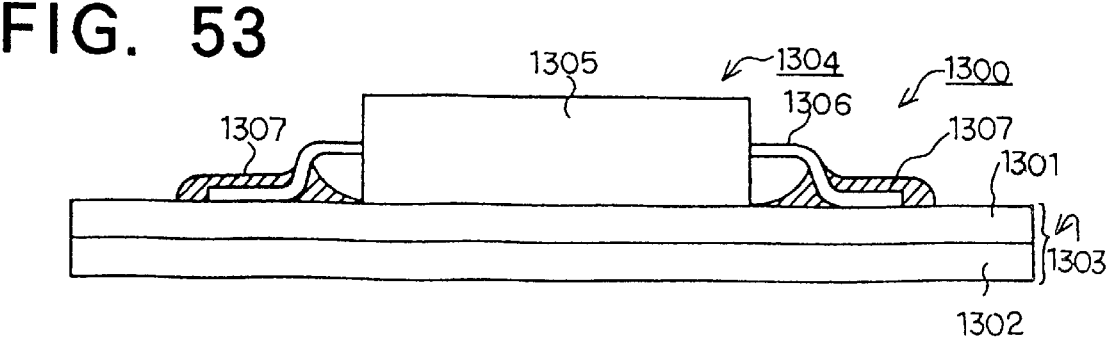
FIG. 53 is a diagram schematically showing an appearance preceding the processing of a packaged substrate, an object being processed.

FIG. 53 is a diagram schematically showing such a mounted substrate 1300.

On a circuit board 1303 in which a copper foil 1301 and resin 1302 are stacked, an electronic element 1304 is mounted. The electronic element 1304 is packaged with a resin 1305. Further, a connecting terminal 1306 of the electronic component and consisting of a copper alloy and a copper foil are connected with a Pb—Sn based solder alloy 1307. Even when the surface of the connecting terminal 1306 of the electronic element is plated by a solder alloy, the same processing can be applied.

First, the mounted substrate 1300 is heated in the first pyrolyzing means under adjustment of the oxygen concentration to pyrolyze the resin 1302, 1303. Since the constituent resin of a printed circuit board is generally a thermosetting resin, much of them is carbonized, but a gaseous effluent including a huge quantity of decomposition product gas is generated. Packaging resin 1303 of the electronic element is pyrolyzed similarly. The gaseous effluent is made non-hazardous by the above described gaseous effluent processing system, and is used as a clean fuel gas.

Figure 54:
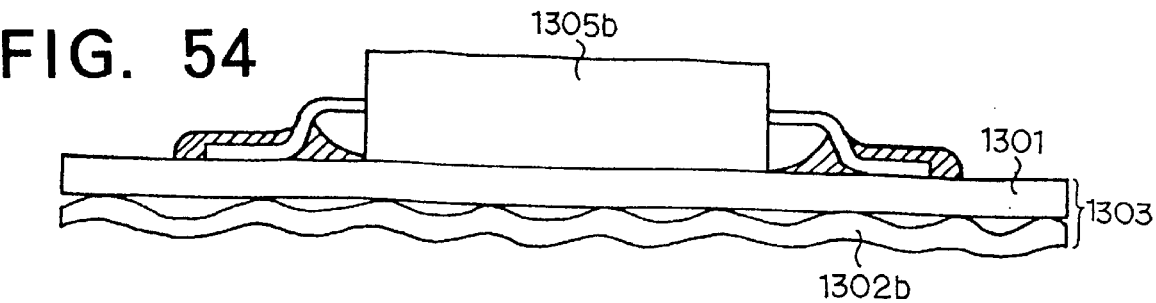
FIG. 54 is a diagram schematically showing an appearance of a packaged substrate of which constituent resin is decomposed.

FIG. 54 is a diagram schematically showing a pyrolyzed mounted substrate 1300.

In this state, much of the constituent resin of the mounted substrate is carbonized. In addition, lead is not scattered due to adjustment of the oxygen concentration.

Next, after the pyrolyzed object is introduced into the decompression/heating means, while adjusting the temperature and the pressure in the gas tight chamber, lead in the object is selectively vaporized. The temperature and the pressure can be determined based on FIG. 52. The inside of the gas tight chamber is preferred to be decompressed. This is because the input energy is less consumed due to the low temperature vaporization of the lead and the lead and the other constituent metals of the object are not oxidized due to the low oxygen concentration. When the constituent metal of the object is likely to be oxidized, the carrier gas such as $N_2$, Ar can be introduced to adjust the oxygen concentration in the gas tight chamber.

Figure 55:
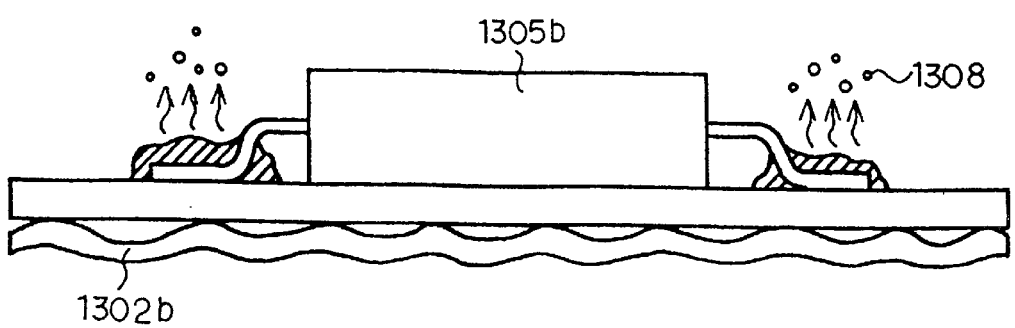
FIG. 55 is a diagram schematically showing a situation of vaporization of lead.

The more the inside of the gas tight chamber is decompressed, at the more lower temperature, lead is vaporized. FIG. 55 is a diagram schematically showing a state where lead 1308 is vaporized as its metallic state.

By adjusting the temperature, the pressure in the gas tight chamber, only lead can be selectively vaporized. When a metal of which melting point is lower than lead is contained in the object, such a metal can be previously evaporated.

Thus, lead can be removed from the mounted substrate 1300 which is an object being processed. Further, by thus processing a huge amount of mounted substrates of such as waste electronic instruments embraced in our society, they can be processed as general wastes, and environmental pollution due to lead elution does not occur. Further, the constituent metals other than lead can be easily separated, and can be used as resource. The constituent resin can be recovered as valuable oil or carbides. The carbide can be utilized as fertilizer, activated charcoal.

In the above, the description has been given up to lead elimination step from the mounted substrate 1300, however, by further adjusting the temperature, the pressure in the gas tight chamber, the other constituent metals than lead can be vaporized.

For instance, from the object from which lead is removed, by further vaporizing tin which constitutes solder alloy, a circuit board 1303 and an electronic element 1304 can be separated.

Figure 56:
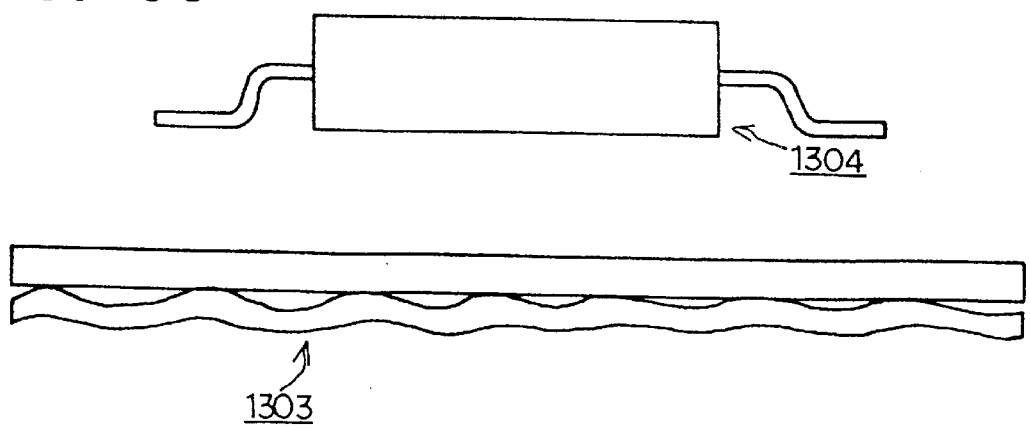
FIG. 56 is a diagram schematically showing a situation wherein a circuit board and an electronic component are separated.

FIG. 56 is a diagram schematically showing a state where a circuit board 1303, from which tin is vaporized, and an electronic element 1304 are separated.

Like this, by removing lead or by separating the circuit board 1303 and the electronic element 1304, complexity of the object can be reduced, thus enabling to be easily processed afterwards. From the electronic component and the like separated from the circuit board, by adjusting the temperature, the pressure in the gas tight chamber, metals such as Au, Ag, Pt, Bi, In, Ta, Ni, Cr, Cu, Al, W, Mo, Co, Pd, for example, which are included in the circuit board 1303, the electronic component 1304 can be vaporized to recover. Such a recovery step can be effectively implemented, after separation of the circuit board 1303 and the electronic component 1304, at a decompression/heating means where another metal of further lower vapor pressure can be recovered.

Figure 57:
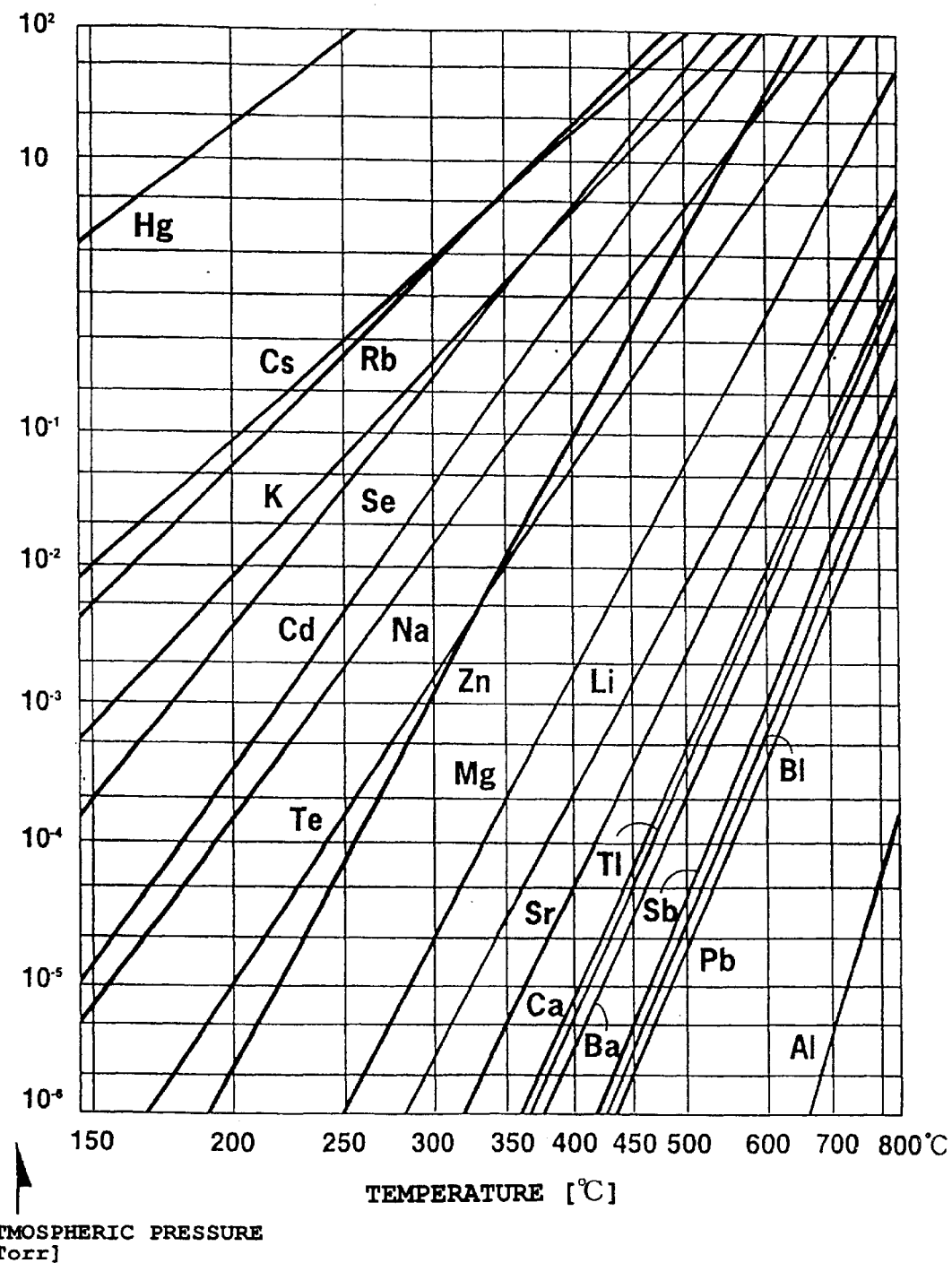
FIG. 57 is a diagram showing pressure dependence of boiling point (vapor pressure) of various kinds of metals.

FIG. 57 is a diagram showing pressure dependence of boiling point(vapor pressure) of various kinds of metals. This figure shows only one example of recoverable metals but also not shown metals can be made recoverable.

Figure 58:
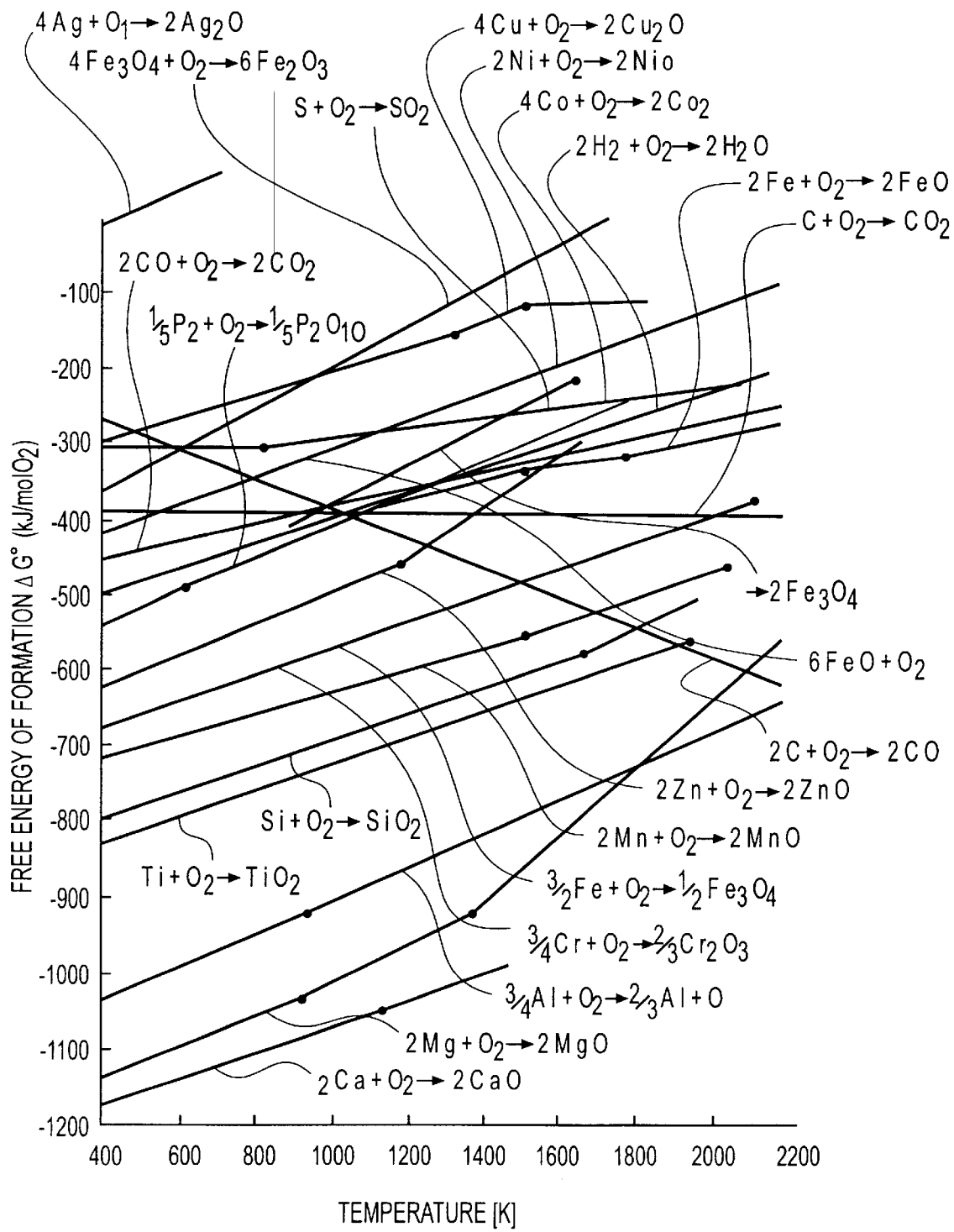
FIG. 58 is a diagram showing temperature dependence of free energy of formation of various kinds of oxides.

FIG. 58 is a diagram showing temperature dependence of the formation free energy of oxides. Elements shown in FIG. 58 are only for example, data of elements other than those can be easily calculated or obtained through data base.

By employing the relation shown in FIG. 57 and FIG. 58 together with the relation between boiling point (vapor pressure) and pressure shown in FIG. 52, the temperature, the pressure, the oxygen concentration, for example, in the gas tight chamber can be controlled.

Further, this relation can be mounted on an electronic calculator as a program and can be used as a control means of the processing apparatus of the present invention.

(Embodiment 13)

Figure 59:
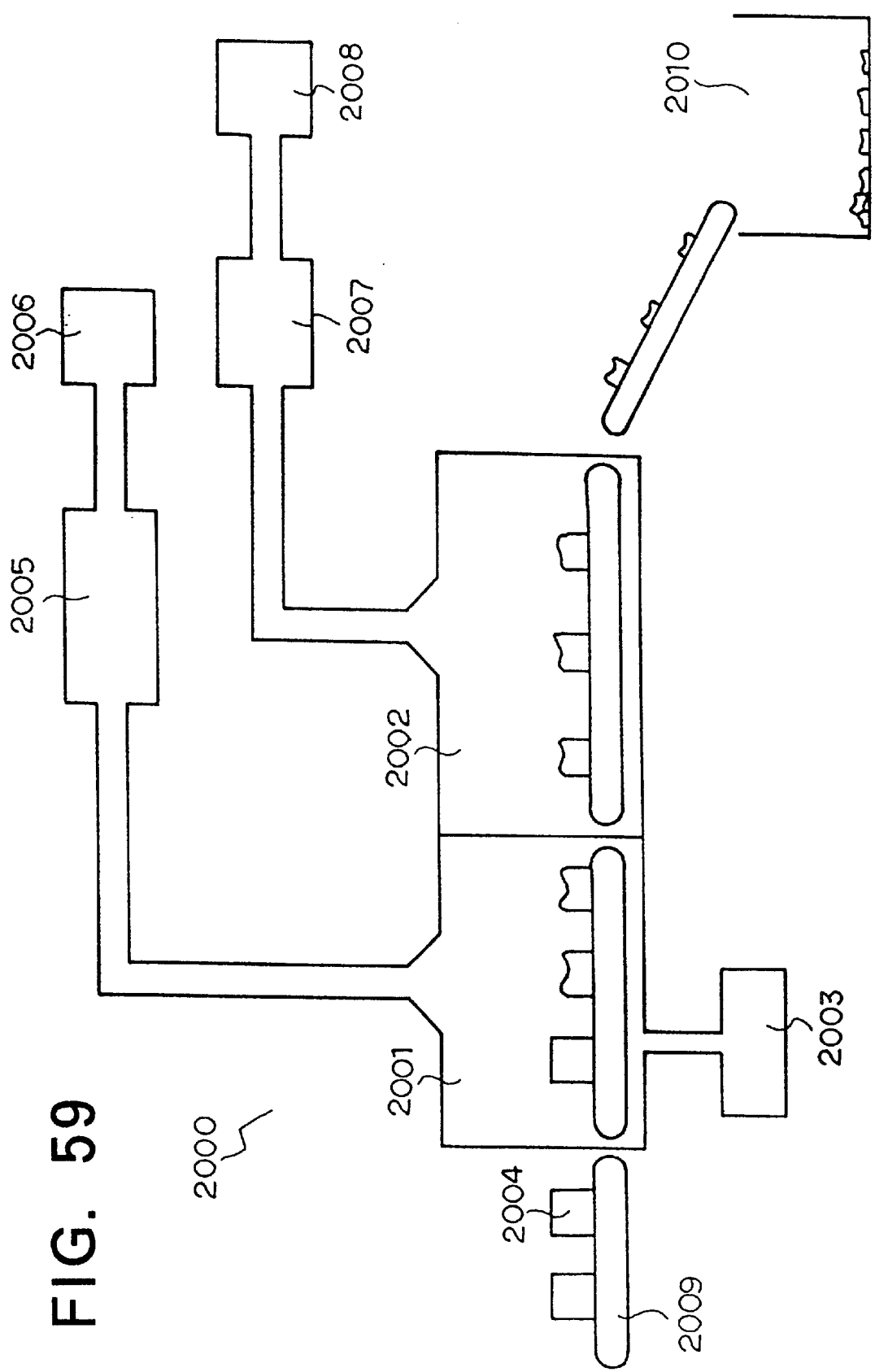
FIG. 59 is a diagram schematically showing one example of a processing apparatus of the present invention.

FIG. 59 is a diagram schematically showing one example of an apparatus of the present invention to be used for elimination of lead of the object possessing lead and resin as constituent member. The apparatus of the above described processing apparatus of the present invention, without restricting to the apparatus illustrated in FIG. 59, can be used.

The processing apparatus 2000 is provided with a pyrolysis furnace 2001 and a decompression/heating furnace 2002.

The pyrolysis furnace 2001 is provided with an oxygen concentration control means 2003 and a not shown heating device. In addition, it is constituted in such a manner that, with a control portion which is omitted in the figure, a predetermined temperature can be kept for a predetermined period.

The gaseous effluent including hydrocarbon based gas discharged from the constituent resin due to heating is reformed, pyrolyzed by a gas decomposition chamber 2005 at such a high temperature (1200° C. in this case) that dioxins can be decomposed, immediate thereafter, is rapidly cooled to 35° C. by cooling tower 2006. The gaseous effluent, which is so cooled that dioxins are not produced, re-synthesized, is neutralized, cleaned with a shower cleaning device which uses alkali water, and can be reused as fuel gas.

The decompression/heating furnace 2002 is a vacuum furnace and is provided with a lead recovering chamber 2007 and an exhausting device 2008.

The object, with a transporting means 2009 such as a conveyer, is transported to the pyrolysis furnace 2001, the decompression/heating furnace 2002, in this order. Between the pyrolysis furnace 2001 and the decompression/heating furnace 2002, a purge room which is not shown in the figure is provided.

Residence time, heating temperature, pressure, oxygen concentration of the object in the pyrolysis furnace 2001, the decompression/heating furnace 2002 can be controlled by a not shown control portion, respectively.

In the pyrolysis furnace 2001, the object 2004 is heated to and held at the temperature of, for example, about 200 to 600° C., the resin component which is a part of the constituent member of the object 2004 is discharged as gaseous effluent including C1 to C8 hydrocarbon based gas to be introduced into the gaseous effluent processing system.

Then, the object 2004 is transferred to the decompression/heating furnace 2002, the pressure is decreased to, for instance, about $10^{-5}$ Torr, the temperature is elevated to around 427° C., thereafter, this state is maintained. Lead in the object is vaporized as lead vapor from the object. A gas exhausting portion is disposed at the upper portion of the decompression/heating furnace 2002, the lead vapor discharged from the object is condensed as metal lead due to lowering of vapor pressure. Crystallized lead metal is precipitated in the lead recovering chamber 2005 to be recovered. Further, in order to send the lead vapor effectively from the decompression/heating furnace 2002 into the lead recovering chamber 2005, $N_2$ or inert gas such as Ar is introduced from the carrier gas introducing portion disposed at the decompression/heating furnace 2002, the lead vapor is sent into the lead recovering chamber 2005 together with the carrier gas.

The object which went through the decompression/heating furnace 2002 and from which lead is eliminated is sent to a residue receiver 2010. Since the resin component of the object is almost completely carbonized and heavy metals such as lead, zinc contained in the object can be also removed, the object is non-hazardous, the later processing is easily carried out, accordingly. When still other useful metals are contained in the object, these metals can be fractionated/recovered with gravity classification method, an electromagnet. The non-haxardous and highly pure carbides undergone the decompression/heating means can be reused as activated charcoal, soil modifier excellent in their properties.

(Embodiment 14)

Next, an example will be described, wherein, with the above described processing apparatus 2000, an electronic instrument containing solder, which is the object, is processed.

The electronic instrument which is the object 2004 can be crushed in advance the processing but, in processing of the mounted substrate, can be preferably introduced without being crushed.

The pyrolysis furnace 2001 is maintained at about 500 to 600° C. inside the furnace and is in an almost oxygen-free state, the electronic instrument is resided there for 60 minutes. The constituent resin which occupies about 40% of the composition ratio of the electronic instrument is pyrolyzed in the pyrolysis furnace 2001 and is discharged as gaseous effluent including hydrocarbon gas or is carbonized.

Further, metal kinds such as iron, copper, aluminum and the like which amount to about 50% of the composition ratio and the constituent metals which occupies about 10% of the composition ratio of the mounted substrate are neither vaporized nor oxidized in the pyrolysis furnace 2001.

The electronic instrument of which constituent resin is pyrolyzed is transferred to the decompression/heating furnace 2002 through the purge room without being cooled. The decompression/heating furnace 2002 is maintained at a pressure of about $10^{-3}$ Torr and at a temperature of about 627° C. The electronic instrument is resided there for about 60 minutes.

In the mounted substrate which occupies about 10% of the electronic instrument, solder alloy which amounts to about 5 to 10% of the weight of the substrate is used. Further, about 40% by weight of the solder alloy is lead.

That is, in the electronic instrument, about 0.2 to 0.4% of lead is used as a part of the constituent member. The lead is vaporized as lead vapor in the decompression/heating furnace 2002 and is sent into the lead recovering chamber 2005 with carrier gas to be recovered as metal lead.

To improve recovering ratio of lead, lead vapor is preferred to be resided in the lead recovering chamber 2005 as long as possible. In this example, the recovering ratio of lead was 98%. The recovered lead is scarce in impurity content, can be reused as useful metal, accordingly.

The hydrocarbon gas discharged after pyrolysis at the pyrolysis furnace 2001 is sent into the gas decomposition chamber 2005 of the above described gaseous effluent processing system to reform, to pyrolyze in coke heated at a temperature of about 1200° C., immediate after this, is rapidly cooled to 35° C. within 8 sec. The cooled gaseous effluent is neutralized, filtered by a bag-filter which is a neutralizing reaction filter, and is further cleaned to be recycled as fuel gas. In this embodiment, 40% of the electronic instrument is composed of resin.

Though the recovering ratio of the resin is different depending on the component of the constituent resin, about 90% by weight can be reused as fuel gas, and about 10% remains as the pyrolysate residue mainly consisting of carbon/carbide.

Further, metals such as iron, copper, aluminum and the like which amount to about 50% of the electronic instrument by constitutional ratio are not oxidized by the pyrolysis furnace 2001 or the decompression/heating furnace 2002, thus, being recovered in a metallic state, are high in its recycle value. In this embodiment, the residue discharged in the residue receiver 30 contained mainly iron, copper, aluminum and carbide of the resin.

FIG. 60 is a diagram schematically showing one example of a partition 2101 capable of being opened/closed and maintaining the gas tightness and adiathermic property between the pyrolysis furnace 2001 and the decompression/heating furnace 2002 of the processing apparatus 2000 illustrated in FIG. 59. The partitions 2101 can be operated with wires 2102 and hoisting machines 2103.

At the position of each partition 2101, a vacuum door and an adiathermic door can be provided separately. For instance, a partition 2101b can be a vacuum door, and, on the pyrolysis furnace 2001 side and on the decompression heating furnace 2002 side thereof, adiathermic doors similarly capable of being opened/closed can be disposed.

(Embodiment 15)

Next, by taking up wastes (includes shredder dust) including resin and metal and used in huge quantity in such as various kinds of electronic instruments, automobiles, precision instruments, stationery, packaging of medicines and foods, as an object being processed, a processing system thereof will be described. For the apparatus, the above described processing apparatus of the present invention can be used.

Such wastes including resin and metal, because of difficulty of separation/recovery thereof, is usually processed by incineration, landfills processing. The processing system of the present invention recovers the constituent metals in metallic state through pyrolysis (vaporization, conversion to oil, carbonization) of the constituent resins and vaporization of the constituent metals of the wastes in the same apparatus.

In the processing of the present invention, first, the wastes including resin and metal is introduced into the pyrolysis furnace. Then, to recover the resin portion, pyrolysis is carried out while adjusting the oxygen concentration. Then, pyrolysate residue are introduced into the decompression/ heating furnace, and decompression and heating are carried out to recover the metals through vaporization.

FIG. 61 is a diagram schematically showing one example of a decompression/heating means of the present invention which can be used in the processing system.

Within a gas tight chamber 2201, wastes including the resin and metal is accommodated. In the gas tight chamber, a supporting shelf 2202 consisting of metal excellent in temperature elevating efficiency and heat resistance is disposed. Numeral 2203 is a door to open or close the gas tight chamber 2201. In the gas tight chamber, a heating device 2204 such as a seed heater and the like is disposed, and is operated by a control panel 2205 together with the pressure, oxygen concentration in the gas tight chamber. Numeral 2206 is a sensor, thereby, the temperature, pressure, oxygen concentration in the gas tight chamber 2201 are transmitted to the control panel 2205 as signals.

The gas tight chamber 2201 is connected to an exhausting device 2208. Between the gas tight chamber 2201 and the exhausting device 2208, metal recovering systems 2209, 2210 which are recovering device of the constituent metal of the wastes are disposed. The metal recovering device can be provided with a cyclone classifier provided with, for instance, a cooling means.

The wastes, which is the object, pyrolyzed at the pyrolysis furnace, is thrown in the supporting shelf 2202 disposed in the gas tight chamber 2201. The door 2203 is closed to seal. At first, with the recovering system closed, heating (400° C.) and pressurization (3 atm) are started.

In this case, the temperature elevation efficiency is better than that of the heating in a decompression state and this contributes to the temperature elevation efficiency of decompression/heating during in the later metal recovering process.

Then, the gas tight chamber 2201 is decompressed down to a pressure of about $10^{-3}$ Torr by the exhausting device, and is heated to more than the boiling temperature of the alloy according to the kinds of the metal to vaporize the metals, thus recovering them with a condensation means disposed at the midway of the metal recovering system 2209, 2210. In this case, since the vaporizing temperature of the metal becomes lower than that of atmospheric pressure, relatively low heating temperature can be employed, and, being likely not to be oxidized, the recovering efficiency is excellent.

The decompressing/heating furnace illustrated in FIG. 31 is provided with 2 lines of metal recovering system. The 2 lines can be used simultaneously or, by switching according to the temperature/pressure condition in the gas tight chamber, a plurality of metal elements can be made to be recovered.

Thus, according to the processing system of the present invention, the thermal efficiency is excellent and the processing cost is low. Further, through the vacuum heating, the metal of high purity can be recovered with high recovering efficiency.

(Embodiment 16)

Next, by taking up wastes of the mounted substrate, in which various kinds of electronic components are mounted on the circuit board and which is used in huge quantity in such as various kinds of electronic instruments, automobiles, precision instruments, as an object, the processing thereof will be described. For the apparatus, the hereto described processing apparatus of the present invention can be employed.

Figure 62:
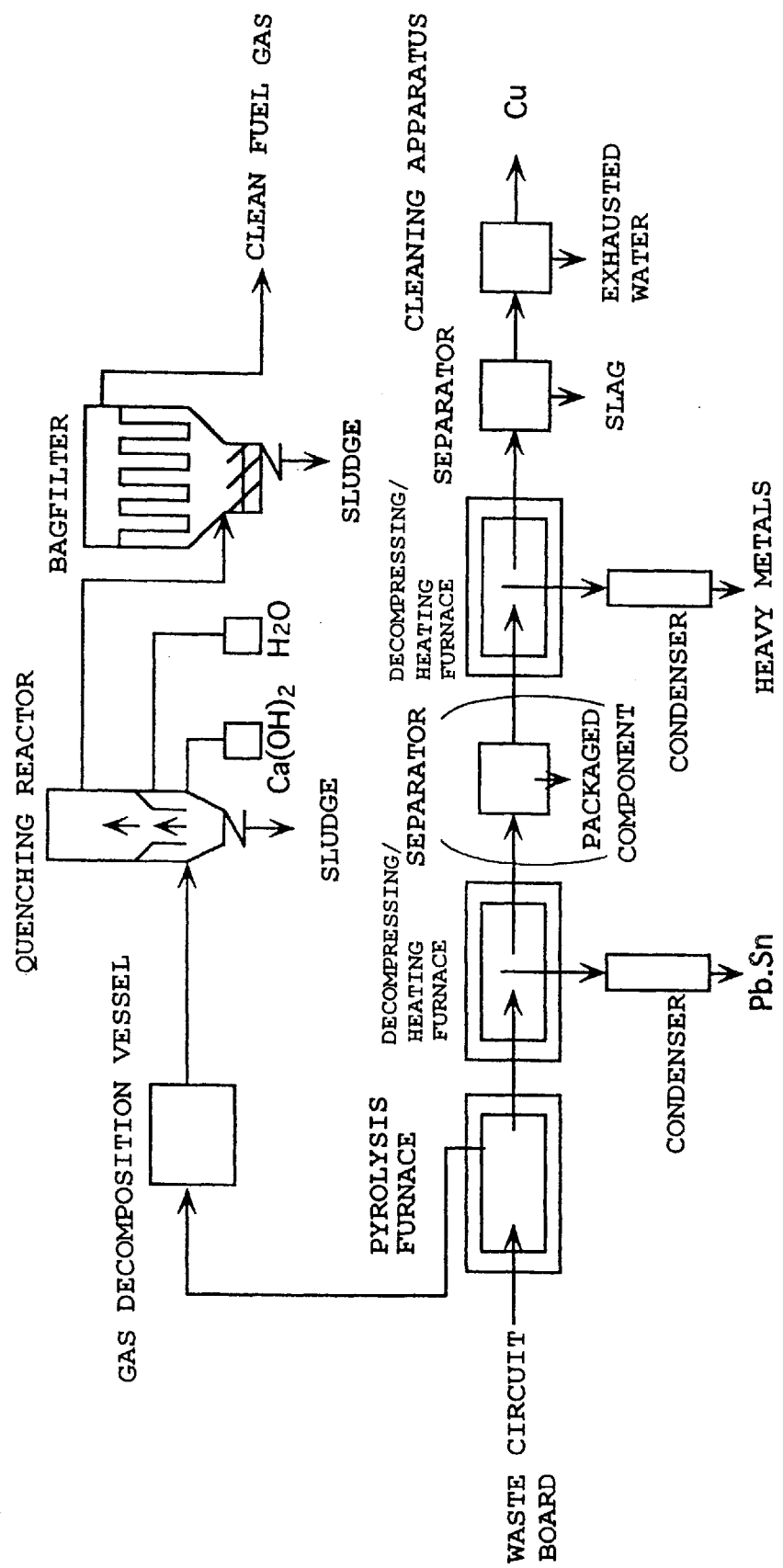
FIG. 62 is a diagram schematically showing a processing scheme of a packaged substrate in which a processing apparatus of the present invention is employed.

FIG. 62 is a diagram schematically showing a processing scheme of a mounted substrate wherein the processing apparatus of the present invention is used.

With this processing system, the electronic components can be efficiently separated/recovered from the mounted substrate in which various kinds of electronic components such as an IC, an LSI, a resistor, a condenser and so on are mounted. Further, also the constituent resin, the constituent metal of the mounted substrate consisting of a circuit board, electronic components can be separated/recovered, thus resulting in utilization as resources.

Wastes of such a mounted substrate was difficult in separation of the electronic components from the circuit board, and, since the mounted substrate is an object in which different materials are complicatedly integrated, its processing was difficult. Therefore, landfill processing, incineration processing were employed predominantly.

In the present invention, at first, the mounted substrate is introduced into the pyrolysis furnace without being crushed to pyrolyze the mounted substrate. The resin component of the substrate or the electronic components which constitute the mounted substrate is pyrolyzed to discharge gaseous effluent and form carbides. Packaging resin of the electronic components is also decomposed, becomes very brittle, thus becomes a state easily separable from an element in the package. In this time, the temperature, oxygen concentration in the pyrolysis furnace can be adjusted for heavy metal such as lead not to be vaporized, oxidized.

The gaseous effluent can be processed as previously described. When the heavy metal such as lead is included in the gaseous effluent, it can be condensed at a gaseous effluent processing system such as a cooling means, for instance. The condensed matter can be introduced into the decompression/heating furnace together with the pyrolysis residue. In addition, when chlorine is contained in the gaseous effluent, it can be contacted with iron heated at an elevated temperature to recover as ferrous chloride.

The mounted substrate which is thus pyrolyzed object is introduced into the decompression/heating furnace. The temperature, pressure, oxygen concentration in the gas tight chamber can be adjusted according to the metals to be recovered to recover the desired metals.

For instance, an alloy (Pb—Sn alloy, for instance) which connects a circuit board and an electronic component is vaporized. The alloy is selectively vaporized according to the respective vapor pressure to separate. This is preferable from the view point of utilization as resource.

When an alloy connecting a circuit board and an electronic component is vaporized, the electronic component can be separated from the circuit board. Further, even when the connecting metal is melted in the pyrolysis furnace and the connection is already disconnected, since the connecting metal components (lead, tin, for instance) are held in the object, these metals can be vaporized from the object to separate/recover.

Other than the connecting alloy connecting the circuit board and the electronic component, various kinds of metals contained in the mounted substrate such as Zn, Sb, Au, Pt, Ni, Cr, Cu, Al, Mo, W, Ta and the like can be vaporized to separate/recover. The metals, being recovered in metallic state without being oxidized, are high in its utility value.

When the solder alloy is to be vaporized, in order to enhance temperature elevation efficiency, after heating up to a temperature (about 200° C., for instance) where the solder alloy is not so much oxidized, the inside of the gas tight chamber is decompressed with an exhausting means and is further heated (about 400° C., for instance), and the metals can be condensed by a condensation means disposed in the midway of the recovering path.

According to this system, as illustrated in FIG. 56, the solder alloy of the mounted substrate can be completely removed, and also the solder of the lead terminal portions of the IC, LSI, resistance, condenser and the like is completely removed. Therefore, not only the electronic component can be separated from the substrate but also the later conversion of the circuit board, electronic component to resources can be made easily, thus, resulting in heightening of its value.

The constituent resin of the mounted substrate is vaporized, carbonized, or converted into an intermediate product, thus, is made possible to be used effectively.

If copper and a carbide, for instance, are left as the residue of the decompression/heating furnace, copper and the carbide can be separated by, for instance, a calcium carbonate solution, then the copper can be cleaned with wash water.

The constituent metals of the solder alloy vaporizes according to the degree of a vacuum in the gas tight chamber. Since the higher the degree of a vacuum becomes, the lower the vaporization temperature becomes, the furnace wall and the like of the processing apparatus are not damaged.

When the mounted substrate is processed by landfills, the hazardous metals such as Pb, Sb in the solder alloy are leached out by the acid rain and the like, resulting in pollution of the soil, rivers. Further, almost all of the resin is not decomposed in nature and remains there semi-permanently, not only invites shortage of the processing places but also causes a problem of environmental security. According to the processing system of the present invention, these problems can be solved.

Further, various kinds of metals contained in the circuit board or the electronic components can be converted into resources by separating/recovering. Among these metals are included metals that are likely to be exhausted or rare metals low in their crustal abundance. Therefore, the recovery of these metals contribute in solving the resource, energy problem which our large consumption society is facing.
(Embodiment 17)

Next, by taking up a circuit board, in which a copper foil and resin are laminated, as an object, the processing system will be described.

The circuit board can be a copper clad laminate, a flexible substrate, or a film carrier of TAB (Tape Automated Bonding). Further, the cut-off portion of the copper clad laminate occurring during manufacturing process of the circuit board can be processed. Further, as described in the above, the circuit board obtained by separating the electronic components and the connecting alloy from the mounted substrate can be processed.

Further, the present description will be done by taking up a circuit board, but, anything possessing copper and resin as its constituent members can be processed in the identical manner.

The separation of the solder alloys, electronic components from the mounted substrate can be carried out as described above. The decomposition of the constituent resin of the mounted substrate also can be carried out as described above.

In the processing system, in order to separate the copper foil and the resin effectively, the circuit board is heated under a non-oxidizing condition, and the constituent resin of the circuit board is processed as the gaseous effluent in the gaseous effluent processing system.

The copper foil can be recovered as an almost pure metal.

Impurities such as carbides stuck to copper can be exposed to cleaning, vibration, mingling rotation together with fine sand particles as demands arise. The processing apparatus of the present invention can be used as the apparatus.

Figure 63:
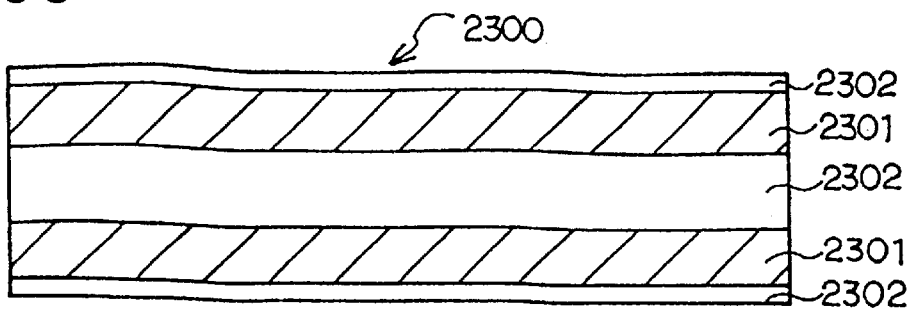
FIG. 63 is a diagram schematically showing a situation preceding the processing of a circuit board, an object being processed.

FIG. 63 is a diagram schematically showing a circuit board 2300 which is an object. The circuit board 2300 is formed in 2 layer, that is, a copper foil 2301 and a resin 2302 are laminated integrally.

The circuit board 2300 is introduced into the pyrolysis furnace and the resin 2302 is pyrolyzed (vaporization, conversion to oil, carbonization) while adjusting the temperature, oxygen concentration in the pyrolysis furnace in such a manner that the copper 2301 is not oxidized. The gaseous effluent including the decomposition product gas of the resin 2302 is processed by the gaseous effluent processing system to make non-hazardous, to convert to a clean fuel gas.

Figure 64:
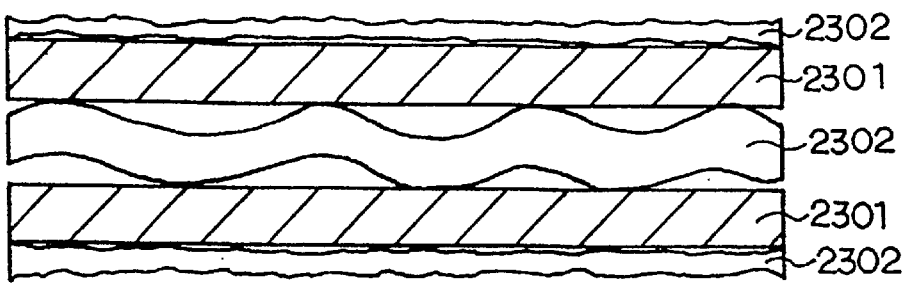
FIG. 64 is a diagram schematically showing a situation of a circuit board of which constituent resin is decomposed.

FIG. 64 is a diagram schematically showing a circuit board 2300 after the constituent resin is pyrolyzed. Much of the resin exists as carbides.

Figure 65:
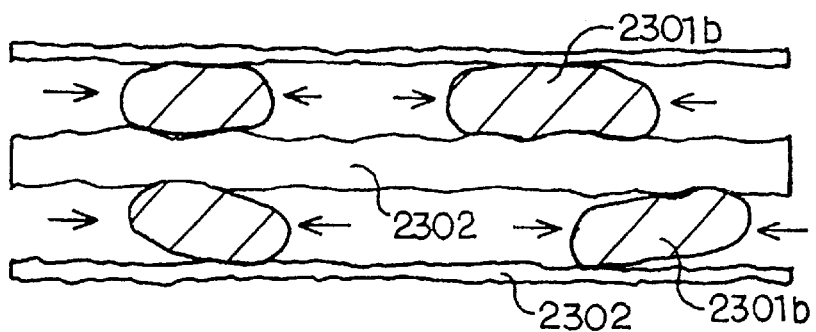
FIG. 65 is a diagram schematically showing a situation where copper aggregates in particles due to surface tension.

In this state, the carbonized resin 2302 can be separated mechanically, but, in this invention, the solid pyrolysate of the circuit board mainly consisting of copper metal and carbides are introduced into the decompression/heating furnace, and, while adjusting the pressure or the oxygen concentration in the gas tight chamber, the temperature is elevated to a temperature several tens degrees higher than the melting point of copper to melt it while preventing oxidation, vaporization thereof. The liquid state copper 2301 becomes particle-like copper 2301b (FIG. 65) due to the surface free energy (surface tension). If cooled in this state, copper can be further easily separated/recovered. For instance, the melting point of copper is 1080° C. at 760 Torr but, by heating the insides of the gas tight chamber to a temperature of about 1150° C. (in the case of 760 Torr), copper can be gathered in particulate shape.

By heating the circuit board under a decompression or in a non-oxidizing atmosphere as previously mentioned, almost the copper foil can be recovered without being oxidized. Further, such impurities as carbides and the like stuck to the surface can be removed by cleaning and the like as demands arise.

Thus, according to the processing system of the present invention, copper can be separated/recovered in its metallic state from the object which integrated resin and metal. Further, the resin can be recovered as oil, carbide.

(Embodiment 18)

Next, by taking up a resin coated aluminum foil, in which an aluminum foil and resin are laminated, as an object, a processing system thereof will be described.

Such resin coated aluminum foil is in wide use in, including such as, for instance, bags of potato chip or wrapping containers of retort pouch food such as curry, wrapping containers of food, medicines, heat insulating materials and the like.

Processing of such a resin coated aluminum foil is difficult because of integration of the resin and the aluminum foil, the present processing is through landfills or incineration. When incinerated, the aluminum foil becomes oxide and the value as resources is remarkably diminished.

Smelting of aluminum requires a huge volume of energy, it is waste of energy not to recycle as resource, accordingly.

The present invention is to heat the resin coated aluminum foil while adjusting the oxygen concentration in the pyrolysis furnace. Thereby, the constituent resin is pyrolyzed while maintaining oxidation state of aluminum.

That is, in order to separate effectively the aluminum foil and the resin, the resin coated aluminum foil is heated under a decompression or in a non-oxidizing condition, thereby discharged gaseous effluent is processed in an identical manner as described above. The aluminum foil can be recovered almost as a pure metal. The impurities such as carbides and the like stuck to the aluminum, as demands arise, can be removed by undergoing such as cleaning, vibration, mingling rotation with fine sand particles.

Further, when other metals such as zinc, for instance, are included in the aluminum foil, after further introduction into the decompression/heating furnace, the object is heated in a decompression condition to vaporize selectively, thereby separating/recovering.

Figure 66:
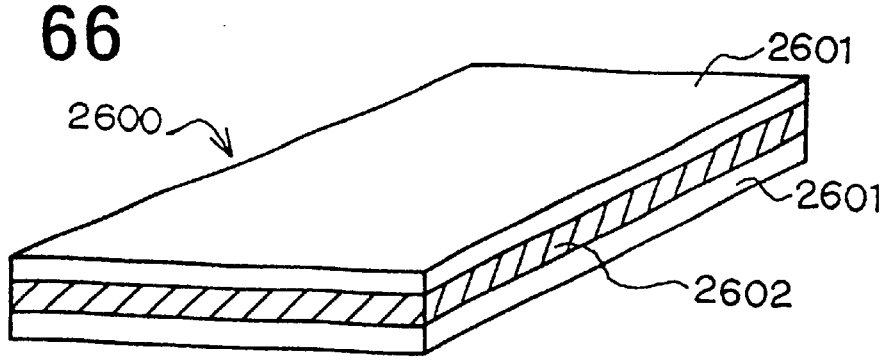
FIG. 66 is a diagram schematically showing a situation preceding the processing of a resin coated aluminum foil, an object being processed.

FIG. 66 is a diagram schematically showing a resin coated aluminum foil 2600. The resin 2601 and the aluminum foil 2602 are integrated.

First, the resin coated aluminum foil 2600, the object being processed, is introduced into the pyrolysis furnace of the processing apparatus of the present invention, then, while controlling the temperature/pressure condition, the resin coated aluminum foil is heated up to 400 to 650° C. to pyrolyze.

At a temperature lower than 400° C., decomposition of the constituent resin is insufficient, and, at a temperature higher than 650° C., melting of the aluminum foil occurs. Thus, the above temperature range is determined.

Figure 67:
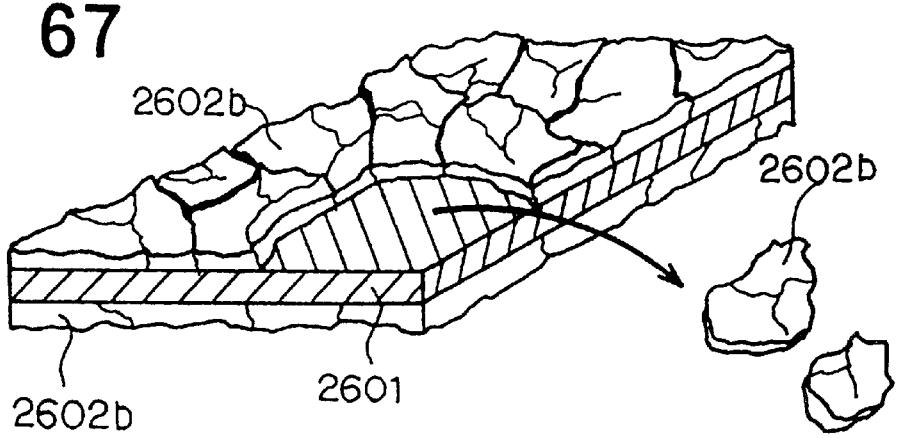
FIG. 67 is a diagram schematically showing a situation of a resin coated aluminum foil of which constituent resin is decomposed.
Figure 68:
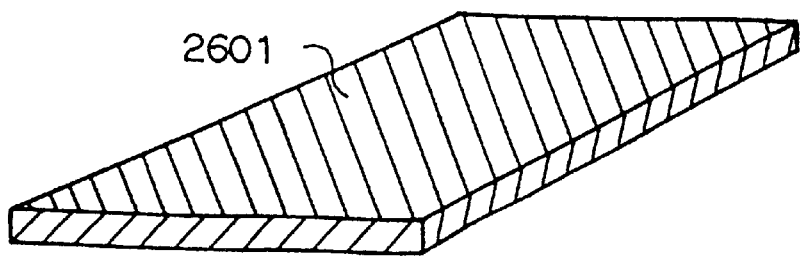
FIG. 68 is a diagram schematically showing an aluminum foil separated from a resin coated aluminum foil.

FIG. 67 is a diagram schematically showing an appearance of the resin coated aluminum foil after decomposition of the constituent resin 2601, wherein, carbide 2602*b*, the resin decomposition product, sticks to the aluminum foil 2601 of metal state. In this state, only touching the carbide 2602*b* is enough to peel off the aluminum foil. Therefore, the aluminum foil can be easily recovered in metal state (vide, FIG. 68). Since the constituent resin of the resin coated aluminum foil is a thermosetting resin in general, much of them can be processed as the gaseous effluent, thereby converting to fuel gas. The carbides of the constituent resin can be easily separated from the aluminum foil. In addition, the aluminum is in metal state.

Thus, by heating the resin coated aluminum foil in a non-oxidizing atmosphere, the aluminum can be almost recovered without being oxidized. In addition, as demands arise, the impurities such as carbides and the like stuck to the surface can be removed by cleaning and so on.

[Effect of the Invention]

As described above, a processing apparatus, a processing method of the present invention can process safely and efficiently an object being processed including resins and metals. According to the present invention, home electric appliances, automobiles, precision instruments and the like can be separated/recovered while preventing the hazardous materials from being discharged into the environment and converting the hazardous materials non-hazardous.

In addition, the present invention can prevent environmental destruction from occurring from the object being processed such as the wastes which include hazardous substances and the source thereof and, when burned, generates the hazardous substance such as dioxins, and can recover the reusable substances in a highly pure state.

The present invention can remarkably reduce the dioxins concentration in the gaseous effluent by reforming, pyrolyzing the gaseous effluent discharged from the object at such a high temperature that the dioxins can be decomposed, and, by rapidly cooling to a third temperature where the dioxins are not produced, resynthesised while reducing the residence time in the temperature region where the dioxins are produced, resynthesised as short as possible. In addition, by carrying out the first pyrolysis, the second pyrolysis or reforming in 2 steps of the first temperature, second temperature, and, at the same time, by carrying out these in reducing atmosphere, the source concentration of the dioxins can be reduced remarkably, the dioxins concentration in the gaseous effluent can be drastically reduced.

According to the present invention, from the wastes which is difficult in processing and contains the resin and the metal, and the generating sources of heavy metal and dioxins such as the shredder dust, without generating hazardous substances such as dioxins and the like and while converting the resin portion into a clean gas fuel, the hazardous heavy metals such as Pb, As, Cd and the like can be recovered in high purity without being discharged into the environment.

According to the present invention, the wastes which is difficult in processing like a mounted substrate, while preventing emission of hazardous substances and removing the hazardous substances, and without relying on hands, can be easily separated into the circuit board and the electronic components such as various kinds of IC or resistors, condensers and the like. At the same time, heavy metals such as lead and other metals can be vaporized to be recovered in highly pure metal state. Further, the metals constituting a circuit board and copper can be recovered in a highly pure state. The resin portion is carbonized, thereby can be rendered to be utilized as resources such as the effective components of the activated charcoal, soil. Further, the processing apparatus and the processing method of the present invention can remove lead from a substance including lead by vaporizing lead. In addition, even from a substance including lead and resin, lead can be recovered. The resin can be recovered by rendering carbides, fuel gas. By eliminating lead, the adverse affect on health can be prevented while preventing the environmental pollution. In addition, shortage of the wastes processing field can be alleviated.

Further, the processing apparatus and the processing method of the present invention can recover metals in metallic state by vaporizing them from the object containing the resin and the metals. The resin can be recovered by converting into a carbide and a fuel gas.

Further, the processing apparatus and the processing method of the present invention can remove the connecting metals by vaporizing the connecting metals of the object connected by the metals. In addition, by vaporizing the connecting alloys of the object connected by the alloys, the connecting metals can be removed. When the object includes resins, the resin can be recovered by converting into carbides, fuel gas.

Further, the processing apparatus and the processing method of the present invention can remove the connecting metals by vaporizing the constituent metals of the solder alloys of the object connected by a solder alloy. Even when a solder alloy contains the hazardous lead, heavy metals such as lead can be separated/recovered in a high purity state, with a high yield.

Further, the processing apparatus and the processing method of the present invention, by processing a mounted substrate in which electronic components are mounted on a circuit board, can effectively separate the circuit board and the electronic components. Even when a solder alloy including lead is employed for connecting the circuit board and the electronic components, in addition to the effective separation, the hazardous lead can be recovered. The constituent resin of the mounted substrate can be recovered by converting into carbide, fuel gas.

Further, the processing apparatus and the processing method of the present invention can process effectively, economically the object possessing metal and resin as its constituent members. The metal can be recovered almost in metal state. In addition, the resin can be utilized as carbide or as clean fuel gas. Further, the present invention can effectively separate the resin component and the metals from the object in which the resin and a plurality of metals are integrated.

Further, the processing apparatus, the processing system and the processing method of the present invention can easily recover copper in metal state from the object in which resin and copper are integrated. The resin can be utilized as carbide, or as clean fuel gas.

Further, the processing apparatus, the processing system and the processing method of the present invention can easily recover aluminum in metal state from the object in which resin and aluminum are integrated. The fuel gas recovered from the resin can be used as a heating means of the processing apparatus. Further, electricity generated by this fuel gas can operate the processing apparatus of the present invention or can be sold, thereby the operating cost can be remarkably reduced. Further, the carbide is excellent as activated charcoal, fertilizer.

Since the processing apparatus, the processing method of the present invention are excellent in energy efficiency, they can process the object of a more wide range of category to heighten the value and convert into resources. That is, the processing apparatus, the processing method of the present invention can safely and effectively process the objects integrated in a complicated manner such as between resin and metal, between a substrate and an electronic component, between metals to convert into resources.

INDUSTRIAL APPLICABILITY

As described above, the processing apparatus, the processing system, the processing method of the present invention can remove lead by vaporizing it from an object including lead. Further, lead can be removed from an object including lead and resin. The resin can be recovered by selectively pyrolyzing, vaporizing, converting to oil, carbonizing.

By removing lead, the environmental pollution can be prevented, thus reducing the adverse effect on health. In addition, the shortage of the landfill fields can be cancelled.

Further, the processing apparatus, the processing system, the processing method of the present invention, even from an object including resin and metal, can recover the metal in metal state by vaporizing the metal. The resin can be vaporized, converted into oil, carbonized to recover.

Further, the processing apparatus, the processing system, the processing method of the present invention can disconnect connection by vaporizing the connecting metals of the object connected by metals. In addition, by vaporizing the connecting metals of the object connected by an alloy, connection can be disconnected. Even when the object includes resin, the constituent resin can be recovered through vaporization, conversion to oil, carbonization.

Still further, the processing apparatus, the processing system, the processing method of the present invention can disconnect connection by vaporizing the constituent metals of a solder alloy of the object connected by the solder alloy. Even when the solder alloy includes hazardous lead, it can be processed.

Further, the processing apparatus, the processing system, the processing method of the present invention, by processing a mounted substrate in which electronic components are mounted on a circuit board, can effectively separate the object into a circuit board and the electronic components. Even when a solder alloy including lead is used in a circuit board for connection between the electronic components, effective separation can be carried out, and the hazardous lead can be recovered. The constituent resin of the mounted substrate can be recovered by vaporizing, converting into oil, carbonizing.

Further, the processing apparatus, the processing system, the processing method of the present invention can process effectively, economically an object possessing metal and resin as the constituent member. The metals can be recovered in metal state. Further, the resin can be recovered by vaporizing, converting into oil, carbonizing. In addition, the present invention can effectively separate the resin component and the metals from the object wherein the resin and a plurality of metals are integrated.

Further, the processing apparatus, the processing system, the processing method of the present invention can easily recover copper in metal state from an object wherein the resin and copper are integrated. The resin can be recovered through vaporization, conversion into oil, carbonization.

Still further, the processing apparatus, the processing system, the processing method of the present invention can easily recover aluminum in metal state from an object wherein resin and aluminum are integrated. The resin can be recovered through vaporization, conversion into oil, carbonization.

The oil recovered from the resin can be utilized as fuel, resources. In addition, carbide are excellent as the activated charcoal, or fertilizer.

Further, the processing apparatus, the processing system, the processing method of the present invention, being excellent in their energy efficiency, can heighten the value of an objects of wide range of category by processing them, thus converting resources.

That is, the processing apparatus, the processing system, the processing method of the present invention can render an object to resources by eliminating complexity of the object from the complicatedly integrated object such as the resin and the metal, the substrate and the electronic component, integrated metals such as alloys.

What is claimed is:

1. A processing apparatus for processing an object that comprises a resin and a metal as constituent members, comprising:

a first gas tight zone provided with a temperature adjusting means and a pressure adjusting means for adjusting a temperature and a pressure in the first gas tight zone so that the resin of the object being selectively pyrolyzed;

a second gas tight zone separated by a partition capable of opening and closing from the first gas tight zone, and the second gas tight zone being provided with a temperature adjusting means and a pressure adjusting means for adjusting a temperature and a pressure in the second gas tight zone so that the metal in the object being selectively vaporized;

a gas decomposition chamber for processing gases generated by pyrolysis of the resin, and the first processing means being connected to the first gas tight zone;

a recovering chamber for recovering the metal vaporized from the object, the recovering chamber connected to the second gas tight zone;

an oxygen concentration sensor in the first gas tight zone; and a carrier gas introducing gas value for adjusting the oxygen concentration in the first gas tight zone in response to the measured oxygen concentration.

2. A processing method for processing an object that comprises lead and a resin as constituent members, comprising:

sealing a gas tight chamber after introduction of the object being processing into the gas tight chamber;

first controlling step for adjusting a temperature and an oxygen concentration in the gas tight chamber so that the resin of the object being selectively pyrolyzed;

second controlling step for adjusting the temperature and the pressure in the gas tight chamber so that the lead in the object being selectively vaporized;

processing step for processing a gaseous effluent generated through pyrolysis of the resin; and recovering step for recovering the lead vaporized from the object;

wherein the oxygen concentration is adjusted by introducing a carrier gas.

3. A processing system for processing an object that comprises a first object and a second object being connected by a metal, comprising:

a gas tight chamber capable of holding the object therein;

a temperature adjusting means for adjusting a temperature in the gas tight chamber;

a pressure adjusting means for adjusting a pressure in the gas tight chamber;

a measuring means for measuring an oxygen concentration in the first gas tight zone;

a carrier gas introducing gas value for adjusting the oxygen concentration in the first gas tight zone in response to the measured oxygen concentration; and a controlling means for controlling the temperature adjusting means, the pressure adjusting means, and the carrier gas introducing gas value so that the metal connecting the first object and the second object is vaporized with no substantial oxidation of the metal.

4. A processing system for processing an object that comprises a first object and a second object, the first object and the second object being connected by an alloy of a first metal and a second metal, and the object comprises at least a resin as a constituent member, comprising:

a gas tight chamber capable of holding the object therein;

a temperature adjusting means for adjusting a temperature in the gas tight chamber;

a pressure adjusting means for adjusting a pressure in the gas tight chamber;

a carrier gas introducing gas value for adjusting an oxygen concentration in the gas tight chamber;

a first controlling means for controlling the temperature adjusting means and the carrier gas introducing part so that the resin of the object is selectively pyrolyzed with no substantial oxidation of the metal;

a second controlling means for controlling the temperature adjusting means and the pressure adjusting means so that the first metal of the alloy of the object is selectively vaporized;

a third controlling means for controlling the temperature adjusting means and the pressure adjusting means so that the second metal of the alloy of the object is vaporized;

at least a means for processing a gaseous effluent generated through the pyrolysis of the resin; and at least a means for recovering the first metal vaporized from the alloy.

5. The processing system as set forth in claim 4, further comprising:

at least a means for recovering the second metal vaporized from the alloy.

6. The processing system as set forth in any one of claim 4 or claim 5 wherein, the first metal is at least one element selected from Zn, Cd, Hg, Ga, As, In, Tl, Sn, Pb, Sb, Bi, Ag or In.

7. A processing method for processing an object comprises a first object and a second object, the first object and the second object being connected by an alloy of a first metal and a second metal, and the object comprises at least a resin as a constituent member, comprising steps of:

sealing a gas tight chamber after introduction of the object into the gas tight chamber;

a first controlling step for adjusting a temperature and an oxygen concentration in the gas tight chamber so that the resin of the object is selectively pyrolyzed;

a second controlling step for adjusting the temperature and the pressure in the gas tight chamber so that the first metal in the alloy of the object is selectively vaporized;

a third controlling step for adjusting the temperature and the pressure in the gas tight chamber so that the second metal in the alloy of the object is vaporized, a step for processing a gaseous effluent generated through pyrolysis of the resin; and a step for recovering the first metal vaporized from the alloy;

wherein the oxygen concentration is adjusted by introducing a carrier gas.

8. A processing system for processing an object that comprises a resin and a metal being integrated, comprising:

a gas tight chamber capable of holding the object therein;

a temperature adjusting means for adjusting a temperature in the gas tight chamber;

a pressure adjusting means for adjusting a pressure in the gas tight chamber;

a carrier gas introducing gas value for adjusting an oxygen concentration in the first gas tight zone in response to the measured oxygen concentration; and a controlling means for controlling temperature adjusting means, the pressure adjusting means, and the carrier gas introducing gas value in the gas tight chamber so as to pyrolyze selectively the resin of the object with no substantial oxidation of the metal.

9. A processing system for processing an object that comprises a resin and a metal being integrated, comprising:
   a gas tight chamber capable of holding the object being processed therein;
   a temperature adjusting means for adjusting a temperature in the gas tight chamber;
   a pressure adjusting means for adjusting a pressure in the gas tight chamber;
   a carrier gas introducing gas value for measuring an oxygen concentration in the gas tight chamber and adjusting the oxygen concentration in the gas tight chamber corresponding to the measured oxygen concentration; and
   a controlling means for controlling the temperature adjusting means and the pressure adjusting means and the carrier gas introducing gas value in the gas tight chamber so as to pyrolyze selectively in the resin of the object with no substantial oxidation of the metal.

10. A processing method for processing an object that comprises a resin and a first metal and a second metal being integrated, comprising steps of:
   introducing the object into a gas tight chamber;
   a first controlling step for adjusting a temperature and an oxygen concentration in the gas tight chamber so as to pyrolyze selectively the resin of the object;
   a second controlling step for adjusting the temperature and the pressure in the gas tight chamber so as to vaporize selectively the first metal of the object; and
   recovering the first metal vaporized from the object;
   wherein the oxygen concentration is adjusted by introducing a carrier gas.

11. A processing apparatus for processing an object comprising a resin and a metal as constituent members, comprising:
   a gas tight chamber capable of holding the object therein;
   means for adjusting a temperature in the gas tight chamber;
   means for adjusting a pressure in the gas tight chamber;
   means for measuring an oxygen concentration in the gas tight chamber;
   a carrier gas introducing gas value for adjusting the oxygen concentration in a first gas tight zone in response to the measured oxygen concentration;
   means for processing gaseous effluent generated by pyrolysis of the resin; and
   means for recovering the metal vaporized from the object.

12. A processing system for processing an object that comprises lead and a resin as constituent members, comprising:
   a gas tight chamber capable of holding the object being processed;
   a temperature adjusting means for adjusting a temperature in the gas tight chamber;
   a pressure adjusting means for adjusting a pressure in the gas tight chamber;
   means for measuring an oxygen concentration in the gas tight chamber;
   a carrier gas introducing gas value for adjusting the oxygen concentration in the first gas tight zone in response to the measured oxygen concentration;
   a first controlling means for controlling the temperature adjusting means and the carrier gas introducing gas value so that the resin of the object is selectively pyrolyzed with no substantial oxidation of the metal;
   a second controlling means for controlling the temperature adjusting means and the pressure adjusting means so that the temperature and the pressure in the gas tight chamber allow the lead in the object to be selectively vaporized;
   at least a means for processing a gaseous effluent generated through pyrolysis of the resin, and the processing means connected to the gas tight chamber; and
   at least a means for recovering the lead vaporized from the object being processed, and the recovering means connected to the gas tight chamber.

13. The processing apparatus as set forth in claim 1, wherein the gas decomposition chamber comprises a reforming means for reforming the gaseous effluent generated from the object at such a second temperature that decompose dioxins, and a cooling means for cooling the gaseous effluent to a third temperature so that an increasing of a concentration of the dioxins in the gaseous effluent reformed at the second temperature being suppressed, and the cooling means connected to the reforming means.

14. The processing apparatus as set forth in claim 13 further comprising:
   a neutralizing means for neutralizing the gaseous effluent.

15. The processing apparatus as set forth in claim 11, wherein, the means for processing the gaseous effluent generated through pyrolysis of the resin comprises, a reforming means for reforming the gaseous effluent generated from the object at such a second temperature that decompose dioxins, and a cooling means for cooling the gaseous effluent to a third temperature so that an increasing of a concentration of the dioxins in the gaseous effluent reformed at the second temperature being suppressed, and the cooling means connected to the reforming means.

16. The processing apparatus as set forth in claim 15, further comprising,
   a neutralizing means neutralizing the gaseous effluent.

17. The processing system as set forth in claim 12, wherein, the means for processing the gaseous effluent generated through pyrolysis of the resin comprises, a reforming means for reforming the gaseous effluent generated from the object at such a second temperature that decompose dioxins, and a cooling means for cooling the gaseous effluent to a third temperature so that an increasing of a concentration of the dioxins in the gaseous effluent reformed at the second temperature being suppressed, and the cooling means connected to the reforming means.

18. The processing system as set forth in claim 17, further comprising,
   a neutralizing means neutralizing the gaseous effluent.

19. The processing system as set forth in claim 4, wherein, the means for processing the gaseous effluent generated through pyrolysis of the resin comprises, a reforming means for reforming the gaseous effluent generated from the object at such a second temperature that decompose dioxins, and a cooling means for cooling the gaseous effluent to a third temperature so that an increasing of a concentration of the dioxins in the gaseous effluent reformed at the second temperature being suppressed, and the cooling means connected to the reforming means.

20. The processing system as set forth in claim 19, further comprising:
   a neutralizing means for neutralizing the gaseous effluent.

21. The processing apparatus as set forth in claim 1, wherein the carrier gas is chosen from nitrogen gas and at least one noble gas.

* * * * *

UNITED STATES PATENT AND TRADEMARK OFFICE
CERTIFICATE OF CORRECTION

PATENT NO. : 6,332,909 B1
DATED : December 25, 2001
INVENTOR(S) : Teshima et al.

It is certified that error appears in the above-identified patent and that said Letters Patent is hereby corrected as shown below:

Column 98,
Line 46, change "vaporized," to -- vaporized; --.

Column 100,
Line 20, change "claim 13" to -- claim 13, --.

Signed and Sealed this

Twenty-third Day of April, 2002

Attest:

Attesting Officer

JAMES E. ROGAN
Director of the United States Patent and Trademark Office